US008180486B2

(12) United States Patent  (10) Patent No.: US 8,180,486 B2
Saito et al.  (45) Date of Patent: May 15, 2012

(54) MOBILE ROBOT AND CONTROLLER FOR SAME

(75) Inventors: Yoko Saito, Saitama (JP); Koji Kawabe, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 1264 days.

(21) Appl. No.: 11/905,344

(22) Filed: Sep. 28, 2007

(65) Prior Publication Data
US 2008/0086236 A1   Apr. 10, 2008

(30) Foreign Application Priority Data

Oct. 2, 2006 (JP) ................. 2006-270374
Oct. 2, 2006 (JP) ................. 2006-270375
Oct. 2, 2006 (JP) ................. 2006-270376
Oct. 2, 2006 (JP) ................. 2006-270377

(51) Int. Cl.
*H04B 7/26* (2006.01)
*G05D 1/02* (2006.01)
*H04W 16/20* (2009.01)
*G06F 19/00* (2011.01)
*H04W 16/00* (2009.01)

(52) U.S. Cl. ........ 700/245; 700/258; 700/255; 700/253; 701/450; 701/461; 701/532; 901/1

(58) Field of Classification Search .......... 700/245–264; 901/1
See application file for complete search history.

(56) References Cited

U.S. PATENT DOCUMENTS

| 6,522,888 | B1 | 2/2003 | Garceran et al. |
| 7,162,507 | B2 * | 1/2007 | Carter ........................ 709/200 |
| 7,456,596 | B2 * | 11/2008 | Goodall et al. ........... 318/568.12 |
| 2002/0129138 | A1 * | 9/2002 | Carter .......................... 709/224 |
| 2005/0051368 | A1 | 3/2005 | Takenaka et al. |

(Continued)

FOREIGN PATENT DOCUMENTS

DE 199 83 163 T1  6/2001

(Continued)

OTHER PUBLICATIONS

Kyu-Han Kim, Alexander W. Min, Kang G. Shin, Sybot: an adaptive and mobile spectrum survey system for wifi networks, Proceedings of the sixteenth annual international conference on Mobile computing and networking, Sep. 20-24, 2010, Chicago, Illinois, USA.*

(Continued)

*Primary Examiner* — Khoi Tran
*Assistant Examiner* — Dale Moyer
(74) *Attorney, Agent, or Firm* — Squire Sanders (US) LLP

(57) ABSTRACT

A mobile robot includes a radio communication unit; a radio environment detector detecting plural types of radio environment data indicating the degree of goodness of radio environment, a comprehensive radio environment data being calculated from results of weighting the plural types of radio environment data with predetermined weights; a self-position detecting unit; a storage for map data of a movement area; the calculated comprehensive radio environment data being written in association with its own position detected. The robot moves at a movement speed not higher than the maximum movement speed determined so that communication with the radio base station is not cut off during movement and, if radio communication is cut off, searches the radio environment map for a communication restoration position where the radio communication is feasible to establish and moves to the communication restoration position and has the radio intensity reporting control section reporting the determined level of radio intensity.

31 Claims, 53 Drawing Sheets

U.S. PATENT DOCUMENTS

| | | | |
|---|---|---|---|
| 2006/0058921 A1* | 3/2006 | Okamoto | 700/255 |
| 2006/0106496 A1* | 5/2006 | Okamoto | 700/253 |
| 2006/0126918 A1 | 6/2006 | Oohashi et al. | |
| 2006/0129276 A1 | 6/2006 | Watabe et al. | |
| 2007/0042716 A1* | 2/2007 | Goodall et al. | 455/67.11 |
| 2007/0178911 A1* | 8/2007 | Baumeister et al. | 455/456.1 |

FOREIGN PATENT DOCUMENTS

| | | |
|---|---|---|
| DE | 600 11 194 T2 | 6/2005 |
| EP | 1 609 568 A1 | 12/2005 |
| JP | 10-098759 A | 4/1998 |
| JP | 2000-184469 A | 6/2000 |
| JP | 2000-253438 A | 9/2000 |
| JP | 2001-062760 | 3/2001 |
| JP | 2001-191275 A | 7/2001 |
| JP | 2004-260769 | 9/2004 |
| JP | 2004-283943 A | 10/2004 |
| JP | 2004-299033 A | 10/2004 |
| JP | 2005-025516 | 1/2005 |
| JP | 2005-086262 A | 3/2005 |
| JP | 2005-288573 | 10/2005 |
| JP | 2005-300462 A | 10/2005 |
| JP | 2005-313308 A | 11/2005 |
| JP | 2006-167838 A | 6/2006 |
| WO | WO 99/59363 | 11/1999 |

OTHER PUBLICATIONS

Japanese Office Action application No. 2006-270374 dated May 10, 2011.

German Search Report 41486P De/HGkr dated Jul. 8, 2008 w/English translation.

Japanese Office Action application No. 2006-270374 dated Sep. 28, 2010.

Japanese Office Action application No. 2006-270376 dated Oct. 5, 2010.

* cited by examiner

FIG.7

| ITEM | WEIGHT | RANGE OF VALUE | CONVERSION EQUATION | NORMALIZING |
|---|---|---|---|---|
| RADIO INTENSITY | 80 | 1~100[%] | WHEN RADIO INTENSITY/NOISE FLOOR > 1, 1 (RADIO INTENSITY/NOISE FLOOR) × 0.8 WHEN INTENSITY/NOISE FLOOR ≤ 1, 0 | 0~80% |
| NOISE FLOOR | | 1~100[%] | | |
| NUMBER OF ERROR TIMES | 5 | 0~1028[times/sec] | (1−(NUMBER OF ERROR TIMES/1028)) × 5 | 0~5% |
| NUMBER OF RETRANSMISSION TIMES | 5 | 0~1028[times/sec] | (1−(NUMBER OF RETRANSMISSION TIMES/1028)) × 5 | 0~5% |
| COMMUNICATION SPEED | 10 | 1, 2, 5.5, 11[Mbps] 6, 9, 12, 18 24, 36, 48, 54[Mbps] | 1 → 0<br>2 → 2<br>5.5 → 8<br>11 → 10<br>6 → 0<br>9 → 1<br>12 → 3<br>18 → 4<br>24 → 5<br>36 → 8<br>48 → 9<br>54 → 10 | 0~10% |

TOTAL (COMPREHENSIVE RADIO ENVI. DATA) =0~100%

FLOOR MAP

COMPREHENSIVE RADIO ENVI. MAP (LINKED TO FLOOR MAP)

MEASURING POSITION (IN GRID)

MEASURING POSITION (INDIVIDUALLY ADDED)

COMPREHENSIVE RADIO ENVIRONMENT MAP (FOR ROBOT)

COMPREHENSIVE RADIO ENVIRONMENT MAP (DISPLAY FOR USER)

| COMPREHENSIVE RADIO ENVI. | LEVEL |
|---|---|
| 70~100% | Excellent |
| 50~69% | Good |
| 1~59% | Poor |

FIG.20A
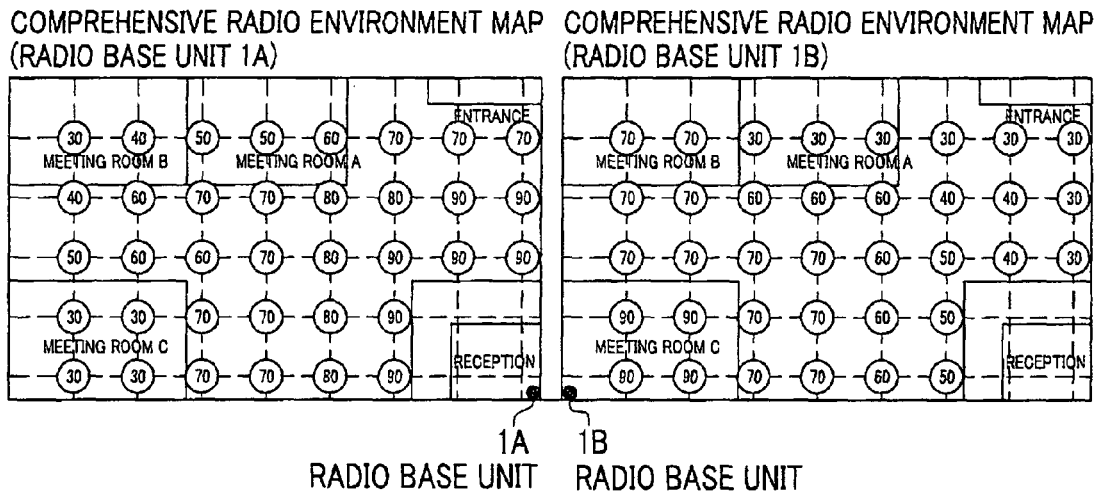
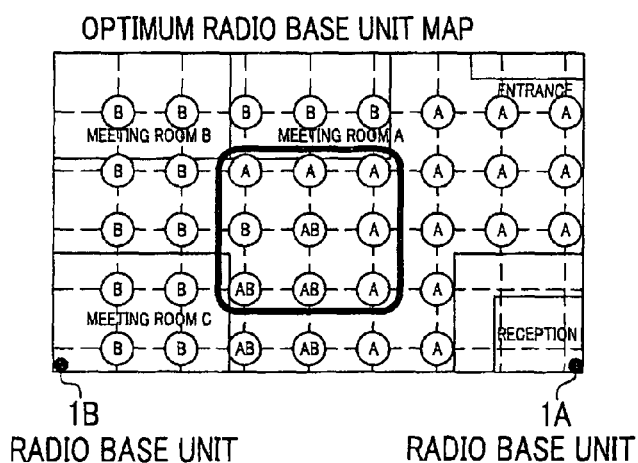
FIG.20B
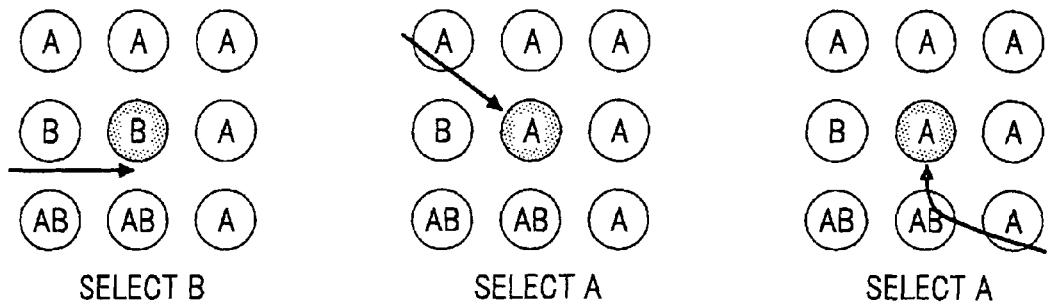

FIG.24A
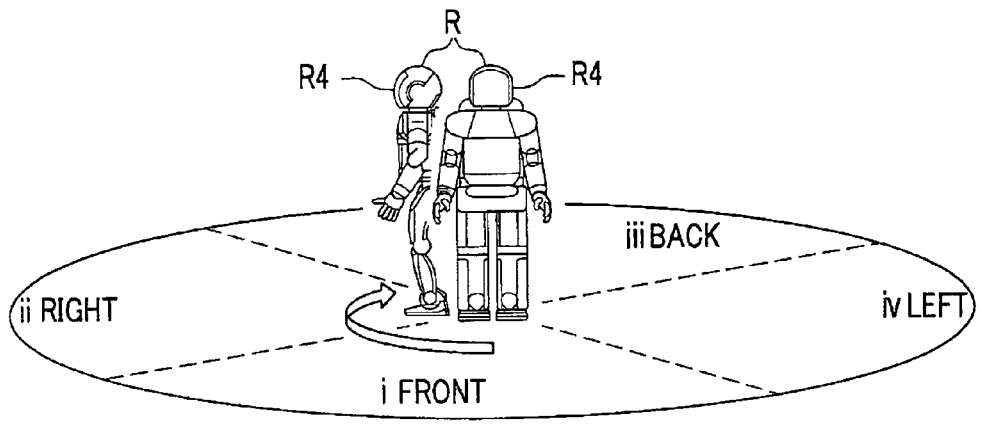
FIG.24B
FLOOR MAP
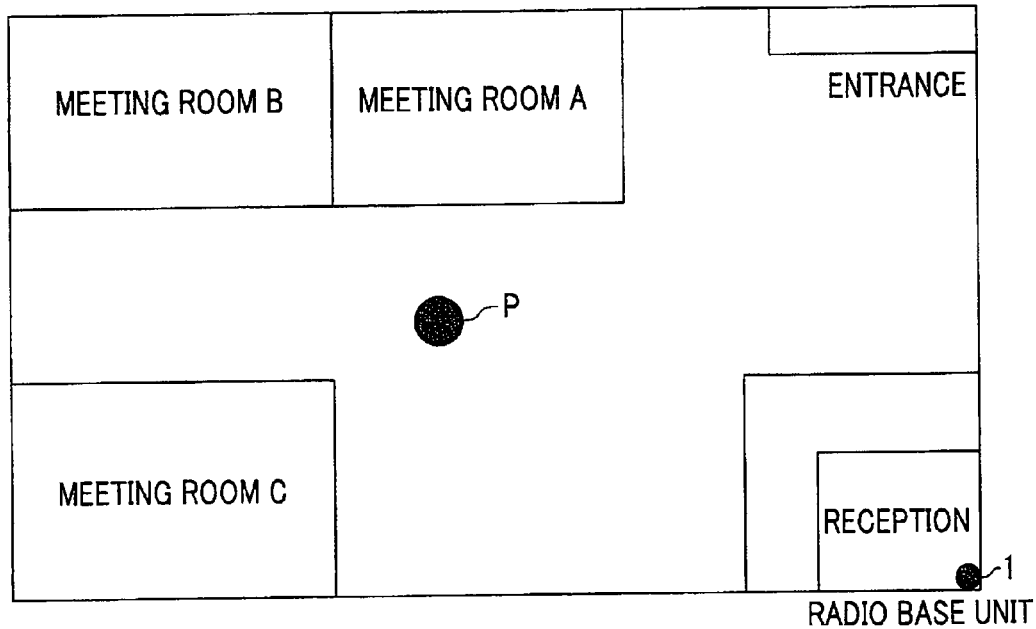
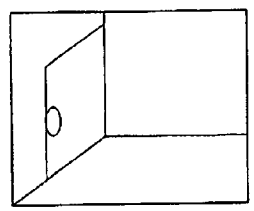
i FRONT
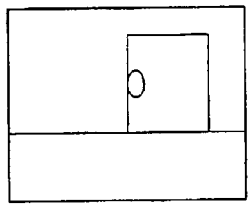
ii RIGHT
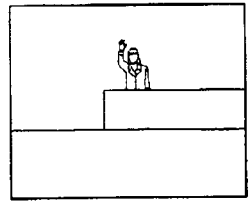
iii BACK
iv LEFT

FLOOR MAP (MAP DATA)

RADIO ENVIRONMENT MAP

FIG.27A
RADIO ENVIRONMENT MAP
(RADIO BASE UNIT 1A)
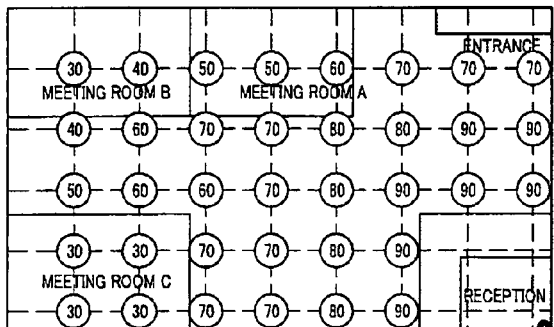
FIG.27B
RADIO ENVIRONMENT MAP
(RADIO BASE UNIT 1B)
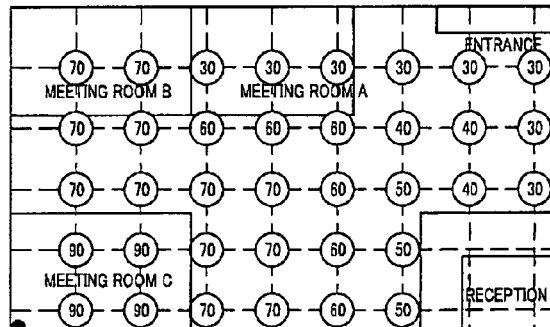
1A    1B
RADIO BASE UNIT  RADIO BASE UNIT
FIG.27C  ⇩ ONE HAVING GREATER
           NUMBER IS SELECTED
OPTIMUM RADIO BASE UNIT MAP
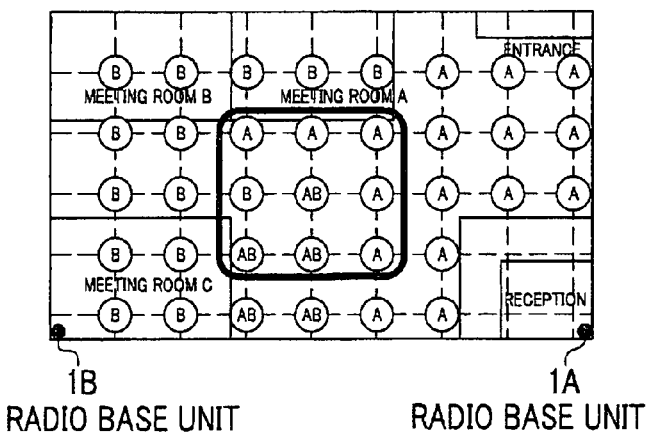
1B                          1A
RADIO BASE UNIT             RADIO BASE UNIT

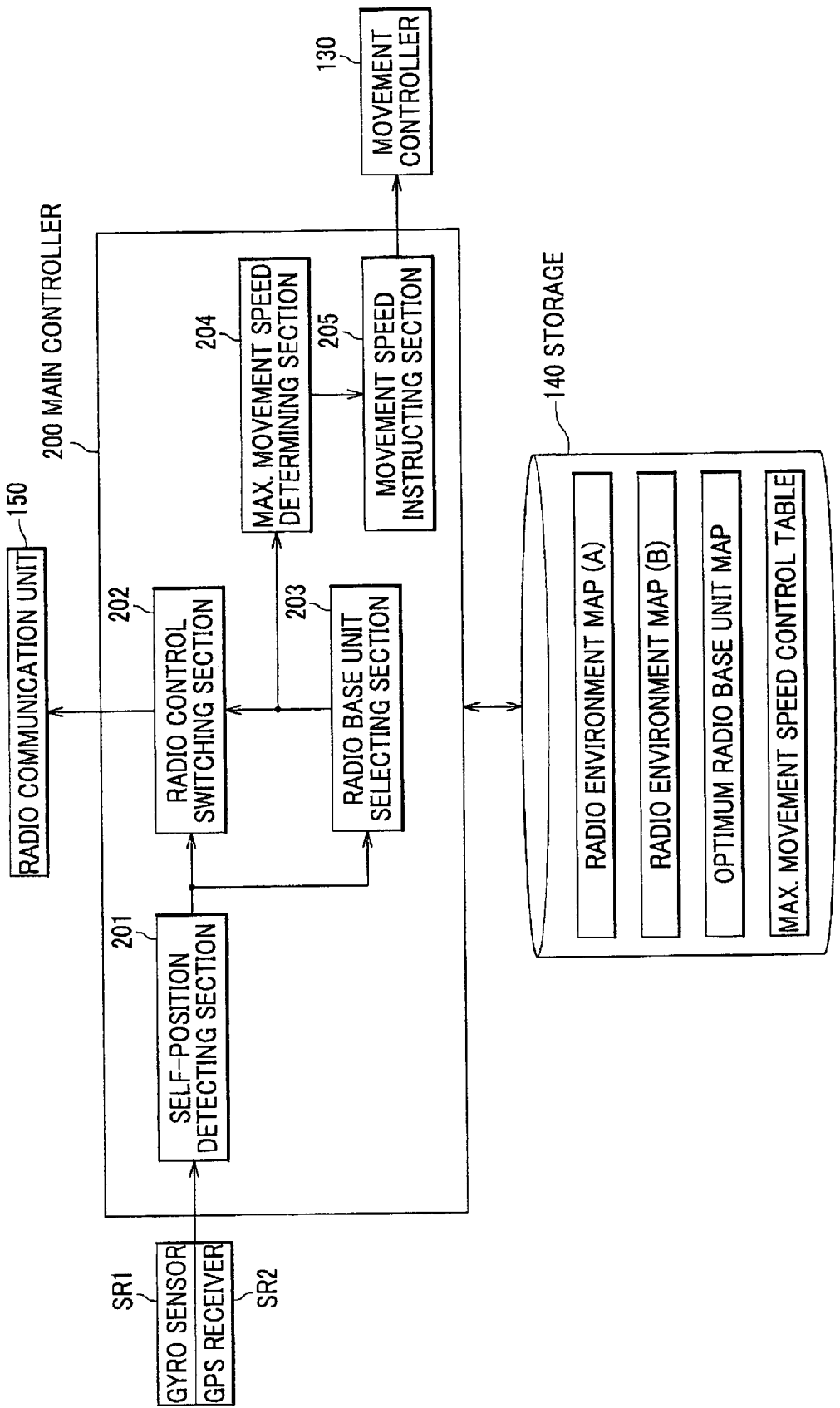

RADIO ENVIRONMENT IS PRIORITIZED

AVOIDING LINK SWITCHING IS PRIORITIZED

COORDINATES OF POSITIONS

RADIO ENVIRONMENT MAP (RADIO BASE UNIT 1A)

RADIO ENVIRONMENT MAP (RADIO BASE UNIT 1B)

RADIO ENVIRONMENT MAP (RADIO BASE UNIT 1C)

OPTIMUM RADIO BASE UNIT MAP

MOVE TASK IN DIRECTION WITH WHICH
RADIO ENVIRONMENT GOES UP

MOVE TASK IN DIRECTION WITH WHICH
RADIO ENVIRONMENT GOES DOWN

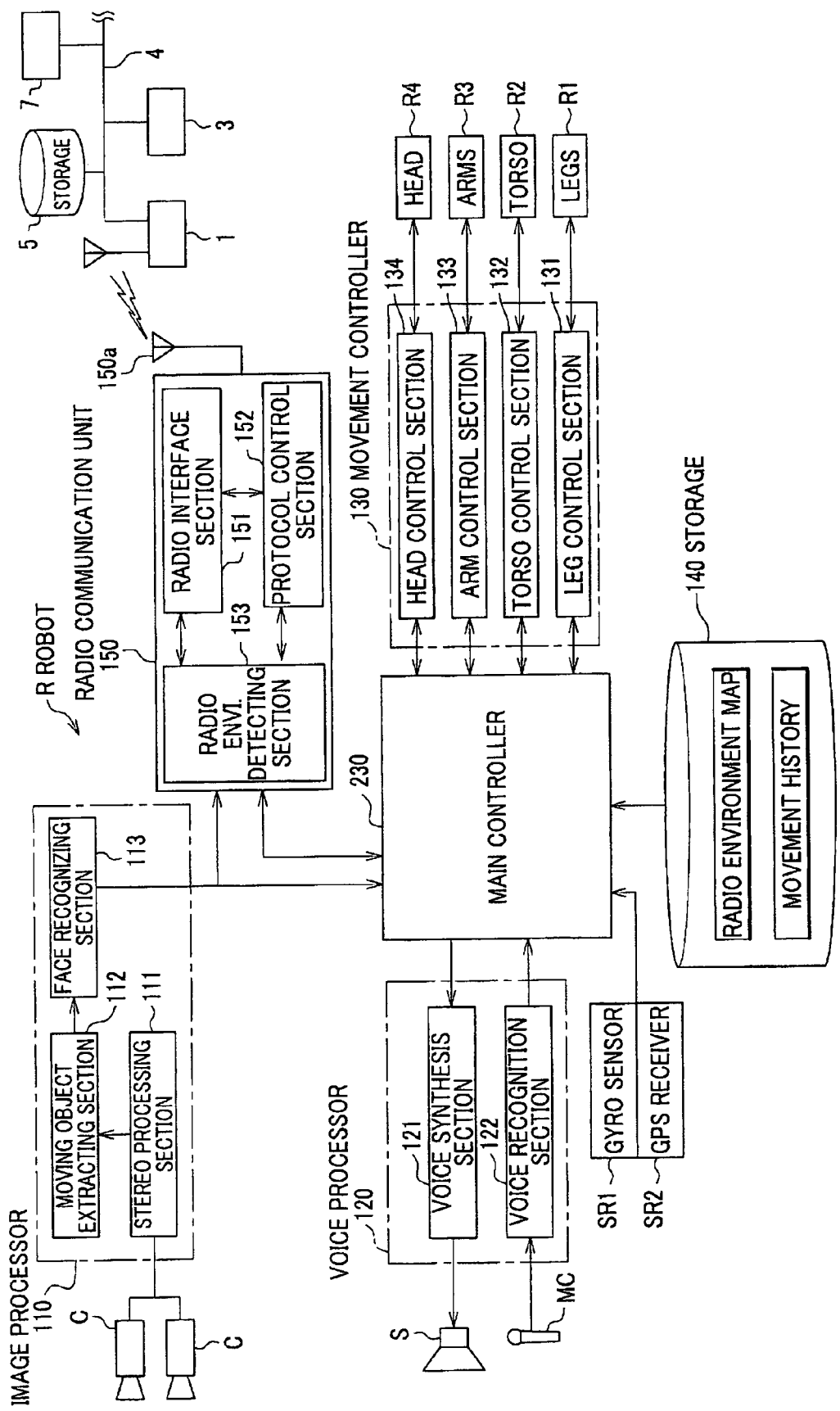

SWING HEAD TO LEFT AND RIGHT

SWING HEAD UP AND DOWN

TURN THROUGH 360° AT CURRENT POSITION

MOVE A STEP IN EIGHT DIRECTIONS FROM CURRENT POSITION

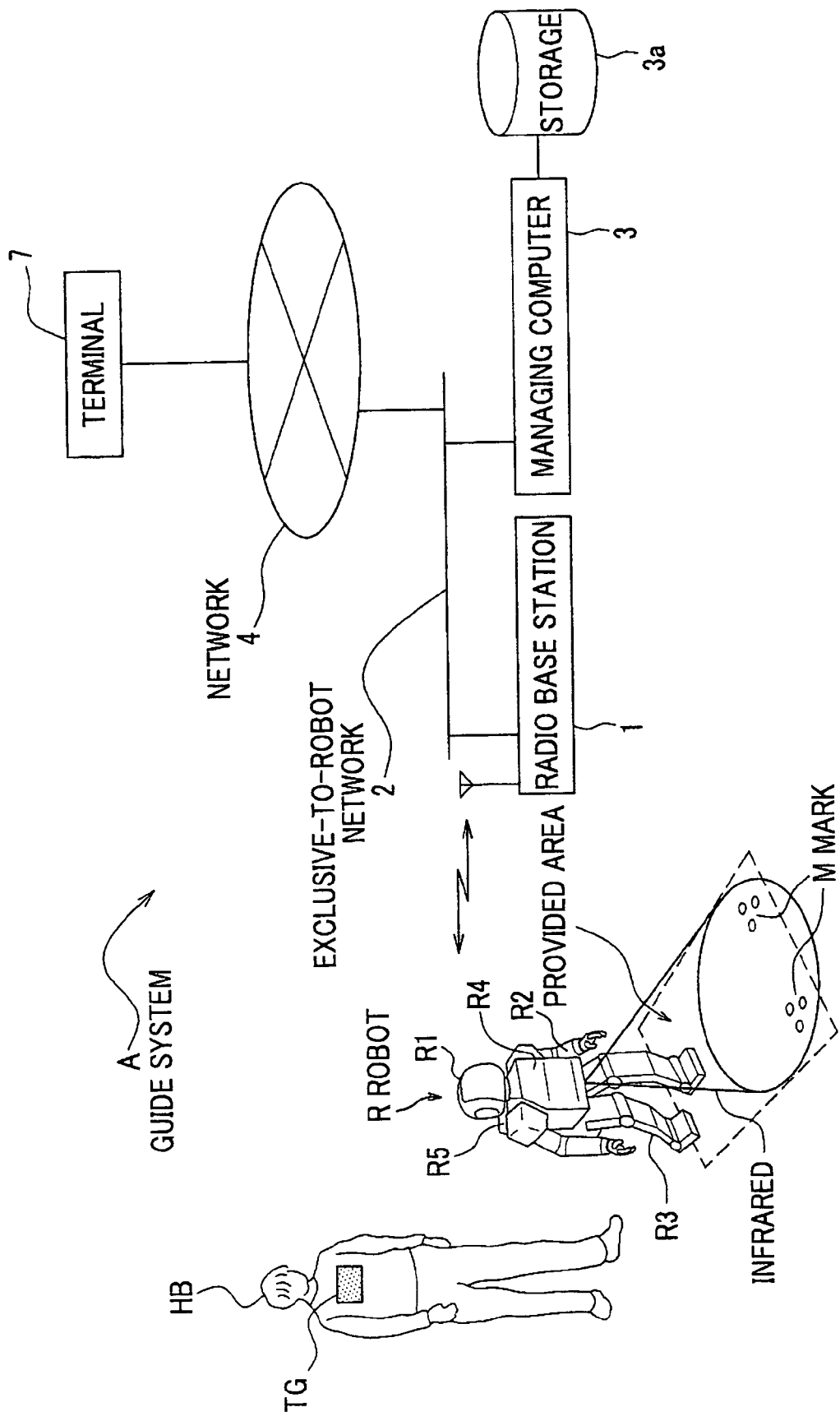

MOBILE ROBOT AND CONTROLLER FOR SAME

CROSS-REFERENCE TO RELATED APPLICATIONS

The present application claims priority from Japanese Patent Application Nos. 2006-270374, 2006-270375, 2006-270376, and 2006-270377 filed on Oct. 2, 2006, which are herein incorporated by reference.

BACKGROUND OF THE INVENTION

1. Field of the Invention

The present invention relates to a mobile robot that moves while communicating by radio with a managing computer and a controller for the same.

2. Description of the Related Art

In recent years, a technique of issuing a task execution command signal to a mobile robot to have it execute a task has been proposed. Such a mobile robot cannot be remotely controlled by radio if the mobile robot has been moved outside the reaching range of radio waves, and a person needs to take the mobile robot back to within the reaching range of radio waves by hand.

As to this problem, in Japanese Patent Application Laid-Open Publication No. 2004-260769 (hereinafter called a reference 1), paragraphs 0008-0012 and FIGS. 4-6, a mobile robot has been proposed which is configured to move autonomously to a radio link-feasible point according to a radio wave intensity map created based on the radio wave intensities obtained while moving if having moved outside the reaching range of radio waves.

Further, in Japanese Patent Application Laid-Open Publication No. 2005-025516 (hereinafter called a reference 2), paragraph 0016 and FIG. 9, a mobile robot has been proposed wherein, where a plurality of the mobile robots are operating, for a mobile robot having moved into an area where radio waves are weak, another mobile robot relays communication with a base station.

However, because the mobile robot described in the reference 1 selects a movement path based on the radio wave intensity map, the mobile robot may not be able to return to a communication-feasible area if communication is cut off by a cause other than radio wave intensity such as noise.

As to the mobile robot described in the reference 2, where only one mobile robot is operating, the mobile robot cannot have communication with the base station relayed, and when having moved outside the reaching range of radio waves, the mobile robot may not be able to return to a communication-feasible area.

Of the above conventional art, in the technique of the reference 1, a movement path for restoration is selected based on only the radio wave intensity map. With this technique, there is the problem that, because radio communication can be cut off by a cause other than radio wave intensity such as noise, radio communication may not be restored depending on the radio environment even if the mobile robot has moved to a place where radio waves are enough in intensity.

With the technique of the reference 2, there is the problem that, where only one mobile robot is operating, radio communication cannot be restored if the mobile robot has moved outside the reaching range of radio waves.

Further, a mobile robot is known which transmits and receives information to and from a managing computer via a radio base station linked to the managing computer and which autonomously moves in a movement area (refer to, e.g., the references 1, 2).

The robot described in the reference 1 is a movable house-sitting monitoring robot having a radio device, a camera, and an infrared transmitter. This robot receives by the radio device instructions transmitted over a network by a user from a remote place, and in response to the instructions, moves in the home from which the user is absent, and operates electric appliances with the use of the infrared transmitter or monitors its surroundings with the use of the camera. Furthermore, if having moved to a point where the state of radio waves received by the radio device is bad, this robot will automatically return to a point where the radio wave state is good (a restoring process).

The robot described in the reference 2 is a humanoid bipedal walking robot having voice recognition and voice synthesis devices and can communicate well with a human who gives instructions to the robot by voice or is involved in the work of the robot. For example, the robot transmits a tag ID obtained from a human with a detection tag who is near the robot to a managing computer, receives personal information (such as name and job title) of the human from the managing computer, and thus can perform interaction tailored for the human.

However, with the conventional art, when the robot has moved to a point where the radio environment is bad, the following problems occur:

The robot described in the reference 1 is a house-sitting monitoring robot and not one intended to communicate with humans. If a human (user) near the robot observes the robot moving, he/she cannot determine whether the robot is moving toward a workplace to work or from a position where the radio wave state is bad to a position where good. Hence, when the user gives a new instruction to the robot that is moving, the new instruction will not reach the robot if the robot is moving for restoration. Thus, when giving a new instruction to the robot moving, the user cannot confirm whether the robot has correctly received the new instruction.

Another robot described in Japanese Patent Application Laid-Open Publication No. 2005-288573 (hereinafter called a reference 3), paragraphs 0147-0167 and FIG. 15 cannot correctly communicate data with a managing computer when having moved to a position where the radio environment is bad. For example, if the robot cannot receive personal information of a detected human from the managing computer, a failure occurs in communication with the detected human. In such a case, humans near the robot cannot determine whether the change in the robot's response is caused by a failure or degradation in the radio environment or whether it is intended in design. Thus, they cannot determine how to deal with it.

As such, there is the problem that the utility (variance of freedom) of the robot is reduced because the radio wave state cannot be recognized. In other words, restoration of the radio communication such as cut off cannot be provided. That is, there is the problem that a human has to analyze the cause to restore the robot, which makes the robot difficult to use.

SUMMARY OF THE INVENTION

The present invention was made in order to solve the above problems and an object thereof is to provide a mobile robot that creates a map which allows it to determine the radio environment state of communication with a radio base station appropriately.

Another object of the present invention is to provide a mobile robot that can move autonomously to a place where radio communication can be restored if having moved to a place where radio communication is cut off, and a controller for the mobile robot.

Yet another object of the present invention is to provide a controller for a robot with which a person near the robot can recognize the state of the robot's radio environment.

A first aspect of the present invention provides a mobile robot which communicates by radio with a managing computer via one or more radio base stations coupled to the managing computer and autonomously moves in a movement area through use of map data of the movement area, comprising: a radio communication unit for communicating by radio with each of the radio base stations; a radio environment detecting unit for detecting plural types of radio environment data including radio intensity of a signal received by the radio communication unit in radio communication with the radio base station, which data indicate degrees of goodness of a radio environment of the radio communication; a comprehensive radio environment data calculating unit for weighting the plural types of radio environment data with predetermined weights and calculating comprehensive radio environment data from results of weighting; a self-position detecting unit for detecting a position of the robot in the movement area; a storing unit for storing a map data of the movement area; and a comprehensive radio environment map creating unit for creating a comprehensive radio environment map for each the radio base stations by writing the calculated comprehensive radio environment data in association with the position detected by the self-position detecting unit when the radio environment data was detected into the map data stored in the storing unit.

With this configuration, the mobile robot, by the radio communication unit, receives a signal transmitted by the radio base station, and the radio environment detecting unit detects radio intensity of the received signal and also communication speed, the number of communication error times, and the number of data retransmission times that are radio environment data (indexes) indicating the degree of goodness of the radio environment. Then, the mobile robot, by the comprehensive radio environment data calculating unit, weights the plural types of radio environment data with predetermined weights and takes, for example, their weighted average, thereby calculating comprehensive radio environment data. Then, the mobile robot, by the comprehensive radio environment map creating unit, writes the calculated comprehensive radio environment data in association with the position detected by the self-position detecting unit when the radio environment data was detected, that is the position where the radio environment data was detected, into the map data stored in the storing unit, thereby creating a comprehensive radio environment map.

By this means, the mobile robot can determine the radio environment state in the movement area by using the comprehensive radio environment map comprising the comprehensive radio environment data for each position, which data include radio intensity and other indexes indicating the degree of goodness of the radio environment.

A second aspect of the present invention provides the mobile robot based on the first aspect, wherein the plural types of radio environment data include data about at least one of communication speed, the number of communication error times, and the number of data retransmission times in addition to the data about the radio intensity.

With this configuration, the mobile robot creates the comprehensive radio environment map comprising the comprehensive radio environment data for each position, which data includes radio intensity and at least one of communication speed, the number of communication error times, and the number of data retransmission times, which indicate the communication state more directly than radio intensity, as another index indicating the degree of goodness of the radio environment.

By this means, the mobile robot can determines the radio environment state in the movement area more accurately.

A third aspect of the present invention provides the mobile robot based on the first aspect, further comprising a movement control unit for autonomously moving to a predetermined position based on the map data stored in the storing unit and the position detected by the self-position detecting unit and a detecting unit for at the predetermined position, detecting the plural types of radio environment data by the radio environment detecting unit.

With this configuration, the mobile robot autonomously moves to any specified position in the movement area based on the map data stored in the storing unit and the position detected by the self-position detecting unit and at that position, detects the plural types of radio environment data by the radio environment detecting unit and creates a comprehensive radio environment map comprising the comprehensive radio environment data calculated based on the detected radio environment data.

By this means, the mobile robot can automatically create the comprehensive radio environment map with only positions to detect radio environment data being specified.

A fourth aspect of the present invention provides the mobile robot based on the first aspect further comparing a movement detecting unit for detecting a movement direction and movement speed of a person, wherein the mobile robot moves together with the person in the movement direction and at the movement speed detected by the movement detecting unit and detects the plural types of radio environment data on a path on which the mobile robot moves together with the person by the radio environment detecting unit.

With this configuration, the mobile robot, by the movement detecting unit, detects the movement direction and movement speed of a person who leads the mobile robot to positions to detect radio environment data and moves together with the person. For a humanoid mobile robot, the movement detecting unit can be six-axis force sensors. When a person leads the mobile robot by its hand, the mobile robot analyzes the components of the reaction in respective directions detected by the sensor, detects the direction and magnitude of the force with which the person leads the robot by its hand, and determines the movement direction and speed of the person based on the detected values. The mobile robot detects radio environment data at a position where the person has stopped or at a predetermined time period by the radio environment detecting unit and creates a comprehensive radio environment map comprising the comprehensive radio environment data for each position calculated based on the detected radio environment data.

By this means, an operator need not enter positions to detect radio environment data in order to create a comprehensive radio environment map but need only lead the mobile robot in the movement area as needed, thus creating a comprehensive radio environment map.

A fifth aspect of the present invention provides the mobile robot based on the first aspect, wherein the radio environment detecting unit detects the plural types of radio environment data repeatedly at predetermined timings, and the comprehensive radio environment data calculating unit calculates the comprehensive radio environment data based on the radio environment data obtained in each repetition of the detection, the mobile robot further comprising: a comprehensive radio environment map updating unit for updating the comprehensive radio environment map by comparing the calculated comprehensive radio environment data as first data and the comprehensive radio environment data which is stored in the map data as second data in association with the position detected when the corresponding radio environment data was detected and, if a difference between the first and second data being at or above a predetermined value has occurred a predetermined number of consecutive times, replacing the comprehensive radio environment data stored in the map data with the last calculated comprehensive radio environment data.

With this configuration, the mobile robot, by the radio environment detecting unit, detects radio environment data repeatedly at predetermined timings during the execution of a task such as carrying an article, and the comprehensive radio environment data calculating unit calculates the comprehensive radio environment data based on the detected radio environment data. That is, the mobile robot always obtains the comprehensive radio environment data repeatedly. Then, the comprehensive radio environment map updating unit compares the comprehensive radio environment data obtained in each repetition and the comprehensive radio environment data which is stored in the map data in association with the position where the corresponding radio environment data was detected. That is, it compares the current comprehensive radio environment data and the past comprehensive radio environment data stored in the map data and, if a predetermined number of (e.g., three), or more, cases where the difference between the two is at or above a predetermined value (e.g., 10%) occur consecutively, overwrites the comprehensive radio environment data stored in the map data with the second most recently obtained comprehensive radio environment data (the second data in the case of three consecutive times), thereby updating the comprehensive radio environment map, considering that a lasting change in the radio environment has occurred such as a partition being newly provided.

By this means, the mobile robot R can perform maintenance on the comprehensive radio environment map by executing a usual task.

A sixth aspect of the present invention provides the mobile robot based on the first aspect, further comprising: an image pickup unit; and a surroundings image acquiring unit for acquiring and storing images of surroundings of the robot picked up by the image pickup unit at the position where the radio environment data was detected by the radio environment detecting unit in association with the position where the radio environment data was detected into the storing unit.

With this configuration, the mobile robot, by the surroundings image acquiring unit, picks up images of the surroundings at the position where the radio environment data was detected by the radio environment detecting unit with use of the image pickup unit such as cameras and stores the picked up image data in association with the position where the radio environment data was detected into the storing unit.

The images of the surroundings are an image with the entire field angle of 360 degrees with respect to a horizontal direction, which image is, if a camera that can pick up an image with the field angle of 90 degrees is used, four frames of image data obtained by the robot R turning 90 degrees by 90 degrees while picking up images sequentially.

By this means, when a large change in radio environment data has occurred relative to data recorded in the comprehensive radio environment map, an operator can refer to and use the image data of the surroundings of the mobile robot at that position as information useful in considering the cause of the change and a measure.

A seventh aspect of the present invention provides the mobile robot based on the first aspect, further comprising: an optimum radio base station map creating unit for creating an optimum radio base station map by writing a radio base station having the best comprehensive radio environment data selected for each of positions based on a plurality of comprehensive radio environment maps created by the comprehensive radio environment map creating unit respectively for the plurality of radio base stations, in association with the position into the map data stored in the storing unit.

With this configuration, where a plurality of radio base stations are provided in the movement area, the mobile robot, by the comprehensive radio environment map creating unit, creates a comprehensive radio environment map for each of the plurality of radio base stations and next, by the optimum radio base station map creating unit, compares a plurality of comprehensive radio environment data for each detection position based on a plurality of the comprehensive radio environment maps and then, determines the radio base station having the best comprehensive radio environment data to be the optimum radio base station for the detection position and writes the optimum radio base station in association with the position into the map data stored in the storing unit, thereby creating an optimum radio base station map.

By this means, the mobile robot can determine the radio base station having the best radio environment for each position in the movement area using the optimum radio base station map.

An eighth aspect of the present invention provides the mobile robot based on the seventh aspect, further comprising: a radio base station failure notifying unit for determining whether the radio environmental data was normally detected as a failure and, when the radio environment data of one radio base station is not normally detected, notifying the occurrence of the failure in the one radio base station to the managing computer via a radio base station other than the one radio base station by the radio communication unit.

With this configuration, where a plurality of radio base stations are provided in the movement area, when the radio environment detecting unit could not normally detect radio environment data of the radio base station linked (or to be linked), the mobile robot, by the radio base station failure notifying unit, determines that a failure has occurred in the radio base station and notifies the occurrence of a failure in the radio base station to the managing computer via another radio base station.

By this means, the mobile robot can quickly notify the occurrence of a failure in a radio base station to the managing computer.

A ninth aspect of the present invention provides the mobile robot based on the first aspect, further comprising a transmitting unit for transmitting a comprehensive radio environment map created by the comprehensive radio environment map creating unit to the managing computer via the radio communication unit.

With this configuration, the mobile robot transmits a comprehensive radio environment map created to the managing computer by the radio communication unit.

Thus, the managing computer stores the comprehensive radio environment map received in, e.g., a storage, and, if the comprehensive radio environment map stored in the storing unit is erased due to restart or the like, the mobile robot can download the comprehensive radio environment map stored in the storage into the storing unit to use it without the need to create the comprehensive radio environment map for the movement area again.

According to the present invention, the mobile robot can precisely determine the radio environment state of communication with the radio base station and prevent communication cutoff from happening, which cannot be predicted from radio intensity.

A tenth aspect of the present invention provides the mobile robot based on the first aspect, further comprising: a movement controlling unit for driving and controlling a movement mechanism for the robot to move autonomously to a goal position specified by the managing computer using the comprehensive radio environmental map; a movement speed instructing unit for instructing the movement controlling unit about a movement speed; and a maximum movement speed determining unit for determining a maximum movement speed for a movement path decided by the position of the robot detected by the self-position detecting unit before starting to move and by the goal position based on the radio environment data and the maximum movement speed associated with the radio environment data beforehand, wherein the movement speed instructing unit instructs the movement controlling unit about a movement speed not higher than the maximum movement speed determined by the maximum movement speed determining unit.

With this configuration, the mobile robot, by the maximum movement speed determining unit, determines a maximum movement speed for a movement path decided by the position, i.e. a start position, detected by the self-position detecting unit before starting to move and by the goal position specified by the managing computer based on the radio environment data (e.g., radio intensity) for the movement path in the radio environment map and the maximum movement speed associated with the radio environment data beforehand. The mobile robot, by the movement speed instructing unit, instructs the movement control unit to control to have move at a movement speed not higher than the maximum movement speed, and the movement control unit drives a movement mechanism for the robot to move at the movement speed specified by the movement speed instructing unit.

By this means, the mobile robot can move at the movement speed with the upper limit depending on the radio environment state for the movement path.

An eleventh aspect of the present invention provides the mobile robot based on the tenth aspect, wherein the radio environment data includes plural types of radio environment indexes including radio intensity of a signal received by the radio communication unit in radio communication with the radio base station, which indexes indicate the degrees of goodness of the radio environment of the radio communication.

With this configuration, the mobile robot, by the maximum movement speed determining unit, determines a maximum movement speed depending on radio environment data including radio environment indexes such as communication speed, the number of communication error times, and the number of data retransmission times as well as radio intensity.

By this means, the mobile robot can determine the radio environment state more appropriately than depending on only radio intensity, thus determining a maximum movement speed more appropriate for the radio environment.

A twelfth aspect of the present invention provides the mobile robot based on the tenth aspect, further comprising: a radio base station selecting unit for selecting a radio base station for the radio communication unit to link to from the plurality of radio base stations based on the respective comprehensive radio environment maps for the radio base stations; and a radio control switching unit for switching a link destination of the radio communication unit to the radio base station selected by the radio base station selecting unit; wherein the maximum movement speed determining unit determines a maximum movement speed based on the radio environment data stored in the comprehensive radio environment map for the radio base station selected by the radio base station selecting unit.

With this configuration, where the managing computer is connected to a plurality of radio base stations, that is, where a plurality of radio base stations are provided in the movement area, the mobile robot, by the radio base station selecting unit, selects one for the radio communication unit to link to from the plurality of radio base stations based on the respective comprehensive radio environment maps for the radio base stations. Then, the radio control switching unit switches the link destination of the radio communication unit to the radio base station selected by the radio base station selecting unit. The maximum movement speed determining unit determines a maximum movement speed depending on the radio environment data stored in the comprehensive radio environment map for the radio base station selected by the radio base station selecting unit.

Thus, the mobile robot can specify the radio base station for determining a radio environmental status in a moving region where a plurality of radio base stations are arranged to determine a maximum movement speed, and can move at a movement speed restricted up to a upper limit of the determined maximum movement speed.

A thirteenth aspect of the present invention provides the mobile robot based on the twelfth aspect, further comprising an optimum radio base station map creating unit for creating an optimum radio base station map by writing a radio base station having the best comprehensive radio environment data selected for each of positions based on a plurality of comprehensive radio environment maps created by the comprehensive radio environment map creating unit respectively for the plurality of radio base stations, in association with the position into the map data stored in the storing unit, wherein the radio base station selecting unit selects a radio base station for the radio communication unit to link to from the radio base stations based on an optimum radio base station map.

With this configuration, the mobile robot, by the radio base station selecting unit, selects an optimum radio base station as the radio base station to link to for each position based on the optimum radio base station map.

Thereby, the mobile robot can communicate with the managing computer with the best radio environment state.

A fourteenth aspect of the present invention provides the mobile robot based on the twelfth aspect, wherein when the radio control switching unit switches the link of the radio communication unit between the radio base stations, the movement speed instructing unit stops the robot moving.

With this configuration, the mobile robot, by the movement speed instructing unit, instructs the movement control unit a movement speed of zero to stop the robot moving and then, by the radio control switching unit, switches the link of the radio communication unit between the radio base stations. Thus, in link switching, the occurrence of a failure can be prevented such as the mobile robot with communication cut off moving into an area, e.g., where communication is not feasible.

A fifteenth aspect of the present invention provides the mobile robot based on the twelfth aspect, wherein the radio base station selecting unit selects a radio base station closest to the goal position from radio base stations with which radio communication is established at a current position before starting to move and for which the radio environment data for the goal position is at or above a predetermined value.

With this configuration, where a plurality of radio base stations are provided in the movement area, the mobile robot, by the radio base station selecting unit, selects the radio base station with which radio communication can be established at a start position and for which the radio environment state can be maintained sufficient for the movement path and links to the selected radio base station to communicate with it.

By this means, the mobile robot can move without link switching to another radio base station because the risk of communication cutoff is relatively low on the entire movement path.

A sixteenth aspect of the present invention provides the mobile robot based on the first aspect, further comprising: a movement controlling unit for driving and controlling a movement mechanism for the robot to move autonomously; a monitoring unit for monitoring the state of the radio environment; a searching unit for, when the radio environment state being monitored becomes a state of radio communication being cut off, searching for a communication restoration position where the radio communication is feasible to establish based on the comprehensive radio environment map; and a self-position move instructing unit for instructing the movement controlling unit to control move from the position detected to the communication restoration position found by the searching unit.

With this configuration, the mobile robot stores a radio environment map where map data is associated with comprehensive radio environment data made up of a plurality of radio environment data in the radio environment map storing unit beforehand. Thus, the mobile robot can find out the radio environment in the movement area. The comprehensive radio environment data can comprise plural type of radio environment data (for example, radio intensity, noise floor, number of error times, number of retransmission times, and the like), thereby more accurately indicating positions where radio base stations can be linked to.

The mobile robot detects its current position (its own position) by the self-position detecting unit, which detects the mobile robot's current position using a gyro sensor, a GPS (Global Positioning System) receiver, or the like.

The mobile robot monitors the state of the radio environment by the monitoring unit. The radio environment refers to the state of radio waves or communication in communication by radio. The state of radio waves refers to radio intensity, noise floor, and the like, and the state of communication refers to the number of error times, number of retransmission times, and the like. It can be determined whether the state of radio communication is good (for example, whether radio communication is cut off) based on the radio environment.

For example, when radio intensity is below a predetermined reference, the number of retransmission times being above a predetermined number and the like are quantified as numbers, and whether the state of radio communication is good is determined using weighted numbers.

Where the radio environment state becomes a state of radio communication being cut off, the mobile robot, by the searching unit, searches for a communication restoration position where the radio communication is feasible to establish, referring to radio environment data contained in the radio environment map.

Then, the self-position move instructing unit instructs the movement control unit to control movement to the communication restoration position, and thereby, the movement mechanism is driven so that the mobile robot moves to the position where the radio communication is feasible to establish.

A seventeenth aspect of the present invention provides the mobile robot based on the sixteenth aspect, wherein the comprehensive radio environment map further has position information of each of the radio base stations associated with the comprehensive radio environment data for each of the radio base stations, and wherein the searching unit comprises: a base station searching unit for searching for radio base stations within a predetermined distance of its own position based on the comprehensive radio environment map; and a communication restoration position searching unit for selecting one of the radio base stations found by the base station searching unit in the order of from the closest to the position and searching for a position for which the comprehensive radio environment data for the selected radio base station satisfies a predetermined reference condition and which is closest to the position to take the found position as the communication restoration position.

With this configuration, the mobile robot stores position information of each of the radio base stations in association with the comprehensive radio environment data for the radio base station in the radio environment map. Before searching for a position where the radio communication is feasible to establish by the searching unit, the mobile robot searches for radio base stations within a predetermined distance from the position by the base station searching unit. By this means, the other radio base stations not likely to be linked to are excluded from ones subject to the later search.

Then, the mobile robot, by the communication restoration position searching means, selects one of the radio base stations found by the base station searching unit in the order from the closest to the position and searches for a position for which the comprehensive radio environment data for the selected radio base station satisfies a predetermined reference condition and which is closest to the position.

Therefore, even where a plurality of radio base stations exist, the mobile robot can search and move the shortest distance to a position for which the radio environment is good if radio communication is cut off. According to the present invention, where a plurality of radio base stations exist, the mobile robot selects radio base stations based on their distance beforehand, thereby reducing the time required for searching for a communication restoration position.

An eighteenth seventh aspect of the present invention provides the mobile robot based on the sixteenth aspect, wherein the movement controlling unit controls a drive structure including the movement mechanism to control the operation of the robot, further comprising: an antenna move instructing unit for instructing the movement controlling unit to perform a predetermined operation so as to change the position or direction of an antenna that transmits and receives radio waves when the searching unit determines a failure in finding the communication restoration position.

With this configuration, when the searching unit cannot find the communication restoration position, the mobile robot, by the antenna move instructing unit, changes the position or direction of an antenna, thereby changing the way that the antenna receives. Thus, the position or direction of the antenna with which radio communication is feasible can be searched for.

With this configuration, even when the searching unit cannot find the communication restoration position, the mobile robot can find out the radio environment around it. Thus, the probability that radio communication will be established can be improved.

A nineteenth aspect of the present invention provides the mobile robot based on the sixteenth aspect, further comprising: a movement history storing unit for storing a movement history indicating the movement path on which the mobile robot has moved; and a move-back instructing unit for instructing the movement controlling unit to control to move back on the movement path by a predetermined amount of movement based on the movement history when the searching unit determines the failure in finding the communication restoration position.

With this configuration, the mobile robot stores a movement history indicating the movement path on which the mobile robot has moved in the movement history storing unit, which can include position information from map data. The mobile robot, by the move-back instructing unit, instructs the movement control unit to control to move back on the movement path by a predetermined amount of movement when the searching unit cannot find the communication restoration position. Thus, the probability that radio communication will be established can be improved.

Further, with this configuration, even when the searching unit cannot find the communication restoration position, the mobile robot can find out the radio environment around it. Thus, the probability that radio communication will be established is improved.

A twentieth aspect of the present invention provides the mobile robot based on the sixteenth aspect, further comprising: a movement stop instructing unit for instructing the movement controlling unit to control to stop moving at the position of the robot detected when the searching unit determines the failure in finding the communication restoration position.

With this configuration, when the searching unit cannot find the communication restoration position, the mobile robot, by the movement stop instructing unit, instructs the movement control unit to control to stop moving at the position. Thus, unnecessary actions can be restricted when radio communication is cut off.

Further, when the searching unit cannot find a place where radio communication can be restored, the mobile robot stops moving, thus facilitating the restoration by a person.

A twenty-first aspect of the present invention provides the mobile robot based on the sixteenth aspect, further comprising: a decelerate instructing unit for instructing the movement controlling unit to decelerate the movement speed when the radio environment state being monitored by the monitoring unit is degraded below a predetermined reference.

With this configuration, when the radio environment state being monitored by the monitoring unit has degraded below a predetermined reference, the mobile robot, by the decelerate instructing unit, instructs the movement control unit to decelerate the movement speed, thereby securing the time required to establish radio communication.

Therefore, when the radio environment state has degraded, the mobile robot reduces the movement speed. Hence, the time required to establish radio communication can be secured, and communication cutoff is prevented from happening.

A twenty-second aspect of the present invention provides the mobile robot based on the first aspect, further comprising: a radio intensity reporting control unit for determining at which one of a plurality of predetermined levels radio intensity at the position of the robot is in the movement area and reporting the determined level of radio intensity to the outside.

A twenty-third aspect of the present invention provides the mobile robot based on the twenty-second aspect, wherein the radio intensity reporting control unit comprises an ear display provided in a part of the robot at an ear position of the robot and ear display control unit for controlling the ear display to light on the basis of the determined level of radio intensity.

With this configuration, the controller for the mobile robot can report the level of radio intensity to the outside through the lighting state of the ear display unit. The ear display unit may be an illuminator that can change its lighting state such as an LED, which is smaller and lower in cost than display devices displaying characters and images. Because it is provided on the sides not the front, the ear display unit is less likely to spoil the appearance than if provided on the front. Although not conspicuous when seen from the front, the ear display unit can take various designs. Further, on/off and blinking can be combined with different degrees of brightness, colors, lighting sizes, or the like corresponding to the number of levels of radio intensity.

A twenty-fourth aspect of the present invention provides the mobile robot based on the twenty-third aspect, wherein the radio intensity reporting control unit determines the level of radio intensity based on a radio intensity map indicating information about radio intensity measured beforehand at each position in the movement area.

With this configuration, because the controller for the mobile robot determines the level of radio intensity based on a radio intensity map created beforehand, the robot need not measure radio intensity in real time. Thus, the robot need not be provided with a radio wave intensity measuring device, thus reducing the number of its components. As a result, in addition to a reduction in cost, the battery charge amount required in movement can be reduced because of becoming lighter.

A twenty-fifth aspect of the present invention provides the mobile robot based on the twenty-third aspect, wherein the radio intensity reporting control unit determines the level of radio intensity based on a current intensity of radio waves transmitted from the radio base station.

With this configuration, since determining the level of radio intensity based on the intensity at the current time point of radio waves, the controller for the mobile robot can accurately deal with radio intensity changing due to external disturbance in the movement area. The external disturbance includes the numbers of robots and persons, doors being open/close, articles being placed, and the like.

A twenty-sixth aspect of the present invention provides the mobile robot based on the twenty-third aspect, wherein the radio intensity reporting control unit further comprises movement speed control unit for controlling and reducing the movement speed of the robot in accordance with the lighting state of the ear display when the level of radio intensity is determined to be at a predetermined low level during movement of the robot.

With this configuration, the controller for the mobile robot, by the movement speed control unit, can reduce the movement speed of the robot when the level of radio intensity has become low during movement of the robot. By this means, the time until radio intensity has become even lower can be elongated compared with the case of not changing the movement speed. The reduction in the movement speed includes the stop of moving. Further, even if persons near the robot did not notice the lighting state of the ear display unit, they could detect that radio intensity has become lower.

A twenty-seventh aspect of the present invention provides the mobile robot based on the twenty-sixth aspect, wherein the radio intensity reporting control unit further comprises voice notifying control unit for, when reducing the movement speed by the movement speed control unit, notifying reduction in the movement speed by voice.

With this configuration, the controller for the mobile robot, when reducing the movement speed by the movement speed control unit, can have the voice notifying control unit notify that by voice. Therefore, persons near the robot can easily detect the reason why the robot has decelerated. The robot may notify by voice that radio intensity has become lower. By this means, persons near the robot can easily detect that radio intensity has become lower.

According to the present invention, persons near the robot can detect the radio environment state of the robot.

A twenty-eighth aspect of the present invention provides a controller for a mobile robot which communicates by radio with a managing computer via one or more radio base stations connected to the managing computer and autonomously moves in a movement area through use of map data of the movement area, the controller comprising: a radio communication unit for communicating by radio with each of the radio base stations; a radio environment detecting unit for detecting plural types of radio environment data including radio intensity of a signal received by the radio communication unit in radio communication with the radio base station, which data indicate degrees of goodness of the radio environment of the radio communication; a comprehensive radio environment data calculating unit for weighting the plural types of radio environment data with predetermined weights and calculating comprehensive radio environment data from results of weighting; a self-position detecting unit for detecting a position of the robot in the movement area; a storing unit for storing the map data of the movement area; and a comprehensive radio environment map creating unit for creating a comprehensive radio environment map for the radio base station by writing the calculated comprehensive radio environment data in association with the position detected by the self-position detecting unit when the radio environment data was detected into the map data stored in the storing unit.

A twenty-ninth aspect of the present invention provides the controller based on the twenty-eighth aspect, further comprising: a movement controlling unit for driving and controlling a movement mechanism for the robot to move autonomously to a goal position specified by the managing computer using the comprehensive radio environment map; a movement speed instructing unit for instructing the movement controlling unit about a movement speed; and a maximum movement speed determining unit for determining a maximum movement speed for a movement path decided by the position of the robot detected by the self-position detecting unit before starting to move and by the goal position based on the radio environment data and the maximum movement speed associated with the radio environment data beforehand; wherein the movement speed instructing unit instructs the movement controlling unit about a movement speed not higher than the maximum movement speed determined by the maximum movement speed determining unit.

With this configuration, the controller for the mobile robot, by the maximum movement speed determining unit, determines a maximum movement speed for a movement path decided by the position, i.e. a start position, detected by the self-position detecting unit before starting to move and by the goal position specified by the managing computer based on the radio environment data (e.g., radio intensity) for the movement path in the radio environment map and the maximum movement speed associated with the radio environment data beforehand. The controller for the mobile robot, by the movement speed instructing unit, may instruct the movement control unit to control to move at a movement speed not higher than the maximum movement speed, and the movement control unit drives a movement mechanism for the robot to move at the movement speed specified by the movement speed instructing unit.

By this means, the controller for the mobile robot can control the mobile robot to move at the movement speed with the upper limit depending on the radio environment state for the movement path.

With this structure, because the mobile robot has the movement speed limited depending on the radio environment state of communication with the radio base station, communication cutoff is prevented from happening during movement.

A thirteenth aspect of the present invention provides the mobile robot based on the twenty-eighth aspect, further comprising: a radio environmental map storing unit for storing a comprehensive radio environment map for associating comprehensive radio environment data including a plurality of types of radio environmental data regarding the radio environment in the movement area with a map data in the movement area; a movement controlling unit for driving and controlling a movement mechanism for the robot to move autonomously on the basis of a task transmitted from a base station using the comprehensive radio environment map; a monitoring unit for monitoring the state of the radio environment; a searching unit for, when the radio environment state being monitored becomes a state of radio communication being cut off, searching for a communication restoration position where the radio communication is feasible to establish based on the comprehensive radio environment map; and a self-position move instructing unit for instructing the movement control unit to control to move from the position of the robot detected to the communication restoration position found by the searching unit.

With this configuration, the controller detects its current position (its own position) by the position detecting unit, which detects the mobile robot's current position using, for example, a gyro sensor, a GPS (Global Positioning System) receiver, or the like.

The controller, by the monitoring unit, monitors the state of the radio environment. The radio environment may comprise radio intensity, number of error times, number of retransmission times, and the like. Whether the state of radio communication is good can be determined based on the radio environment.

Where the radio environment state becomes a state of radio communication being cut off, the controller, by the searching unit, searches for a communication restoration position where the radio communication is feasible to establish, referring to radio environment data contained in the radio environment map.

Then, the controller, by the self-position move instructing unit, instructs the movement control unit to control to move to the communication restoration position, and thereby, the movement mechanism is driven so that the mobile robot moves to the position where the radio communication is feasible to establish.

A thirteen-first aspect of the present invention provides the controller for the mobile robot based on the twenty-eighth aspect, further comprising: a radio intensity reporting control unit for determining at which one of a plurality of predetermined levels radio intensity at the position of the robot is in the movement area and reporting the determined level of radio intensity to the outside.

With this configuration, the controller for the mobile robot, by the radio intensity reporting control unit, can report the level of radio intensity in real time that changes according to the position of the robot while the robot is moving. Radio intensity at the position of the robot may be measured before movement or during movement. There may be two or more levels of radio intensity. The method of reporting the level of radio intensity includes a method to display on a display device, a method to output voice by a voice output device, and a combination thereof. The display device includes, for example, an illuminator, a character display device, and an image display device. The voice output from voice output device includes a buzzing sound, a digital warning beep, and voice announcement.

BRIEF DESCRIPTION OF THE DRAWINGS

For a more complete understanding of the present invention and the advantages thereof, reference is now made to the following description taken in conjunction with the accompanying drawings wherein:

FIGS. 2A and 2B are perspective views illustrating the way that the robot of this embodiment is moving, in which FIG. 2A shows the state where the robot is moving in normal part of a movement area, and FIG. 2B shows the state where the robot is moving in a sub-area provided with a mark;

FIG. 7 is a view for explaining comprehensive radio environment data of first to third embodiments;

FIGS. 11A and 11B show examples of map data and a comprehensive radio environment map, in which FIG. 11A shows map data (floor map) and FIG. 11B shows a comprehensive radio environment map;

FIGS. 15A and 15B illustrate the way to specify measuring positions for the robot to move alone in a movement area to measure radio environment data at, in which FIG. 15A shows positions where marks are provided, and FIG. 15B shows an example of the comprehensive radio environment map created based on radio environment data measured at the mark provided positions;

FIGS. 18A and 18B illustrate the way to specify positions to measure radio environment data, in which FIG. 18A shows an example where they are specified on a grid, and FIG. 18B shows an example where individual measuring points are specified individually additionally;

FIGS. 19A and 19B show an example of the comprehensive radio environment map, in which FIG. 19A is a comprehensive radio environment map created by specifying measuring positions in grid, and FIG. 19B is a comprehensive radio environment map in a format for display to users;

FIGS. 20A and 20B illustrate the way in which the robot selects a radio base unit to link to, in which FIG. 20A illustrates the way in which an optimum radio base unit map is created from the comprehensive radio environment maps for a plurality of radio base units, and FIG. 20B illustrates the way in which the robot selects a radio base unit to link to from a plurality of optimum radio base units;

FIGS. 24A and 24B illustrate the way that the robot picks up images of its surroundings, in which FIG. 24A shows the way that the robot picks up images of the surroundings while changing its orientation, and FIG. 24B shows (in the upper) a picking-up position in a floor map and (in the lower) picked-up images of the surroundings at the picking-up position;

FIGS. 26A and 26B illustrate the contents of the radio environment map, in which FIG. 26A is a floor map showing an example of map data visually, and FIG. 26B is an example of the radio environment map;

FIGS. 27A to 27C illustrate the way to create an optimum radio base unit map;

FIG. 30 is a block diagram of a main controller;

FIGS. 34A to 34C illustrate the movement direction of the robot and change in radio environment in a radio environment map, in which FIG. 34A shows an example of the radio environment map, FIG. 34B shows a direction in which the radio environment improves, and FIG. 34C shows a direction in which the radio environment state lowers;

FIG. 39A is a block diagram showing the configuration of a mobile robot according to the third embodiment;

FIG. 47 is a configuration diagram of a guide system including a robot according to a fourth embodiment of the present invention;

FIGS. 48A and 48B illustrate an example of a guide area used in the guide system of FIG. 47, in which FIG. 48A is a plan view of the guide area, and FIG. 48B shows radio intensity in the guide area;

FIGS. 49A and 49B are illustrations showing an example of the head of the robot shown in FIG. 47, in which FIG. 49A is a front view thereof, and FIG. 49B is a side view as seen from the left;

FIGS. 51A and 51B illustrate the display states of the ear display sections of FIG. 49, in which FIG. 51A shows the case where radio intensity is at or above 70%, FIG. 51B shows the case where radio intensity is at or above 50% but below 70%.

DETAILED DESCRIPTION OF THE INVENTION

Figure 1:
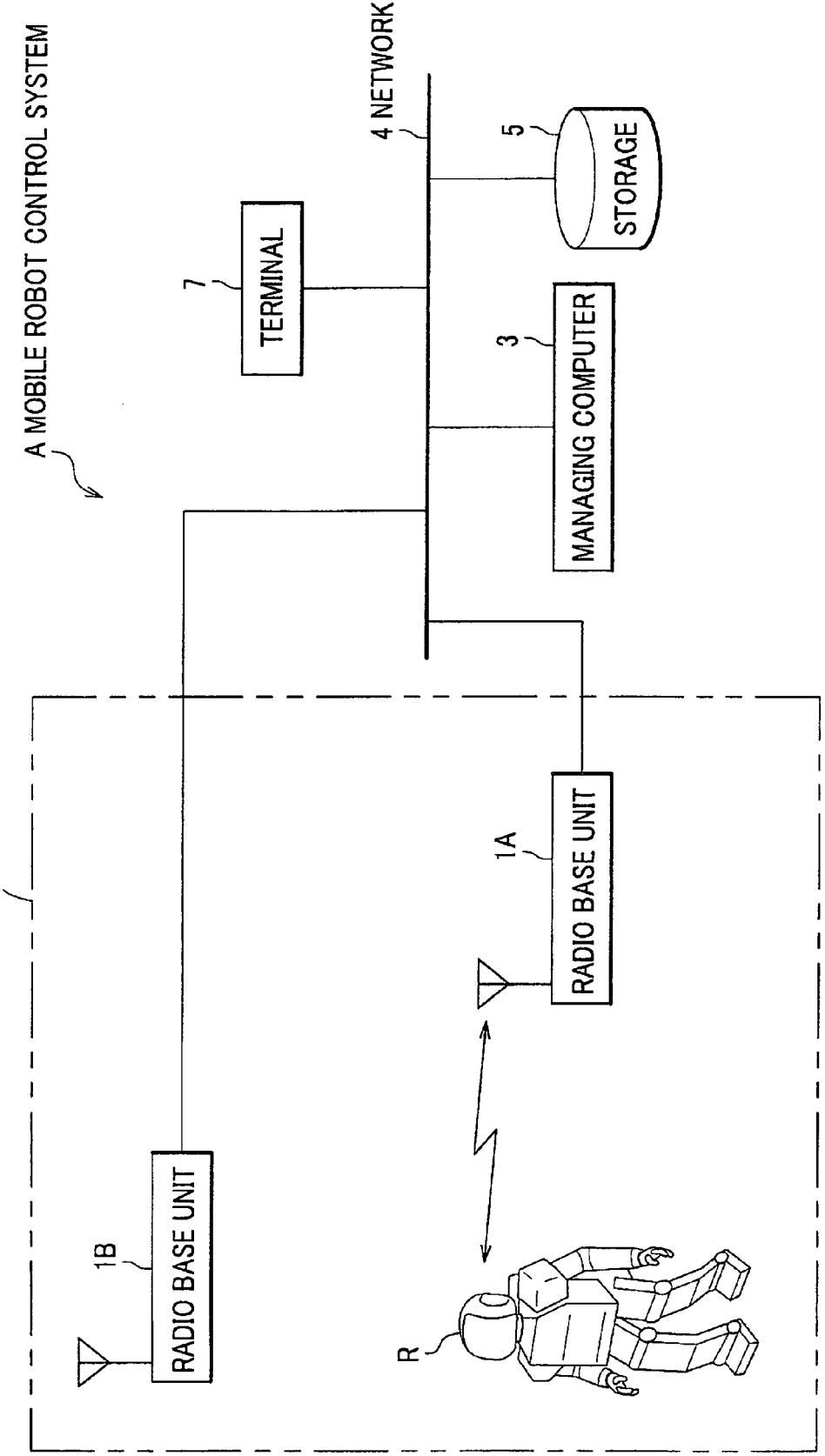
FIG. 1 is a configuration diagram showing a mobile robot control system according to first to third embodiments of the present invention.

The best mode for carrying out the present invention will be described in detail with reference to the drawings. Herein, the same reference numerals indicate the same elements with duplicate description thereof being omitted.

<<Configuration of Mobile robot Control System>>
<Configuration of the System>

First, a mobile robot control system A according to embodiments of the present invention will be described. FIG. 1 shows the mobile robot control system of the embodiment of the present invention.

As shown in FIG. 1, the mobile robot control system A comprises one or more mobile robots R located in a movement area (locomotion area) to execute a task in, one in this embodiment, (hereinafter referred to as a robot for short); one or more radio base units (radio base stations) 1 linked by radio with the robot R, two radio base units 1A, 1B (1) in this embodiment; a managing computer 3 linked to the radio base units 1 via a network 4; and a storage 5 and a terminal 7 connected (communicatively coupled) to the managing computer 3 via the network 4.

The mobile robot R is located in a movement area (movement range) to execute a task in and autonomously moves in this movement area so as to execute a task such as carrying an article or guiding a visitor according to a task execution command signal. In this movement area, the radio base units 1 are located at such places as to cover the entire movement area.

The radio base units (radio base stations) 1 (1A, 1B) are communication units for the managing computer 3 communicating with the robot R, and can be embodied by radio LAN base stations in conformity with, for example, IEEE 802.11b, IEEE 802.11g, or IEEE 802.11a. Or, radio communication devices of other standards such as Bluetooth (registered trademark) may be used.

Where a plurality of radio base units 1 are located in the movement area, the robot R is configured to switch to being linked to a radio base unit 1 whose radio environment is in a good state to communicate with the managing computer 3.

In order to have the robot R execute a task based on task data input from the terminal 7 described later, the managing computer 3 generates a task execution command signal including the content of the task and outputs to the robot R. This task data is data about a task which to have the robot R execute, and includes, for example, information about the requester and the delivery destination of an article to be carried, information about the destination of a visitor to be guided and the visitor, or the like.

Further, the managing computer 3 manages input to and output from the storage 5, transmits map data and a comprehensive radio environment map stored in the storage 5 to the robot R, and stores a comprehensive radio environment map and image data received from the robot R into the storage 5 so as to be associated with map data.

The managing computer 3 may be embodied by, for example, a general-purpose PC (Personal Computer).

The storage 5 stores map data of the movement area where the robot R moves to execute a task, a comprehensive radio environment map associated with map data, image data, and the like. The map data is registered beforehand in the storage 5 so as to be associated with the movement area such as the floor map for each floor. Input and output (write and read) to and from the storage 5 is managed by the managing computer 3.

The storage 5 may be embodied by, for example, a hard disk device, an optical disk device, a semiconductor memory device, or the like.

The terminal 7 is an input device for inputting task data to the managing computer 3 and may be embodied by a laptop computer, a PHS, or the like. Also, the terminal 7 is a display device that converts the comprehensive radio environment map received from the robot R to an easy-to-view format to display and that displays image data.

Note that the managing computer 3, the storage 5, the terminal 7, and the radio base units 1 may not be connected via the network 4, but have a structure in which all or parts of them may be integrated.

Next, with reference to FIGS. 2A and 2B, will be described the way that the robot R of this embodiment detects an obstacle during movement and marks for detecting positions, which marks are located at suitable places in a movement area.

Figure 2A:
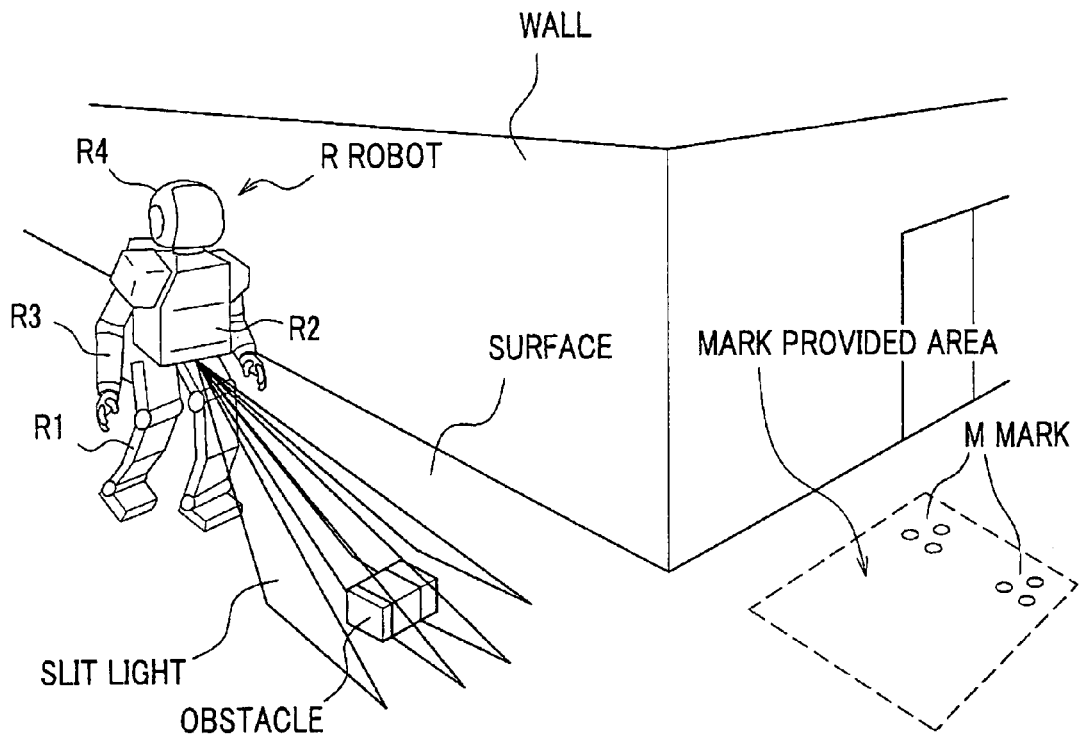
Figure 2B:
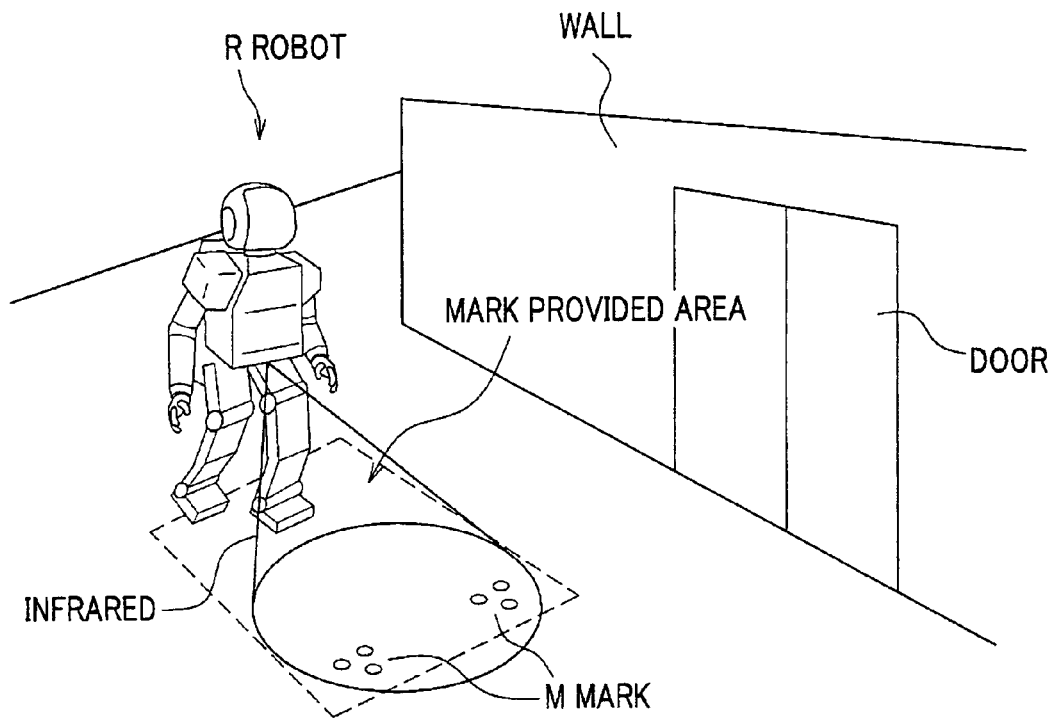

FIGS. 2A and 2B are perspective views illustrating the way that the robot of this embodiment is moving. FIG. 2A shows the state where the robot is moving in normal part of the movement area, and FIG. 2B shows the state where the robot is moving in a sub-area provided with a mark.

As shown in FIGS. 2A and 2B, this robot R radiates laser slit light or infrared rays to check the surface condition and search for a mark M or the like when autonomously moving in a movement area such as an office or a corridor to execute a task such as delivering documents.

That is, the robot R finds out where it is moving in the movement area, and when it is in normal part of the movement area, irradiates laser slit light (hereinafter "slit light" for short) onto the surface to detect whether there are steps, undulation, or obstacles in or on the surface, and when in a mark provided sub-area, irradiates infrared onto the surface to detect the mark M to confirm and correct its own position.

The mark M is made of reflective material that reflects back infrared and provided at predetermined places in the movement area such as in front of a door. The mark M may preferably be, for example, transparent or extremely small so as not to spoil the view inside the movement area. Further, in the present embodiment, as shown in FIG. 2, three reflective members form a mark M, and a set of two marks M is provided in the surface. Each mark M has position data, which is stored in the storage 5 and a storage 190 in the robot R, described later, in such a form as to be included in map data.

In the present embodiment, the marks M observed by the robot R are used in the form of a set of two marks M each made up of three members but, not being limited to this, may be in another form as needed. For example, they may be placed in a continuous line or a dotted line on the surface.

<Appearance of Robot>

Next, the appearance of the robot R according to this embodiment of the invention will be described. In the description below, let an X-axis be in the back-to-front direction of the robot R, a Y-axis be in the right-to-left direction, and a Z-axis be in the upward direction (see FIG. 3).

The robot R according to this embodiment of the invention is an autonomously moving bipedal walking robot. This robot R executes a task in response to an execution command signal received from the managing computer 3.

Figure 3:
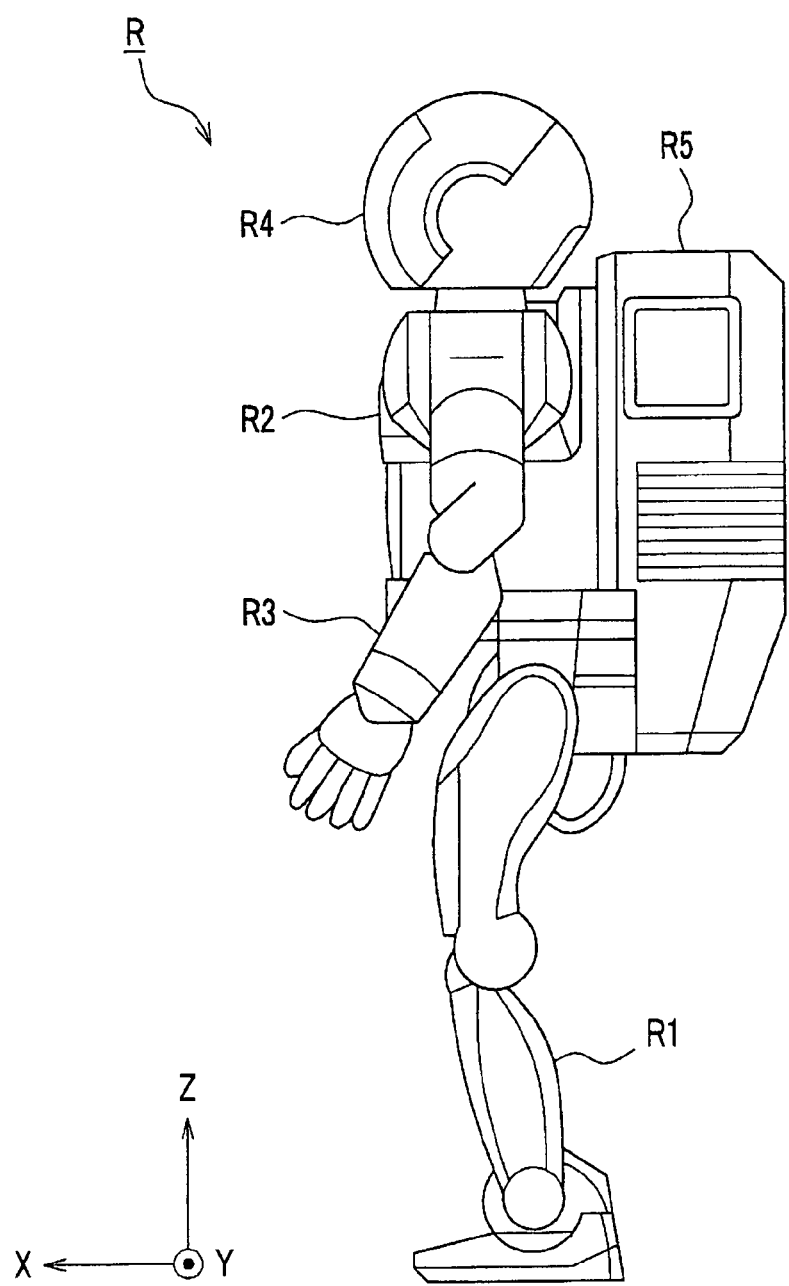
FIG. 3 is a side view schematically showing the appearance of the robot of FIGS. 1, 2, and 47.

FIG. 3 is a side view schematically showing the appearance of the robot R of FIGS. 1, 2. As shown in FIG. 3, the robot R stands and moves (walks, runs, etc.) on two legs R1 (only one being shown) like a human, comprises a torso R2, two arms R3 (only one being shown), and a head R4, and autonomously moves. Further, the robot R has provided on its back (back of torso R2) a controller mounted part R5 controlling the operations of the legs R1, torso R2, arms R3, and head R4 as the robot is carrying it on the back. In addition, an antenna for transmitting and receiving radio waves for radio communication, described later, is provided in the head R4.

<Drive Structure of Robot>

Figure 4:
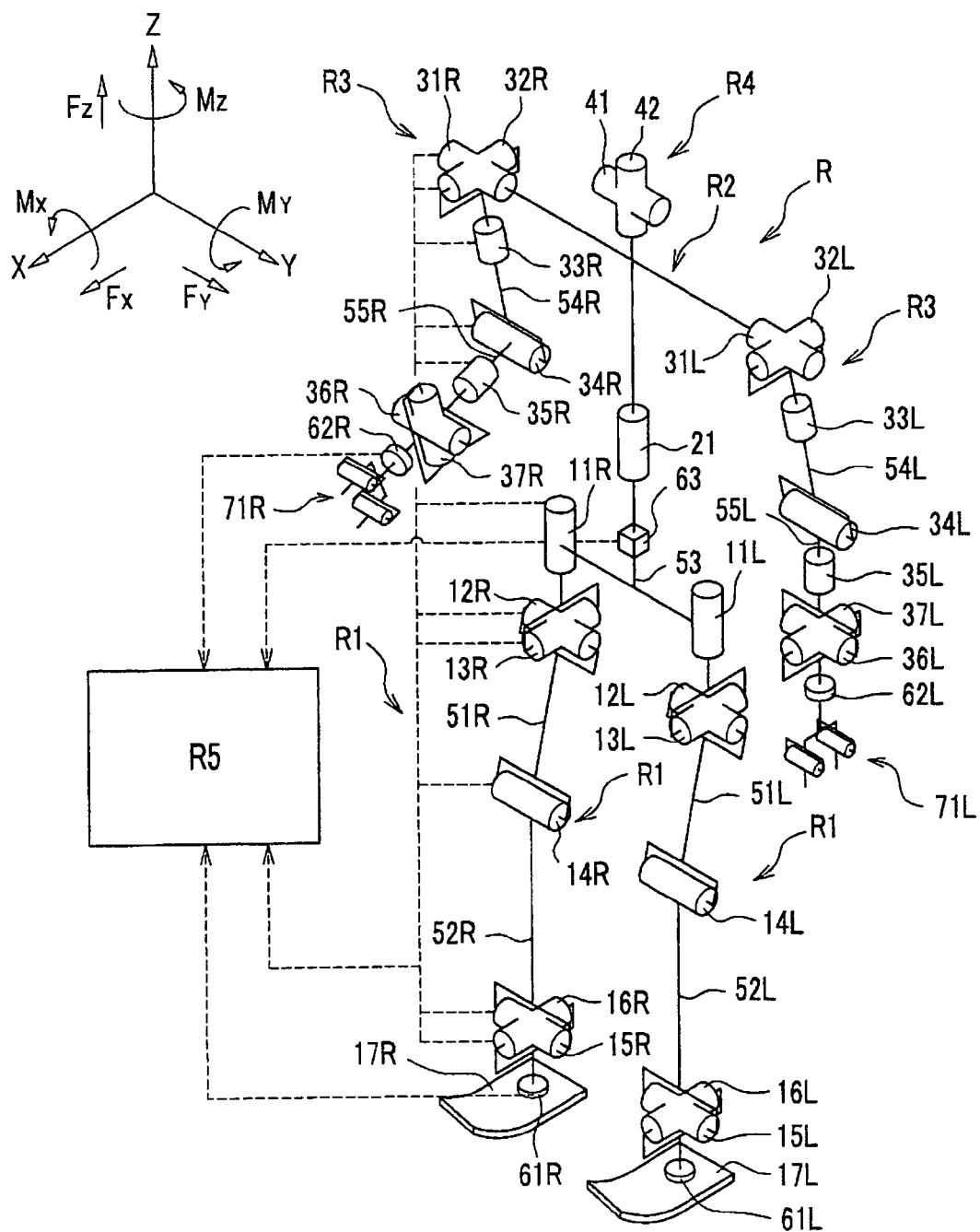
FIG. 4 is a perspective view schematically showing the drive structure of the robot of FIG. 3.

Next, the drive structure of the robot will be described. FIG. 4 is a perspective view schematically showing the drive structure of the robot of FIG. 3. The joints of FIG. 4 are represented by electric motors driving the joints.

<Legs R1>

As shown in FIG. 4, left and right legs R1 each comprise six joints 11L-16L or 11R-16R. The left and right 12 joints include crotch joints 11R, 11L (joints of legs R1 and torso R2) where the legs pivot about the Z-axis (R indicating right and L indicating left, which may be omitted hereinafter); crotch joints 12R, 12L to pivot about a pitch axis (Y-axis); crotch joints 13R, 13L to pivot about a roll axis (X-axis); knee joints 14R, 14L to pivot about the pitch axis (Y-axis); ankle joints 15R, 15L to pivot about the pitch axis (Y-axis); and ankle joints 16R, 16L to pivot about the roll axis (X-axis). Feet 17R, 17L are attached under the legs R1.

As such, the leg R1 comprises the crotch joints 11R(L), 12R(L), 13R(L), the knee joint 14R(L), and the ankle joints 15R(L), 16R(L). The crotch joints 11R(L)-13R(L) and the knee joint 14R(L) are joined by a thigh link 51R, 51L; and the knee joint 14R(L), and the ankle joints 15R(L), 16R(L) are joined by a lower leg link 52R, 52L.

<Torso R2>

As shown in FIG. 4, the torso R2 is the body of the robot R and is coupled to the legs R1, the arms R3, and the head R4. That is, the torso R2 (upper link 53) is coupled to the legs R1 via the crotch joints 11R(L)-13R(L). Further, the torso R2 is coupled to the arms R3 via shoulder joints 31R(L)-33R(L) described later. Yet further, the torso R2 is coupled to the head R4 via neck joints 41, 42 described later.

Still further, the torso R2 has a joint 21 where the upper body pivots about the Z-axis.

<Arms R3>

As shown in FIG. 4, the left and right arms R3 each comprise seven joints 31L-37L or 31R-37R. The left and right 14 joints include shoulder joints 31R, 31L of the shoulder (joints of torso R2 and arms R3) to pivot about the pitch axis (Y-axis); shoulder joints 32R, 32L of the shoulder to pivot about the roll axis (X-axis); shoulder joints 33R, 33L where the arms pivot about the Z-axis; elbow joints 34R, 34L of the elbow to pivot about the pitch axis (Y-axis); arm joints 35R, 35L where the wrists pivot about the Z-axis; wrist joints 36R, 36L of the wrist to pivot about the pitch axis (Y-axis); and wrist joints 37R, 137L of the wrist to pivot about the roll axis (X-axis). Further, hands 71R, 71L are attached at the ends of the arms R3.

That is, the arms R3 comprises the shoulder joints 31R(L), 32R(L), 33R(L), the elbow joint 34R(L), the arm joint 35R(L), and the wrist joints 36R(L), 37R(L). The shoulder joints 31R(L)-33R(L) and the elbow joint 34R(L) are joined by an upper arm link 54R(L); and the elbow joint 34R(L) and the wrist joints 36R(L), 37R(L) are joined by a lower arm link 55R(L).

<Head R4>

As shown in FIG. 4, the head R4 comprises a neck joint 41 (joint of head R4 and torso R2) to pivot about the Y-axis and a neck joint 42 to pivot about the Z-axis. The neck joint 41 is for setting the tilt angle of the head R4, and the neck joint 42 is for setting the pan angle of the head R4.

With this configuration, the left and right legs R1 are given a total of 12 degrees of freedom, and in movement the legs R1 may be given a desired motion by driving the 12 joints 11R-16R, 11L-16L to be at appropriate angles, so that the robot R can move in a three dimensional space as desired. The left and right arms R3 are given a total of 14 degrees of freedom, and by driving the 14 joints 31R-37R, 31L-37L through appropriate angles, the robot R can work as desired.

Furthermore, a well-known six-axis force sensor 61R(L) is provided in between the ankle joints 15R(L), 16R(L) and foot 17R(L). The six-axis force sensor 61R(L) detects three directional components Fx, Fy, Fz of the floor reaction which acts on the robot R from the floor and moment components Mx, My, Mz in three directions.

Yet further, a well-known six-axis force sensor 62R(L) (movement detecting unit) is provided in between the wrist joints 36R(L), 37R(L) and hand 71R(L). The six-axis force sensor 62R(L) detects three directional components Fx, Fy, Fz of the reaction which acts on the hand 71R(L) of the robot R and three directional components Mx, My, Mz of moment.

Still further, a tilt sensor 63 is provided in the torso R2. The tilt sensor 63 detects the tilt of the torso R2 relative to the vertical axis (Z-axis) and its angular speed.

The electric motor of each joint moves the thigh link 51R (L), the lower leg link 52R(L), etc., relatively through a speed reducing device (not shown) that reduces and increases the output of the motor. The angle of each joint is detected by a joint angle detecting unit (for example, a rotary encoder).

The controller mounted part R5 comprises an autonomous movement controller 148 (see FIG. 5), a radio communication unit 160, a main controller 139, a battery (not shown), and the like. The detected data of each of the sensor 61-63 and the like are sent to respective controllers in the controller mounted part R5. Each electric motor is driven according to a drive instructing signal from the respective controller.

The details of bipedal movement control are disclosed in, for example, US 2005/0051368 (A1), which is herein incorporated by reference. In this embodiment, the robot R is a humanoid bipedal mobile robot, but the invention can be applied to mobile robots having other moving units such as one for quadruped walking, one for movement on wheels, and one for movement on a caterpillar track, not being limited to a humanoid robot.

FIRST EMBODIMENT

Configuration of Robot

Figure 5:
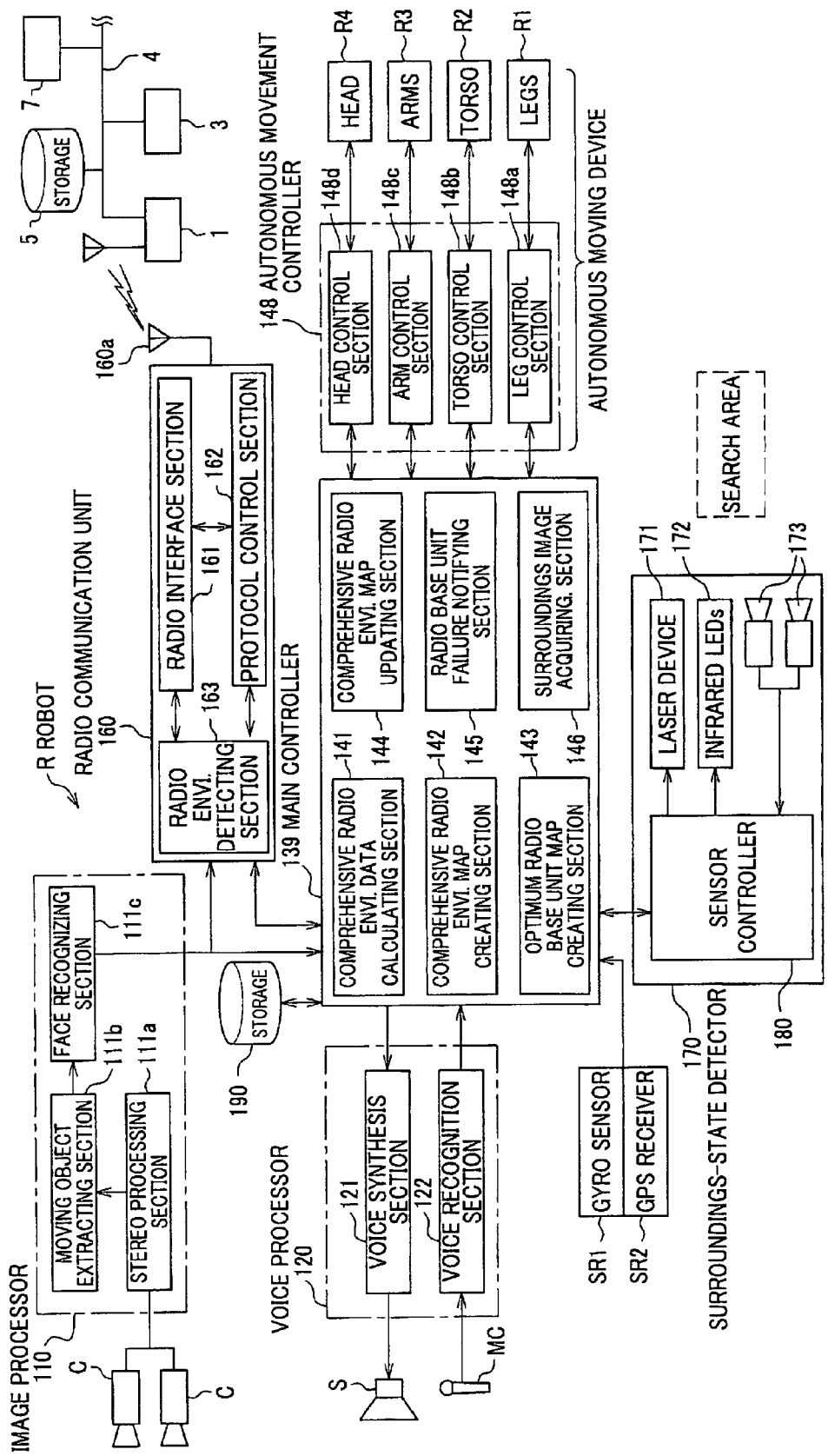
FIG. 5 is a block diagram showing the configuration of a robot according to the first embodiment.

FIG. 5 is a block diagram showing the configuration of a robot according to a first embodiment.

As shown in FIG. 5, the robot R includes cameras C, a speaker S, a microphone MC, an image processor 110, a voice processor 120, a main controller 139, an autonomous movement controller 148, a radio communication unit 160, and a surroundings-state detector 170 as well as the legs R1, the torso R2, the arms R3, and the head R4.

The robot R further includes a gyro sensor SR1 for detecting directions and/or a GPS (Global Positioning System) receiver SR2 for detecting coordinates as a self-position detecting unit for detecting its own position.

[Camera]

The cameras (image pickup units) C are for reading in images in the form of digital data and are embodied by, for example, color CCD (Charge Coupled Device) cameras. The cameras C are arranged laterally in parallel, and the images picked up are output to the image processor 110. The cameras C, speaker S, and microphone MC are all provided in the head R4.

[Image processor]

The image processor 110 processes the images picked up by the cameras C and recognizes obstacles and persons in the surrounding area to find out the status of the surroundings of the robot R from the images. The image processor 110 comprises a stereo processing section 111a, a moving object extracting section 111b, and a face recognizing section 111c.

The stereo processing section 111a performs pattern matching using one of two images picked up by the left and right cameras C as a reference, calculates a parallax for each pixel between the left and right images to create a parallactic image, and outputs the created parallactic image and the original images to the moving object extracting section 111b. The parallaxes indicate the distance from the robot R to the image-picked-up object.

The moving object extracting section 111b extracts a moving object from the picked-up images based on the data output from the stereo processing section 111a. This is for detecting (recognizing) the person assuming that a moving object is a person.

In order to extract the moving object, the moving object extracting section 111b stores several past frames of images, compares the newest frame and the past frames for pattern matching, and calculates the amount of movement for each pixel to create an image of the amounts of movement. If it is found from the parallactic image and the image of the amounts of movement that there is a pixel having the large amount of movement within a predetermined distance from the cameras C, assuming that a person is there, part of the parallactic image within the predetermined distance is extracted as the moving object, and the image of the moving object is output to the face recognizing section 111c.

The face recognizing section 111c extracts parts in skin color from the extracted image of the moving object and, from their sizes and shapes, recognizes the position of the face. From the sizes and shapes of the parts in skin color, likewise, the positions of the hands are detected.

The position of the face recognized is output to the main controller 139 as information for use when the robot R moves and for communication with the person and also to the radio communication unit 160 and transmitted to the managing computer 3 via the radio base unit 1.

[Voice Processor]

The voice processor 120 includes a voice synthesis section 121 and a voice recognition section 122.

The voice synthesis section 121, according to a speak instruction recognized and output by the main controller 139, creates voice data from information in characters and outputs voice through the speaker S. In the creating of voice data, the beforehand-stored correspondence between information in characters and voice data is used.

The voice recognition section 122 has voice data inputted through the microphone MC, creates information in characters from the voice data based on the beforehand-stored correspondence between voice data and information in characters, and outputs the created information in characters to the main controller 139.

[Autonomous Movement Controller]

The autonomous movement controller 148 includes a head control section 148d, an arm control section 148c, a torso control section 148b, and a leg control section 148a.

The head control section 148d drives the head R4 according to an instruction from the main controller 139; the arm control section 148c drives the arms R3 according to an instruction from the main controller 139; the torso control section 148b drives the torso R2 according to an instruction from the main controller 139; and the leg control section 148a drives the legs R1 according to an instruction from the main controller 139.

Data detected by the gyro sensor SR1 and the GPS receiver SR2 is output to the main controller 139 and used to determine the action of the robot R and is transmitted to the managing computer 3 via the radio communication unit 160.

[Radio Communication Unit]

The radio communication unit 160 is a communication device for transmitting and receiving data to and from the managing computer 3 and comprises a radio interface section 161, a protocol control section 162, a radio environment detecting section 163, and a communication antenna 160*a*.

Figure 6:
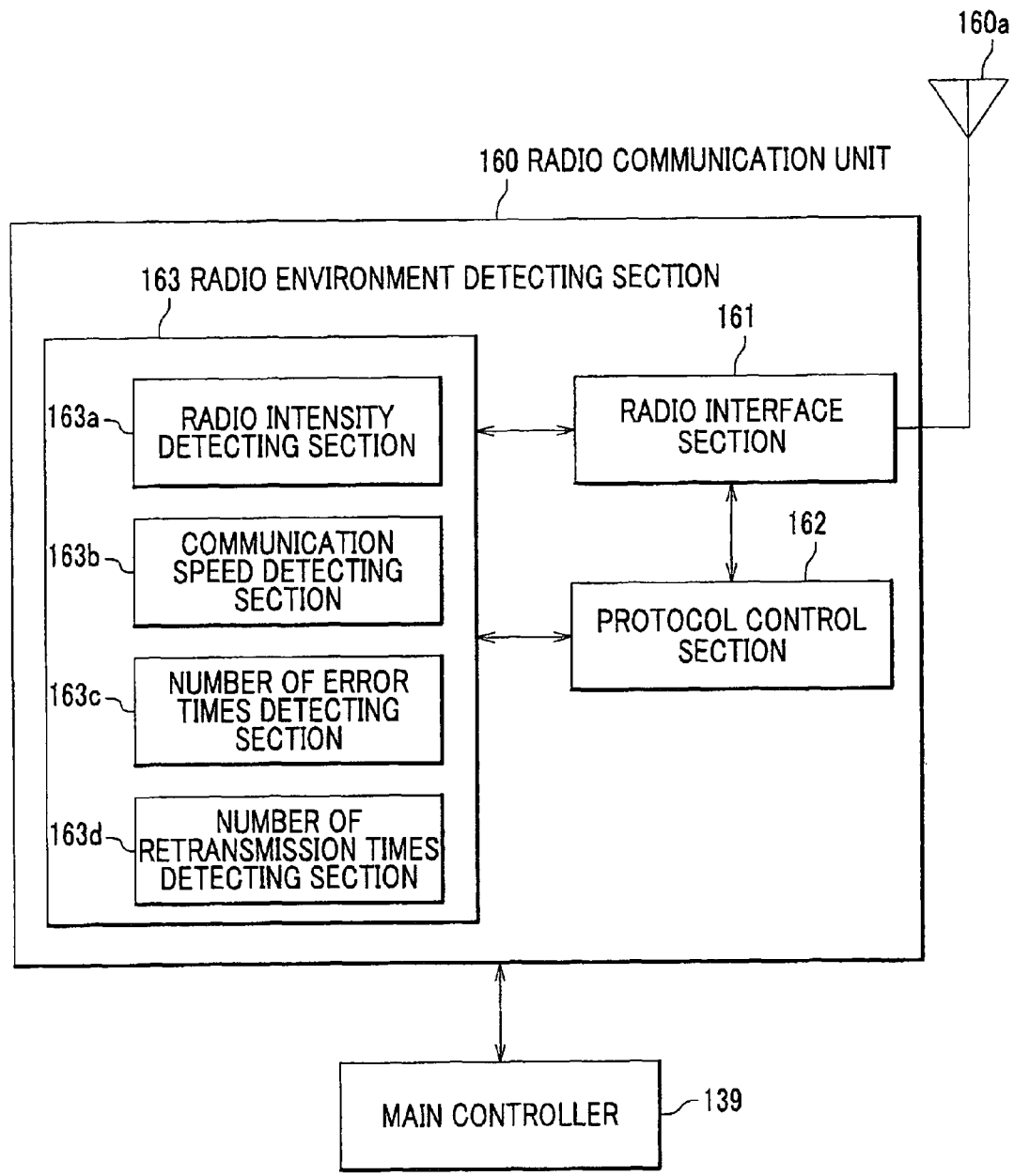
FIG. 6 is a block diagram showing the configuration of a radio communication unit of FIG. 5.

With reference to FIG. 6, the configuration of the radio communication unit 160 will be described in detail. FIG. 6 is a block diagram of the radio communication unit 160.

As shown in FIG. 6, the radio communication unit 160 comprises the radio interface section 161, the protocol control section 162, the radio environment detecting section 163, and the communication antenna 160*a*, and the radio environment detecting section 163 comprises a radio intensity detecting section 163*a*, a communication speed detecting section 163*b*, a number of error times detecting section 163*c*, and a number of retransmission times detecting section 163*d*.

The radio interface section 161 performs physical conversion between data and radio waves, which are transmitted to and received from the managing computer 3 via the radio base unit 1 (see FIG. 5) through the communication antenna 160*a*. Upon receipt, the radio interface section 161 converts radio waves received through the communication antenna 160*a* into data and outputs to the protocol control section 162. Further, the received radio waves are output to the radio intensity detecting section 163*a* of the radio environment detecting section 163.

In transmission, the radio interface section 161 has data inputted from the protocol control section 162, converts the data into radio waves, and transmits the converted data to the radio base unit 1 (see FIG. 5) via the communication antenna 160*a*.

The protocol control section 162 performs data framing and arbitration for data communication between the managing computer 3 and the main controller 139 of the robot R according to, for example, a LAN standard such as IEEE 802.3. Upon receipt, the protocol control section 162 selects data addressed to the robot R from data received from the managing computer 3 and converted by the radio interface section 161, extracts data from frames such as TCP/IP packets according to a predetermined communication protocol scheme such as TCP/IP (Transmission Control Protocol/Internet Protocol), and outputs the extracted data to the main controller 139.

In transmission, the protocol control section 162 creates frames such as TCP/IP packets from data inputted from the main controller 139 according to the predetermined communication protocol scheme and outputs the frames to the radio interface section 161.

Communication speed in receipt and transmission, number of error times in receipt, and number of retransmission times in transmission in the protocol control section 162 are measured by the communication speed detecting section 163*b*, the number of error times detecting section 163*c*, and the number of retransmission times detecting section 163*d*, respectively.

The radio environment detecting section 163 detects the radio intensity of radio waves converted in the radio interface section 161 and noise floor by means of the radio intensity detecting section 163*a*, and the speed of communication with the radio base unit 1 (see FIG. 5) by means of the communication speed detecting section 163*b*. Further, the detecting section 163 detects the number of error times in receipt in the protocol control section 162 by means of the number of error times detecting section 163*c* and the number of data retransmission times in transmission in the protocol control section 162 by means of the number of retransmission times detecting section 163*d*. Radio environment data comprising the detected (measured) radio intensity, noise floor, communication speed, number of error times, and number of retransmission times are output to the main controller 139.

[Main Controller]

The main controller 139 is a control unit to control overall the components forming the robot R such as the image processor 110, voice processor 120, autonomous movement controller 148, radio communication unit 160, and surroundings-state detector 170, storage 190, gyro sensor SR1, and GPS receiver SR2 and is constituted by a computer comprising a CPU (Central Processing Unit), a ROM (Read Only Memory), a RAM (Random Access Memory), and the like.

In this embodiment, the main controller 139 includes a comprehensive radio environment data calculating section 141, a comprehensive radio environment map creating section 142, an optimum radio base unit map creating section 143, a comprehensive radio environment map updating section 144, a radio base unit failure notifying section 145, and a surroundings image acquiring section 146.

The comprehensive radio environment data calculating section 141 calculates comprehensive radio environment data, described later, based on radio environment data detected by the radio environment detecting section 163. The calculated comprehensive radio environment data is output to the comprehensive radio environment map creating section 142.

The comprehensive radio environment map creating section 142 stores the calculated comprehensive radio environment data in association with the location of the robot R when the original radio environment data is detected into the map data stored in the storage 190, thereby creating a comprehensive radio environment map.

The comprehensive radio environment map comprises, for example, the identifications of the robot R and of radio base units 1, the coordinates of measuring points, measuring time points, and the comprehensive radio environment data. The map may further comprise the original radio environment data from which the comprehensive radio environment data was calculated. Radio environment data measured in the past may be stored as a measurement history in the map.

Furthermore, the comprehensive radio environment map may be directly written into the map data (data base), or another data base (such as a comprehensive radio environment map data base) containing the map may be built and linked to the map data.

Or, an identification indicating the type of map such as the floor map, the comprehensive radio environment map, or the optimum radio base unit map may be added to data of each map, and the desired type of map may be read from the data base as needed.

The optimum radio base unit map creating section 143 creates an optimum radio base unit map (optimum radio base station map), described later, for a movement area where a plurality of radio base units 1 (see FIG. 5) are provided based on the comprehensive radio environment map for each radio base unit 1 created by the comprehensive radio environment map creating section 142 and stores the created optimum radio base unit map in the storage 190.

The optimum radio base unit map comprises, for example, the identification of the robot R, location coordinates, updating time points, and the identification of the optimum radio base unit.

Furthermore, the optimum radio base unit map may be directly written into the map data (data base) like the comprehensive radio environment map, or another data base (such as an optimum radio base unit map data base) containing the map may be built and linked to the map data. Or, as another data base, for example, a data base having the optimum radio base unit map and the comprehensive radio environment map integrated therein may be built.

The comprehensive radio environment map updating section 144 compares the comprehensive radio environment data stored in the comprehensive radio environment map, created by the comprehensive radio environment map creating section 142 and stored in the storage 190, and the comprehensive radio environment data newly obtained by the robot R during the execution of a task, and as needed, updates the comprehensive radio environment data, etc., stored in the map data for the maintenance of the comprehensive radio environment map.

Further, the comprehensive radio environment map updating section 144, subsequent to the maintenance of a comprehensive radio environment map for a movement area where a plurality of radio base units 1 are located, performs the maintenance of the associated optimum radio base unit map.

The radio base unit failure notifying section (radio base unit failure notifying unit) 145 determines whether the radio environment data was normally detected (measured) by the radio environment detecting section 163, and if not normally detected, notifies the occurrence of a failure in the radio base unit 1 to the managing computer 3 with the use of the radio communication unit 160.

Further, when detecting degradation in the radio environment through the comprehensive radio environment map updating section 144, the radio base unit failure notifying section 145 notifies degradation in the communication environment of the radio base unit 1 to the managing computer 3 with the use of the radio communication unit 160 and transmits the radio environment data and image data obtained at the point where the degradation was detected.

The surroundings image acquiring section (surroundings image acquiring unit) 146 obtains images of its surroundings with the use of the cameras C at the point where radio environment data has been detected and stores the obtained images in association with the location of the point into the storage 190. In obtaining images of the surroundings, the surroundings image acquiring section 146 drives the legs R1 via the leg control section 148a to change the orientation of the robot R thereby changing the shooting direction of the cameras C, so as to obtain images of its 360 degree surroundings.

With reference to FIG. 7, the comprehensive radio environment data will be described. FIG. 7 is a view for explaining the comprehensive radio environment data.

As shown in FIG. 7, in the present embodiment, in order to evaluate the degree of goodness of the radio environment comprehensively, the radio intensity, noise floor, number of error times (communication error times), number of retransmission times (data retransmission times), and communication speed are used as radio environment data serving as indexes, and each radio environment data is weighted to calculate the comprehensive radio environment data.

The radio intensity, which best indicates the radio environment, is weighted with 80%. In the present embodiment, instead of the radio intensity data as it is, the ratio thereof to noise floor is used. That is, the radio intensity of radio waves transmitted from the radio base unit 1 (see FIG. 5) and received by the robot R and the intensity of noise floor are quantified as percents of 1 to 100% in accordance with intensities of the radio waves and the noise floor. The 100% indicates the highest intensity. When radio intensity/noise floor>1, its contribution to the comprehensive radio environment data is set at (radio intensity/noise floor)×0.8. For example, the radio environment where the radio intensity is 100% and noise floor is 1% is the best with the contribution being at (100/1)×0.8=80%.

When radio intensity/noise floor<1, the noise level is higher than the radio intensity (signal level), which indicates the radio environment being extremely bad, and its contribution to the comprehensive radio environment data is set at 0%.

The number of error times is weighted with 5%, and letting the maximum number of error times in a second be 1028, its contribution to the comprehensive radio environment data is set at (1−(number of error times/1028))×5%. That is, as the number of error times becomes closer to 0, the contribution becomes closer to 5% (the radio environment being good), and as the number of error times becomes closer to 1028, the contribution becomes closer to 0% (the radio environment being bad).

For the number of retransmission times, like for the number of error times, letting the maximum number of retransmission times in a second be 1028, its contribution to the comprehensive radio environment data is set at (1−(number of retransmission times/1028))×5%. That is, as the number of retransmission times becomes closer to 0, the contribution becomes closer to 5% (the radio environment being good), and as the number of retransmission times becomes closer to 1028, the contribution becomes closer to 0% (the radio environment being bad).

The communication speed is weighted with 10%, and a contribution to the comprehensive radio environment data is calculated with the use of a preset conversion table depending on the communication speed selected in the radio LAN adapter in use.

In the "COMMUNICATION SPEED" section of FIG. 7, the conversion tables for a range of numbers {1, 2, 5.5, 11} [Mbps] and a range of numbers {6, 9, 12, 18, 24, 36, 48, 54} [Mbps] are set. The former is a conversion table for the case that a radio LAN adapter in compliance with IEEE 802.11b is used, and the latter is a conversion table for the case that a radio LAN adapter in compliance with IEEE 802.11g or IEEE 802.11a is used.

As communication with higher communication speed can be established, the radio environment is better, and higher converted values are assigned.

Where communication in compliance with another standard or scheme is used, it is sufficient to appropriately determine converted values corresponding to communication speeds.

By adding the above four converted-into radio environment data, normalized comprehensive radio environment data of 100% to 0% is obtained.

By using the comprehensive radio environment data calculated in this way by weighting the radio environment data including data about the radio environment other than the radio intensity, the radio environment can be evaluated more appropriately.

If the radio environment state is evaluated with only the radio intensity, it is difficult to determine reliably whether communication can be established, especially in areas of low intensity. In order to determine an area where communication is reliably secured, the threshold needs to be of a radio intensity level having an enough margin. Accordingly, in order to be able to determine that an entire movement area is a communication-feasible area, the radio wave output power of the radio base unit 1 (see FIG. 5) needs to be increased, or many radio base units 1 need to be provided as shown in the lower of FIG. 20A.

Accordingly, by adding other radio environment data, the radio environment state can be evaluated more accurately without increasing the radio wave output power of the radio base unit 1 (see FIG. 5) or the number of radio base units 1.

Especially, because the radio environment state with communication established can be evaluated with the number of error times or the number of retransmission times, the state where communication is becoming not feasible can be precisely determined.

[Surroundings-State Detector]

Referring back to FIG. 5, description will continue.

The surroundings-state detector (self-position detecting unit) 170 includes a laser device 171 that is slit light irradiating unit, infrared LEDs (Light Emitting Diodes) 172 that are infrared irradiating units, two infrared cameras 173 that pick up images of a search area, and a sensor controller 180 that controls these.

The surroundings-state detector 170 irradiates slit light or infrared onto the search area by the laser device 171 or the infrared LEDs 172 and picks up images of the search area by the infrared cameras 173 in the control of the sensor controller 180, thereby detecting the surroundings state of the robot R. That is, the surroundings-state detector 170 corresponds to conventional surface detecting and position detecting devices, and space is saved using the common infrared cameras 173.

The surroundings-state detector 170 is connected to the main controller 139 and can obtain data about its own position detected by the gyro sensor SR1 or the GPS receiver SR2.

Figure 8:
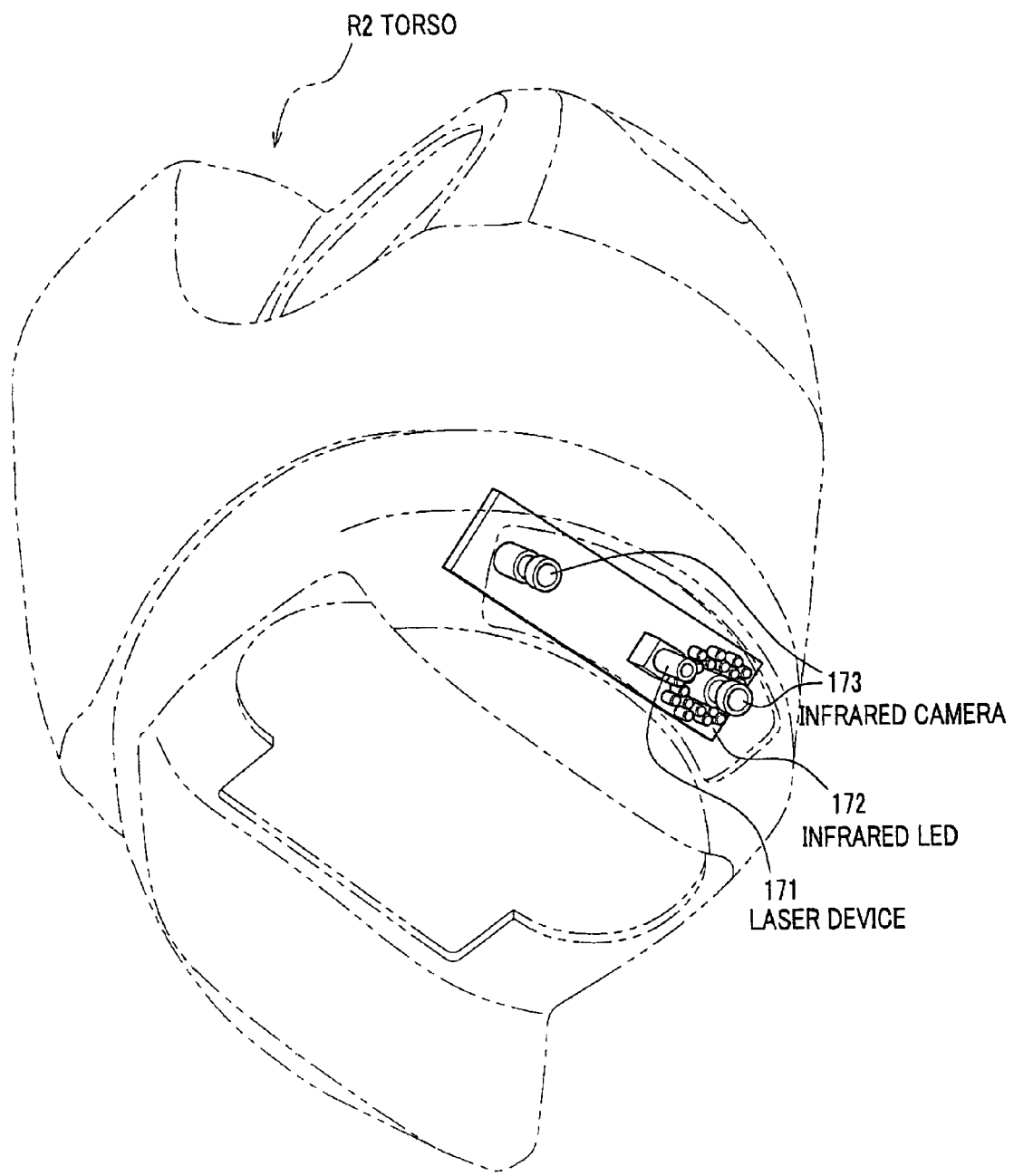
FIG. 8 is a see-through view of a torso of the robot according to the present embodiment.

FIG. 8 is a see-through view of the torso of the robot according to the present embodiment.

As shown in FIG. 8, in the present embodiment, the two infrared cameras 173 are arranged laterally in the front of the torso R2 at the height of the loin. The laser device 171 is located in the middle between the infrared cameras 173. The infrared LEDs 172 are located around one of the infrared cameras 173 (on the left side of the robot R in FIG. 8).

Where the laser device 171, the infrared LEDs 172, and the infrared cameras 173 are arranged in the front of the torso R2 at the height of the loin, advantageously they are less affected by the swings of the robot R as compared with the case of being provided in another part (e.g., head R4 or legs R1), and their scopes are less likely to be blocked by the arm R3 or the legs R1.

[Laser Device]

The laser device 171 is a device that irradiates, for example, infrared laser light in the shape of a slit, and is coupled to an actuator (not shown) for changing the irradiating direction of the infrared laser light so as to irradiate the slit light onto the road surface as the search area to form a radial pattern. The slit light forms a laser bright line on the object (e.g., the road surface) at which the light hits the object.

The laser device 171 is connected to a sensor controller 180 (a switching determining section 181) described later, and irradiates the slit light and stops according to instructions from the sensor controller 180.

[Infrared LED]

The infrared LED 172 is a device that irradiates infrared onto the search area, and in the present embodiment, a plurality of infrared LEDs 172 are arranged around the infrared camera 173 on the left side of the robot R in FIG. 8. Infrared emitted from the infrared LEDs 172 is reflected back toward them by a mark M made of reflective material provided on the road surface.

The infrared LEDs 172 are connected to the sensor controller 180 (a switching determining section 181) described later, and irradiates infrared and stops according to instructions from the sensor controller 180.

[Infrared Camera]

The infrared camera 173, image pickup units, can take in picked up images in the form of digital data, and is embodied by, for example, a CCD infrared camera. The infrared cameras 173 are arranged laterally in the front of the torso R2 at the height of the loin. The images picked up by the infrared camera 173 are output to the sensor controller 180 described later.

Of the images picked up by the infrared cameras 173, the picked-up image of the search area onto which the slit light was irradiated (hereinafter called "slit light image") has the laser bright line imaged therein. The laser bright line is detected and a so-called light-section method is used to calculate the distance to the object. The slit light image is picked up by the left and right infrared cameras 173. Thus, the three dimensional shape of the road surface can be detected in details.

Meanwhile, of the images picked up by the infrared camera 173, the picked-up image of the search area onto which the infrared was irradiated (hereinafter called an "infrared image") has the mark M imaged therein. Because the infrared cameras 173 are fixed at predetermined angles at the height of the loin of the torso R2 of the robot R as shown in FIG. 8, the relative position relationship between the mark M and the infrared camera 173, thus between the mark M and the robot R can be detected by detecting at which position the mark M is imaged in the infrared image. Hence, not using both the infrared cameras 173, the infrared image is picked up by only the left infrared camera 173 in this embodiment.

[Sensor Controller]

Figure 9:
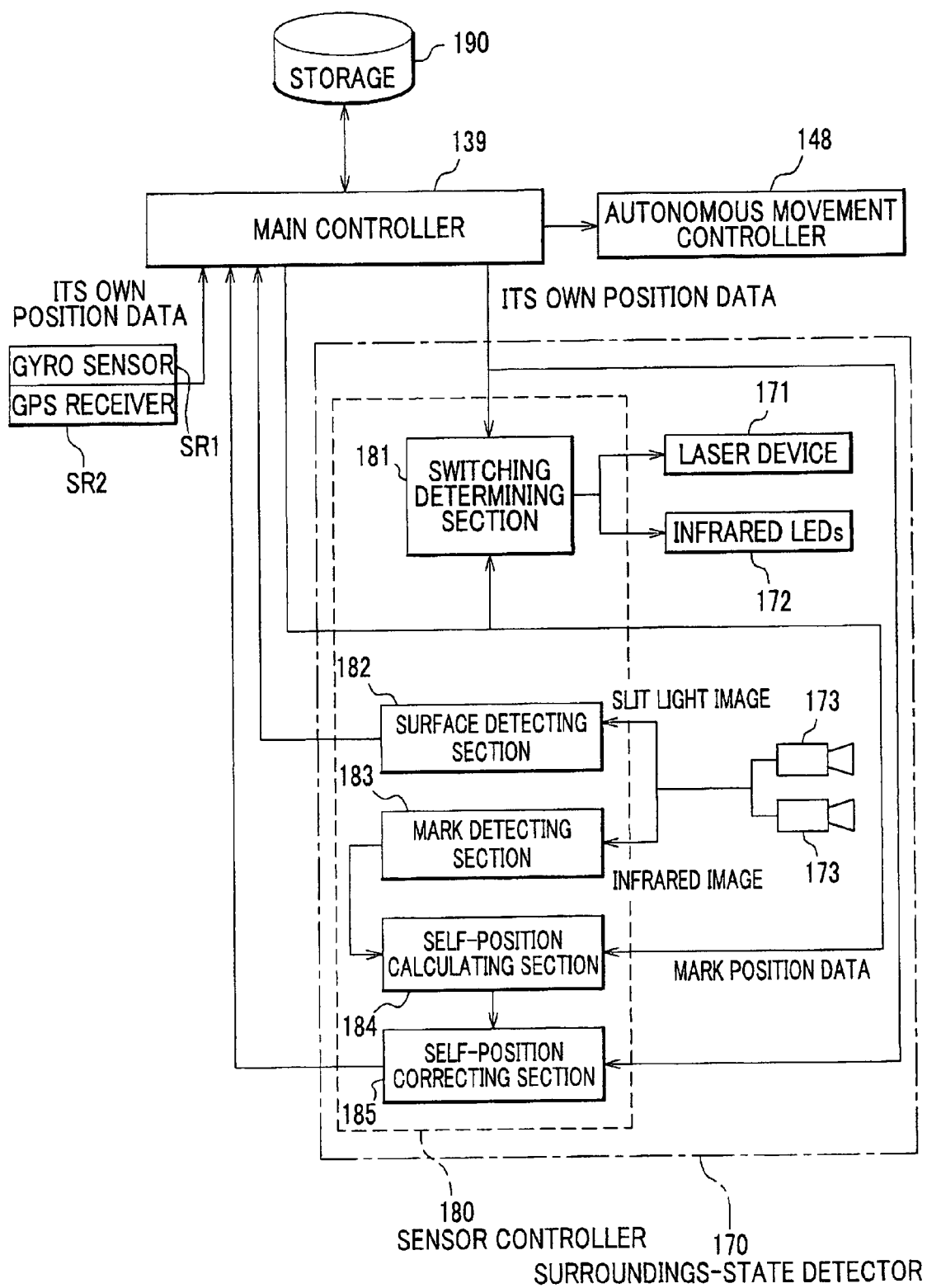
FIG. 9 is a block diagram mainly showing the configuration of a surroundings-state detector shown in FIG. 5.

Next, the sensor controller 180 will be described in more detail with reference to FIG. 9. FIG. 9 is a block diagram showing the configuration of the surroundings-state detector.

The sensor controller 180, as shown in FIG. 9, has a switching determining section 181, a surface detecting section 182, a mark detecting section 183, a self-position calculating section 184, and a self-position correcting section 185.

Further, the sensor controller 180 is configured to obtain map data stored in the storage 190 via the main controller 139. The map data that is obtained from the storage 190 is map data of a movement area for the robot R and includes position data of marks M located at specific locations in the movement area, and data about the mark provided areas covering a predetermined range around the marks M (hereinafter "mark provided area data" for short).

The obtained map data is input to the switching determining section 181 and the self-position calculating section 184.

[Switching Determining Section]

The switching determining section 181 compares the mark provided area data of the marks M included in the map data read from the storage 190 via the main controller 139 and data about its own position obtained from the gyro sensor SR1 or the GPS receiver SR2 via the main controller 139. The switching determining section 181 is connected to the laser device 171 and the infrared LEDs 172 to be able to output start and stop commands to either of them.

As a result of the comparing of the mark provided area data and the data about its own position, if it is determined that its own position is outside the mark provided areas of the marks M, the switching determining section 181 outputs a start command to the laser device 171 and a stop command to the infrared LEDs 172. In contrast, if it is determined that its own position is inside the mark provided area of a mark M, the switching determining section 181 outputs a stop command to the laser device 171 and a start command to the infrared LEDs 172.

[Surface Detecting Section]

The surface detecting section 182 detects the road surface state by analyzing the slit light images picked up by the infrared cameras 173. To be specific, for example, the so-called light-section method is used to obtain the distance from the infrared cameras 173 to the road surface onto which the slit light was irradiated. Because the slit light is irradiated onto the road surface in the movement direction of the robot R to form a radial pattern, the robot R can detect the three dimensional shape of the road surface in the movement direction.

Information about the road surface state detected by the surface detecting section 182 is output to the main controller 139.

[Mark Detecting Section]

The mark detecting section 183 detects the marks M by analyzing the infrared image picked up by the infrared camera 173.

The mark detecting section 183 comprises, for example, a band pass filter and can selectively observe light having wavelengths at and near the center wavelength of the infrared LED 172. By this means, light having wavelengths in unnecessary wavelength bands is cut off so that this device is highly resistant to disturbance by visible light or the like.

The mark detecting section 183 measures the relative distances between three members forming a mark M (see FIG. 1) and the distance between the centers of two marks M (each distance being measured with the center of its three members), and when these two kinds of distances are close to set values, the marks M are detected as genuine ones. By this means, this device is highly resistant to disturbance by infrared reflective objects other than marks M.

[Self-Position Calculating Section]

The self-position calculating section 184 calculates a relative position relationship between the mark M and the robot R from the position (coordinates) of a mark M imaged in the infrared image.

Because the infrared camera 173 is fixed at a predetermined angle at the height of the loin of the robot R, the relative position relationship between the mark M and the robot R can be calculated by analyzing at which position or pixel in the infrared image the mark M is imaged. Further, because the mark M is constituted by a set of two marks M, the tilt of the robot R with respect to the line joining the marks M can be calculated. That is, the self-position calculating section 184 can calculate the accurate position of the robot R based on the coordinates of the mark M obtained from map data and the relative position relationship between the mark M and the robot R.

The robot R's own position calculated by the self-position calculating section 184 is output to the self-position correcting section 185.

[Self-Position Correcting Section]

The self-position correcting section 185 corrects the robot R's own position based on position data of the mark M detected by the mark detecting section 183.

In this embodiment, the self-position correcting section 185 compares its own position calculated by the self-position calculating section 184 and its own position obtained from the gyro sensor SR1 or the GPS receiver SR2, and if a deviation exists between the two, believing that its own position calculated by the self-position calculating section 184 is correct, correction is made.

Data about the robot R's own position corrected is output to the main controller 139. By this means, movement errors or position detection errors accumulated during autonomous movement control are resolved. Thus, the movement of the robot R can be controlled accurately and reliably.

The correction of its own position by the self-position correcting section 185 is not limited to the above method, but by instructing the autonomous movement controller 148, the position or orientation of the robot R may be finely adjusted such that the mark M is imaged at a predetermined position in the infrared image, for example.

In the present embodiment, the robot is configured to use the gyro sensor SR1 and the GPS receiver SR2 as self-position detecting unit and have the self-position correcting section 185 to correct its own position by detecting marks M so as to accurately detect its own position. However, without using the self-position correcting section, its own position may be detected with the gyro sensor SR1 and/or the GPS receiver SR2, or by detecting marks M, or by using another method.

[Storage]

Referring back to FIG. 5, description will continue.

The storage (storing unit) 190 is constituted by a storage device such as a RAM or a hard disk device, and stores map data of a movement area for the robot R, a comprehensive radio environment map, an optimum radio base unit map, radio environment data, image data picked up by the cameras C at radio environment data measuring positions, and the like.

The map data includes mark provided area data of the marks M (see FIGS. 2A and 2B) located at specific locations in the movement area and can be read from the storage 190 by the main controller 139 and output to the switching determining section 181 and self-position calculating section 184 of the sensor controller 180 (see FIG. 9).

Further, the comprehensive radio environment map creating section 142 of the main controller 139 stores comprehensive radio environment data into the comprehensive radio environment map in the storage 190; the optimum radio base unit map creating section 143 stores optimum radio base unit data into the optimum radio base unit map; the comprehensive radio environment map updating section 144 updates comprehensive radio environment data in the comprehensive radio environment map and optimum radio base unit data in the optimum radio base unit map; and the surroundings image acquiring section 146 stores image data picked up by the cameras C at radio environment data measuring positions in association with corresponding positions in the map data.

The comprehensive radio environment map and the image data stored in the storage 190 are transmitted to the managing computer 3 via the main controller 139 and the radio communication unit 160 and stored in the storage 5 that is managed by the managing computer 3. Also, the map data, the comprehensive radio environment map, and the optimum radio base unit map stored in the storage 5 can be downloaded into the storage 190 of the robot R as needed.

<<Control Method for Robot>>

Next, the control method for the robot will be described with reference to the drawings as needed.

<Autonomous Movement Control for Robot>

Figure 10:
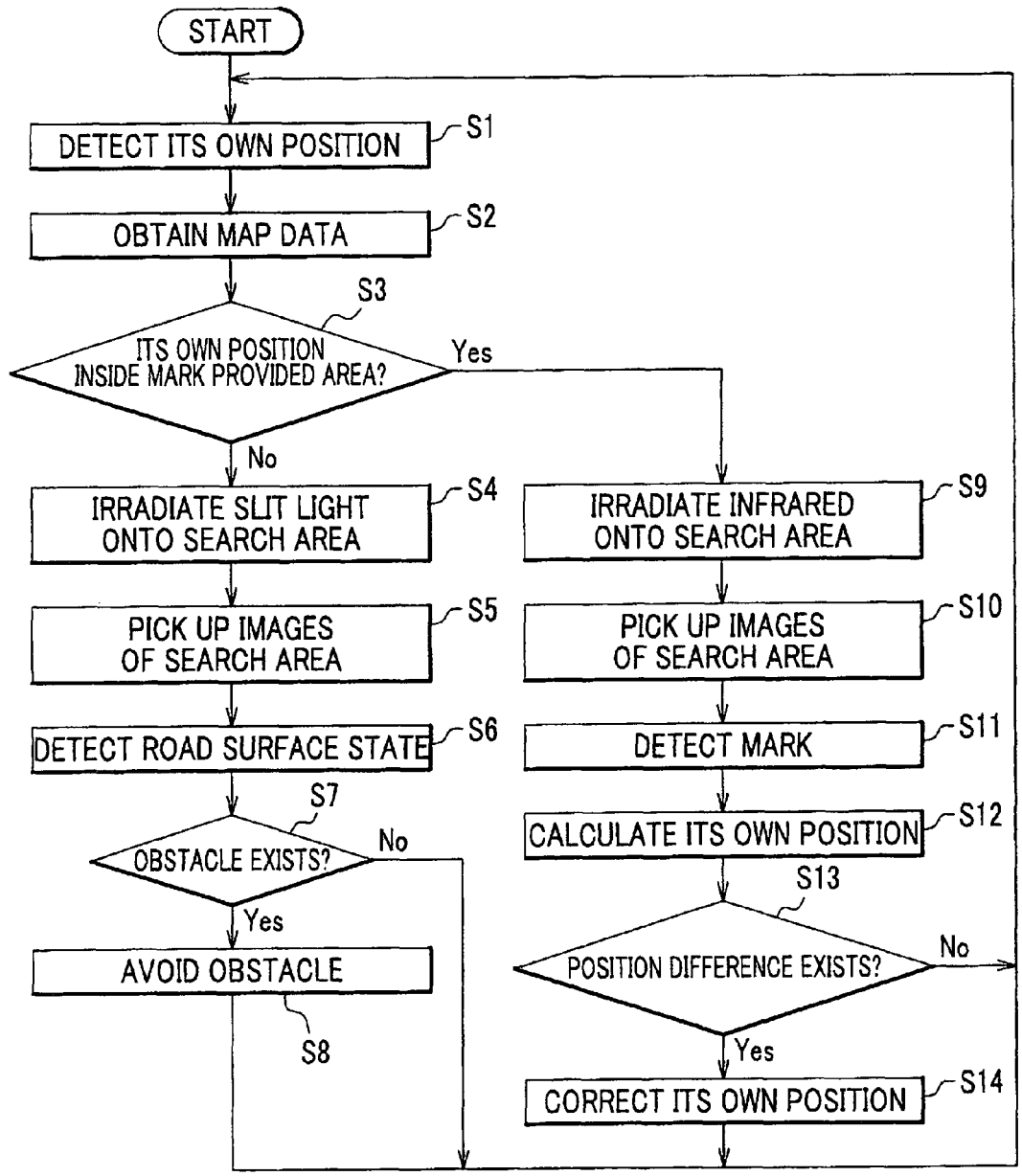
FIG. 10 is a flowchart of autonomous movement control for the robot (switching control between slit light irradiation and infrared irradiation)

First, the control exercised when the robot R autonomously moves while switching between the irradiation of slit light and the irradiation of infrared will be described with reference to FIG. 10 (and FIGS. 2A and 2B, 5, 9 as needed). FIG. 10 is a flowchart of autonomous movement control for the robot (switching control between slit light irradiation and infrared irradiation).

<Step S1>

First, the robot R detects its own position by the gyro sensor SR1 or the GPS receiver SR2 as a self-position detecting unit obtaining data about its own position. The obtained data about its own position is output to the switching determining section 181 via the main controller 139.

<Step S2>

Next, the switching determining section 181 obtains map data including position data of marks M from the storage 190 via the main controller 139.

<Step S3>

Then, the switching determining section 181 compares the robot R's own position and the mark provided area of a mark M and determines whether its own position is inside the mark provided area of the mark M. To be specific, as shown in FIGS. 2A and 2B, the range within a predetermined distance from a mark M is set as the mark provided area of the mark M and stored beforehand in the storage 190 (and the storage 5), and it is determined whether the coordinates of the robot R's own position are inside the mark provided area of the mark M.

Not being limited to this, the determining method by the switching determining section 181 may be to calculate the distance between its own position and the mark M and to determine that its own position is inside the mark provided area if the distance is below a threshold. In this determining, the movement direction of the robot R may be taken into consideration. That is, because the robot R does not need to detect the mark M while moving away from the mark M, the switching determining section 181 may determine that its own position is not inside the mark provided area even if the distance between the mark M and the robot R's own position is below the threshold.

Hence, slit light irradiation and infrared irradiation can be switched at appropriate timings. Thus, space is saved using the common infrared cameras 173, and power consumption is reduced without wasteful infrared irradiation.

<Step S4>

If the switching determining section 181 determines that its own position is not inside the mark provided area of the mark R (No at step S3), the determining section 181 outputs a start command to the laser device 171 and a stop command to the infrared LEDs 172. The laser device 171 having received the start command irradiates the slit light onto the road surface as a search area to form a radial pattern (see FIG. 2A). The infrared LEDs 172 having received the stop command stop the infrared irradiation.

<Step S5>

When the laser device 171 irradiates the slit light, the infrared cameras 173 pick up images of the search area irradiated with the slit light and obtain a slit light image.

The slit light image picked up is output to the surface detecting section 182.

<Step S6>

The surface detecting section 182 analyzes the slit light image with the use of, for example, the light-section method, thereby obtaining the three dimensional shape of the road surface, that is, detecting the road surface state.

The detected three dimensional data of the road surface is output to the main controller 139.

<Step S7>

The main controller 139 compares the road surface shape stored as part of map data and the road surface shape received from the surface detecting section 182. As a result of the comparing, if the two match or the difference is within permissible limits (No at step S7), the main controller 139 determines that no obstacle exists, and returns to step S1, where the main controller 139 senses the surroundings state of the robot R again.

<Step S8>

As a result of the comparing, if the two do not match or the difference is above the permissible limit (Yes at step S7), the main controller 139 determines that an obstacle exists in the search area, and instructs the autonomous movement controller 148 to avoid the obstacle, specifically, for example, to take a detour or remove the obstacle with the arms R3.

If a step exists in the road surface without an obstacle, the legs R1 and arms R3 of the robot R are controlled based on not map data but the three dimensional data of the road surface detected by the surface detecting section 182, thereby more accurately and reliably controlling the movement of the robot R.

Referring back to step S3, description will continue.

<Step S9>

If in step S3 it is determined that its own position is inside the mark provided area of the mark M (Yes at step S3), the determining section 181 outputs a start command to the infrared LEDs 172 and a stop command to the laser device 171. The infrared LEDs 172 having received the start command irradiate infrared onto the road surface as a search area (see FIG. 2B). The laser device 171 having received the stop command stops the slit light irradiation.

<Step S10>

When the infrared LEDs 172 irradiate infrared, the infrared camera 173 picks up an image of the search area irradiated with the infrared and obtain an infrared image. Because a mark M made of reflective material reflecting back is provided in the search area, the infrared image has the mark M imaged therein.

The infrared image picked up is output to the mark detecting section 183.

<Step S11>

The mark detecting section 183 analyzes the infrared image with the use of image processing such as pattern matching to detect the mark M. By this means, the robot R can detect where (at which pixel) the mark M is located in the infrared image.

<Step S12>

The self-position calculating section 184 calculates the position of the robot R based on the position of the mark M in the infrared image (hereinafter called a "position in the image").

To be specific, the self-position calculating section 184 calculates the robot R's own position by adding or subtracting the relative distance and angle between the mark M and the robot R obtained from the infrared image to or from position data of the mark M read from the storage 190. Because the position and angle at which the infrared camera 173 is attached are fixed, the relative position relationship between the robot R and the mark M can be calculated from where the mark M is imaged in the infrared image. Further, because a set of two marks M are used, the difference in angle can be detected, and thus correction can be made for the difference in direction.

As the robot R moves, the infrared camera 173 may change in height or tilt angle. In such a case, the attitude of the robot R may be detected based on, for example, control data of the autonomous movement controller 148, and the deviation from the reference attitude of the infrared camera 173 may be cancelled out. In such a case, the detected results can be corrected using, for example, a flection model for the robot R.

The calculated data about the robot R's own position is output to the self-position correcting section 185.

<Step S13>

Next, the self-position correcting section 185 compares the robot R's own position obtained from the gyro sensor SR1 or the GPS receiver SR2 and the robot R's own position calculated by the self-position calculating section 184.

As a result of the comparing, if the two match or the difference is within permissible limits (No at step S13), without the correction of its own position, the process returns to step S1, where sensing the surroundings state continues.

<Step S14>

As a result of the comparing, if the two do not match or the difference is outside the permissible limits (Yes at step S13), considering its own position calculated based on the mark M to be correct, the robot R's own position is corrected. By this means, movement errors or position detection errors accumulated during autonomous movement control are resolved. Thus, the movement of the robot R can be controlled accurately and reliably.

In the present embodiment, the self-position calculating section 184 calculates the absolute coordinates (coordinates on map data) of the robot R from position data of the mark M, but not being limited to this, the position of the robot R may be corrected such that the relative position relationship between the mark M and the robot R calculated from the infrared image takes on a predetermined value. This method has a merit that the absolute coordinates of the robot R need not be calculated and is effective in making the robot R remain at a predetermined position.

<Creation of Comprehensive Radio Environment Map>

Next, creation control of the comprehensive radio environment map by the robot R will be described.

Figure 11A:
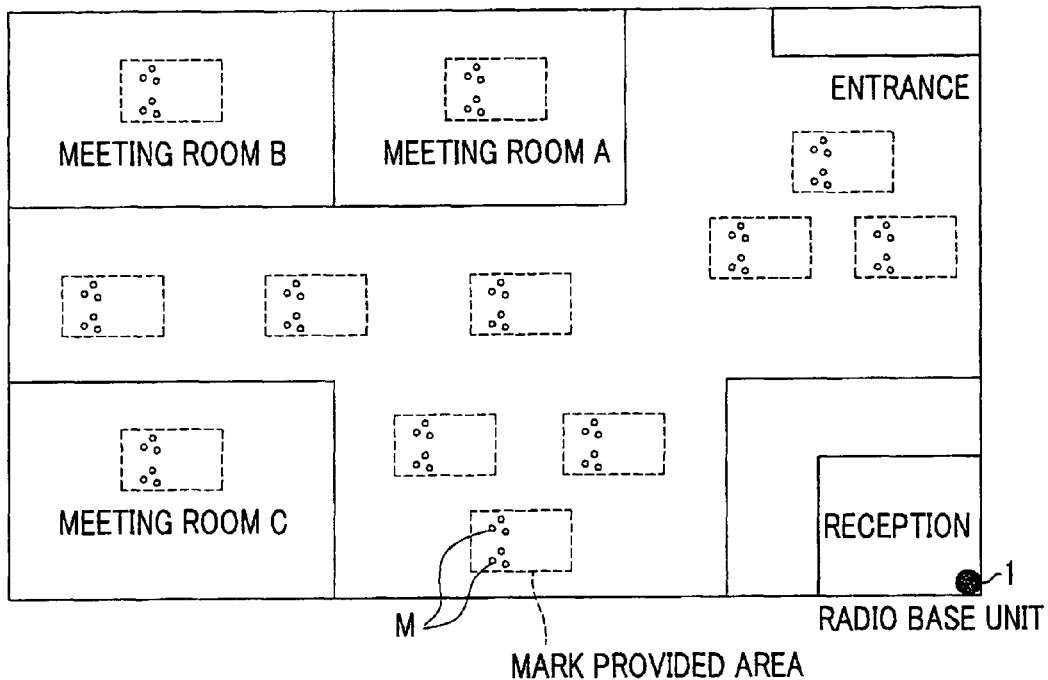
Figure 11B:
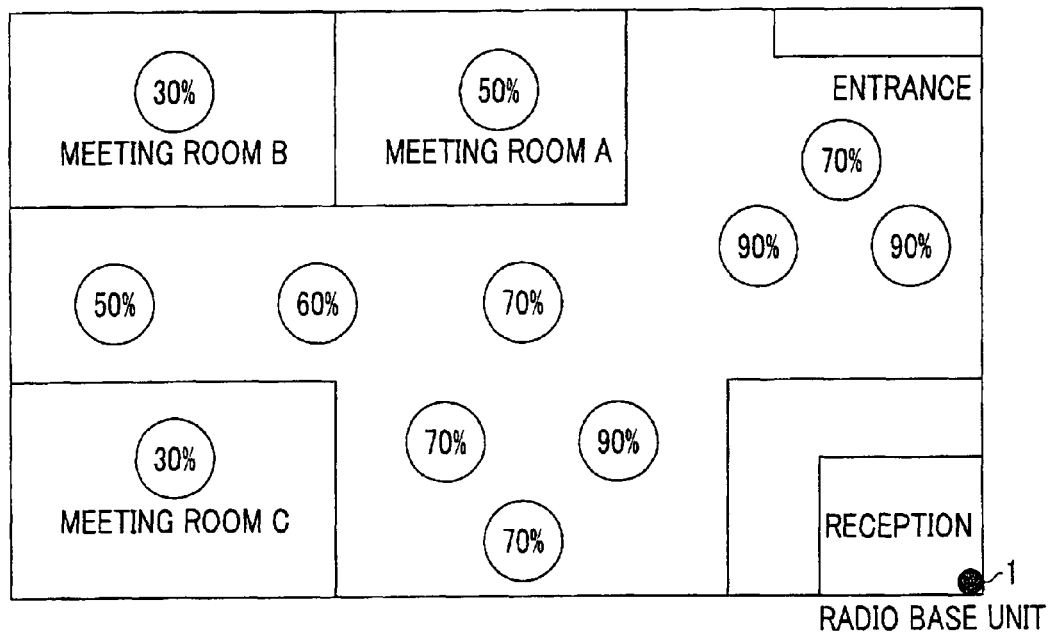

FIGS. 11A and 11B show an example of map data and the comprehensive radio environment map. FIG. 11A shows map data (floor map) and FIG. 11B shows a comprehensive radio environment map.

As shown in FIG. 11A, the map data is in the form of a floor map showing the layout of the entrance, meeting rooms, a reception, and the like for each floor of a building. The map data further includes data about the positions where radio base units 1 are provided, the mark provided areas of marks M provided at appropriate positions, and the like.

The robot R can move while obtaining data about its own position from the gyro sensor SR1 or the GPS receiver SR2 as described previously, and detecting marks M thereby detecting its own position. At appropriate positions, the robot R measures radio environment data of radio waves transmitted from a radio base unit 1, calculates comprehensive radio environment data, and writes it into the map data, thereby creating a comprehensive radio environment map as shown in FIG. 11B. In this example, the robot R measures radio environment data at each position where a mark M is provided, calculates comprehensive radio environment data, and writes the data in association with the measuring position into the map data stored in the storage 190, thereby creating a comprehensive radio environment map.

<Creation of Comprehensive Radio Environment Map by Being Led by its Hand>

In order to measure radio environment data, conventionally an operator has to carry a measuring device and move around the area for which a comprehensive radio environment map is to be made. Such work where a person carries a measuring device to measure takes a lot of labor and requires a large man power, and also because the measuring device differs in radio communication conditions from the radio communication unit 160 mounted in the robot R, the radio environment may not exactly match the one when the radio communication unit 160 of the robot R receives radio waves from a radio base unit 1.

Accordingly, in the present embodiment, a radio environment detecting section 163 to measure the radio environment of the robot R is mounted in the robot R, and instead of carrying a measuring device, a person HB guides the robot R around, has the robot R measure radio environment data at places appropriate to calculate comprehensive radio environment data, and stores the comprehensive radio environment data in association with the measuring position into the map data of the movement area for the robot R, thereby creating a comprehensive radio environment map.

Figure 12:
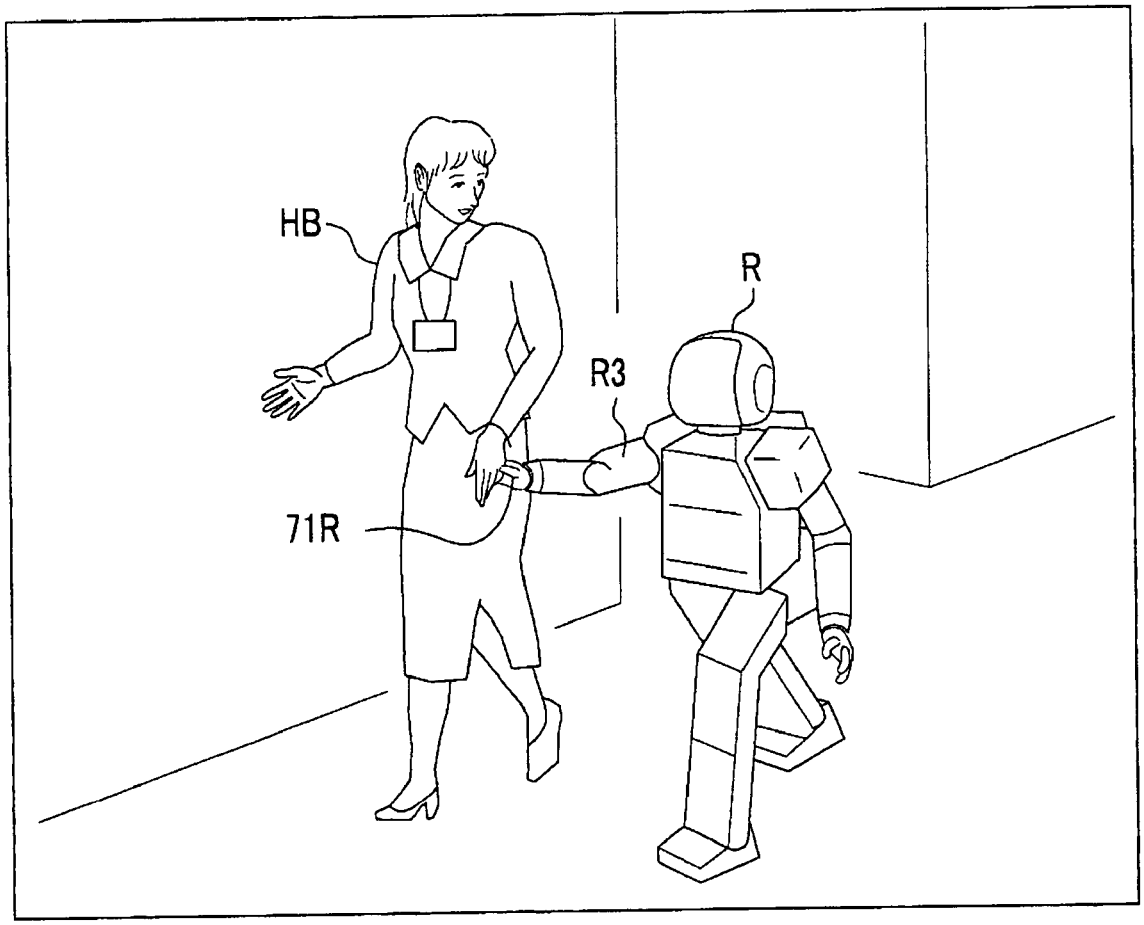
FIG. 12 is an illustration showing the way that a person leads the robot by its hand.

To be more specific, as shown in FIG. 12, the person HB guides the robot R by the right hand (hand 71R at the end of the arm R3) of the robot R to measuring positions.

The robot R of the present embodiment can move (walk or run) by driving and controlling the electric motor of each joint of the legs R1 as shown in FIGS. 3-5 and can stretch out a hand to the person HB or hold the person HB's hand by driving and controlling the electric motor of each joint of the arms R3. The hand 71R at the end of the arm R3 and the six-axis force sensor 62R (movement detecting unit) provided between wrist joints 36R, 37R can detect three directional components Fx, Fy, Fz and three directional components Mx, My, Mz of moment of the reaction which act on the hand 71R of the robot R (see FIG. 4).

The three directional components Fx, Fy, Fz of the reaction detected by the six-axis force sensor 62R are transmitted to the arm control section 148c of the autonomous movement controller 148, which determines the direction and magnitude of the force with which the person HB leads the robot by its hand 71R based on the three directional components Fx, Fy, Fz of the reaction as shown in FIG. 12 and transmits them to the main controller 139. The main controller 139 determines the direction and speed in and at which the robot R is to move, based on the direction and magnitude of the force with which the person HB leads the robot by its hand 71R and instructs the leg control section 148a to control the robot to move. The leg control section 148a drives and controls each joint of the legs R1 according to the direction and speed of movement given in the instructions transmitted from the main controller 139, and thereby the robot R can move with the person HB leading it by its hand.

Figure 13:
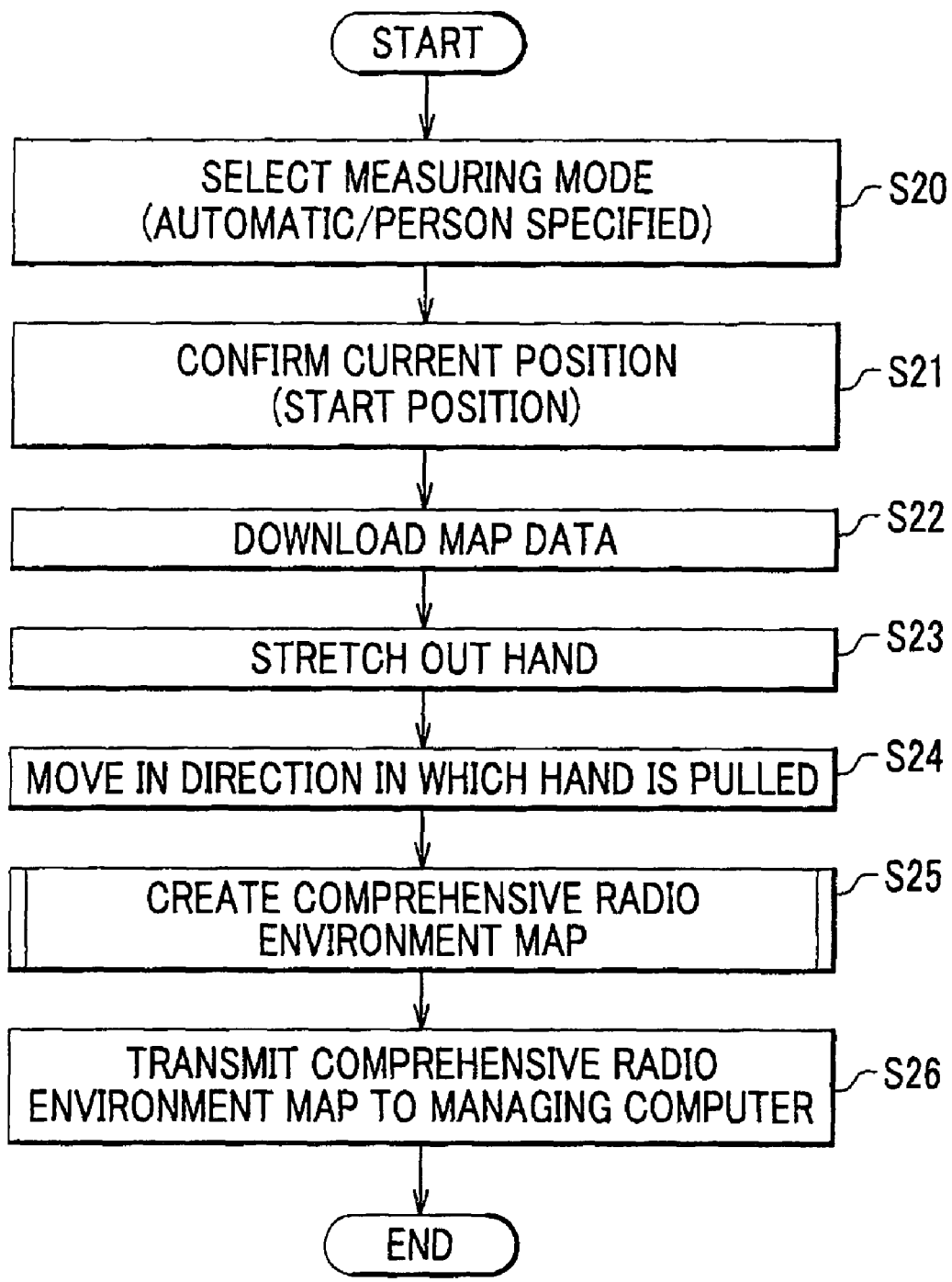
FIG. 13 is a flowchart showing the process of creating a comprehensive radio environment map with the robot being led by its hand by the person to a measuring position.

Next, with reference to FIG. 13 (and FIG. 5 as needed), the flow of the process of creating a comprehensive radio environment map with the robot being led hand in hand by the person HB will be described. FIG. 13 is a flowchart showing the process of creating a comprehensive radio environment map with the robot being led by its hand by the person to a measuring position.

First, a measuring mode is selected to measure radio environment data (step S20). The measuring mode refers to a mode to determine timings to measure radio environment data on the path that the robot R moves along in which its hand is led by the person HB. There are an "automatic mode" where the robot R automatically measures radio environment data at predetermined time intervals in which its hand is led by the person HB and a "person specified mode" where the person HB instructs the robot R to measure with specified measuring positions.

The selection of a measuring mode is performed with an input unit such as a keyboard (not shown) of the terminal 7 connected to the managing computer 3. Then, the managing computer 3 instructs the robot R about the measuring mode. Or, a selection switch may be provided at an appropriate place such as the back of the robot R to switch the selection, or the robot R may be directly told the selected mode by voice.

In the case of instructing the selected mode by voice, the robot R picks up the voice by the microphone MC, and the voice recognition section 122 of the voice processor 120 creates character information from the voice picked up and outputs the character information to the main controller 139, which analyzes the character information to find out the designated measuring mode.

Next, the robot R detects its current position with the use of the gyro sensor SRI, the GPS receiver SR2, and the surroundings-state detector 170 and sets it as the measuring start position (step S21).

After confirming its current position, the robot R downloads map data including the current position from the storage 5 that is managed by the managing computer 3 (step S22).

To be specific, the robot R requests the managing computer 3 for map data via a radio base unit 1 by the radio communication unit 160. The managing computer 3 reads corresponding map data from the storage 5 and transmits it to the robot R via the radio base unit 1. The robot R receives the map data by the radio communication unit 160 and stores the received map data in the storage 190. By this procedure, the download of map data finishes.

Where the map data including the current position is already stored in the storage 190, the download procedure of map data may be omitted.

When the map data becomes ready for use, the robot R analyzes images picked up by cameras C by the image processor 110, detects the position of the person HB guiding the robot R to a measuring position, and drives an arm R3 by the arm control section 148c to stretch out a hand (for example, the hand 71R as shown in FIG. 12) to the person HB (step S23).

When the person HB starts leading the robot R by the stretched-out hand at step S23 (for example, the hand 71R), the robot R starts moving in the direction in which it is led (step S24).

To be specific, when led by, e.g., its hand 71R, the robot R determines the direction and speed in and at which the robot R is to move based on the three directional components Fx, Fy, Fz of the reaction detected by the six-axis force sensor 62R (see FIG. 4), drives and controls each joint of the legs R1, and starts moving in which the hand is led by the person HB.

The robot R, in the measuring mode selected at step S20, measures radio environment data for radio communication between the radio communication unit 160 and the radio base unit 1 by the radio environment detecting section 163, and calculates comprehensive radio environment data based on the measured radio environment data by the comprehensive radio environment data calculating section 141. Then, the comprehensive radio environment map creating section 142 stores the calculated comprehensive radio environment data in association with the measuring position into the map data stored in the storage 190, thereby creating a comprehensive radio environment map (step S25).

After the creation of the comprehensive radio environment map, the robot R reads the comprehensive radio environment map stored in the storage 190 and transmits it by the radio communication unit 160 to the managing computer 3 (step S26). When receiving the comprehensive radio environment map via the radio base unit 1, the managing computer 3 stores it in the storage 5.

Figure 14:
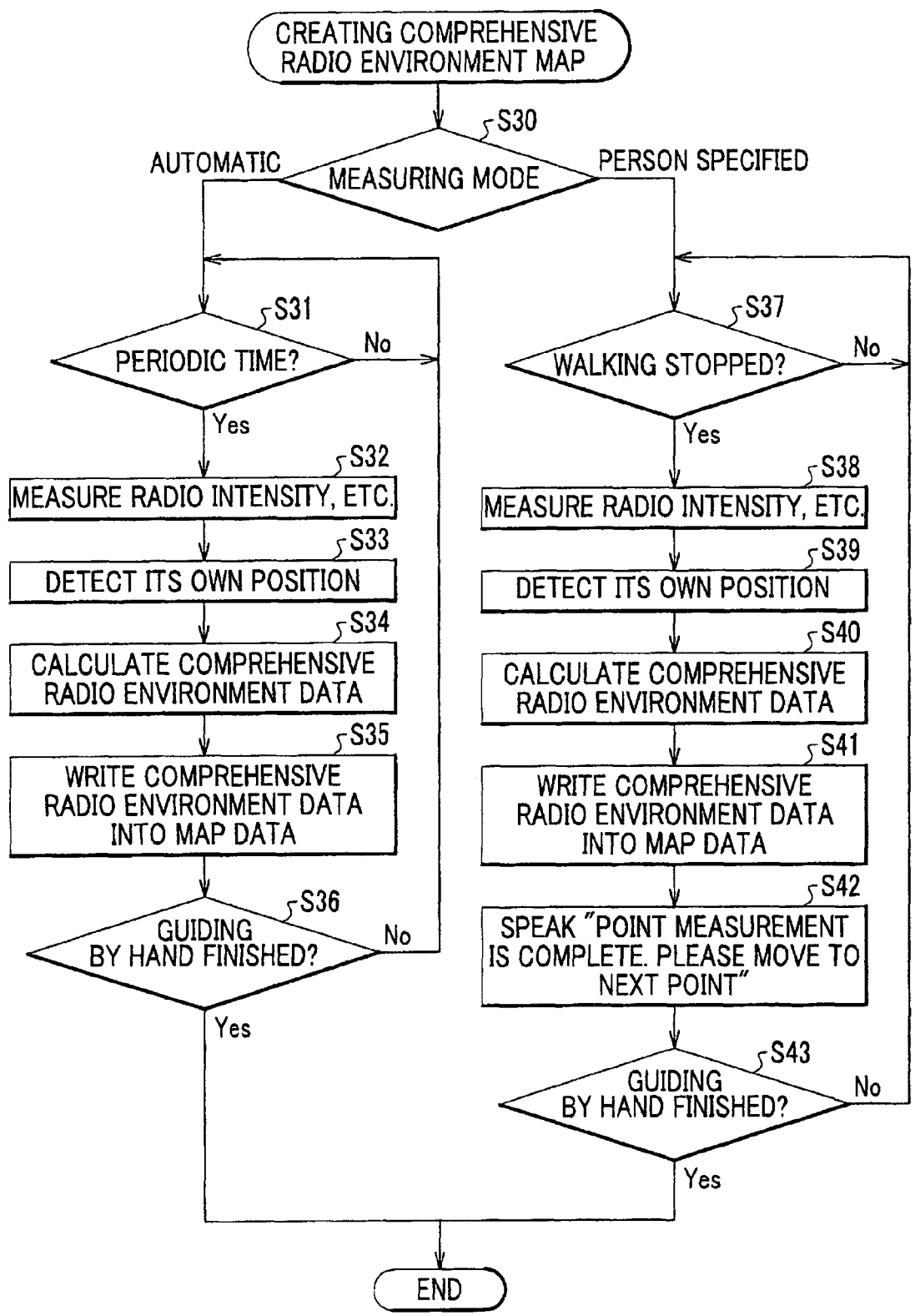
FIG. 14 is a flowchart showing the process of creating a comprehensive radio environment map.

Next, with reference to FIG. 14 (and FIG. 5 as needed), the flow of the process of creating a comprehensive radio environment map will be described in detail. FIG. 14 is a flowchart showing the process of creating a comprehensive radio environment map. The process of creating a comprehensive radio environment map of FIG. 14 corresponds to step S25 of the flowchart shown in FIG. 13.

The robot R checks the measuring mode selected at step S20 of the flowchart of FIG. 13 (step S30), and if "automatic mode" is selected ("automatic" at step S30), determines whether it is a predetermined periodic time point to measure referring to an internal clock (not shown) incorporated in the main controller 139 (step S31). If not a predetermined periodic time point (No at step S31), the robot R continues to move with being led through its hand by the person HB and repeats step S31 until it reaches a predetermined periodic time point.

When it reaches a predetermined periodic time point (Yes at step S31), the radio environment detecting section 163 measures radio environment data such as radio intensity for communication between the radio communication unit 160 and the radio base unit 1 (step S32).

Then, the robot R detects its own position at the time of the measuring using the gyro sensor SR1, the GPS receiver SR2, and the surroundings-state detector 170 (step S33).

Next, the comprehensive radio environment data calculating section 141 calculates comprehensive radio environment data based on the radio environment data measured at step S32 (step S34).

Then, the comprehensive radio environment map creating section 142 writes the comprehensive radio environment data calculated at step S34 in association with its own position detected at step S33, i.e., the measuring position into the map data stored in the storage 190, thereby creating (updating) a comprehensive radio environment map (step S35).

After the updating of the comprehensive radio environment map, the robot R confirms whether the guiding by its hand of the person HB has finished based on the output values of the six-axis force sensor 62R (step S36). For example, when no external force is detected in analyzing the output of the six-axis force sensor 62R, it is determined that the guiding by its hand of the person HB has finished (Yes at step S36), and the process of creating the comprehensive radio environment map is ended.

In contrast, if it is determined that the guiding by its hand of the person HB has not finished (No at step S36), the process returns to step S31, where the robot R confirms whether it is the next periodic time point to measure while it moves following the guiding by its hand.

Thereafter, steps S31-S36 are repeated to continue creating the comprehensive radio environment map until it is determined that the guiding by its hand of the person HB has finished at step S36.

If the measuring mode is the "person specified mode" ("person specified" at step S30), the robot R repeatedly confirms the output of the six-axis force sensor 62R and determines whether the person HB guiding by its hand has stopped walking based on the force detected by the six-axis force sensor 62R (step S37).

If the person HB has not stopped walking (No at step S37), the robot R repeats step S37 where it determines whether the person HB has stopped walking, while continuing to move with being led by its hand by the person HB.

If it is determined that the person HB has stopped walking (Yes at step S37), the robot R measures radio environment data such as radio intensity for communication between the radio communication unit 160 and the radio base unit 1 by the radio environment detecting section 163 (step S38). In this measuring mode, the radio environment data is measured with walking being stopped. In order to reduce influence by burst noise for accurate measurement, the measurement is repeated a plurality of times at the same place, and the average of the measurements for the radio environment data is calculated and used. For the radio intensity, for example, the radio intensity detecting section 163a (see FIG. 6) measures every 500 ms in 5 sec, that is, ten times and outputs the measurement data to the main controller 139. For other radio environment data, likewise, respective sections of the radio environment detecting section 163 measure a predetermined number of times and output the measurement data to the main controller 139.

Then, the robot R detects its own position at the time of the measuring through the use of the gyro sensor SR1, the GPS receiver SR2, and the surroundings-state detector 170 (step S39).

The comprehensive radio environment data calculating section 141 of the main controller 139 calculates the average of each type of radio environment data measured by a respective section of the radio environment detecting section 163 and calculates comprehensive radio environment data based on the averages of the radio environment data (step S40).

The comprehensive radio environment map creating section 142 writes the comprehensive radio environment data calculated at step S40 in association with its own position detected at step S39, i.e., the measuring position into the map data stored in the storage 190, thereby creating (adding data to) the comprehensive radio environment map (step S41).

After the writing of the comprehensive radio environment data into the map data, the robot R synthesizes voice from a text "Point measurement is complete. Please move to next point" by the voice synthesis section 121 of the voice processor 120 and speaks through the speaker S to prompt the person HB to guide to the next measuring position (step S42).

For example, if a predetermined time (e.g., 15 sec) has elapsed from an end of the speaking at step S42 without detecting the action of the person HB guiding by the hand, the robot R determines that the guiding by its hand has finished (Yes at step S43) and ends the process of creating the comprehensive radio environment map.

In that determination, for example, the voice recognition section 122 of the voice processor 120 may convert voice instruction from the person HB such as "End the creation of the comprehensive radio environment map" into a text and the main controller 139 may analyze the instruction content to determine whether the guiding by its hand has finished.

In contrast, if detecting the person HB resuming the guiding by its hand at step S43, the robot R determines that the guiding by its hand has not finished (No at step S43), and the process returns to step S37, where the robot R moves to the next measuring position while checking whether walking has stopped.

Thereafter, steps S37-S43 are repeated to continue creating the comprehensive radio environment map until it is determined that the guiding by its hand has finished at step S43.

As described above, the robot R moves in the movement area with being guided by the person HB and measures radio environment data on the movement path. Hence, the person HB can save the labor of inputting measuring positions, e.g., through the terminal 7 to instruct the robot R. Moreover, because the radio environment state between the robot R and the radio base unit 1 is directly measured through the use of the radio communication unit 160 mounted in the robot R, an accurate comprehensive radio environment map can be created.

In the present embodiment, the robot R detects the direction and speed of the person HB moving based on the output of the six-axis force sensor 62R(L) provided in the arm R3 when the person HB is leading the robot by the hand. However, the robot R may pick up an image of the person HB with the cameras C and detect the direction and speed of the person HB moving by the stereo processing section 111a and the moving object extracting section 111b. Or, another unit such as a human sensitive sensor constituted by an infrared sensor may be used to detect the movement of the person.

<Creation of Comprehensive Radio Environment Map While Moving Alone>

Figure 15A:
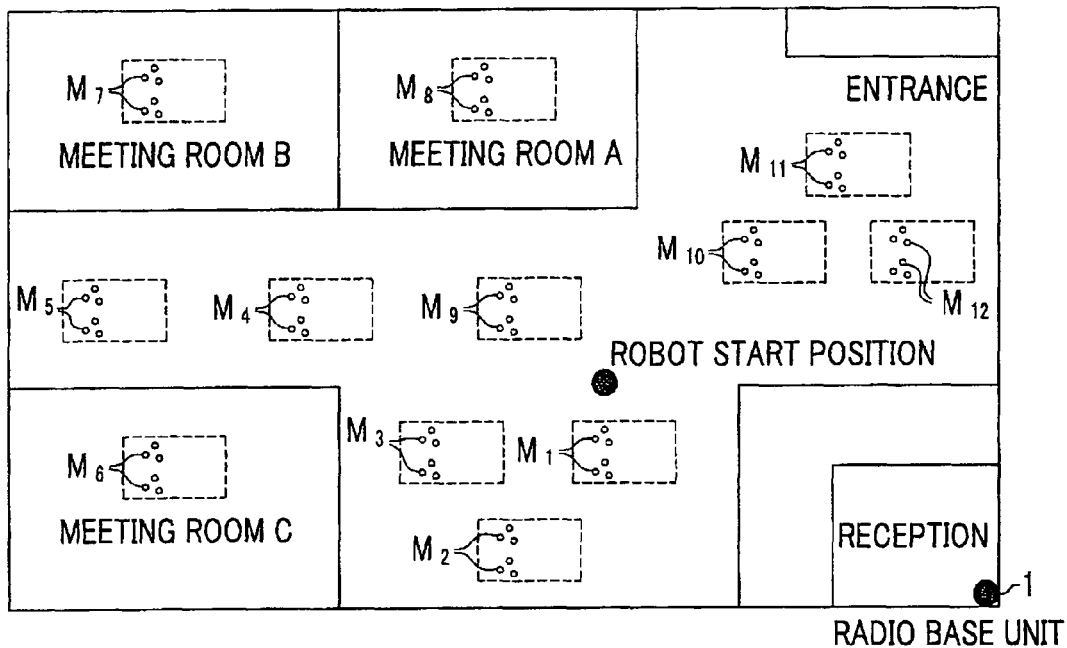
Figure 15B:
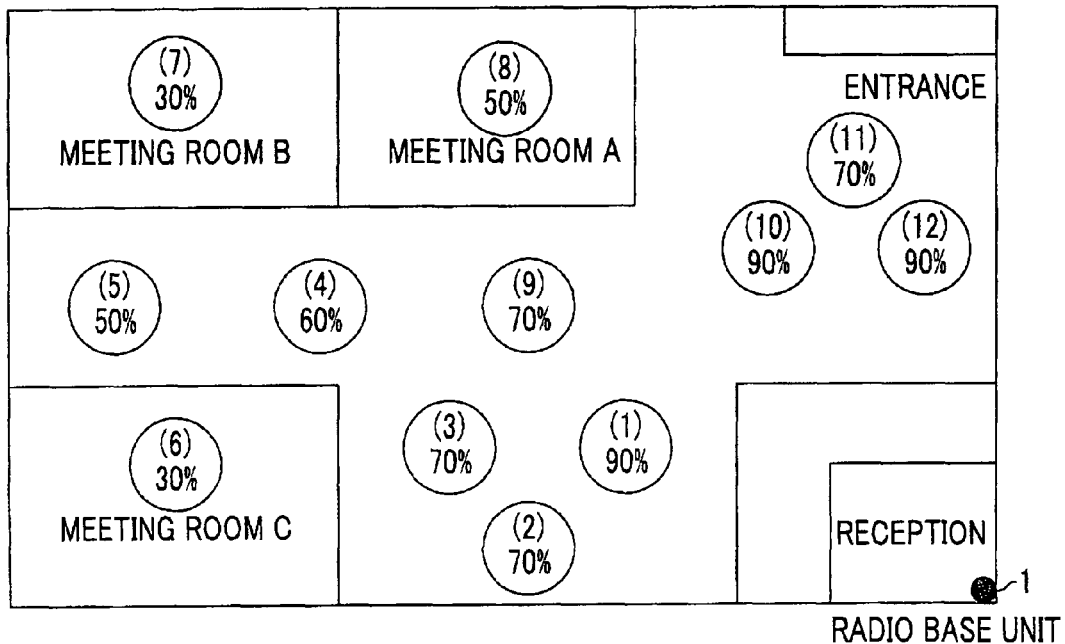
Figure 16:
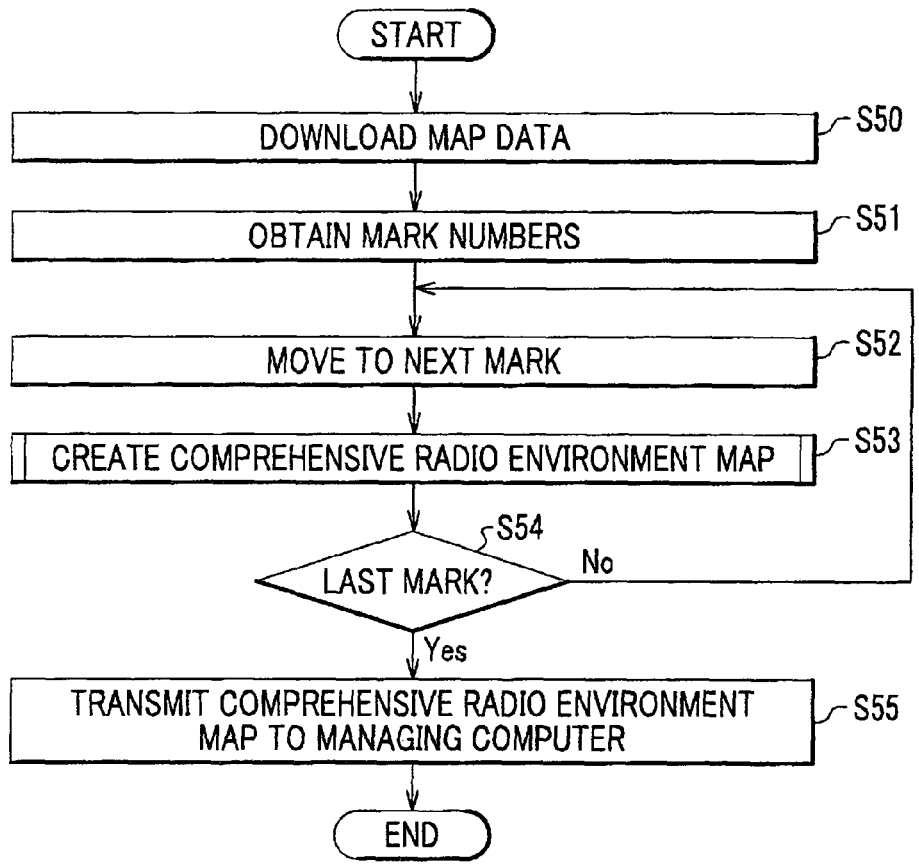
FIG. 16 is a flowchart showing the process of creating a comprehensive radio environment map by measuring radio environment data at the mark positions specified.
Figure 17:
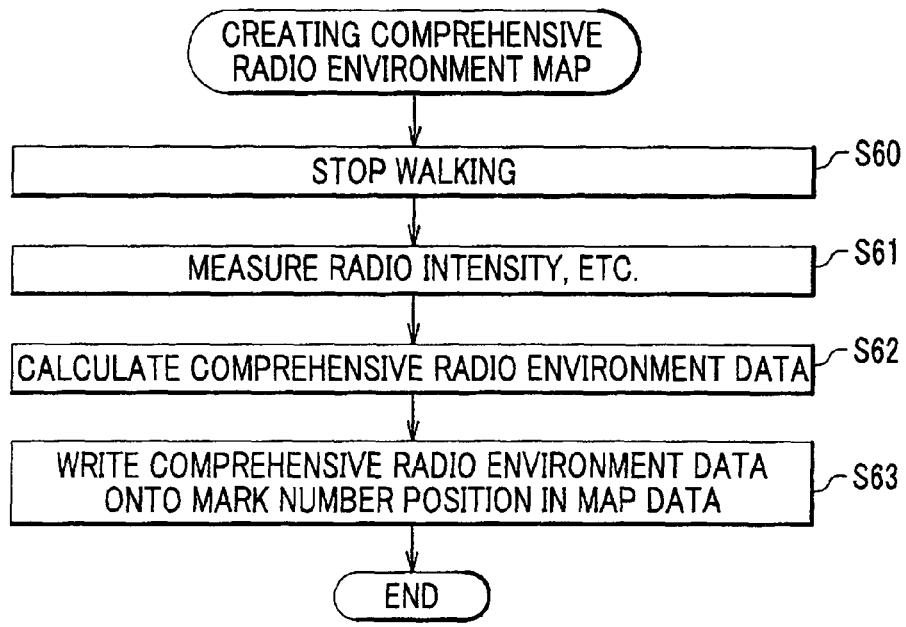
FIG. 17 is a flowchart showing the details of the step of FIG. 16 where a comprehensive radio environment map is created.

Next, with reference to FIGS. 15A-17 (and FIG. 5 as needed), the method of creating a comprehensive radio environment map by the robot R moving alone when measuring positions to measure radio environment data are specified beforehand simply will be described. FIGS. 15A and 15B illustrate the way to specify measuring positions for the robot R to move alone in a movement area to measure radio environment data at, and FIG. 15A shows positions where marks are provided, and FIG. 15B shows an example of the comprehensive radio environment map created based on radio environment data measured at the mark provided positions. FIG. 16 is a flowchart showing the flow of the process of the robot creating a comprehensive radio environment map by measuring radio environment data at the mark positions specified, and FIG. 17 is a flowchart showing the details of the step of FIG. 16 where a comprehensive radio environment map is created.

As shown in FIG. 15A, marks M ($M_1$-$M_{12}$) are provided at a plurality of places in a movement area for the robot R. Meanwhile, map data (a floor map) stored in the storage 5 (see FIG. 5) includes mark provided area data associated with the numbers (numbers 1-12 in FIG. 15) of the marks M.

An operator who is going to have the robot R create a comprehensive radio environment map, accesses the managing computer 3 through, e.g., the terminal 7 (see FIG. 5) and specifies the numbers of marks M as measuring positions, thereby instructing the robot R the measuring positions.

When receiving an execution command signal to create a comprehensive radio environment map from the managing computer 3 via the radio base unit 1, the robot R requests the managing computer 3 for map data of the movement area via the radio base unit 1 and downloads the map data stored in the storage 5 into the storage 190 of the robot R (step S50). If the map data of the movement area is already stored in the storage 190, the download of the map data can be omitted.

Next, the robot R obtains the measuring positions and the mark numbers (a mark number series) indicating the order in which to measure from the managing computer 3 (step S51).

When obtaining the mark numbers, the robot R moves from its current position (robot start position) to the mark M specified as the first one (e.g., $M_1$) (step S52).

Having moved to the mark M, the robot R measures radio environment data by the radio environment detecting section 163, calculates comprehensive radio environment data by the comprehensive radio environment data calculating section 141, and writes the calculated comprehensive radio environment data in association with the position of the corresponding mark number into the map data stored in the storage 190, thereby creating a comprehensive radio environment map (step S53).

The robot R confirms whether the mark M specified as a measuring position at step S53 has the last number, and if so (Yes at step S54), the process proceeds to step S55.

On the other hand, if not the last number (No at step S54), the process returns to step S52, where the robot R moves to the position of the next mark M in order (e.g., M2). Then, at the next mark position, the robot R measures radio environment data, calculates comprehensive radio environment data, and writes the calculated comprehensive radio environment data in association with the position of the mark number into the map data stored in the storage 190, thereby creating the comprehensive radio environment map (step S53).

Then, steps S52-S54 are repeatedly executed until the comprehensive radio environment map is completed to include data for the position of the mark having the last number.

After the creation for the position of the mark having the last number is finished (Yes at step S54), the comprehensive radio environment map having written therein the comprehensive radio environment data in association with the mark positions of the map data is created and stored in the storage 190 as shown in FIG. 15B. Then, the robot R transmits the created comprehensive radio environment map to the managing computer 3 by the radio communication unit 160 (step S55), and the process is ended.

The managing computer 3 stores the comprehensive radio environment map received into the storage 5.

Next, with reference to FIG. 17 (and FIG. 5 as needed), step S53 of FIG. 16 of creating a comprehensive radio environment map will be described.

Having moved to the position of the specified mark M (step S52 of FIG. 16), the robot R stops moving (walking) (step S60).

Next, while remaining at the mark position, the robot R measures radio environment data including radio intensity (step S61). Each section of the radio environment detecting section 163 measures radio environment data a plurality of times and outputs the measured data to the main controller 139 like in step S38 of the flowchart of FIG. 14.

The main controller 139 calculates by the comprehensive radio environment data calculating section 141 the average of each type of radio environment data measured a plurality of times by the radio environment detecting section 163 and calculates comprehensive radio environment data based on the averages of the radio environment data (step S62).

The main controller 139 writes the calculated comprehensive radio environment data in association with the position of the mark number into the map data stored in the storage 190 (step S63), and the process is ended.

In this way, comprehensive radio environment data for a specified mark position can be written into (added to) the map data.

Figure 18A:
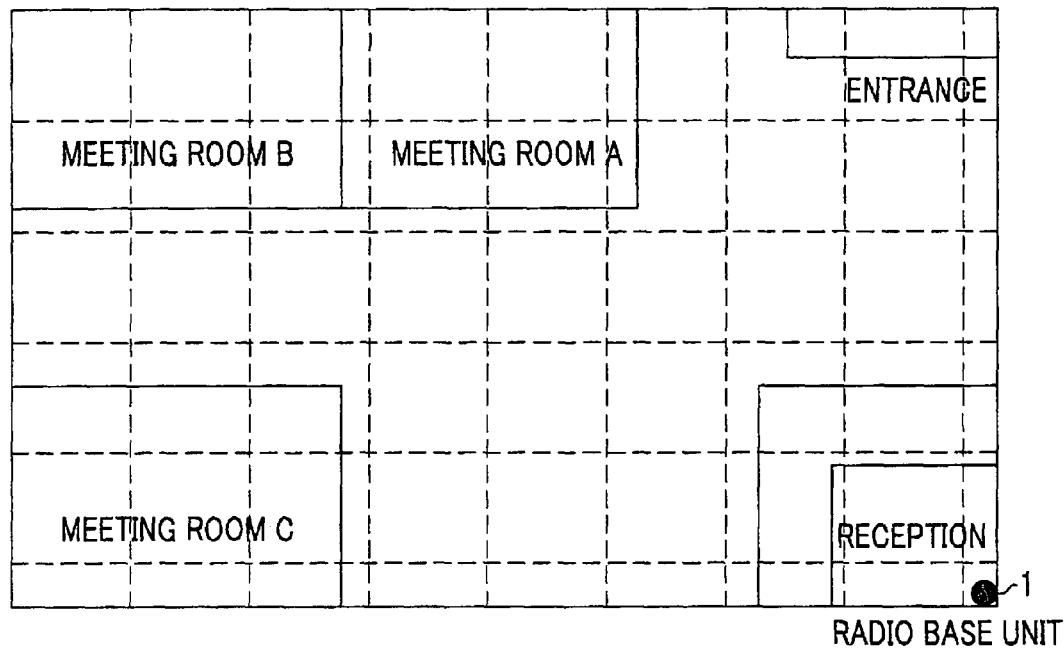
Figure 18B:
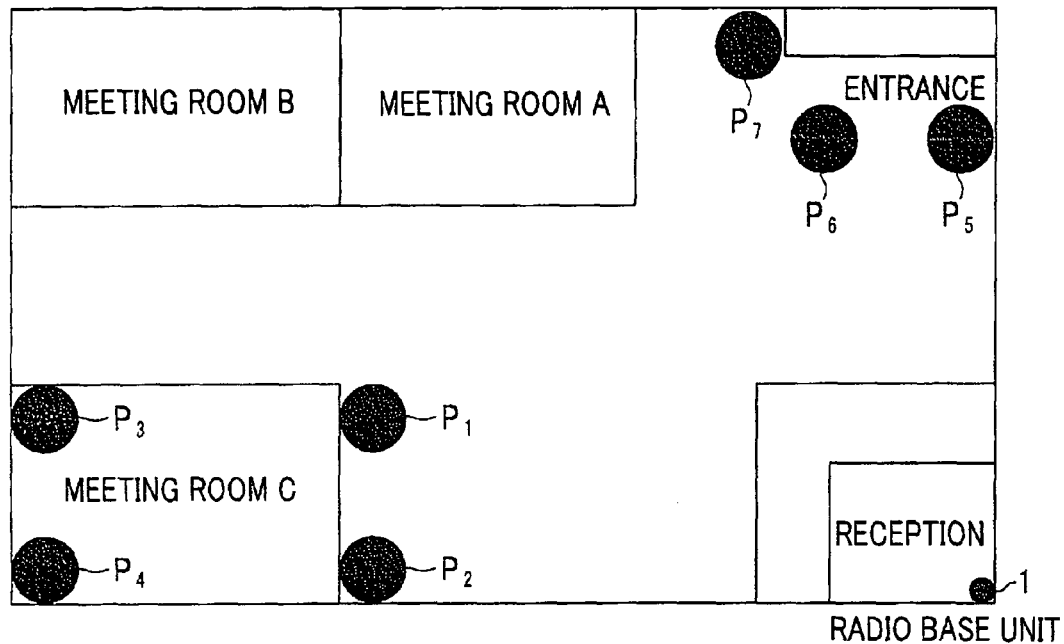

Next, with reference to FIGS. 18A and 18B, another method of specifying the positions to measure radio environment data to the robot will be described. FIGS. 18A and 18B illustrates the way to specify the positions to measure radio environment data, and FIG. 18A shows an example where they are specified with the use of a grid, and FIG. 18B shows an example where individual measuring points are specified additionally.

In the example of FIG. 18A, as represented by broken lines in the Figure, a grid is set on map data (a floor map) and grid points of the grid can be specified as measuring points. In the setting of the grid, for example, with the top left corner of the map of FIG. 18A being the origin, vertical and lateral grid intervals are set. If measuring points are specified with the use of a grid in this way, the robot calculates the positions of the grid points from the vertical and lateral grid intervals, sequentially moves to the calculated positions of the grid points to measure radio environment data, and calculates comprehensive radio environment data based on the measured radio environment data. Then, by writing the calculated comprehensive radio environment data in association with the positions of the grid points measured into the map data stored in the storage 190, a comprehensive radio environment map can be created.

By using the grid in this way, measuring positions can be specified conveniently and evenly in a movement area.

If the grid is set finely, too many measuring positions may exist. On the other hand, if the grid is set coarsely, measuring positions may not be enough in number.

Accordingly, the grid is set to have appropriate intervals so as not to be too fine, and referring to the layout on the map, positions at which to be likely to be affected by radio wave obstructions or the like are specified additionally, individually as measuring points. By this means, with less of the entry work that an operator specifies measuring positions, important measuring positions can be specified in detail and flexibly.

FIG. 18B shows a way that measuring positions have been specified additionally, individually. In this example, seven measuring positions P1-P7 are added.

The robot R obtains positions corresponding to the grid points shown in FIG. 18A and the individually added positions shown in FIG. 18B as measuring positions, sequentially moves to the measuring positions to measure radio environment data, calculates comprehensive radio environment data from the measured radio environment data, and writes it into the map data stored. Thereby a comprehensive radio environment map can be created.

Figure 19A:
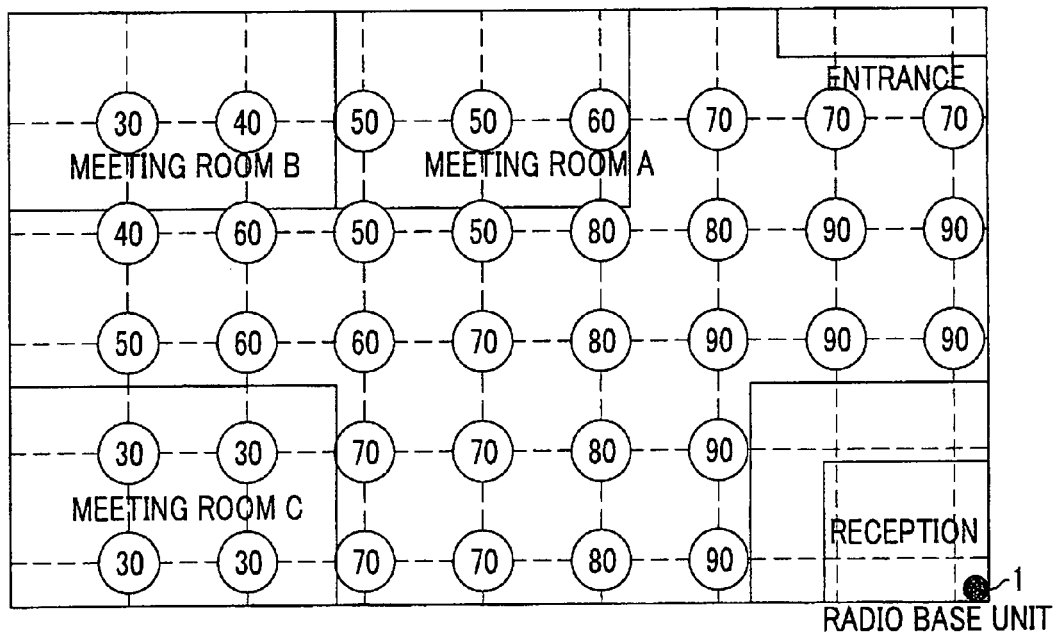
Figure 19B:
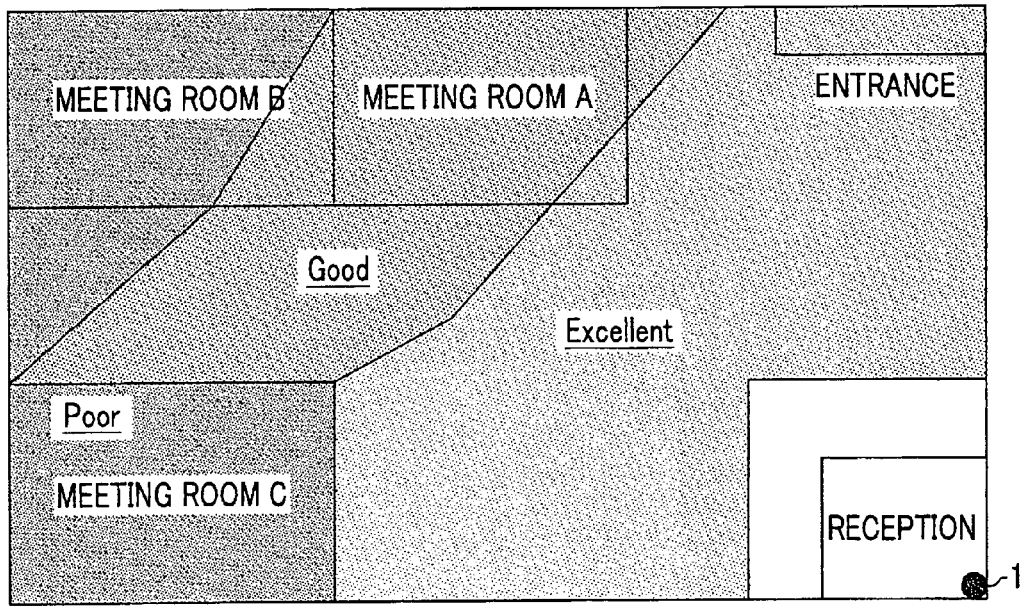

FIGS. 19A and 19B show an example of the comprehensive radio environment map, and FIG. 19A is a comprehensive radio environment map created with measuring positions in grid specified, and FIG. 19B is a comprehensive radio environment map in a format for display to users.

The comprehensive radio environment map shown in FIG. 19A is one into which comprehensive radio environment data measured at measuring positions specified in grid as shown in FIG. 18A has been written. FIG. 19B is an example where based on the comprehensive radio environment map of FIG. 19A, the comprehensive radio environments are classified into three levels of goodness (Excellent, Good, and Poor) to be colored and displayed in GUI (Graphical User Interface) environment so as to make the radio environment easy for an operator (user) to understand. This map in a format for display to users can be displayed on the screen of the terminal 7, for example, by reading the comprehensive radio environment map from the storage 5 and then performing appropriate image processing thereon.

The display format is not limited to coloring separately, but, for example, points whose comprehensive radio environments are of the same level may be joined by lines to form a contour.

As such, the comprehensive radio environment map is converted to a format easy for users to understand and displayed. By this means, for example, when the place to install a radio base unit 1 is decided on, merits and demerits can be easily determined by creating and comparing comprehensive radio environment maps for when a radio base unit is provided at a plurality of candidate places. Further, because areas whose level of the comprehensive radio environment is low can be easily detected, for example, an appropriate additional place at which a radio base unit 1 is to be provided as a measure can be easily determined.

<Creation of Optimum Radio Base Unit Map>

Next, with reference to FIGS. 20A and 20B (and FIG. 5 as needed), the method of selecting a radio base unit 1 to be connected to the robot R where a plurality of radio base units 1 are provided will be described. FIG. 20 illustrates the way in which the robot R selects a radio base unit to link to, and FIG. 20A illustrates the way in which an optimum radio base unit map is created from the comprehensive radio environment maps for a plurality of radio base units, and FIG. 20B illustrates the way in which the robot R selects a radio base unit to link to from a plurality of optimum radio base units.

As shown in FIG. 20A, two radio base units 1A, 1B are provided at the bottom right and left corners respectively. The upper left and right figures of FIG. 20A are the comprehensive radio environment maps for the radio base units 1A, 1B respectively, and comprehensive radio environment data measured at measuring positions specified in grid are stored therein.

As such, in the present embodiment, where a plurality of radio base units 1 are provided in a movement area for the robot R, radio environment data is measured for each radio base unit 1, and the comprehensive radio environment map creating section 142 creates and stores a comprehensive radio environment map into the storage 190.

Next, the optimum radio base unit map creating section 143 creates an optimum radio base unit map (optimum radio base station map) indicating an optimum radio base unit based on the comprehensive radio environment maps for the plurality of radio base units stored in the storage 190.

In this embodiment, an example where the two radio base units 1A, 1B are provided will be described, but three or more radio base units may be provided.

An optimum radio base unit refers to the radio base unit, the numeric value of whose comprehensive radio environment data is greatest. As shown in the lower of FIG. 20A, an optimum radio base unit map with an optimum radio base unit selected can be created from two radio base units 1A, 1B. In the optimum radio base unit map, "A" and "B" show respectively the optimum radio base unit being radio base unit 1A and radio base unit 1B, and "AB" shows both being optimum radio base units because the two radio base units have the same value in radio environment data.

In the optimum radio base unit map of FIG. 20A, where there are a plurality of radio base units of the same comprehensive radio environment level as indicated by "AB", the robot R needs to select one of the radio base units to link to. With reference to FIG. 20B, the method of selecting a radio base unit for the robot R to link to where there are a plurality of optimum radio base units will be described.

The robot R switches its link between radio base units 1 having an optimum comprehensive radio environment as needed while moving. In the switching of its link between radio base units 1, that is, handovers, the link between the robot R and the radio base units 1 is temporarily cut off, so that the robot R is in a state where communication with the managing computer 3 is infeasible.

In the present embodiment, in order to avoid the state where communication with the managing computer 3 is infeasible as long as possible, the robot R selects a radio base unit 1 such that handover is unnecessary.

FIG. 20B show the region enclosed by a thick line in the middle of the optimum radio base unit map shown in the lower of FIG. 20A. FIG. 20B, where the region is divided into three rows by three columns, shows which radio base unit is selected at the center when advancing from the periphery to the center where the optimum radio base units are radio base units 1A and 1B ("AB") in the optimum radio base unit map.

In the case of the left example of FIG. 20B, the robot R advances along the middle row of the three by three region from left to right. Because on the left side of the middle row the robot R is linked to radio base unit 1B, when the robot R moves to right, the radio base unit 1B is selected at the center so as to maintain the link with radio base unit 1B without handover.

In the case of the center example of FIG. 20B, the robot R advances from above left (the left side of the top row) obliquely down to the center. Because on the left side of the top row the robot R is linked to radio base unit 1A, radio base unit 1A is selected at the center so as to maintain the link with radio base unit 1A without handover.

In the case of the right example of FIG. 20B, the robot R advances from below right (the right side of the bottom row) to the left, then up to the center. Because on the right side of the bottom row the robot R is linked to radio base unit 1A, when moving to the left, the robot R maintains the link with radio base unit 1A without handover. Then, after moving up, radio base unit 1A is selected at the center so as to maintain the link with radio base unit 1A again without handover.

As such, where a plurality of radio base units are selectable, the robot R of the present embodiment selects a radio base unit so as to avoid handover.

Also where there are three or more radio base units and radio base units of the same comprehensive radio environment level are selectable, the robot R may select a radio base unit so as to avoid handover as long as possible.

<Use of Comprehensive Radio Environment Map>

Figure 21:
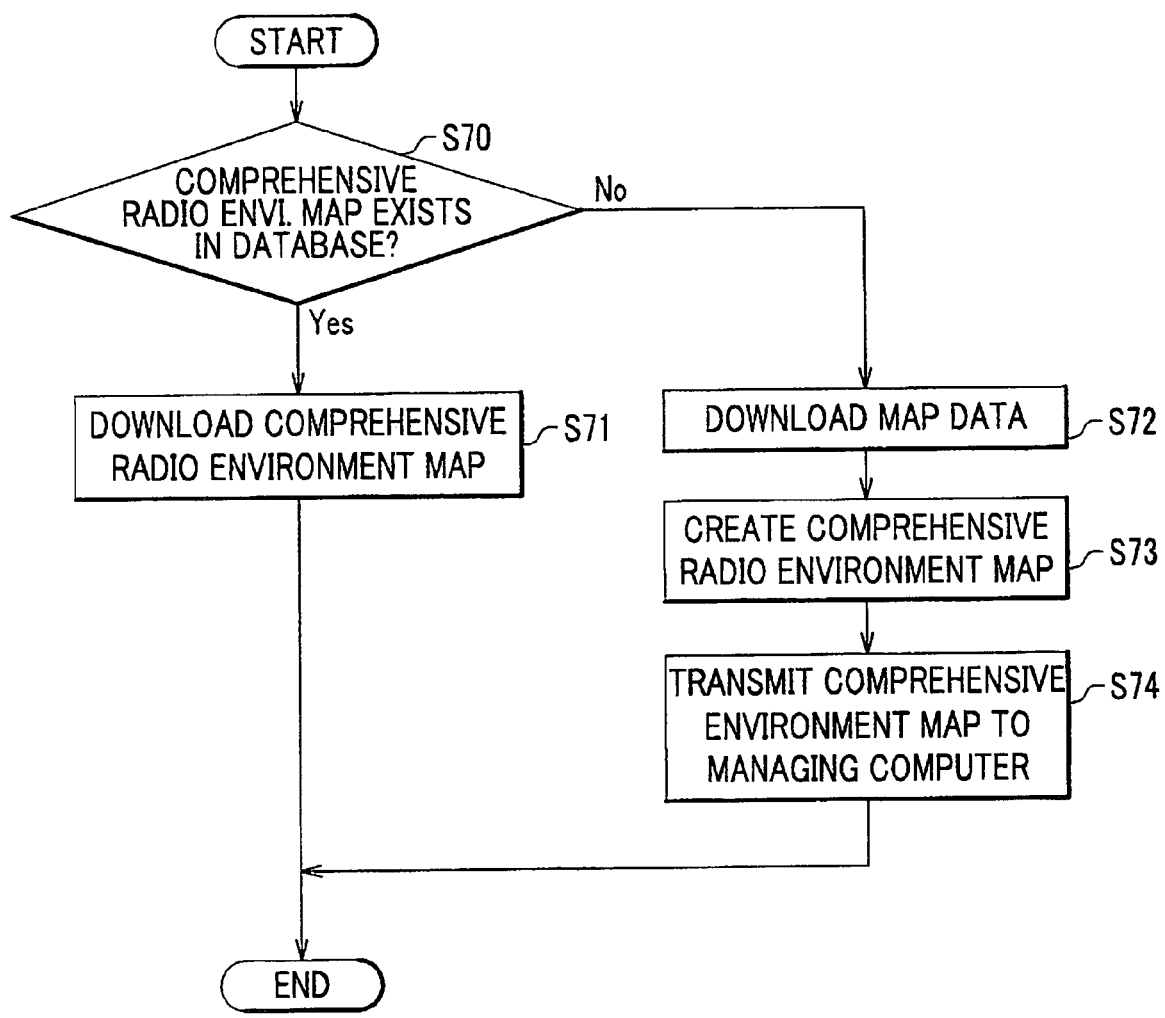
FIG. 21 is a flowchart showing the process of using the comprehensive radio environment map.

Next, with reference to FIG. 21 (and FIG. 5 as needed), the operation of the robot R in using the comprehensive radio environment map will be described. FIG. 21 is a flowchart showing the process when the robot R uses the comprehensive radio environment map.

The robot R uses the comprehensive radio environment map created beforehand and stored in the storage 190 when executing a task. The comprehensive radio environment map created by the robot R is uploaded to the managing computer 3 and stored into the storage 5. If the comprehensive radio environment map stored in the storage 190 is erased by restart, or a comprehensive radio environment map created by another robot is stored in the storage 5, the robot R can download and use a necessary comprehensive radio environment map from the managing computer 3.

Therefore, the labor of the robot R newly creating a comprehensive radio environment map each time a task is executed can be omitted.

As shown in FIG. 21, the robot R accesses the managing computer 3 via the radio base unit 1 by the radio communication unit 160 to confirm whether a comprehensive radio environment map concerning the movement area where the robot R is about to execute task is stored in a data base of map data stored in the storage 5 that is managed by the managing computer 3 (step S70).

If a desired comprehensive radio environment map is stored in the storage 5 (Yes at step S70), the robot R downloads the comprehensive radio environment map from the managing computer 3 (step S71). To be specific, the managing computer 3 reads the comprehensive radio environment map from the storage 5 and transmits the read comprehensive radio environment map to the robot R. The robot R receives the comprehensive radio environment map by the radio communication unit 160 and stores into the storage 190. This completes the download of the comprehensive radio environment map.

The comprehensive radio environment map that the robot R downloads from the managing computer 3 may be the comprehensive radio environment map created by the robot R, or the comprehensive radio environment map created by another robot. If the comprehensive radio environment maps created by a plurality of robots are stored, for example, the latest comprehensive radio environment map may be downloaded, or a comprehensive radio environment map comprising the averages of comprehensive radio environment data of these maps may be used. If the movement area has a plurality of radio base units provided, instead of, or in addition to, the comprehensive radio environment map, the optimum radio base unit map may be downloaded. The robot R may be configured to select a map to be downloaded as needed or download plural types of maps.

The managing computer 3 may select the types of maps to be downloaded that are most suitable for the content of the task that the managing computer 3 has instructed the robot R to execute and transmit the maps.

In contrast, if a desired comprehensive radio environment map is not stored in the storage 5 (No at step S70), the robot R downloads map data concerning the movement area of interest stored in the storage 5 via the managing computer 3 (step S72). Then, the comprehensive radio environment map for the movement area is created (step S73). In the creation of the comprehensive radio environment map, as described above, the robot R moves in a circle of mark-M provided places as shown in FIG. 15 while measuring radio environment data, and calculates comprehensive radio environment data, and writes the calculated data in association with measuring positions into map data stored in the storage 190, thereby creating a comprehensive radio environment map, which is stored into the storage 190.

The robot R reads the comprehensive radio environment map created at step S73 from the storage 190 and transmits the created map to the managing computer 3 via a radio base unit 1 by the radio communication unit 160 (step S74). The managing computer 3 stores the received comprehensive radio environment map into the storage 5, which completes the upload of the comprehensive radio environment map.

<Update of Comprehensive Radio Environment Map>

Figure 22:
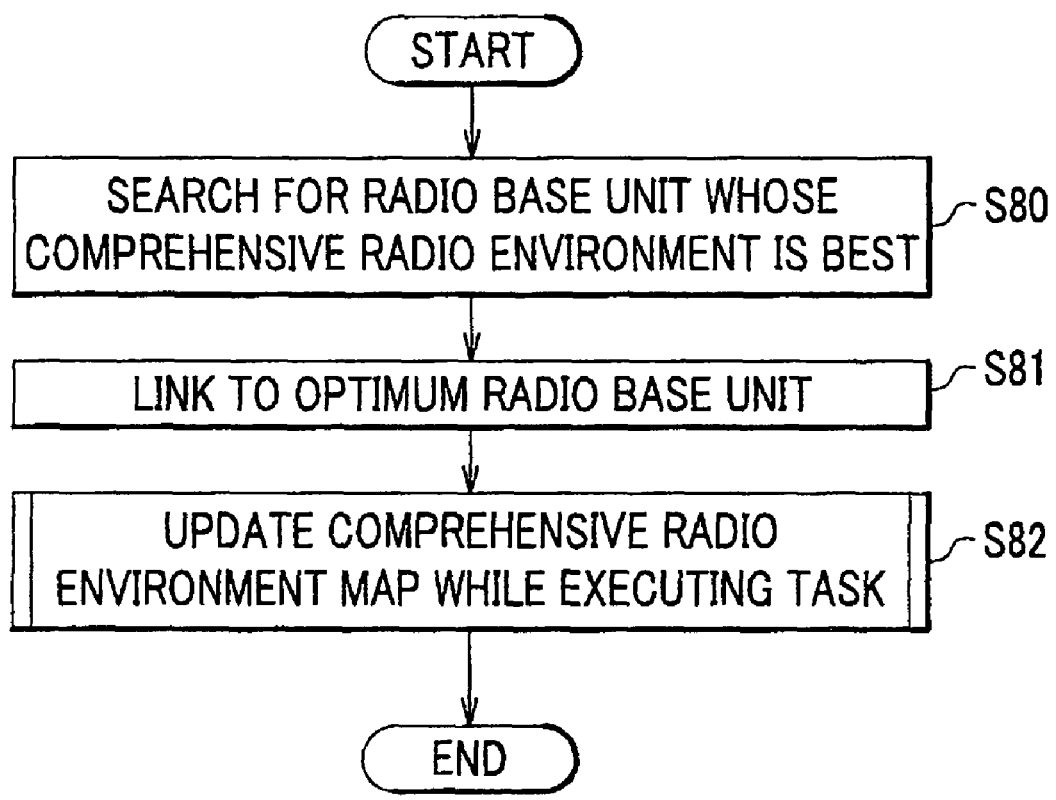
FIG. 22 is a flowchart showing the process of updating the comprehensive radio environment map during the execution of a task.

Next, with reference to FIG. 22 (and FIG. 5 as needed), the operation of the robot R measuring radio environment data during the execution of a task and updating (performing maintenance on) the comprehensive radio environment map will be described. FIG. 22 is a flowchart showing the process of updating the comprehensive radio environment map during the execution of a task.

The robot R of the present embodiment always measures radio environment data even during the execution of a task other than the task of creating a comprehensive radio environment map and compares comprehensive radio environment data calculated based on the radio environment data and comprehensive radio environment data as part of a comprehensive radio environment map stored in map data, and replaces the radio environment data as needed to update the comprehensive radio environment map.

Radio environment data is measured repeatedly at predetermined timings. For example, measurements may be performed one after another consecutively, or regularly such as at 10 second intervals.

As shown in FIG. 22, when the robot R moves in a movement area to execute a task such as carrying an article, the robot R downloads a comprehensive radio environment map and an optimum radio base unit map as shown in, e.g., FIG. 20A from the managing computer 3 and stores them into the storage 190, and searches the downloaded optimum radio base unit map for the radio base unit 1 (1A or 1B) whose comprehensive radio environment is best at the current position of the robot R, that is, a task start position (step S80).

Next, the robot R links to the optimum radio base unit 1 (hereinafter radio base unit 1A for the sake of description) found at step S80 by the radio communication unit 160 (step S81) and starts executing the task while performing the updating of the comprehensive radio environment map (step S82).

During the execution of the task, the robot R moves while always finding out its own position through the use of the gyro sensor SR1, the GPS receiver SR2, and the surroundings-state detector 170 and referring to the optimum radio base unit map, performs handover to link to an optimum radio base unit 1 (1A or 1B) as needed.

Figure 23:
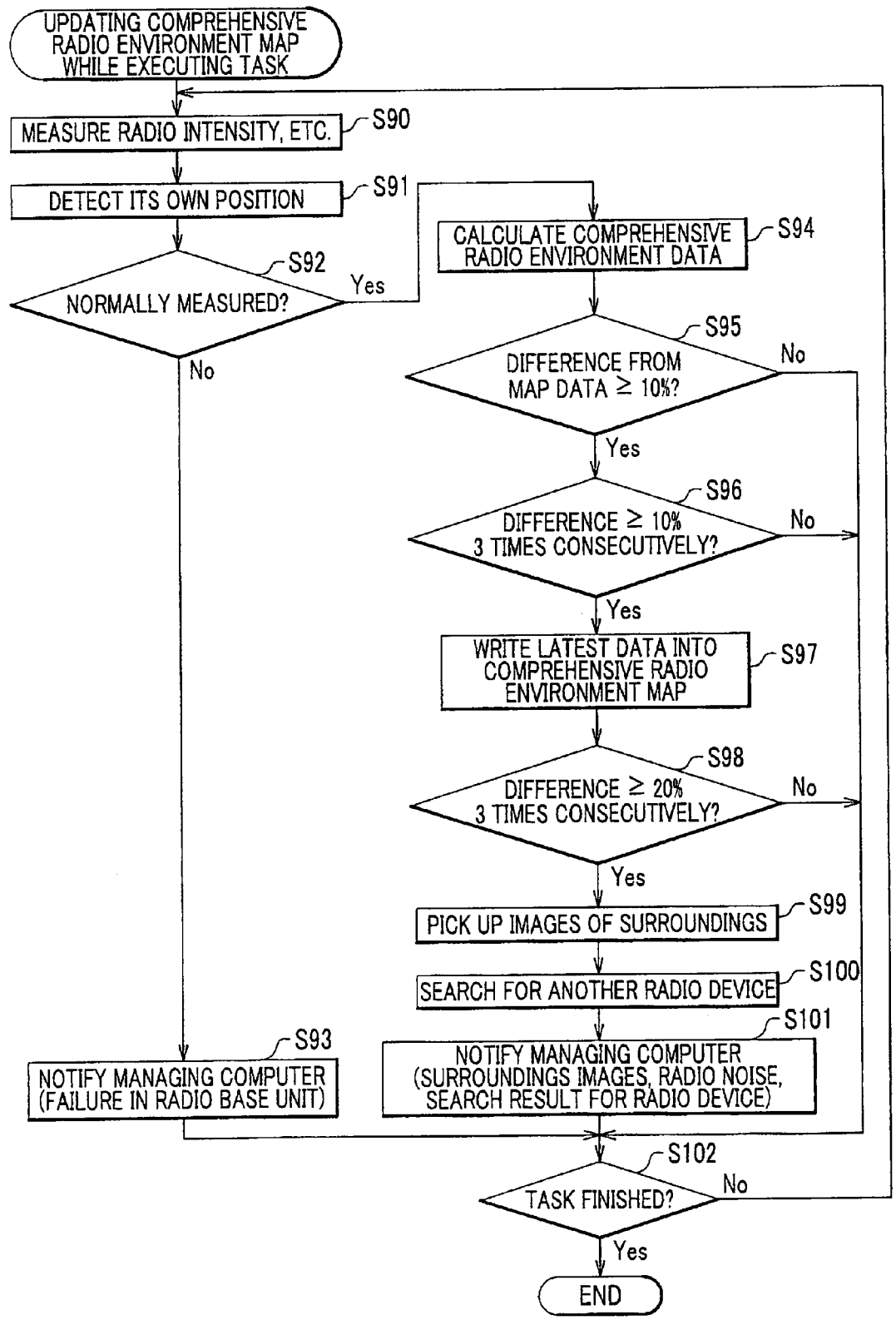
FIG. 23 is a flowchart showing the process of updating the comprehensive radio environment map during the execution of a task.

Next, with reference to FIG. 23 (and FIG. 5 as needed), the operation of the robot R updating the comprehensive radio environment map during the execution of a task will be described. FIG. 23 is a flowchart showing the process of updating the comprehensive radio environment map during the execution of a task and corresponds to step S82 of the flowchart of FIG. 22.

The robot R of the present embodiment, while executing a task, measures radio environment data such as radio intensity repeatedly at predetermined timings by the radio environment detecting section 163 of the radio communication unit 160 and outputs the measured radio environment data to the main controller 139 (step S90).

After the measurement of radio environment data, the robot R finds out its own position with the use of the gyro sensor SR1, the GPS receiver SR2, and the surroundings-state detector 170 (step S91). The measurement of radio environment data and finding out its own position may be performed in parallel.

The radio base unit failure notifying section 145 of the main controller 139 determines whether the radio environment detecting section 163 has normally measured radio environment data (step S92) by confirming, for example, whether radio environment data has been inputted to the main controller 139 in a predetermined time period, or whether radio environment data has an abnormal value. If radio environment data has not been measured (No at step S92), the radio base unit failure notifying section 145 notifies the occurrence of a failure in the radio base unit 1A to the managing computer 3 via the radio communication unit 160 (step S93). Here, because the radio base unit 1A has failed, it is expected that the link to the unit is cut off. Accordingly, the radio base unit failure notifying section 145 switches the communication partner of the radio communication unit 160 from the radio base unit 1A to the radio base unit 1B and notifies the occurrence of a failure in the radio base unit 1A to the managing computer 3 via the radio base unit 1B. If another communication-feasible radio base unit 1 cannot be found in the movement area, the robot R may record the failure state of the radio base unit 1A in the storage 190, for example, and notify it when communication with the managing computer 3 via any radio base unit 1 becomes feasible again.

After the robot R notifies the occurrence of a failure in the radio base unit 1A to the managing computer 3, the process proceeds to step S102 and confirms whether the task has finished.

On the other hand, if the radio base unit failure notifying section 145 determined that the radio environment detecting section 163 has normally measured radio environment data (Yes at step S92), the comprehensive radio environment data calculating section 141 calculates comprehensive radio environment data based on the radio environment data measured by the radio environment detecting section 163 (step S94), and the comprehensive radio environment map updating section 144 reads comprehensive radio environment data for the radio base unit 1A that was being linked for the position detected at step S92 from the storage 190, compares the comprehensive radio environment data stored in the comprehensive radio environment map and the comprehensive radio environment data calculated at step S94, and confirms whether the difference is at or above 10% (step S95). If the difference is below 10% (No at step S95), the process proceeds to step S102.

If the difference is at or above 10% (Yes at step S95), referring to the confirmation history for comprehensive radio environment data for the radio base unit 1A, it is confirmed whether the difference from corresponding data stored in the comprehensive radio environment map being at or above 10% has happened three times (i.e., the two previous confirmations telling being at or above 10%) (step S96). If less than three times (No at step S96), the process proceeds to step S102.

The confirmation history may be stored in the comprehensive radio environment map stored in the storage 190 such that the confirmation result is associated with a corresponding position and radio base unit and be read out for reference as needed.

If the difference being at or above 10% has happened three or more consecutive times (Yes at step S96), the comprehensive radio environment map updating section 144 writes the latest comprehensive radio environment data (i.e., the one calculated based on the latest measured data) over the corresponding part of the map data, thereby updating the comprehensive radio environment map (step S97).

Where a plurality of radio base units 1 are provided in a movement area, subsequently the comprehensive radio environment map updating section 144 reads the updated comprehensive radio environment map and the comprehensive radio environment maps for the other radio base units from the storage 190 and updates the optimum radio base unit map.

Then, it is confirmed whether the difference is at or above 20% and the difference being at or above 20% has happened three consecutive times referring to the confirmation history (step S98). If less than 20% or less than three consecutive times (No at step S98), the process proceeds to step S102.

If the difference being at or above 20% has happened three consecutive times (Yes at step S98), the surroundings image acquiring section 146 picks up images of the surroundings using the cameras C while driving the legs R1 via the leg control section 148a to change the orientation of the robot R at the current position. The data of the images picked up is stored in association with the picking-up position into the storage 190 (step S99).

In the present embodiment, if at, e.g., steps S96 and S98 the difference being at a predetermined value or greater has occurred a predetermined number of, or more, measurement times consecutively, that is, has continued for a predetermined time or longer, data of the comprehensive radio environment map is updated. Hence, the influence of instantaneous noise is negligible, and with frequent data update being avoided, the workloads of the robot R and the managing computer 3 and the increase in communication amount between the robot R and radio base units 1 can be suppressed.

With reference to FIGS. 24A and 24B (and FIG. 5 as needed), the way to pick up images of the surroundings will be described. FIG. 24A shows the way that the robot R picks up images of the surroundings while changing its orientation, and FIG. 24B shows (in the upper) a picking-up position in a floor map and (in the lower) images of the surroundings picked up at the picking-up position.

If the difference of the comprehensive radio environment data from corresponding data stored in the comprehensive radio environment map being at or above 20% has happened three consecutive times (Yes at step S98 of FIG. 23A), a situation is inferred to have occurred which constantly greatly affects the radio environment such as a partition being provided or an obstruction being placed in the movement area for the robot R. Accordingly, in the present embodiment, if determining that the difference of the comprehensive radio environment data from corresponding data stored in the comprehensive radio environment map is large, that is, detecting a large change in the radio environment, the robot R picks up images of the surroundings at that place and transmits the data of picked-up images to the managing computer 3 to allow an operator to use for the analysis of the situation.

As shown in FIG. 24A, the robot R stops walking and turns 90 degrees by 90 degrees at the current position while picking up images sequentially with the field angle of 90 degrees to obtain an image with the entire field angle of 360 degrees.

To be specific, the robot R controls, by the surroundings image acquiring section 146, each component of the legs R1 via the leg control section 148a of the autonomous movement controller 148 to stop walking (e.g., at position P of the upper of FIG. 24B) and first picks up a front image i using the camera C mounted in the head R4. The picked-up image is stored into the storage 190. Then, the robot R drives and controls the legs R1 via the leg control section 148a by the surroundings image acquiring section 146 to turn to the right, picks up a right image ii using the camera C, and stores the picked-up image data into the storage 190. Likewise, the robot R, while turning clockwise 90 degrees by 90 degrees, picks up a back image iii and a left image iv and stores the picked-up image data into the storage 190. After picking up the left image iv, the robot R turns to the right again to face in the original movement direction and stays.

Image data made up of the four images picked up in this way (see the lower of FIG. 24B) is temporarily stored in the storage 190.

Referring back to FIG. 23, description will continue.

If at step S98 a large change in the radio environment is detected, the robot R, while picking up images of the surroundings to obtain image data (step S99), analyzes radio waves received to detect a radio node of the same standard as the robot R and its traffic, searches for another radio device existing in the movement area, and stores the existence/non-existence of another radio device and the traffic as the search result into the storage 190 (step S100). For example, if the sum of traffics of all radio nodes is greater than the amount of data that the robot R transmits and receives, it may be determined that the radio environment is bad.

After the search for another radio device, the robot R has radio base unit failure notifying section 145 notify the managing computer 3 via the radio base unit 1A by the radio communication unit 160 that the radio environment for the radio base unit 1A has become worse and in addition transmits image data, the search result for another radio device, and the radio environment data measured at step S90 stored in the storage 190 (step S101).

After the notification to the managing computer 3, the process proceeds to step S102.

In the present embodiment, radio environment data including noise floor (radio noise) measured at step S90 is temporarily stored in the storage 190, and is read from the storage 190 at step S101 and transmitted to the managing computer 3. Especially, noise floor as one of the evaluated values for radio noise is useful in determining whether the radio environment is good or bad.

After the updating of the comprehensive radio environment map for each condition, the robot R confirms whether the task is completed (step S102) and if completed (Yes at step S102), the process ends.

If not completed (No at step S102), the process returns to step S90, where the robot continues executing the task while the updating of the comprehensive radio environment map is repeated.

Meanwhile, when receiving from the robot R the notification of a failure in the radio base unit 1 (e.g., 1A) (step S93) or the notification that a large change in the radio environment has been detected (step S101), the managing computer 3 stores the content of the notification as log information into the storage 5 and displays the log information on, for example, the display screen (not shown) of the terminal 7 to notify the content of the notification from the robot R to an operator.

The operator can analyze the problem referring to, for example, image data picked up at the place where a large change in the radio environment happened, radio environment data, and the like with the use of the terminal 7 and examine measures.

As described above, the robot R of the present embodiment always measures radio environment data even during the execution of a task other than the task of creating a comprehensive radio environment map, compares comprehensive radio environment data calculated based on the measured radio environment data and comprehensive radio environment data stored in the comprehensive radio environment map that is downloaded from the managing computer 3 and stored into the storage 190, and updates the comprehensive radio environment map when the difference being at a predetermined value or greater has been detected consecutively for a predetermined time. Hence, the maintenance of the comprehensive radio environment map can be performed by having the robot R execute a normal task.

SECOND EMBODIMENT

Next, a mobile robot of a second embodiment will be described with reference to the drawings. The basic structure of the mobile robot of the second embodiment is the same as that of the mobile robot of the first embodiment, and differences from the latter will be mainly described.

In description, the same elements are indicated by the same reference numerals with duplicate description being omitted.
[Mobile Robot Control System]
First, a mobile robot control system A of the second embodiment will be described.

As shown in FIG. 1, the mobile robot control system A comprises a mobile robot R (hereinafter a "robot" for short) provided in a movement area where to execute a task; a radio base unit (radio base station) 1 (1A, 1B) linked to the robot R by radio communication; a managing computer 3 connected to the radio base unit 1 via a network 4; and a storage 5 and a terminal 7 connected to the managing computer 3 via the network 4. The numbers of mobile robots R and radio base units 1 provided in a movement area where to execute a task are not limited to this embodiment.

The mobile robot R is located in a movement area (movement range) where to execute a task, and autonomously moves in this movement area so as to execute a task such as carrying an article or guiding a visitor according to a task command transmitted by radio via the radio base unit 1 from the managing computer 3. In this movement area, radio base units 1 are provided at such places as to cover the entire movement area.

In executing the task of moving in a movement area, the robot R decides on a pattern of switching its link between radio base units 1, described later, and the maximum movement speed depending on the radio environment state on the movement path and then starts executing the task.

The radio base units (radio base stations) 1 (1A, 1B) are communication units for the managing computer 3 communicating with the robot R, and can be embodied by radio LAN base stations in conformity with, for example, IEEE 802.11b, IEEE 802.11g, or IEEE 802.11a. Or, radio communication devices of other standards such as Bluetooth (registered trademark) can be used.

Where a plurality of radio base units are located in the movement area, the robot R is configured to switch to being linked to a radio base unit 1 whose radio environment is in a good state to communicate with the managing computer 3.

In order to have the robot R execute a task based on task data input from the terminal 7 described later, the managing computer 3 generates a task execution command signal including the content of the task and outputs to the robot R. This task data is data about a task which to have the robot R execute, and includes, for example, information about the requester and the delivery destination of an article to be carried, information about the destination of a visitor to be guided and the visitor, or the like.

Further, the managing computer 3 manages input to and output from the storage 5 and can be embodied by, for example, a general-purpose PC (Personal Computer).

The storage 5 stores a radio environment map including map data of a movement area where the robot R moves (such as a floor map for each floor of a building) and a plurality of radio environment data concerning the radio environment in the movement area. This radio environment map is stored beforehand in the storage 5 and is read and transmitted by the managing computer 3 to the robot R. The radio environment map will be described later.

The storage 5 can be embodied by, for example, a hard disk device, an optical disk device, a semiconductor memory device, or the like.

The terminal 7 is an input device for inputting task data to the managing computer 3, and can be embodied by a laptop computer, a PHS, or the like. Also, the terminal 7 is a display device for converting a radio environment map, described later, received from the robot R to an easy-to-view format to display.

Figure 25:
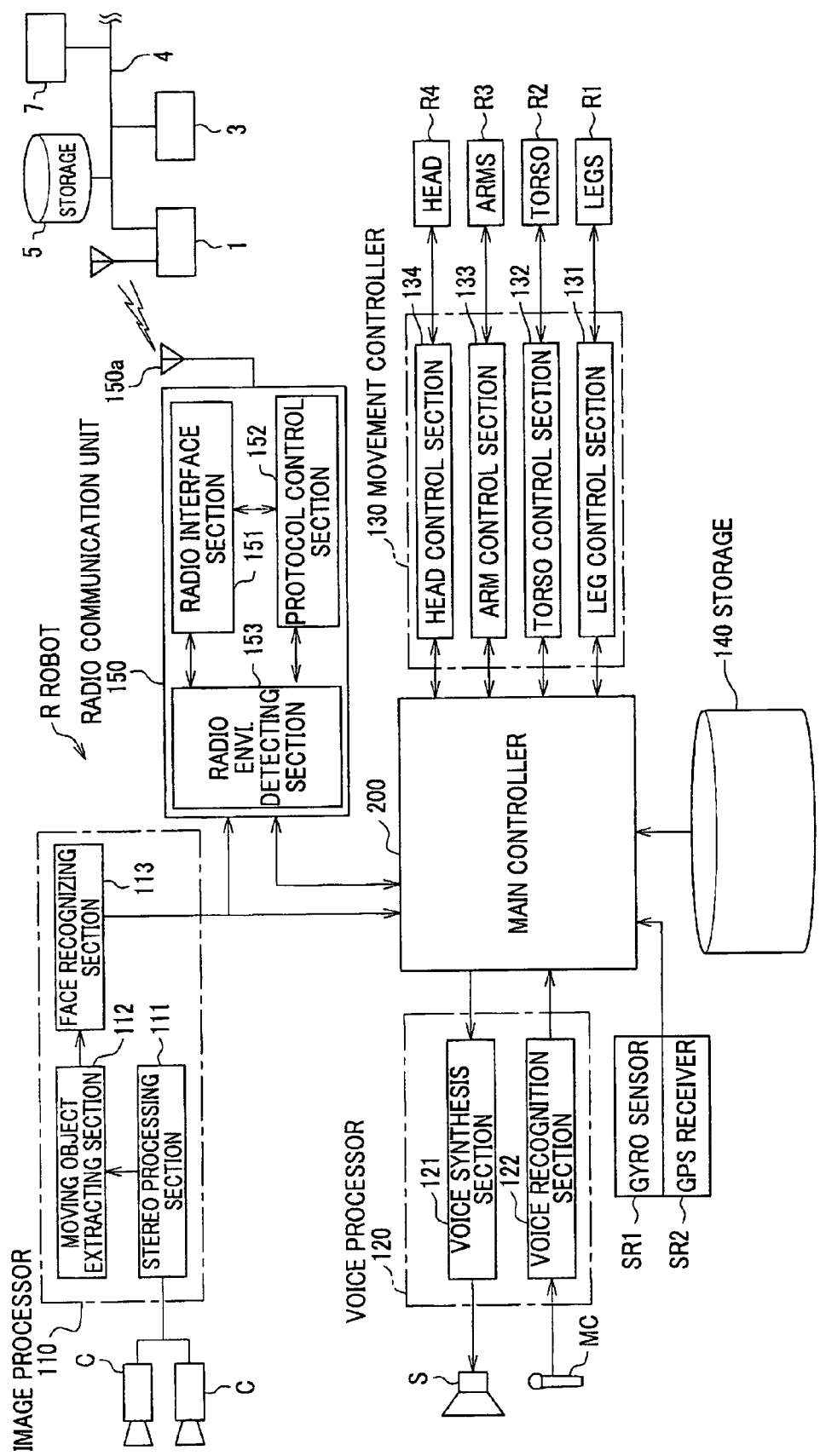
FIG. 25 is a block diagram of a robot according to the second embodiment.

Note that the managing computer 3, the storage 5, the terminal 7, and the radio base units 1 may not be connected via the network 4, but all or parts of them may be integrated.
[Configuration of Robot]
FIG. 25 is a block diagram showing the configuration of a robot according to the present embodiment.

As shown in FIG. 25, the robot R has cameras C, a speaker S, a microphone MC, an image processor 110, a voice processor 120, a movement controller 130, a storage 140, a radio communication unit 150, and a main controller 200 as well as the legs R1, the torso R2, the arms R3, and the head R4 cited in the first embodiment.

The robot R further has a gyro sensor SR1 and a GPS (Global Positioning System) receiver SR2 as a position detecting unit for detecting its own position.
<Camera>
The cameras C are for reading in images in the form of digital data and are embodied by, for example, color CCD (Charge Coupled Device) cameras. The cameras C are arranged laterally in parallel, and the images picked up are output to the image processor 110. The cameras C are provided in the head R4.
<Image Processor>
The image processor 110 processes the images picked up by the cameras C and detects obstacles and persons in the surrounding area to find out the status of the surroundings of the robot R from the images. The image processor 110 comprises a stereo processing section 111, a moving object extracting section 112, and a face recognizing section 113.

The stereo processing section 111 performs pattern matching using one of two images picked up by the left and right cameras C as a reference, calculates a parallax for each pixel between the left and right images to create a parallactic image, and outputs the created parallactic image and the original images to the moving object extracting section 112. The parallaxes indicate the distance from the robot R to the image-picked-up object.

The moving object extracting section 112 extracts a moving object from the picked-up images based on the data output from the stereo processing section 111. This is for detecting the person, assuming that a moving object is a person.

In order to extract the moving object, the moving object extracting section 112 stores several past frames of images, compares the newest frame and the past frames for pattern matching, and calculates the amount of movement for each pixel to create an image of the amounts of movement. If it is found from the parallactic image and the image of the amounts of movement that there is a pixel having the large amount of movement within a predetermined distance from the cameras C, assuming that a person exists there, part of the parallactic image within the predetermined distance is extracted as an image of the moving object, which is output to the face recognizing section 113.

The face recognizing section 113 extracts parts in skin color from the extracted image of the moving object and, from their sizes and shapes, detects the position of the face. From the sizes and shapes of the parts in skin color, likewise, the positions of the hands are detected.

The position of the face recognized is output to the main controller 200 as information for when the robot R moves and for communication with the person and also to the radio communication unit 150 and transmitted to the managing computer 3 via the radio base unit 1.

<Speaker>

The speaker S is for outputting voice created by a voice synthesis section 121 described later. The speaker S is provided in the head R4.

<Microphone>

The microphone MC is for collecting sound from the surroundings of the robot R. The collected sound is output as a voice signal to a voice recognition section 122 described later.

<Voice Processor>

The voice processor 120 has a voice synthesis section 121 and a voice recognition section 122.

The voice synthesis section 121, according to a speak instruction decided and output by the main controller 200, creates voice data from information in characters and outputs voice through the speaker S. In the creating of voice data, the beforehand-stored correspondence between information in characters and voice data is used.

The voice recognition section 122 has voice data inputted through the microphone MC, creates information in characters from the voice data based on the beforehand-stored correspondence between voice data and information in characters, and outputs to the main controller 200.

<Movement Controller>

The movement controller (movement control unit) 130 drives and controls the legs R1, the torso R2, the arms R3, and the head R4 and comprises a leg control section 131, a torso control section 132, an arm control section 133, and a head control section 134.

The leg control section 131 drives the leg R1 according to an instruction from the main controller 200; the torso control section 132 drives the torso R2 according to an instruction from the main controller 200; the arm control section 133 drives the arm R3 according to an instruction from the main controller 200; and the head control section 134 drives the head R4 according to an instruction from the main controller 200.

<Gyro Sensor and GPS Receiver>

The gyro sensor SR1 detects directions and the GPS receiver SR2 detects coordinates. Data detected by the gyro sensor SR1 and the GPS receiver SR2 is output to the main controller 200 and used to decide on the action of the robot.

<Storage>

The storage (storing unit) 140 is a storage device such as a hard disk device or a semiconductor memory and stores a radio environment map including map data of a movement area for the robot R and radio environment data about the radio environment of the movement area, and an optimum radio base unit map including map data of the movement area and data indicating the radio base unit 1 having the best radio environment in the movement area. The storage 140 stores a maximum movement speed control table that is used to decide on the maximum movement speed of the robot R depending on the radio environment state and in which the correspondences between radio environment values and maximum movement speeds are listed.

The map data is information identifying the map of the movement area for the robot R and contains, for example, coordinates identifying the positions of the reception, entrance, meeting rooms, and the like present in a floor that is a movement area.

In the radio environment map, the map data is associated with comprehensive radio environment data made up of plural types of radio environment data concerning the radio environment. This comprehensive radio environment data is information indicating the degree of goodness of radio communication link environment.

Where a plurality of radio base units 1 exist, a radio environment map is prepared for each radio base unit 1 and stored in the storage 140.

With reference to FIG. 7, the comprehensive radio environment data will be described. FIG. 7 illustrates the comprehensive radio environment data.

As shown in FIG. 7, in the present embodiment, in order to evaluate the degree of goodness of the radio environment comprehensively, the radio intensity, noise floor, number of error times (communication error times), number of retransmission times (data retransmission times), and communication speed are used as radio environment data that are indexes, and each radio environment data is weighted to calculate the comprehensive radio environment data.

Note that the comprehensive radio environment data in the present embodiment corresponds to "radio environment data" in appended claims 10-15.

The radio intensity, which best indicates the radio environment, is weighted with 80%. In the present embodiment, instead of the radio intensity data as it is, the ratio thereof to noise floor is used. That is, the radio intensity received by the robot R of radio waves transmitted from the radio base unit 1 (see FIG. 25) and the intensity of noise floor are quantified as percents of 1 to 100%. The 100% indicates the highest intensity. When radio intensity/noise floor>1, its contribution to the comprehensive radio environment data is set at (radio intensity/noise floor)×0.8. For example, the radio environment where the radio intensity is 100% and noise floor is 1% is the best with the contribution being at (100/1)×0.8=80%.

When radio intensity/noise floor<1, the noise level is higher than the radio intensity (signal level), and its contribution to the comprehensive radio environment data is set at 0%, which indicates the radio environment being extremely bad.

The number of error times is weighted with 5%, and letting the maximum number of error times in a second be 1028, its contribution to the comprehensive radio environment data is set at (1−(number of error times/1028))×5%. That is, as the number of error times becomes closer to 0, the contribution becomes closer to 5% (the radio environment being good), and as the number of error times becomes closer to 1028, the contribution becomes closer to 0% (the radio environment being bad).

For the number of retransmission times, like for the number of error times, letting the maximum number of retransmission times in a second be 1028, its contribution to the comprehensive radio environment data is set at (1−(number of retransmission times/1028))×5%. That is, as the number of retransmission times becomes closer to 0, the contribution becomes closer to 5% (the radio environment being good), and as the number of retransmission times becomes closer to 1028, the contribution becomes closer to 0% (the radio environment being bad).

The communication speed is weighted with 10%, and its contribution to the comprehensive radio environment data is calculated with the use of a preset conversion table depending on the communication speed selected in the radio LAN adapter in use.

In the "COMMUNICATION SPEED" section of FIG. 7, the conversion tables for a range of numbers {1, 2, 5.5, 11} [Mbps] and a range of numbers {6, 9, 12, 18, 24, 36, 48, 54} [Mbps] are set. The former is a conversion table for the case that a radio LAN adapter in compliance with IEEE 802.11b is used, and the latter is a conversion table for the case that a radio LAN adapter in compliance with IEEE 802.11g or IEEE 802.11a is used.

As communication with higher communication speed can be established, the radio environment is better, and a higher converted value is assigned.

Where communication in compliance with another standard or scheme is used, converted values corresponding to communication speeds need only be determined appropriately.

By adding the above four converted-into radio environment data, normalized comprehensive radio environment data of 100% to 0% is obtained.

By using the comprehensive radio environment data calculated in this way by weighting the radio environment data including data about the radio environment other than the radio intensity, the radio environment can be evaluated more appropriately.

If the radio environment state is evaluated with only the radio intensity, it is difficult to determine reliably whether communication can be established, especially in areas of low intensity. In order to determine reliably being a communication-feasible area, the threshold needs to be of a radio intensity level having an enough margin. Accordingly, in order to be able to determine that an entire movement area is a communication-feasible area, the radio wave output power of the radio base unit 1 (see FIG. 25) needs to be increased, or many radio base units 1 need to be located in the movement area (see FIG. 25).

Accordingly, by adding other radio environment data, the radio environment state can be evaluated more accurately without increasing the radio wave output power of the radio base unit 1 (see FIG. 25) or the number of radio base units 1.

Especially, because the radio environment state with communication established can be evaluated with the number of error times or the number of retransmission times, the state where communication is becoming not feasible can be precisely determined.

In the present embodiment, the radio environment state of a movement area is determined using a radio environment map made up of comprehensive radio environment data including radio environment data other than the radio intensity, but a radio environment map made up of any one alone of the radio intensity, communication speed, number of error times, and number of retransmission times may be used, or a radio environment map comprising another type of radio environment data indicating the degree of goodness of the radio environment may be used.

Figure 26A:
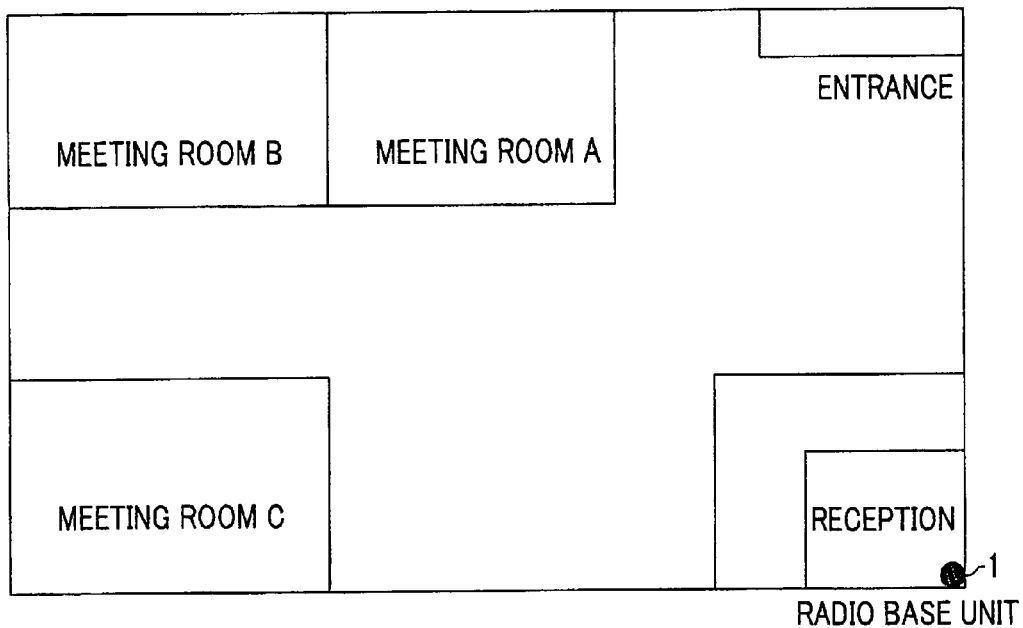
Figure 26B:
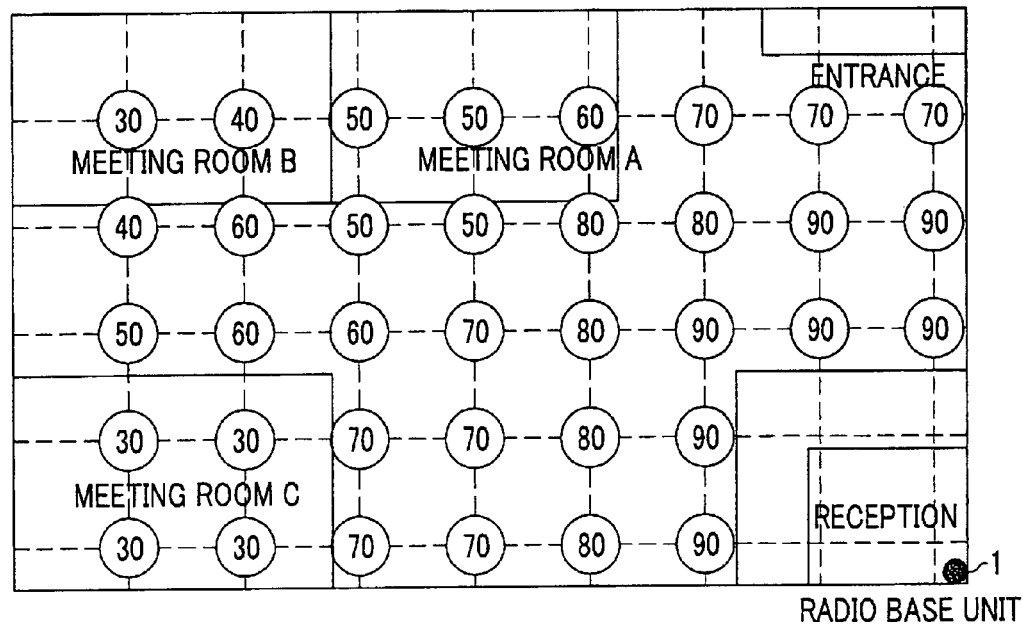

With reference to FIGS. 26A and 26B, a radio environment map having comprehensive radio environment data (hereinafter "radio environment data" for short) associated with map data will be described. FIG. 26A is a floor map showing an example of the map data visually and FIG. 26B is an example of the radio environment map having the radio environment data associated with the map data.

In the example of FIG. 26A, in the map data of the movement area for the robot R, the positions of the reception, entrance, meeting rooms A-C, a radio base unit 1, i.e., a radio base station, and the like are mapped on a predetermined coordinate system.

In the example of the radio environment map shown in FIG. 26B, a grid of predetermined intervals is set on the map data (a floor map) of FIG. 26A, and radio environment data (comprehensive radio environment data) shown in FIG. 7 is associated with each grid point.

As such, by associating radio environment data with the map data, the robot R can detect which place is good in radio environment.

The optimum radio base unit map (optimum radio base station map) is a map showing a radio base unit 1 associated with each position, which is selected as having a larger radio environment data value for the position based on the respective radio environment maps for a plurality of radio base units 1.

For example, where as shown in FIGS. 27A to 27C two radio base units 1 are provided, each grid point is associated with a radio base unit 1 having a larger radio environment data value from the radio environment map of radio base unit 1A shown in FIG. 27A and the radio environment map of radio base unit 1B shown in FIG. 27B, thereby creating an optimum radio base unit map shown in FIG. 27C.

In the optimum radio base unit map of FIG. 27C, "A" and "B" show respectively the optimum radio base unit being radio base unit 1A and radio base unit 1B, and "AB" shows both being optimum radio base units because the two radio base units have the same value in radio environment data.

The optimum radio base unit map is stored in the storage 140.

As such, where a plurality of radio base units 1 exist, the robot R can select a radio base unit 1 in a good communication state by using the optimum radio base unit map.

Figure 28:
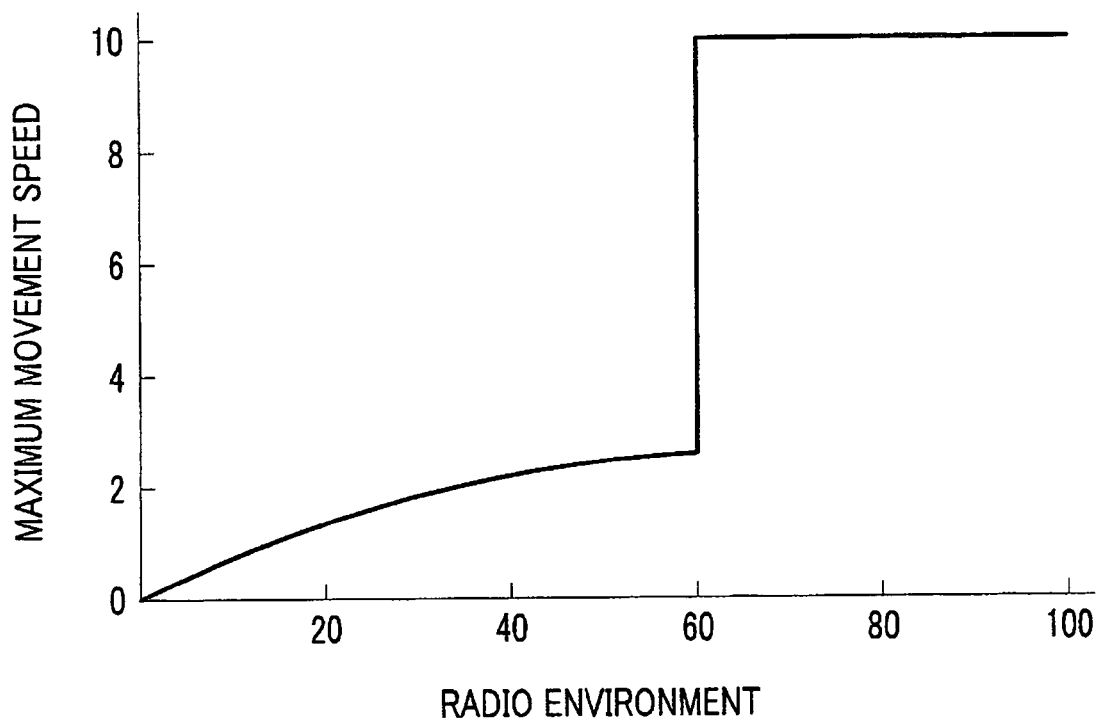
FIG. 28 is a chart showing an example relationship between the radio environment and the maximum movement speed.

The maximum movement speed control table is a numeric table indicating a relationship between the radio environment and the maximum movement speed of the robot R. The relationship between the radio environment and the maximum movement speed can be set as shown in, e.g., FIG. 28. FIG. 28 is a chart showing the example relationship between the two where the horizontal axis represents the radio environment and the vertical axis represents the maximum movement speed. In the present embodiment, the radio environment value is the value of the radio environment data (comprehensive radio environment data), and in this example, the value is normalized as 0 to 100% as described in FIG. 7. The maximum movement speed is normalized as 0 to 10, and if the maximum of mechanical movement speed is, e.g., 6 km/h, the maximum movement speed of 10 corresponds to 6 km/h.

In the example of FIG. 28, if the radio environment value is above 60%, the maximum movement speed is at 10. Thus, the robot R can move without being subject to restrictions on movement speed due to the radio environment state. When the radio environment value is at 60%, the maximum movement speed is restricted to 2.5, and as the radio environment value decreases below 60%, the maximum movement speed is restricted to a lower speed.

A numeric table into which this graph is converted is the maximum movement speed control table. The conversion into a numeric table is to create a correspondence table showing the correspondences between the radio environment values of multiples of 10% and the maximum movement speeds, which table is, for example, a LUT (Look Up Table). The maximum movement speed control table is stored beforehand in the storage 140.

By this means, the robot R can instantaneously find the maximum movement speed at that place by obtaining the value of the radio environment data referring to the radio environment map.

A link switching table contains information indicating radio base units 1 for the robot R to link to associated respectively with positions on the movement path for when executing a move task in an area where a plurality of radio base units 1 exist. The link is switched at a position where the radio base unit 1 has changed with a shift in this link switching table. The link switching table is created by a radio base unit selector 203 (see FIG. 30) described later and stored in the storage 140.

Referring back to FIG. 25, the configuration of the robot R will continue to be described.

<Radio Communication Unit>

The radio communication unit (radio communication unit) 150 is a communication device for transmitting and receiving data to and from to the managing computer 3 and performs switching its link between radio base units 1 (handover) according to an instruction from a radio control switching section 202 of the main controller 200 (see FIG. 30).

Figure 29:
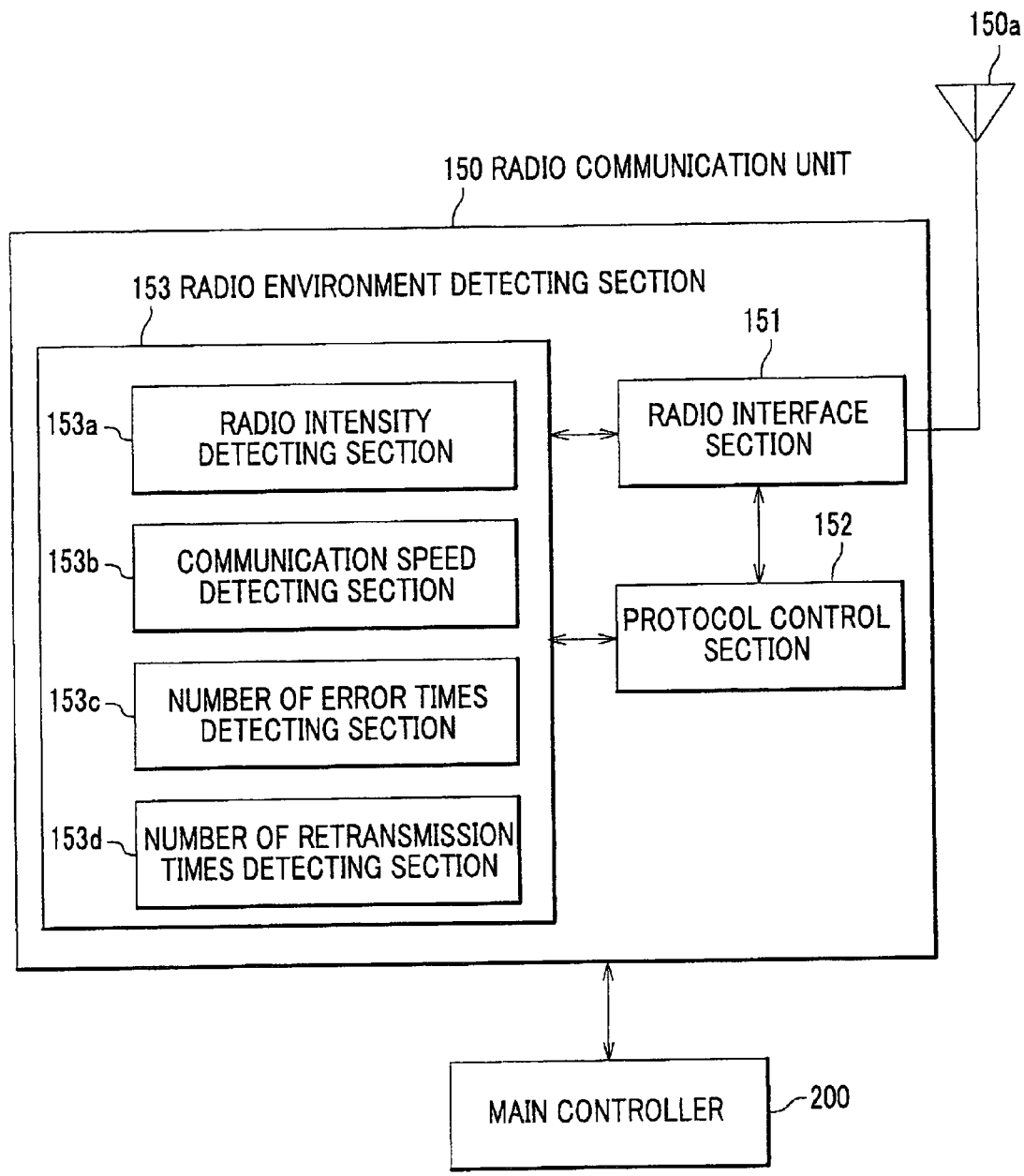
FIG. 29 is a block diagram of a radio communication unit shown in FIG. 25.

With reference to FIG. 29, the configuration of the radio communication unit 150 will be described in detail. FIG. 29 is a block diagram showing the configuration of the radio communication unit.

As shown in FIG. 29, the radio communication unit 150 comprises a radio interface section 151, a protocol control section 152, a radio environment detecting section 153, and a communication antenna 150a. The radio environment detecting section 153 comprises a radio intensity detecting section 153a, a communication speed detecting section 153b, a number of error times detecting section 153c, and a number of retransmission times detecting section 153d.

The radio interface section 151 performs physical conversion between data and radio waves, which are transmitted to and received from the managing computer 3 via the radio base unit 1 (see FIG. 25) through the communication antenna 150a. Upon receipt, the radio interface section 151 converts radio waves received through the communication antenna 150a into data and outputs to the protocol control section 152. Further, the received radio waves are output to the radio intensity detecting section 153a of the radio environment detecting section 153.

In transmission, the radio interface section 151 has data inputted from the protocol control section 152, converts the data into radio waves, and transmits to the radio base unit 1 (see FIG. 25) via the communication antenna 150a.

The protocol control section 152 performs data framing and arbitration for data communication between the managing computer 3 and the main controller 200 of the robot R according to, for example, a LAN standard such as IEEE 802.3. Upon receipt, the protocol control section 152 selects data addressed to the robot R from data received from the managing computer 3 and converted by the radio interface section 151, extracts data from frames such as TCP/IP packets according to a predetermined communication protocol scheme such as TCP/IP (Transmission Control Protocol/Internet Protocol), and outputs the data to the main controller 200.

In transmission, the protocol control section 152 creates frames such as TCP/IP packets from data inputted from the main controller 200 according to the predetermined communication protocol scheme and outputs the frames to the radio interface section 151.

Communication speed in receipt and transmission, number of error times in receipt, and number of retransmission times in transmission in the protocol control section 152 are detected by the communication speed detecting section 153b, the number of error times detecting section 153c, and the number of retransmission times detecting section 153d, respectively.

The radio environment detecting section 153 detects the radio intensity of radio waves converted in the radio interface section 151 and noise floor by means of the radio intensity detecting section 153a, and the speed of communication with the radio base unit 1 (see FIG. 25) by means of the communication speed detecting section 153b. Further, the detecting section 153 detects the number of error times in receipt in the protocol control section 152 by means of the number of error times detecting section 153c and the number of data retransmission times in transmission in the protocol control section 152 by means of the number of retransmission times detecting section 153d. Radio environment data comprising the detected (measured) radio intensity, noise floor, communication speed, number of error times, and number of retransmission times is output to the main controller 200.

By configuring the radio communication unit 150 in this way, the radio environment map stored in the storage 140 can be created and updated. If the robot R does not create and update the radio environment map, the radio environment detecting section 153 can be omitted from the configuration.

Referring back to FIG. 25, the configuration of the robot R will continue to be described.

<Main Controller>

The main controller (controller of the mobile robot) 200 is control unit to control overall the components forming the robot R such as the image processor 110, voice processor 120, movement controller 130, storage 140, radio communication unit 150, gyro sensor SR1, and GPS receiver SR2 and is constituted by a computer comprising a CPU (Central Processing Unit), a ROM (Read Only Memory), a RAM (Random Access Memory), and the like.

The main controller 200 analyzes task commands transmitted from the managing computer 3 and instructs the movement controller 130 to operate according to the task command, thereby having it execute a series of tasks autonomously.

With reference to FIG. 30, the configuration of the main controller 200 will be described in detail. FIG. 30 is a block diagram showing the functional configuration of the main controller 200. The configuration will be described in the below which is for achieving functions to restrict the maximum movement speed and to switch the link between radio base units 1 when instructed to execute a move task.

As shown in FIG. 30, the main controller 200 has a self-position detecting section 201, a radio control switching section 202, a radio base unit selecting section 203, a maximum movement speed determining section 204, and a movement speed instructing section 205.

The self-position detecting section (self-position detecting unit) 201 detects its own position in the movement area. The self-position detecting section 201 obtains the direction and coordinates output from the gyro sensor SR1 and the GPS receiver SR2 and associates them with the map data to detect its current position and orientation. Position information indicating its own position detected in the self-position detecting section 201 is output to the radio control switching section 202 and the radio base unit selecting section 203.

The unit to detect the direction and coordinates of the robot R is not limited to the gyro sensor SR1 and the GPS receiver SR2. For example, cameras may be provided at appropriate places in the movement area, not in the robot R, so as to detect the direction and coordinates of the robot R with the use of an image recognizing technique or the like.

When receiving a move task command from the managing computer 3, the radio base unit selecting section (radio base station selecting means) 203 searches for a link switching pattern having radio base units 1 to link to which are selected along a movement path decided by its own position output from the self-position detecting section 201, that is, the start position for the move task and the destination position (goal position) included in the move task command to create a link switching table. The created link switching table is output to the radio control switching section 202 and the maximum movement speed determining section 204.

Referring to the drawings as needed, the search for the link switching pattern will be described.

Figure 31A:
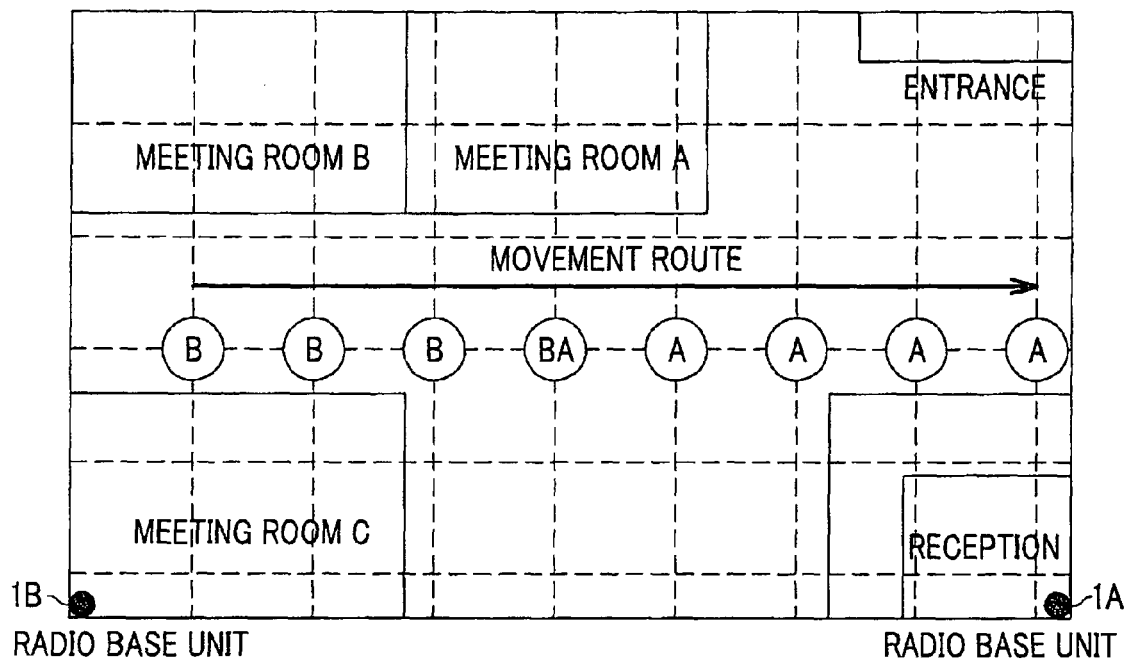
FIG. 31A is an example of a link switching pattern where the priority is the radio environment on a movement path.

First, with reference to FIGS. 31A and 31B (and FIG. 27 as needed), the search for the link switching pattern will be described. FIG. 31A is an example of the link switching pattern where the priority is the radio environment on the movement path, and FIG. 31B is an example of the link switching pattern where the priority is avoiding link switching.

Figure 31B:
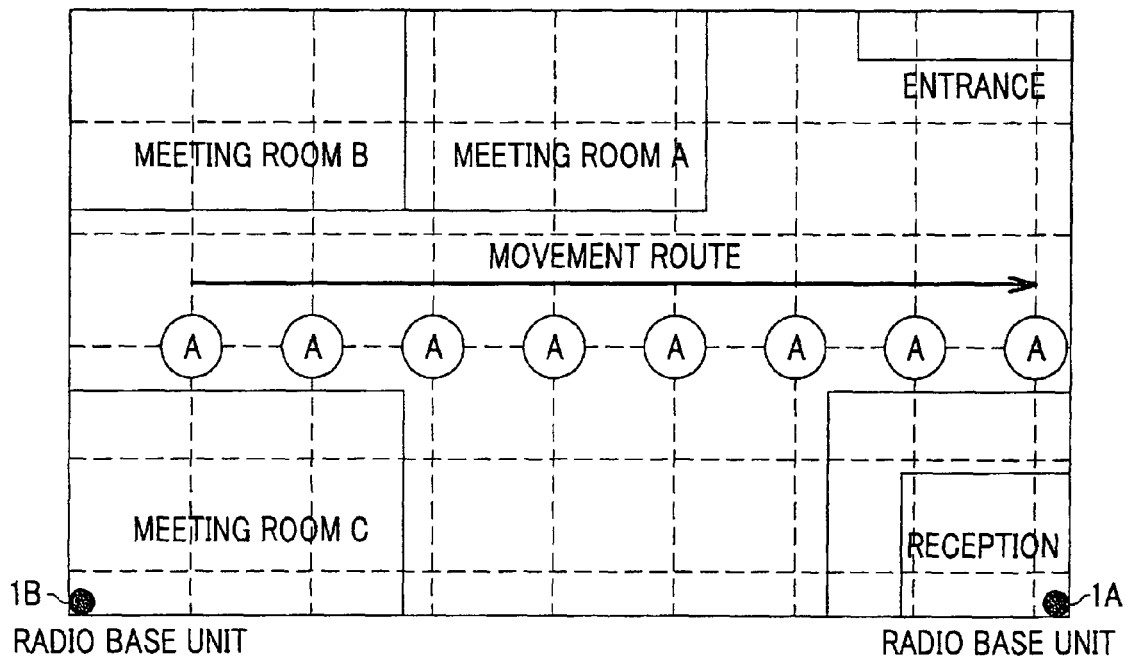
FIG. 31B is an example of the link switching pattern where the priority is avoiding link switching.

The example link switching patterns of FIGS. 31A and 31B are created based on the radio environment map and the optimum radio base unit map of FIG. 27. In FIGS. 31A and 31B, the robot moves along the movement route indicated by the arrow near the center.

<Priority being Radio Environment>

The link switching pattern of FIG. 31A is a pattern obtained by searching the optimum radio base unit map of FIG. 27C. That is, it is a link switching pattern where radio base units whose radio environment is best are selected along the movement path. In this case, radio base unit 1B is selected at first three points including the start position at the left end, and at the fourth point labeled "BA", the link is switched. In the link switching pattern, for example, "BA" represents that the link is to be switched from radio base unit 1B to radio base unit 1A. At four points on the right of the center, radio base unit 1A is selected.

As such, in the example of FIG. 31A, by switching the link once, the radio environment is maintained in a good state along the movement path.

The link switching pattern found in this way is converted into a link switching table.

<Priority being Avoiding Link Switching (Handover)>

The example of FIG. 31B shows such a link switching pattern that link switching does not happen on the movement path. In this case, radio base unit 1A that is best at the end point (right end point) of the movement path is selected at the start position (left end point), and the robot R moves to the end point without link switching.

A case where link switching is performed will be described. In link switching, communication with a new radio base unit 1 to link to needs to be established with communication with a previous radio base unit 1 being cut off. That is, if link switching is performed during movement, the robot R continues to move with communication being cut off, that is, with the managing computer 3 being unable to control the robot R.

Hence, while communication is cut off, for example, if the robot R has moved to a radio communication-infeasible area, the robot R may not be able to return to a radio communication-feasible area.

Accordingly, in the present embodiment, in link switching, the robot R once stops moving and after link switching finishes, resumes moving. By selecting a radio base unit 1 that can maintain the radio environment at or above a predetermined value to avoid link switching rather than maintaining the best radio environment all the time, the robot R need not stop moving in link switching. Thus, movement time can be reduced.

In the example of FIG. 31B, a predetermined value that decides the lower limit of the permissible radio environment state is at 50%. As to the radio environment map for radio base unit 1A shown in FIG. 27A, the value of radio environment data at the start position of the move task is at 50% and hence at or above the predetermined value, and at the end point the value of radio environment data is at 90%. Hence, on the movement path the value of radio environment data is always at or above the predetermined value of 50%. Thus, if at the start position communication with radio base unit 1A that is the optimum radio base unit for the end point can be established, the possibility that communication is cut off during movement is very low. Hence, the move task can be executed without link switching.

The link switching pattern found in this way (i.e., the pattern that radio base unit 1A is selected for all parts of the movement path) is converted into a link switching table.

Figure 32A:
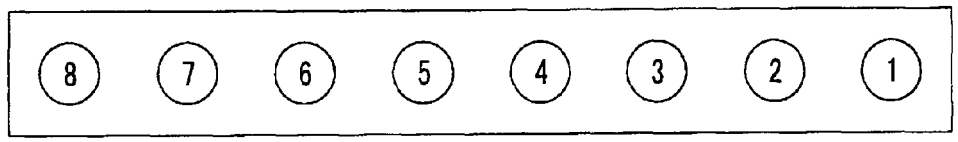
FIGS. 32A to 32E show an example of radio environment maps and an optimum radio base unit map.
Figure 32B:
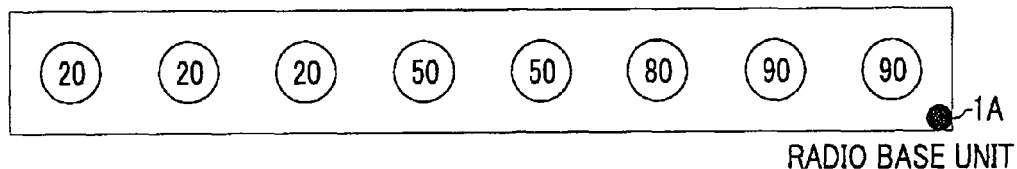
Figure 32C:
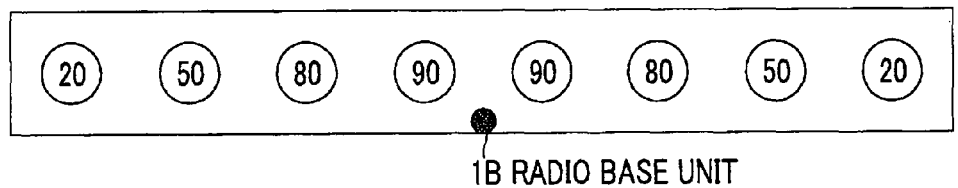
Figure 32D:
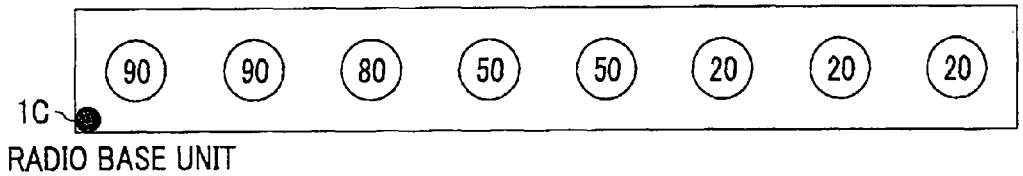
Figure 32E:
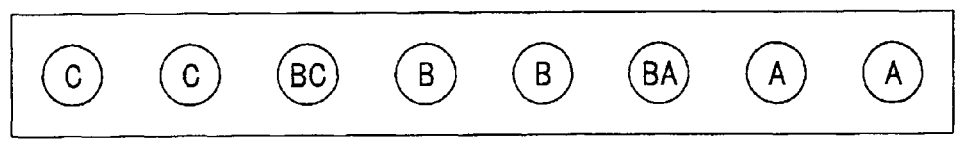

Next, with reference to FIGS. 32A to 32E, 33A, and 33B, a method of searching for a link switching pattern will be described for when a radio base unit 1 that can maintain the radio environment at or above the predetermined value for all parts of the movement path does not exist. FIG. 32A shows the coordinates of positions; FIG. 32B the radio environment map for radio base unit 1A; FIG. 32C the radio environment map for radio base unit 1B; FIG. 32D the radio environment map for radio base unit 1C; and FIG. 32E an optimum radio base unit map.

FIGS. 33A to 33F illustrate the way in which a link switching pattern is searched for using the radio environment maps and the radio base unit map of FIGS. 32A to 33E.

Figure 33A:
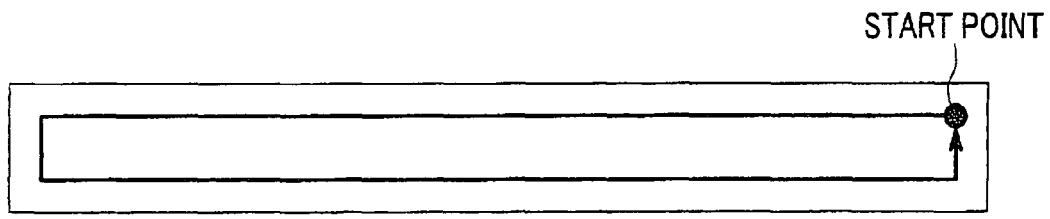
FIGS. 33A to 33F illustrate the way in which a link switching pattern for the movement path is searched for using the radio environment maps and the radio base unit map of FIG. 32.

As shown in FIG. 33A, the movement path for the move task described in the below extends laterally linearly and will be described using the coordinates of positions of FIG. 32A as needed.

As shown in FIGS. 32B-32D, three radio base units 1A, 1B, 1C are placed respectively at the right end, the center, and the left end in the movement area. The movement path for the move task is a circuit route, as shown in FIG. 33A, that starts at position "1", goes in the left direction to the left end, position "8", and turns back in the right direction to the right end, position "1" as the final point.

As illustrated in FIG. 31B, supposing that the predetermined value of the permissible radio environment is at 50% for no link switching, a radio base unit 1 which is at or above 50% for all parts (positions 1-8) of the movement path does not exist as shown in FIGS. 32B-32D. Accordingly, a link switching pattern to minimize the number of link switch times is searched for.

Here, the movement path is divided into the trip out of positions 1, 2, . . . , 8 and the trip back of positions 8, 7, . . . , 1 to search for a link switching pattern for each. Where the movement path is a circuit route like in this example, the movement path can be divided to search for a link switching pattern for each, thereby simplifying the search algorithm.

First, the robot searches for a link switching pattern for the trip out of positions 1, 2, . . . , 8 of the movement path.

Figure 33B:

First, referring to the optimum radio base unit map (FIG. 32E) as shown in FIG. 33B, radio base unit 1A that is the optimum radio base unit at the start position, position "1", is selected for position "1".

Figure 33C:
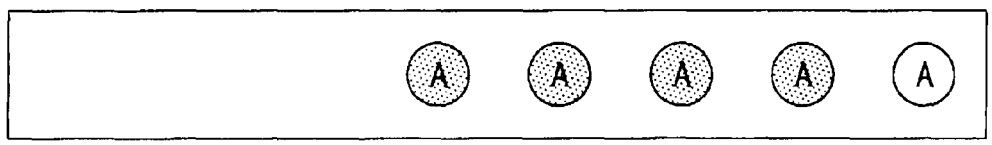
Figure 33D:
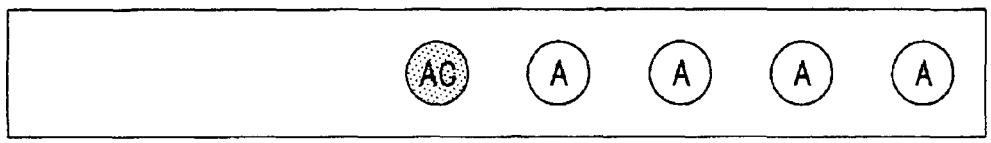

Next, referring to the radio environment map for radio base unit 1A (FIG. 32B) as shown in FIG. 33C, the link with radio base unit 1A linked at the start position is held as long as the radio environment is at or above the predetermined value of 50%. The link with radio base unit 1A may be selected based on the radio environment map for radio base unit 1A up to position "5".

Next, referring to the optimum radio base unit map (FIG. 32E), radio base unit 1C that is the optimum radio base unit for the end point of the trip out, position "8", is selected provisionally. Then, referring to the radio environment map for radio base unit 1C (FIG. 32D), the robot checks the radio environment data for position "5", a link switching point. Because the radio environment data for radio base unit 1C for position "5" is at 50% and thus at or above the predetermined value (50%), the link is switched from radio base unit 1A to radio base unit 1C at position "5" as indicated by "AC" of FIG. 33D.

If the radio environment data for radio base unit 1C for position "5" were below 50%, radio base unit 1C could not be selected and another radio base unit 1 would be searched for. As to the next candidate, for example, by comparing the radio environment maps for other radio base units and selecting provisionally sequentially radio base units whose radio environment is next best to the optimum radio base unit for the end point of the radio environment map (position "8") and referring to the radio environment map for the provisionally selected radio base unit, it may be determined whether the radio base unit is selectable.

Instead of comparing the radio environment data sets for the end point, referring to the map data and selecting provisionally sequentially radio base units 1 in the order of from the closest to the end point and referring to the radio environment map for the provisionally selected radio base unit 1, it may be determined whether the radio base unit is selectable.

In general, because it is expected that a radio base unit provided closer to the destination (end point) has a better radio environment when approaching the end point, if the radio environment data for the radio base unit 1 for a link switching point is at or above a predetermined value, it can be judged that another link switching is not necessary until the end point.

Figure 33E:
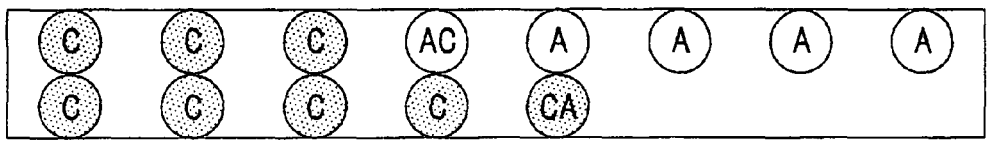

Because radio base unit 1C that is the optimum radio base unit for the end point of the trip out, position "8", has been selected at position "5", radio base unit 1C is selected up to position "8" as shown in FIG. 33E.

Next, a pattern search for the trip back is performed. In the trip back, position "8" is the start position, and at the start position of a divided movement path, the link with the radio base unit 1 selected at the end point of the preceding divided movement path is held. Then, referring to the radio environment map for radio base unit 1C selected at position "8", radio base unit 1C is selected for the positions down to position "4" where radio environment data of radio base unit 1C is at or above 50% so that the link is held.

Next, referring to the optimum radio base unit map, radio base unit 1A that is the optimum radio base unit for the end point, position "1", of the trip back is provisionally selected, and referring to the radio environment map for the provisionally selected radio base unit 1A, the radio environment data for position "4", a link switching point, is checked. Because the radio environment data for position "4" is at 50%, the link is switched from radio base unit 1C to radio base unit 1A at position "4" as indicated by "CA" of FIG. 33F.

Then, referring to the radio environment map for radio base unit 1A, radio base unit 1A is selected as long as the radio environment is at or above 50%. Thus, radio base unit 1A is selected down to the end point, position "1", as shown in FIG. 33F.

The link switching pattern found in this way is converted into a link switching table.

Figure 33F:
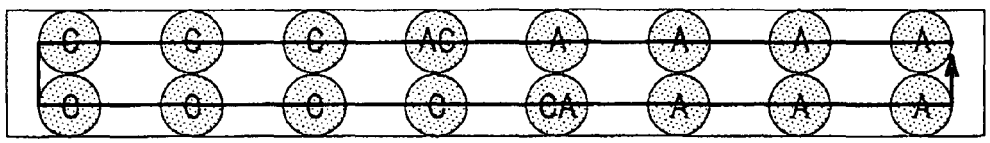

In this link switching pattern, link switching is performed twice at positions "5" and "4" as shown in FIG. 33F.

For that movement path, if a link switching pattern is searched for based on the optimum radio base unit map of FIG. 33E, radio base units 1 selected for positions "1" to "8" and back to position "1" are A, A, AB, B, B, BC, C, C, C, C, CB, B, B, BA, A, A, where link switching is performed four times.

Therefore, by using the radio environment map as well as the optimum radio base unit map and holding the link with a radio base unit 1 once linked as long as the radio environment is at or above a predetermined value, a link switching pattern with a reduced number of link switch times can be obtained.

A radio base unit 1 may be selected at the start position, which is not the optimum radio base unit for the start position but has a radio environment value at or above a predetermined value for the start position and is provided closest to the destination and on or near the movement path.

Referring back to FIG. 30, the description of the main controller 200 will continue.

The maximum movement speed determining section (maximum movement speed determining means) 204 extracts values of radio environment data on the movement path specified by a move task command based on the link switching table output from the radio base unit selecting section 203 and the radio environment map stored in the storage 140 and referring to the maximum movement speed control table stored in the storage 140, the maximum movement speeds are determined for the values of radio environment data and output to the movement speed instructing section 205.

Figure 34A:
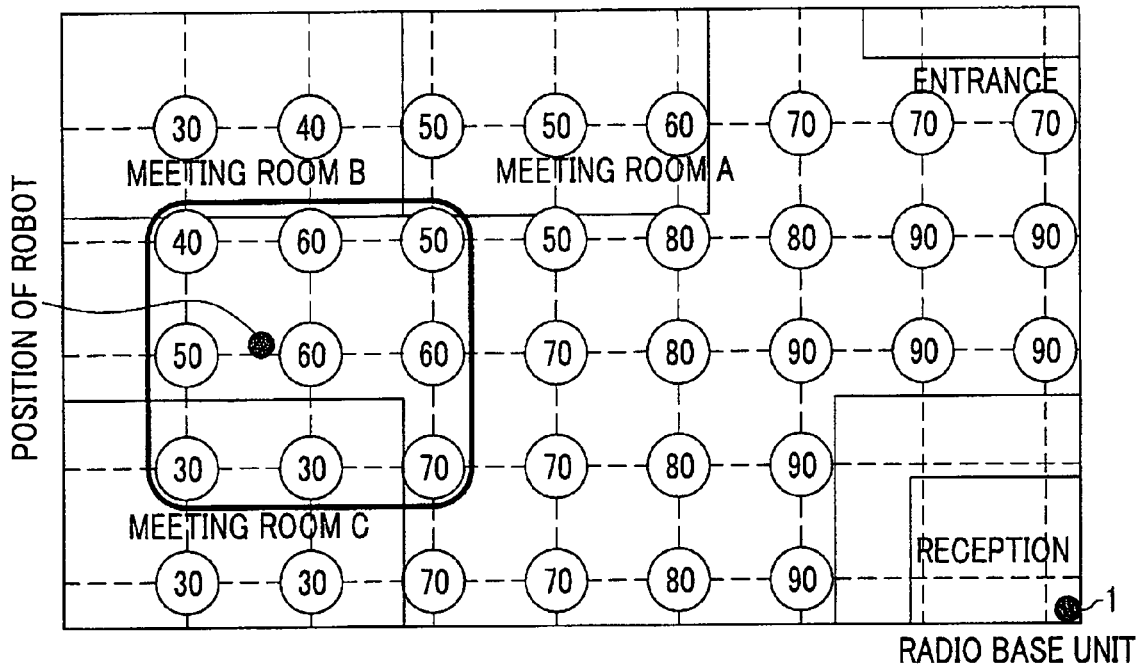
Figure 34B:
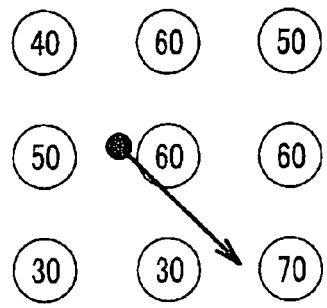
Figure 34C:
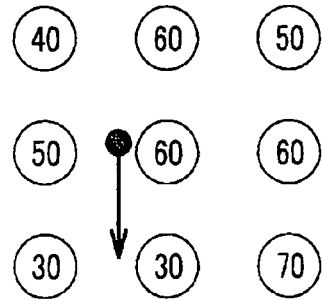

With reference to FIGS. 34A to 34C, a method of determining the maximum movement speed will be described. FIGS. 34A to 24C illustrate a move task and change in the state of the radio environment in a radio environment map. FIG. 34A shows an example of the radio environment map; FIG. 34B shows a move task in a direction with which the radio environment state rises; and FIG. 34C shows a move task in a direction with which the radio environment state lowers.

In the present embodiment, the maximum movement speed determining section 204 determines the maximum movement speed depending on radio environment data and change therein on the movement path specified by a move task command. It is assumed that switching its link between radio base units 1 is not performed on the movement path for the move task.

Let us consider movement from the center of the region including three points by three points enclosed by a thick line to the periphery in the radio environment map for a radio base unit 1 of FIG. 34A. FIG. 34B shows a move task from the center where the radio environment data value is at 60% to bottom right where the radio environment data value is at 70%. In this case, because the movement is in a direction with which the radio environment state rises, the risk of communication being cut off is very low during the movement if radio communication is established at the current position (start position of the move task). Hence, the maximum movement speed is not restricted.

Also if the radio environment state does not change (being at the same level), the maximum movement speed is not restricted.

FIG. 34C shows a move task from the center where the radio environment data value is at 60% to a position below where the radio environment data value is at 30%. In this case, because the movement is in a direction with which the radio environment state lowers, there is the risk of communication being cut off during the movement even if radio communication is established at the current position (start position of the move task). Hence, the maximum movement speed is restricted. For example, the maximum movement speed is set equal to the maximum movement speed for the radio environment data value of 30% at the destination (goal position) with the use of the maximum movement speed control table created based on the chart shown in FIG. 28.

In the present embodiment, even if the move task is in a direction with which the radio environment state lowers, the risk of communication being cut off is very low if the radio environment value at the destination is at or above a predetermined value (e.g., 60%). Hence, the maximum movement speed is not restricted.

As such, the maximum movement speed is restricted based on the radio environment data values at the start position and the goal position and change in the radio environment data value. Hence, the maximum movement speed can be restricted selectively only for move tasks where the risk of communication being cut off is high. Thus, movement time can be prevented from becoming longer than is necessary.

If a move task is a movement over a long distance, for example, the maximum movement speed may be set equal to the maximum movement speed for, e.g., the lowest value of radio environment data on the movement path taking into account a pattern of changes in the radio environment on the movement path as well as the radio environment data at the start position and the goal position.

Referring back to FIG. 30, the description of the main controller 200 will continue.

The movement speed instructing section 205 determines the movement speed of the robot R in executing a move task and instructs the movement controller 130 to control the robot to move at the determined movement speed. The movement speed instructing section 205 restricts the movement speed to be instructed to the movement controller 130 to no higher than the maximum movement speed output from the maximum movement speed determining section 204.

When instructing a movement speed of "0", the movement controller 130 stops moving.

Also, the instructing section 205 instructs the movement controller 130 to stop moving (a movement speed of "0") according to a notification to switch the link between radio base units 1, described later, output from the radio control switching section 202.

The radio control switching section 202 notifies to the radio communication unit 150 a radio base unit 1 to switch the link to based on its own position output from the self-position detecting section 201 and the link switching table output from the radio base unit selecting section 203 during the execution of a move task.

In the present embodiment, the link is switched between radio base units 1 while movement is stopped. Hence, to perform link switching, a notification to switch the link is output to the movement speed instructing section 205.

[Operation of Robot]

Next, the operation of the robot R will be described. The operation that, when instructed to perform a move task, the robot R restricts the maximum movement speed and switches the link between radio base units 1 will be mainly described.

<Restriction of Maximum Movement Speed>

Figure 35:
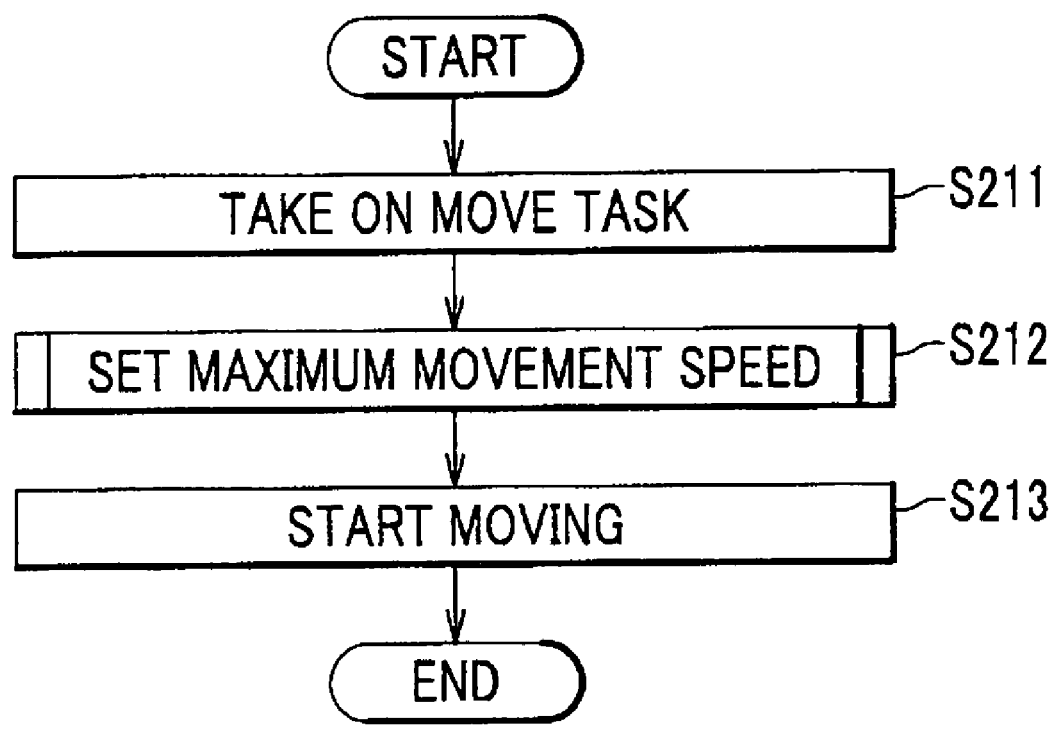
FIG. 35 is a flowchart showing the operation in which the robot sets the maximum movement speed and executes a move task.

First, with reference to FIG. 35 (and FIGS. 25, 30 as needed), the operation in which the robot R receives a move task command from the managing computer 3, sets the maximum movement speed, and starts the move task will be described. FIG. 35 is a flowchart showing the operation in which the robot R sets the maximum movement speed and executes the move task.

First, the robot R receives by the radio communication unit 150 a move task command transmitted from the managing computer 3 via a radio base unit 1 and takes on the move task (step S211).

When receiving the move task command, the main controller 200 determines by the maximum movement speed determining section 204 the maximum movement speed based on its own position detected by the self-position detecting section 201 and the radio environment state on the movement path decided by the goal position included in the move task command. Then, the movement speed instructing section 205 sets the upper limit of the movement speed to be instructed to the movement controller 130 at the maximum movement speed determined by the maximum movement speed determining section 204 (step S212).

The main controller 200 has the movement speed instructing section 205 instruct the movement controller 130 a movement speed. This movement speed is restricted to no higher than the maximum movement speed determined by the maximum movement speed determining section 204. The movement controller 130 drives the legs R1, etc., so as to move at the specified movement speed, so that the robot R starts moving (step S213).

<Setting of Maximum Movement Speed>

Figure 36:
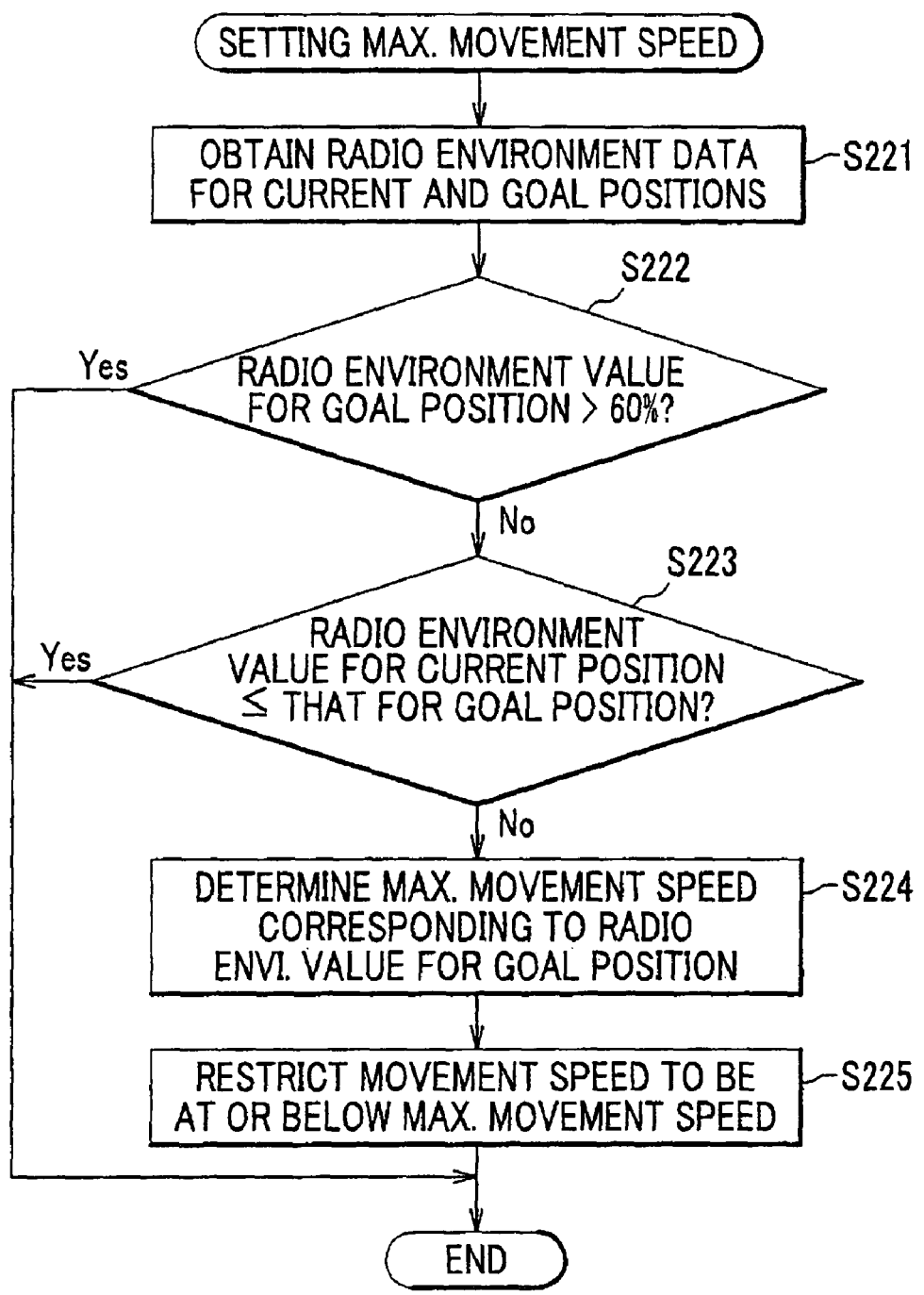
FIG. 36 is a flowchart showing the process of setting the maximum movement speed.

With reference to FIG. 36 (and FIGS. 25, 30 as needed), the step of setting the maximum movement speed (step S212) in the flowchart of FIG. 35 will be described in detail. FIG. 36 is a flowchart showing the process of setting the maximum movement speed.

First, the main controller 200 detects the robot R's own position by the self-position detecting section 201 and obtains the detected position as the current position. This current position is the start position for the move task. The maximum movement speed determining section 204 reads the radio environment map for the radio base unit 1 selected by the radio base unit selecting section 203 from the storage 140 and obtains radio environment data for the current position and for the goal position included in the move task command (step S221).

Next, the main controller 200 confirms whether the value of radio environment data (radio environment value) for the goal position is above a predetermined value (60%) by the maximum movement speed determining section 204 (step S222). If above 60% (Yes at step S222), the maximum movement speed is not set and the process is ended. That is, in this case the maximum movement speed is not restricted. Or, the maximum movement speed may be set equal to the maximum speed at which the robot R can move (for example, a speed of "10" in FIG. 28), so that the maximum movement speed is substantially free from restriction.

On the other hand, if the radio environment value for the goal position is at or below 60% at step S222 (No at step S222), the maximum movement speed determining section 204 confirms whether the radio environment value for the goal position is at or above the radio environment value for the current position (step S223). If at or above the radio environment value for the current position (Yes at step S223), the radio environment state rises or at least does not change as the robot moves toward the goal position. Hence, the maximum movement speed is not set and the process is ended. That is, also in this case the maximum movement speed is not restricted.

If the radio environment value for the goal position is below the radio environment value for the current position at step S223 (No at step S223), the radio environment state lowers as the robot moves toward the goal position. Hence, the maximum movement speed determining section 204 refers to the maximum movement speed control table stored beforehand in the storage 140 and determines the maximum movement speed corresponding to the radio environment data value for the goal position (step S224).

The determined maximum movement speed is sent to the movement speed instructing section 205, which sets the movement speed to be at or below the maximum movement speed and instructs the movement speed (step S225), and the process is ended. By this means, the robot R is controlled to move at a movement speed no higher than the maximum movement speed.

Although description has been made on the premise that the link is not switched between radio base units 1 during the move task, if the link is switched between radio base units 1, replacing the goal position with a position to switch the link in the above description, the maximum movement speed may be set for each section where the robot R moves with being linked to the same radio base unit 1 continuously.

Next, a method of searching for a pattern of switching the link between radio base units 1 to move in the case of executing a move task in a movement area in which a plurality of radio base units 1 are provided will be described with reference to the drawings as needed.

<Case where Degree of Goodness of Radio Environment is Prioritized>

Figure 37:
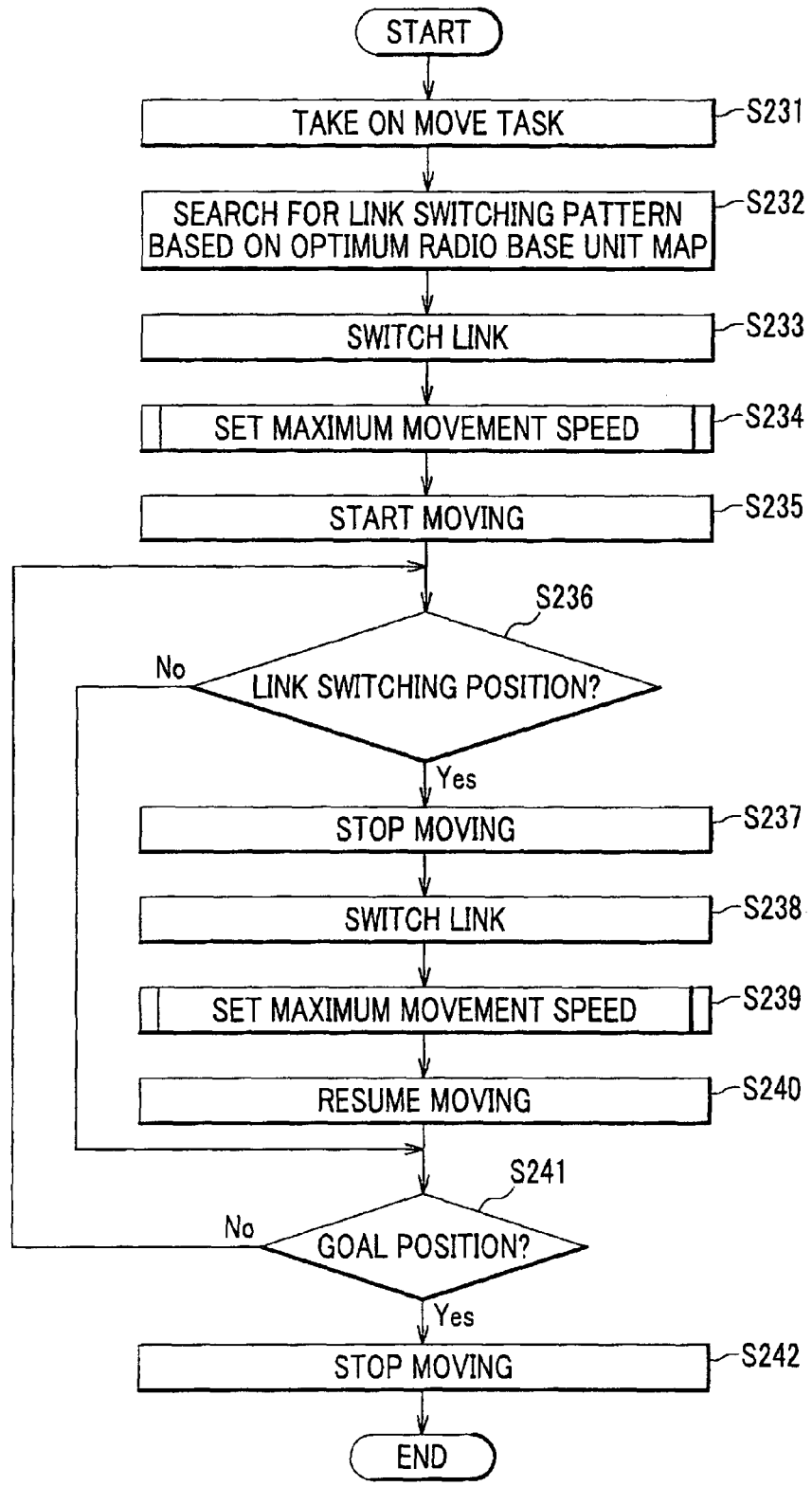
FIG. 37 is a flowchart showing the process of searching for a link switching pattern to move with the degree of goodness of the radio environment prioritized.

First, with reference to FIG. 37 (and FIGS. 25, 30 as needed), the case where the priority is the degree of goodness of the radio environment will be described. FIG. 37 is a flowchart showing the process of searching for a link switching pattern to move with the priority being the degree of goodness of the radio environment.

First, the robot R receives by the radio communication unit 150 a move task command transmitted from the managing computer 3 via a radio base unit 1 and takes on the move task (step S231).

When receiving the move task command, the main controller 200 has the radio base unit selecting section 203 refer to the optimum radio base unit map stored in the storage 140 and searches for a link switching pattern in which an optimum radio base unit recorded in the optimum radio base unit map is selected for each position on the movement path that is decided by its own position detected by the self-position detecting section 201 and by the goal position included in the move task command. Then, a link switching table is created from the link switching pattern as the search result (step S232).

Next, the radio control switching section 202 instructs the radio communication unit 150 to switch the link to the radio base unit 1 selected for a first section in the created link switching table, and the radio communication unit 150 switches the link to the specified radio base unit 1 (step S233).

Next, the main controller 200, by the maximum movement speed determining section 204, refers to the radio environment map for the radio base unit 1 selected for the section whose start position and goal position are respectively the current position and the next link switching position obtained from the link switching table created by the radio base unit selecting section 203 and sets the maximum movement speed for the section (step S234). The method of setting the maximum movement speed can be the same as the one illustrated in FIG. 36, and detailed description thereof is omitted. Note that steps S233 and S234 may be exchanged in the processing order or processed in parallel.

Next, the movement speed instructing section 205 instructs the movement controller 130 a movement speed with the set maximum movement speed as the upper limit, and thereby the robot starts moving (step S235).

Next, the main controller 200 confirms whether the robot has reached the position to switch the link between radio base units 1 by the radio control switching section 202 (step S236). Whether the robot has reached the link switching position can be confirmed by checking whether the next link switching position obtained from the link switching table matches its own position detected by the self-position detecting section 201.

If the robot has not reached the link switching position (No at step S236), the main controller 200 confirms whether its own position detected by the self-position detecting section 201 matches the goal position of the move task (step S241), and if matching (Yes at step S241), since the robot has reached the goal position, the movement speed instructing section 205 instructs the movement controller 130 a movement speed of "0" so as to stop the movement of the robot R (step S242). By this means, the move task ends.

In contrast, if having not reached the goal position at step S241 (No at step S241), the process returns to step S236, where it is confirmed whether the robot has reached the link switching position.

If it is found that the robot has reached the link switching position at step S236 (Yes at step S236), the main controller 200 instructs by the movement speed instructing section 205 the movement controller 130 a movement speed of "0" so as to stop the movement of the robot (step S237).

When the movement is stopped, the radio control switching section 202 instructs the radio communication unit 150 to switch the link between radio base units 1 based on the link switching table, so that the link is switched (step S238).

When link switching finishes, the main controller 200, by the maximum movement speed determining section 204, refers to the radio environment map for the radio base unit 1 selected for the section whose start position and goal position are respectively the current position where the link has been switched and the next link switching position obtained from the link switching table and sets the maximum movement speed for the section (step S239). The method of setting the maximum movement speed can be the same as the one illustrated in FIG. 36, and detailed description thereof is omitted. Note that steps S238 and S239 may be exchanged in the processing order or processed in parallel.

Then, the movement speed instructing section 205 instructs the movement controller 130 a movement speed with the set maximum movement speed as the upper limit, and thereby the robot resumes moving (step S240).

After resuming movement, the main controller 200 confirms whether its own position detected by the self-position detecting section 201 matches the goal position of the move task (step S241), and if matching (Yes at step S241), since the robot has reached the goal position, the movement speed instructing section 205 instructs the movement controller 130 a movement speed of "0" so as to stop the movement of the robot (step S242). By this means, the move task ends.

In contrast, if having not reached the goal position at step S241 (No at step S241), the process returns to step S236, where it is confirmed whether the robot has reached the link switching position.

As such, the robot R can move to the goal position while switching the link between radio base units 1 as needed to maintain the optimum radio environment.

If a radio base unit 1 to maintain the radio environment state sufficient cannot be selected, the maximum movement speed is restricted according to the radio environment state. Hence, for example, if a failure such as sharp degradation in the radio environment is detected, a measure such as stopping the movement can be taken quickly. Further, because the maximum movement speed is restricted according to its radio environment state for each section where the robot R moves with holding the link with the same radio base unit 1, the time required to execute the move task can be prevented from becoming longer than is necessary.

Yet further, because the movement is stopped during link switching, a failure in communication can be prevented from causing a failure in the walking or the like of the robot R when communication is temporarily cut off by the link switching.

<Case where Avoiding Link Switching is Prioritized>

Figure 38:
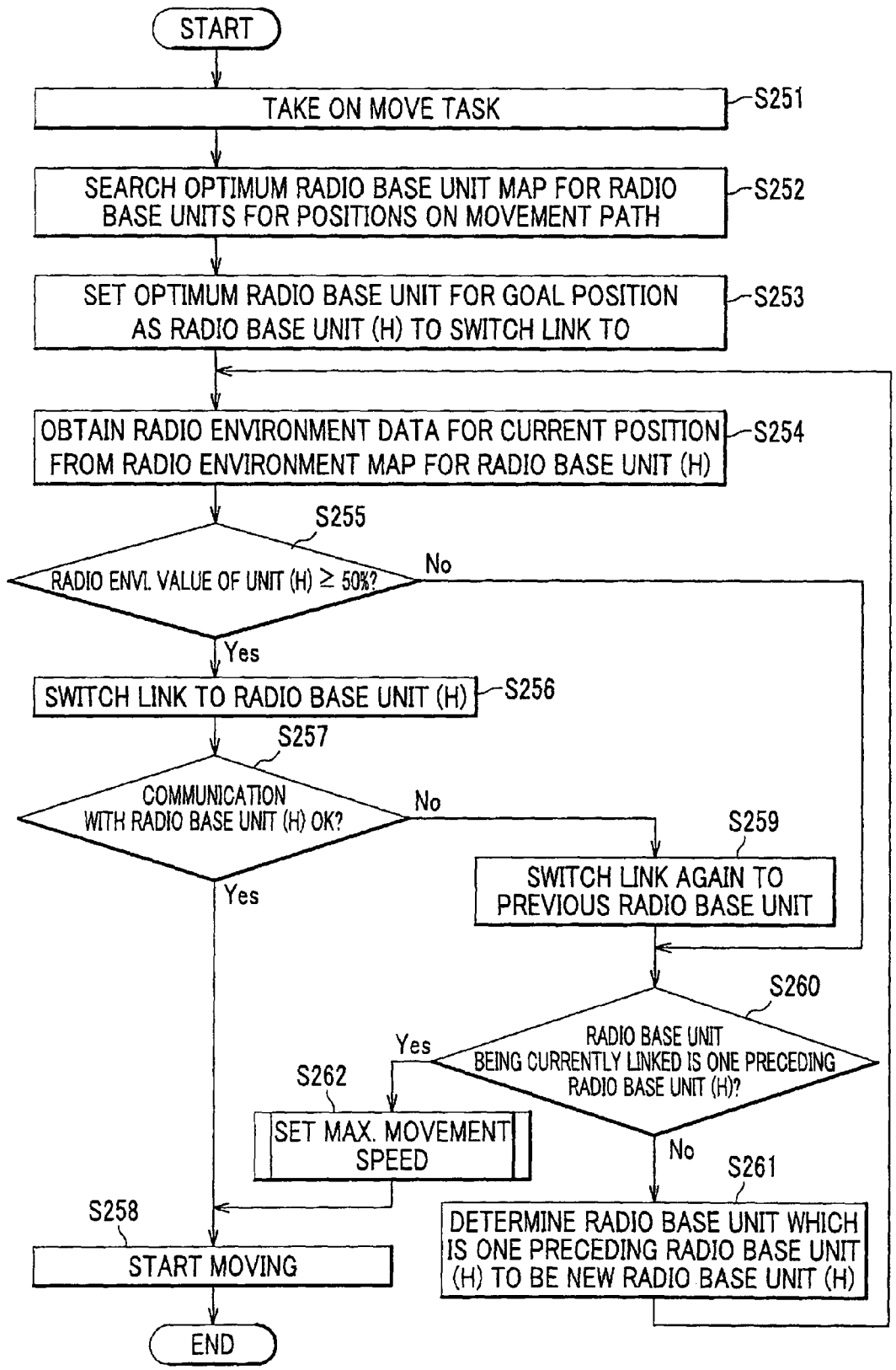
FIG. 38 is a flowchart showing the process of searching for a link switching pattern to move in which avoiding link switching is prioritized.

Next, with reference to FIG. 38 (and FIGS. 25, 30 as needed), the case where the priority is avoiding link switching will be described. FIG. 38 is a flowchart showing the process of searching for a link switching pattern to move with the priority being avoiding link switching.

In this example, when receiving a move task command, the main controller 200 selects a radio base unit 1 to link to in this move task by the radio base unit selecting section 203 and before movement, switches the link to the selected radio base unit 1 and after starting to move, moves to the goal position without link switching.

First, the robot R receives by the radio communication unit 150 a move task command transmitted from the managing computer 3 via a radio base unit 1 and takes on the move task (step S251).

The radio base unit selecting section 203 refers to the optimum radio base unit map stored in the storage 140 and searches for radio base units 1 for positions on the movement path that is decided by its own position (current position) detected by the self-position detecting section 201 and by the goal position included in the move task command (step S252). The optimum radio base unit for the goal position is set as the radio base unit (H) to switch the link to (step S253) (hereinafter the radio base unit 1 set as a partner to switch the link to (handover) being called a radio base unit (H)).

Next, the radio base unit selecting section 203 refers to the radio environment map for the radio base unit (H) stored in the storage 140 and obtains radio environment data for the current position (step S254).

If the radio environment data value (radio environment value) is at or above 50% (Yes at step S255), the radio control switching section 202 has the radio communication unit 150 switch the link to the radio base unit (H) (step S256). When communication with the radio base unit (H) is confirmed (established) (Yes at step S257), this radio base unit 1 is determined to be the radio base unit (H) selected for the move task. Since communication is confirmed, link switching to this radio base unit (H) is complete. Hence, with the link being held, the main controller 200 has the movement speed instructing section 205 instruct the movement controller 130 to control the robot move at the movement speed determined based on the move task. Thereby, the robot R starts moving (step S258).

In contrast, if communication with the radio base unit (H) is not confirmed at step S257 (No at step S257), the radio communication unit 150 switches the link again to the radio base unit 1 that was linked before the attempt to switch the link to the radio base unit (H) (step S259), and the process proceeds to step S260.

If the radio environment data value for the radio base unit (H) is below 50% (No at step S255), the process proceeds to step S260 to search for another radio base unit 1 as the radio base unit (H).

If the radio base unit 1 being currently linked precedes the radio base unit (H), that is, it is located next furthest away from the current position of the robot R to the radio base unit (H) (Yes at step S260), there is no radio base unit 1 more suitable than the radio base unit 1 being currently linked. Hence, the radio base unit 1 being currently linked is determined to be the radio base unit (H) for this move task. In this case, since the radio environment state may not be maintained sufficient on the movement path, the maximum movement speed is set based on radio environment data on the movement path (step S262), and the robot starts moving with the maximum movement speed restricted (step S258).

The method of setting the maximum movement speed is the same as the one illustrated in FIG. 36, and detailed description thereof is omitted.

In contrast, if the radio base unit 1 being currently linked does not precede the radio base unit (H) (No at step S260), the radio base unit 1 preceding the currently selected radio base unit (H) is determined to be the new radio base unit (H) (step S261). The process returns again to step S254, where it is confirmed whether the new radio base unit (H) is selectable as a radio base unit 1 to link to in this move task.

As such, where link switching is not performed during a move task, a radio base unit 1, with which communication can be established at the current position before starting to move, i.e., the start position and which is located closest to the goal position, can be selected from a plurality of radio base units 1 provided on or near the movement path. By this means, the robot R can link to an appropriate radio base unit 1 (having the least risk of communication being cut off during movement) and execute the move task. When a sufficient radio environment state cannot be obtained for the entire movement path, the maximum movement speed is restricted according to the radio environment state. Hence, for example, if a failure such as sharp degradation in the radio environment is detected during movement, a measure such as stopping the movement can be taken quickly.

In the present embodiment, the controller for the mobile robot is embodied as the main controller 200 incorporated in the robot R and, using the radio environment map and the like stored in the storage 140, determines the maximum movement speed and searches for a link switching pattern. However, all or part of the controller may be provided in, for example, the managing computer 3 outside the body of the robot R, and the controller provided in the managing computer 3 may instruct the movement controller 130 of the robot R a movement speed and timings to switch the link between radio base units 1 by radio.

THIRD EMBODIMENT

Next, a mobile robot of a third embodiment will be described with reference to the drawings. The basic structure of the mobile robot of the third embodiment is the same as that of the mobile robots of the first and second embodiments, and differences from the latter will be mainly described.

[Mobile Robot Control System]

First, a mobile robot control system of the third embodiment will be described. FIG. 39A is a block diagram of the mobile robot control system of the embodiment of the present invention.

As shown in FIG. 1 and FIG. 39A, the mobile robot control system A comprises a mobile robot R provided in a movement area where to execute a task; a radio base unit 1 linked to the mobile robot R by radio communication; a managing computer 3, a storage 5, and a terminal 7 connected to the radio base unit 1 via a network 4. The numbers of mobile robots R and radio base units 1 provided in a movement area where to execute a task are not limited to this embodiment.

The mobile robot R is located in a movement area where to execute a task and autonomously moves in this movement area so as to execute a task such as carrying an article or guiding a visitor according to an execution command signal (task command).

Depending on the radio environment such as radio intensity, radio communication between the mobile robot R and the radio base unit 1 may be cut off. Accordingly, the mobile robot R moves autonomously to a place where radio communication can be restored if radio communication is cut off.

The radio base units 1 (1A, 1B) are communication units for the managing computer 3 communicating with the robot R, and can be embodied by radio LAN base stations in conformity with, for example, IEEE 802.11b, IEEE 802.11g, or IEEE 802.11a.

In order to have the robot R execute a task based on task data input from the terminal 7 described later, the managing computer 3 generates an execution command signal including the content of the task and outputs to the robot R. This task data is data about a task which to have the robot R execute, and includes, for example, information about the requester and the delivery destination of an article to be carried, information about the destination of a visitor to be guided and the visitor, or the like.

The managing computer 3 can be embodied by, for example, a general-purpose PC (Personal Computer).

The storage 5 stores a radio environment map including map data of a movement area where the robot R moves (such as a floor map for each floor of a building) and a plurality of radio environment data concerning the radio environment in the movement area. This radio environment map is stored beforehand in the storage 5 and is read and transmitted by the managing computer 3 to the robot R. The contents of the radio environment map will be described later.

The storage 5 can be embodied by, for example, a hard disk device, an optical disk device, a semiconductor memory device, or the like.

The terminal 7 is an input device for inputting task data to the managing computer 3, and can be embodied by a laptop computer, a PHS (Personal Handyphone System) terminal, or the like. Also, the terminal 7 is a display device for converting a radio environment map received from the robot R to an easy-to-view format to display.

Note that the radio base unit 1, the managing computer 3, the storage 5, and the terminal 7 may not be connected via the network 4, but all or parts of them may be integrated.

The controller mounted part R5 comprises a movement controller 130, a radio communication unit 150, a main controller 230, a battery (not shown), and the like. The detected data of each sensor 61-63 is sent to each controller in the controller mounted part R5. Each electric motor is driven according to a drive instructing signal from the respective controller.

<Configuration of Mobile Robot>

Next, with reference to FIG. 39A, the configuration of the mobile robot will be described.

As shown in FIG. 39A, the mobile robot R has cameras C, a speaker S, a microphone MC, an image processor 110, a voice processor 120, a movement controller 130, a storage 140, a radio communication unit 150, and a main controller 230 as well as the legs R1, the torso R2, the arms R3, and the head R4 cited in the above embodiment.

The mobile robot R further has a gyro sensor SR1 detecting directions and a GPS (Global Positioning System) receiver SR2 detecting coordinates as position detecting unit for detecting its own position.

<Camera>

The cameras C are for taking in images in the form of digital data and are embodied by, for example, color CCD (Charge Coupled Device) cameras. The cameras C are arranged laterally in parallel, and the images picked up are output to the image processor 110. The cameras C are provided in the head R4.

<Speaker>

The speaker S is for outputting voice created by a voice synthesis section 121 described later. The speaker S is provided in the head R4.

<Image Processor>

The image processor 110 processes the images picked up by the cameras C and detects obstacles and persons in the surrounding area to find out the status of the surroundings of the robot R from the images.

The image processor 110 comprises a stereo processing section 111, a moving object extracting section 112, and a face recognizing section 113.

The stereo processing section 111 performs pattern matching using one of two images picked up by the left and right cameras C as a reference, calculates a parallax for each pixel between the left and right images to create a parallactic image, and outputs the created parallactic image and the original images to the moving object extracting section 112. The parallaxes indicate the distance from the robot R to the image-picked-up object.

The moving object extracting section 112 extracts a moving object from the picked-up images based on the data output from the stereo processing section 111. This is for detecting the person, assuming that a moving object is a person.

In order to extract the moving object, the moving object extracting section 112 stores several past frames of images, compares the newest frame and the past frames for pattern matching, and calculates the amount of movement for each pixel. Then, the moving object extracting section 112, assuming that a person exists in a region including a pixel having the large amount of movement within a predetermined distance from the cameras C in the parallactic image, extracts the part within the predetermined distance as an image of the moving object from the original image and outputs to the face recognizing section 113.

The face recognizing section 113 extracts parts in skin color from the extracted image of the moving object and, from their sizes and shapes, detects the position of the face. From the sizes and shapes of the parts in skin color, likewise, the positions of the hands can be detected.

The position of the face recognized is output to the main controller 230 as information for when the robot R moves and for communication with the person. Also, detecting a human or the position of the human (face) is output to the radio communication unit 150 and transmitted to the managing computer 3 via the radio base unit 1.

<Microphone>

The microphone MC is for collecting sound from the surroundings of the robot R. The collected sound is output as a voice signal to a voice recognition section 122 described later.

<Voice Processor>

The voice processor 120 has a voice synthesis section 121 and a voice recognition section 122.

The voice synthesis section 121, according to a speak instruction including information in characters decided and output by the main controller 230, creates voice data from the information in characters based on the beforehand-stored correspondence between voice data and information in characters and outputs to the speaker S.

The voice recognition section 122 has voice data inputted through the microphone MC, creates information in characters from the voice data based on the beforehand-stored correspondence between voice data and information in characters and outputs to the main controller 230.

<Movement controller>

The movement controller 130 drives and controls the legs R1, the torso R2, the arms R3, and the head R4 that are the drive structure of the mobile robot R and comprises a leg control section 131, a torso control section 132, an arm control section 133, and a head control section 134.

The leg control section 131 drives the leg R1 according to an instruction from the main controller 230; the torso control section 132 drives the torso R2 according to an instruction from the main controller 230; the arm control section 133 drives the arm R3 according to an instruction from the main controller 230; and the head control section 134 drives the head R4 according to an instruction from the main controller 230.

<Storage>

The storage (radio environment map storing unit and movement history storing unit) 140 is a storage device such as a hard disk device or a semiconductor memory and stores a radio environment map including map data of a movement area for the robot R and a plurality of radio environment data about the radio environment of the movement area. Further, the storage 140 stores a movement history (e.g., position coordinates on map data or the like) indicating movement paths of the mobile robot R.

The map data is information identifying the map of the movement area for the robot R and contains, for example, coordinates identifying the positions of the reception, entrance, meeting rooms, and the like present in a floor that is a movement area.

In the radio environment map, the map data is associated with comprehensive radio environment data made up of plural types of radio environment data concerning the radio environment. This comprehensive radio environment data is information indicating the degree of goodness of radio communication link environment.

With reference to FIG. 7, the comprehensive radio environment data will be described. FIG. 7 illustrates the contents of the comprehensive radio environment data.

As shown in FIG. 7, in the present embodiment, in order to evaluate the degree of goodness of the radio environment comprehensively, the radio intensity, noise floor, number of error times, number of retransmission times, and communication speed are used as radio environment data, and each radio environment data is weighted to calculate the comprehensive radio environment data.

The radio intensity, which best indicates the radio environment, is weighted with 80%. In the present embodiment, instead of the radio intensity data as it is, the ratio thereof to noise floor is used. That is, the radio intensity received by the mobile robot R of radio waves transmitted from the radio base unit 1 and the intensity of noise floor are quantified as percents of 1 to 100%. The 100% indicates the highest intensity. When radio intensity/noise floor>1, its contribution to the comprehensive radio environment data is set at (radio intensity/noise floor)×0.8. That is, the radio environment where the radio intensity is 100% and noise floor is 1% is the best with the contribution being at (100/1)×0.8=80%.

When radio intensity/noise floor≦1, the noise level is higher than the radio intensity (signal level), and its contribution to the comprehensive radio environment data is set at 0%, which indicates the radio environment being extremely bad.

The number of error times is weighted with 5%, and letting the maximum number of error times in a second be 1028, its contribution to the comprehensive radio environment data is set at (1−(number of error times/1028))×5%. That is, as the number of error times becomes closer to 0, the contribution becomes closer to 5% (the radio environment being good), and as the number of error times becomes closer to 1028, the contribution becomes closer to 0% (the radio environment being bad).

For the number of retransmission times, like for the number of error times, letting the maximum number of retransmission times in a second be 1028, its contribution to the comprehensive radio environment data is set at (1−(number of retransmission times/1028))×5%. That is, as the number of retransmission times becomes closer to 0, the contribution becomes closer to 5% (the radio environment being good), and as the number of retransmission times becomes closer to 1028, the contribution becomes closer to 0% (the radio environment being bad).

The communication speed is weighted with 10%, and its contribution to the comprehensive radio environment data is calculated with the use of a preset conversion table depending on the communication speed selected in the radio LAN adapter in use for radio communication.

In the "COMMUNICATION SPEED" section of FIG. 7, the conversion tables for a range of numbers {1, 2, 5.5, 11} [Mbps] and a range of numbers {6, 9, 12, 18, 24, 36, 48, 54} [Mbps] are set. The former is a conversion table for the case that a radio LAN adapter in compliance with IEEE 802.11b is used, and the latter is a conversion table for the case that a radio LAN adapter in compliance with IEEE 802.11g or IEEE 802.11a is used.

As communication with higher communication speed can be established, the radio environment is better, and a higher converted value is assigned.

Where communication in compliance with another standard or scheme is used, converted values corresponding to communication speeds need only be determined appropriately.

By adding the above four converted-into radio environment data, normalized comprehensive radio environment data of 100% to 0% is obtained.

By using the comprehensive radio environment data calculated in this way by weighting the radio environment data including data about the radio environment other than the radio intensity, the radio environment can be evaluated more appropriately. Especially, because the radio environment state with communication established can be evaluated with the number of error times or the number of retransmission times, the state where communication is becoming not feasible can be precisely determined.

Next, with reference to FIGS. 26A and 26B, a radio environment map having comprehensive radio environment data associated with map data will be described. FIG. 26A is a floor map showing an example of the map data visually and FIG. 26B is an example of the radio environment map having the comprehensive radio environment data associated with the map data.

In the example of FIG. 26A, in the map data of the movement area for the robot R, the positions of the reception, entrance, meeting rooms A-C, a radio base unit 1, i.e., a radio base station, and the like are mapped on a predetermined coordinate system.

In the example of FIG. 26B, a grid of predetermined intervals is set on the map data (a floor map) of FIG. 26A, and comprehensive radio environment data illustrated in FIG. 7 is associated with each grid point.

As such, by associating comprehensive radio environment data with the map data, the robot R can detect which place is good in radio environment.

Where a plurality of radio base units 1 exist, a map may be created which has a plurality of radio environment maps incorporated where a radio base unit 1 having a large comprehensive radio environment data value is selected for each position from the respective radio environment maps for the plurality of radio base units 1.

For example, where as shown in FIGS. 27A to 27C two radio base units 1 are provided, a map (radio base unit map shown in FIG. 27C) is created where each grid point is associated with a radio base unit 1 having a larger comprehensive radio environment data value from the radio environment map of radio base unit 1A shown in FIG. 27A and the radio environment map of radio base unit 1B shown in FIG. 27B. This radio base unit map is stored in the storage 140 as the radio environment maps are.

Where a plurality of radio base units 1 exist, the combination of a plurality of radio environment maps and the radio base unit map is called a radio environment map.

As such, where a plurality of radio base units 1 exist, the mobile robot R can select a radio base unit 1 in a good communication state.

Referring back to FIG. 39A, the configuration of the mobile robot R will continue to be described.

<Radio Communication Unit>

The radio communication unit 150 transmits and receives data (task commands, etc.) to and from to the managing computer 3 via a radio base unit 1.

With reference to FIG. 29, the configuration of the radio communication unit 150 will be described. FIG. 29 is a configuration diagram showing the configuration of the radio communication unit.

As shown in FIG. 29, the radio communication unit 150 comprises a radio interface section 151, a protocol control section 152, a radio environment detecting section 153, and an antenna 150a. The antenna 150a is provided in the head R4.

The radio interface section 151 performs physical conversion between data and radio waves, which are transmitted to and received from the managing computer 3 via the radio base unit 1 through the antenna 150a. Upon receipt, the radio interface section 151 converts radio waves received through the antenna 150a into data and outputs to the protocol control section 152. Further, the received radio waves are output to the radio intensity detecting section 153a of the radio environment detecting section 153.

In transmission, the radio interface section 151 has data inputted from the protocol control section 152, converts the data into radio waves, and transmits to the radio base unit 1 via the antenna 150a.

The protocol control section 152 performs data framing and arbitration for data communication between the managing computer 3 and the main controller 230 of the mobile robot R according to, for example, a LAN standard such as IEEE 802.3. Upon receipt, the protocol control section 152 selects data addressed to the robot R from data received from the managing computer 3 and converted by the radio interface section 151, extracts data from frames such as TCP/IP packets according to a predetermined communication protocol scheme such as TCP/IP (Transmission Control Protocol/Internet Protocol), and outputs the data to the main controller 230.

In transmission, the protocol control section 152 creates frames such as TCP/IP packets from data inputted from the main controller 230 according to the predetermined communication protocol scheme and outputs the frames to the radio interface section 151.

The number of error times in receipt, number of retransmission times in transmission, and communication speed in receipt and transmission in the protocol control section 152 are measured by the number of error times detecting section 153c, the number of retransmission times detecting section 153d, and the communication speed detecting section 153b respectively.

The radio interface section 151 and the protocol control section 152 can be embodied by a usual radio LAN adaptor.

The radio environment detecting section 153 detects the radio intensity of radio waves converted in the radio interface section 151 and noise floor by means of the radio intensity detecting section 153a, and the speed of communication with the radio base unit 1 (see FIG. 25) by means of the communication speed detecting section 153b. Further, the detecting section 153 measures the number of error times in receipt in the protocol control section 152 by means of the number of error times detecting section 153c and the number of data retransmission times in transmission in the protocol control section 152. Comprehensive radio environment data indicating the degree of goodness of radio environment is calculated from these measurements and output to the main controller 230.

By configuring the radio communication unit 150 in this way, the radio environment map stored in the storage 140 can be updated.

If the mobile robot R does not update the radio environment map, the radio environment detecting section 153 can be omitted from the configuration.

Referring back to FIG. 39A, the configuration of the mobile robot R will continue to be described.

<Main Controller [Controller]>

The main controller 230 is a control unit to control the operation of the entire mobile robot R and is constituted by a computer comprising a CPU (Central Processing Unit), a RAM (Random Access Memory), a ROM (Read Only Memory), and the like.

The main controller 230 analyzes task commands transmitted from the managing computer 3 and instructs the movement controller 130 to operate according to the task command, thereby having it execute a series of tasks autonomously. The main controller 230 records the positions that the mobile robot R moved to in executing the tasks into the storage 140.

Further, the main controller 230 monitors the radio environment state output from the radio communication unit 150 and when the radio environment state has degraded, controls the operation of restoring it.

Figure 39B:
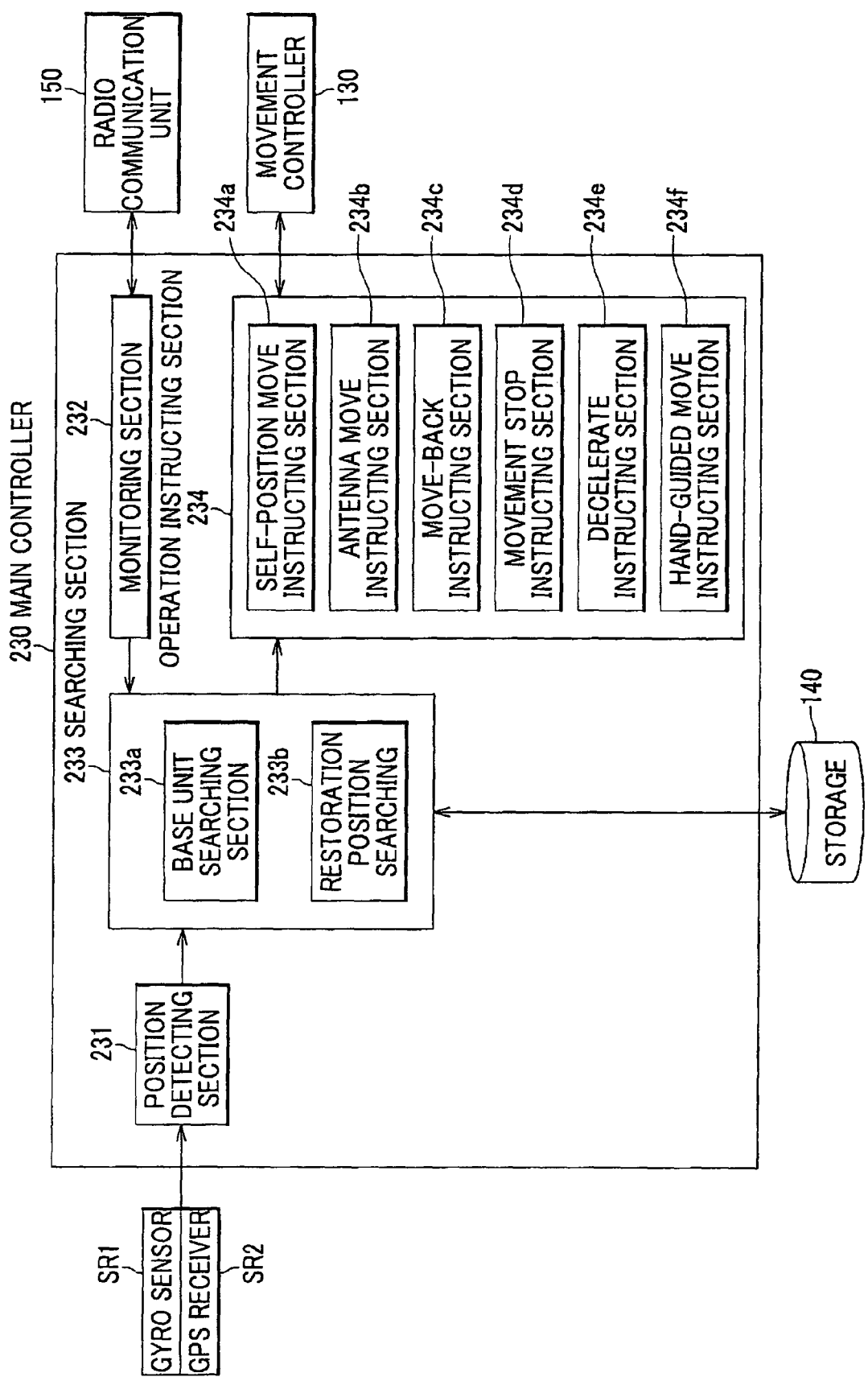
FIG. 39B is a block diagram showing the functional configuration of a main controller shown in FIG. 39A.

With reference to FIG. 39B, the configuration of the main controller 230 will be described. FIG. 39B is a block diagram showing the functional configuration of the main controller.

The configuration for achieving a function to restore it when radio communication was cut off will be described in the below.

As shown in FIG. 39B, the main controller 230 has a position detecting section 231, a monitoring section 232, a searching section 233, and an operation instructing section 234.

The position detecting section (position detecting unit) 231 detects its own position in the movement area. The position detecting section 231 obtains the direction and coordinates output from the gyro sensor SR1 and the GPS receiver SR2 and associates them with the map data to detect its current position and orientation. Position information indicating its own position detected in the position detecting section 231 is output to the searching section 233.

The monitoring section (monitoring unit) 232 monitors the radio environment for the radio communication unit 150. The monitoring section 232 determines whether the radio environment has degraded or whether communication is infeasible (cut off) based on the comprehensive radio environment data value output from the radio communication unit 150. For example, if the comprehensive radio environment data value is at or above 70%, the radio environment is determined to be in a good state; if at or above 50% but below 70%, in a degraded state where the radio environment has degraded; and if below 50%, in a cut-off state where the radio communication may be cut off. This monitoring result is output to the searching section 233.

These reference values (comprehensive radio environment data value) are an example, and the reference values will be raised, for example, if it is desired to raise accuracy in radio communication.

Note that the monitoring section 232 may determine the radio communication state with the use of radio intensity, the number of data error times, the number of retransmission times, or the like if the radio communication unit 150 does not calculate the comprehensive radio environment data.

The searching section (searching unit) 233 searches for a communication restoration position where radio communication link is feasible based on the radio environment map stored in the storage 140 if the monitoring section 232 determines that radio communication is cut off. The searching section 233 comprises a base unit searching section 233a and a communication restoration position searching section 233b.

The base unit searching section (base unit searching unit) 233a searches for a radio base unit located within a predetermined distance from the position of the mobile robot R based on the radio environment map. To be specific, the base unit searching section 233a refers to the radio environment map (specifically the radio base unit map of FIG. 27C) stored in the storage 140 and searches for a radio base unit located within a predetermined distance (e.g., 20 m) from its own position detected by the position detecting section 231. The type (1A or 1B) of the radio base unit found is output to the communication restoration position searching section 233b. If a plurality of radio base units exist within the predetermined distance, a list of the radio base units is output to the communication restoration position searching section 233b.

The communication restoration position searching section (communication restoration position searching unit) 233b selects one from the radio base units found by the base unit searching section 233a in the order of from the closest to its own position and searches for a position where the comprehensive radio environment data for the radio base unit satisfies a predetermined reference condition and which is closest to its own position. To be specific, the communication restoration position searching section 233b refers to the radio environment map stored in the storage 140, selects a radio base unit in the order of from the closest to its own position, and searches for a position where the comprehensive radio environment data (see FIG. 7) for the selected radio base unit is at or above a predetermined value (e.g., 70%) and which is closest to its own position detected by the position detecting section 231. The position found by the communication restoration position searching section 233b is output as a communication restoration position to the operation instructing section 234.

The operation instructing section 234 notifies an instruction to perform a predetermined operation to the movement controller 130. The operation instructing section 234 may have the voice synthesis section 121 of the voice processor 120 speak the operation content when performing the predetermined operation.

The operation instructing section 234 comprises a self-position move instructing section 234a, an antenna move instructing section 234b, a move-back instructing section 234c, a movement stop instructing section 234d, a decelerate instructing section 234e, and a hand-guided move instructing section 234f.

The self-position move instructing section (self-position move instructing unit) 234a instructs the movement controller 130 to control the mobile robot R to move to the communication restoration position found by the searching section 233. According to an instruction from self-position move instructing section 234a, the movement controller 130 drives the legs R1, etc., for the mobile robot R to move to the communication restoration position. As such, the self-position move instructing section 234a has the mobile robot R move to the communication restoration position found from the radio environment map, thereby enabling restoring radio communication.

The antenna move instructing section (antenna move instructing unit) 234b instructs the movement controller 130 to perform predetermined operation to change the position or direction of the antenna 150a. The antenna move instructing section 234b changes the position or direction of the antenna 150a thereby changing the radio environment such as radio intensity. In this way, the antenna move instructing section 234b is one of the units which attempts to restore radio communication when it is cut off. The main controller 230 starts the antenna move instructing section 234b when the searching section 233 could not find a communication restoration position, i.e., when the searching section 233 detects a failure in finding a communication restoration position.

Next, with reference to FIGS. 40A to 40D, examples where the position or direction of the antenna 150a is changed will be described. FIGS. 40A to 40D show the examples of the operation of changing the position or direction of the antenna. In FIGS. 40A to 40D, for visualizing the state of the antenna 150a, the antenna 150a is seen to be on the top of the mobile robot R, but the antenna 150a may be incorporated in the head or provided in another place.

Figure 40A:
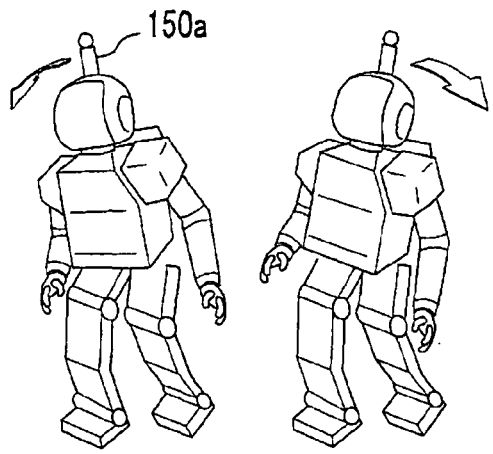
FIGS. 40A to 40D are schematic views showing examples of the operation of the mobile robot changing the position or direction of its antenna.
Figure 40B:
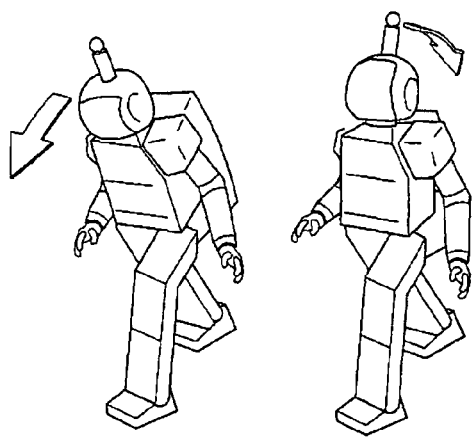

For example, as shown in FIG. 40A, the mobile robot R swings the head (or the entire body) to the left and right to search for a position where the radio environment is good in an attempt to restore radio communication. In another example as shown in FIG. 40B, the mobile robot R swings the head up and down (or the entire body to the front and back) to search for a position in the front or back where the radio environment is good in an attempt to restore radio communication.

Figure 40C:
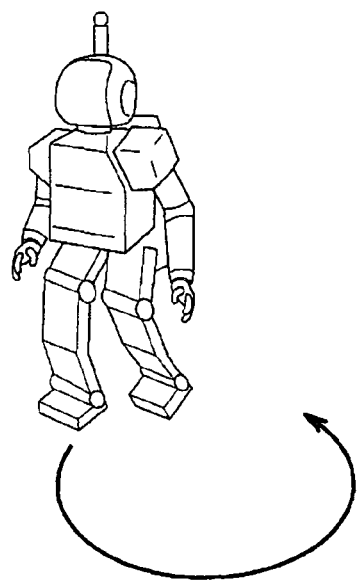
Figure 40D:
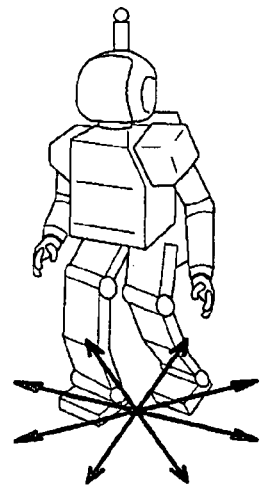

In yet another example as shown in FIG. 40C, the mobile robot R turns through 360 degrees at the current position to search for a direction of the antenna 150a where the radio environment is good in an attempt to restore radio communication. In still another example as shown in FIG. 40D, the mobile robot R moves a step in each of eight directions, to the front and back, to the left and right, and obliquely to the front and back from the current position, to search for a position near it where the radio environment is good in an attempt to restore radio communication.

Referring back to FIG. 39B, the configuration of the main controller 230 will continue to be described.

The move-back instructing section (move-back instructing unit) 234c instructs the movement controller 130 to control to move back on the movement path by a predetermined amount of movement based on the movement history stored in the storage 140. The move-back instructing section 234c, referring to the movement history of the mobile robot R, has the mobile robot R move back the way it has come by, e.g., 1 m from the current position. As such, when radio communication is cut off, the move-back instructing section 234c has the robot R move back the way it has come, thereby increasing the probability of restoring radio communication.

The movement stop instructing section (movement stop instructing unit) 234d instructs the movement controller 130 to control to stop moving when the searching section 233 could not find a communication restoration position. The main controller 230 starts the movement stop instructing section 234d when communication could not be restored even with the antenna move instructing section 234b and the move-back instructing section 234c.

The decelerate instructing section (decelerate instructing unit) 234e instructs the movement controller 130 to decelerate movement speed when the radio environment state being monitored by the monitoring section 232 has degraded below a predetermined reference.

Figure 41:
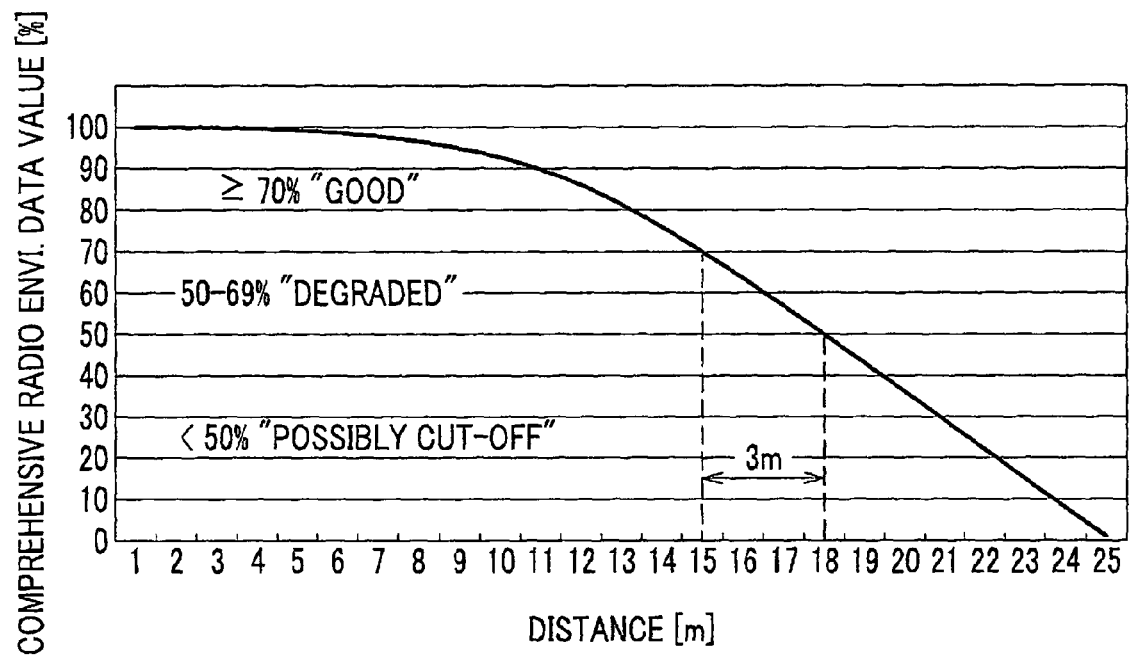
FIG. 41 is a chart showing a relationship between the distance from a radio base unit and the comprehensive radio environment data value.

Next, with reference to FIG. 41 (and FIG. 39B as needed), an example of the decelerate instructing section 234e decelerating movement speed will be described. FIG. 41 is a chart showing a relationship between the distance from a radio base unit and the comprehensive radio environment data value. In FIG. 41, the horizontal axis represents the distance [m] from a radio base unit, and the vertical axis represents the comprehensive radio environment data value [%]. This graph is an example and changes depending on the type of radio base unit used or the like.

As shown in FIG. 41, the decelerate instructing section 234e classifies radio environments into three category of state for management: "good", "degraded", and "cut-off (possibly)". The "good" refers to a stable state where radio communication is in normal operation; "degraded" refers to a state where radio communication is in normal operation while the comprehensive radio environment data value is degrading; and "cut-off (possibly)" refers to a state where the comprehensive radio environment data value has degraded and radio communication may be cut off.

For example, if the mobile robot R moves away from a radio base unit, the state may shift from "good" to "degraded" to "cut-off (possibly)". In this case, if being able to link to the radio base unit again before the radio environment becomes "cut-off (possibly)", the mobile robot R can notify it to the managing computer 3. To this end, the time required to re-link need only be secured between the "degraded" state and the "cut-off (possibly)" state.

In FIG. 41, the distance in transition from "good" to "degraded" (the comprehensive radio environment data value being below 70%) to "cut-off (possibly)" (below 50%) is about 3 m. Let the time required to re-link to the radio base unit be at a maximum of 10 sec, then the robot need only move this distance of 3 m in 10 sec.

That is, the decelerate instructing section 234e instructs the movement controller 130 to control to move at 1.08 km per hour.

By this means, the rate of radio communication being cut off can be reduced.

Referring back to FIG. 39B, the configuration of the main controller 230 will continue to be described.

The hand-guided move instructing section (hand-guided move instructing unit) 234f cooperates with the movement controller 130 to have the mobile robot R move in the direction in which a person guides. By this means, the mobile robot R shifts into a "guided-by-hand mode" where it is guided by a person.

To be specific, the hand-guided move instructing section 234f, as shown in FIG. 12, allows a person HB to move the mobile robot R to a position where radio communication is feasible by guiding the mobile robot R by its hand (hand 71R at the end of the arm R3).

The robot R of the present embodiment can move (walk or run) by driving and controlling the electric motor of each joint of the legs R1 as shown in FIG. 4 and can stretch out a hand to the person HB or hold the person HB's hand by driving and controlling the electric motor of each joint of the arms R3. The hand 71R(L) at the end of the arm R3 and the six-axis force sensor 62R(L) (movement detecting unit) provided in between wrist joints 36R(L), 37R(L) can detect three directional components Fx, Fy, Fz of the reaction which acts on the hand 71R(L) of the mobile robot R and three directional components Mx, My, Mz of moment.

The three directional components Fx, Fy, Fz of the reaction detected by the six-axis force sensor 62R are transmitted to the arm control section 133 of the movement controller 130, which determines the direction and magnitude of the force with which the person HB leads the robot by its hand 71R based on the three directional components Fx, Fy, Fz of the reaction as shown in FIG. 12 and transmits them to the hand-guided move instructing section 234f of the main controller 230. Then, the hand-guided move instructing section 234f determines the direction and speed of movement based on the direction and magnitude of the force with which the person HB leads the robot by its hand 71R and transmits them to the leg control section 131. The leg control section 131 drives and controls each joint of the legs R1 according to the direction and speed to move from the hand-guided move instructing section 234f, and thereby the robot R can move with the person HB leading it by its hand.

The main controller 230, after stopping the mobile robot R moving by the movement stop instructing section 234d, starts the hand-guided move instructing section 234f to instruct the robot R to shift into the "guided-by-hand mode" when communication could not be restored even with the self-position move instructing section 234a, the antenna move instructing section 234b and the move-back instructing section 234c. Note that switching unit such as a switch (not shown) may be provided so as to set only the hand-guided move instructing section 234f of the operation instructing section 234 to operate without performing autonomous radio restoration.

While the functional configuration of the main controller 230 has been described in the above, the main controller 230 may be embodied by a computer having a control program achieve the function of each of the above units or sections.

[Operation of Mobile Robot]

Next, the operation of the mobile robot R will be described. The operation of the mobile robot monitoring the radio environment and restoring radio communication will be described.

<Overall Operation>

Figure 42:
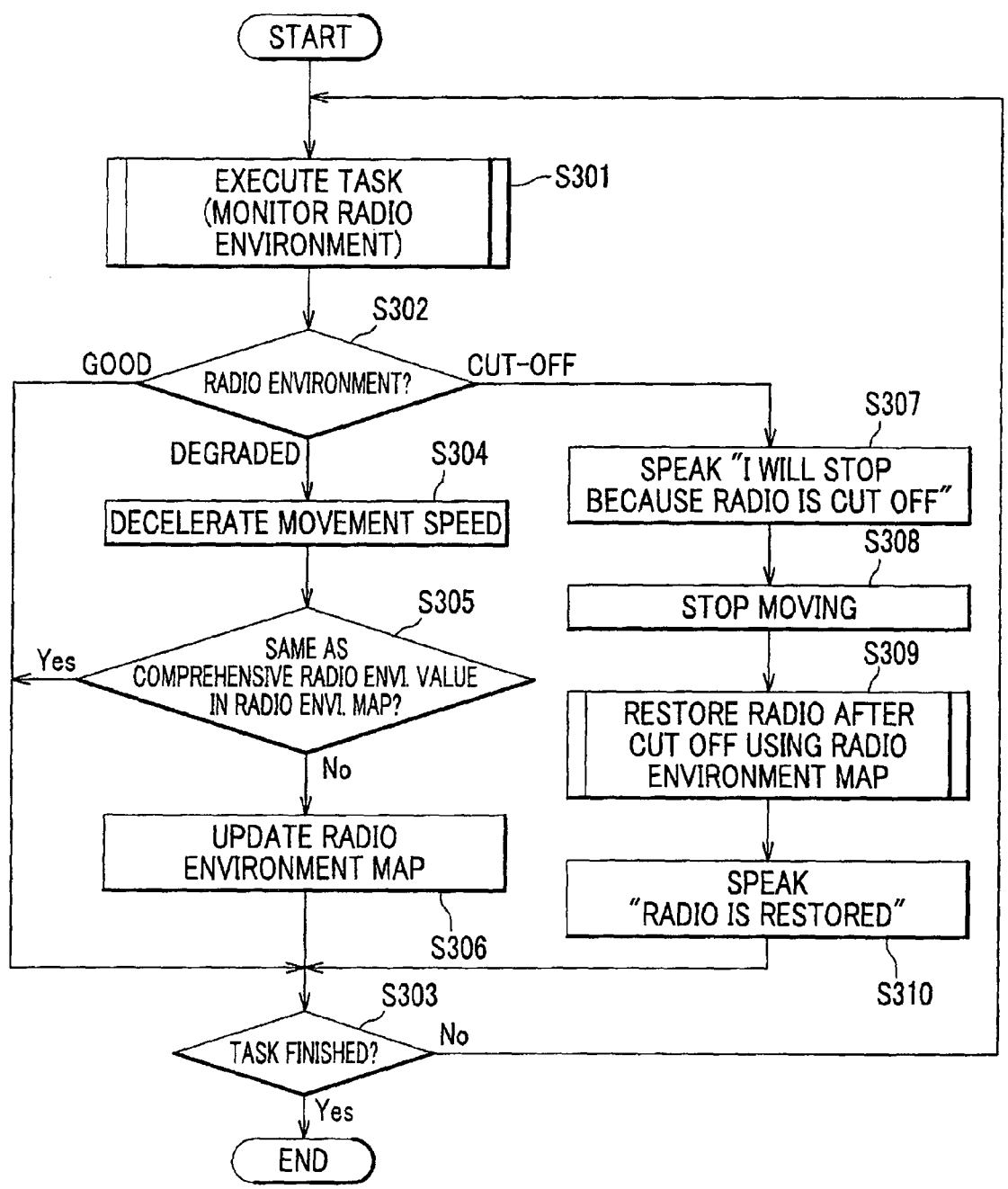
FIG. 42 is a flowchart showing the overall operation of the mobile robot due to change in the radio environment according to the third embodiment of the present invention.

First, with reference to FIG. 42 (and FIGS. 25, 39B as needed), the overall operation of the mobile robot R due to change in the radio environment will be described. FIG. 42 is a flowchart showing the overall operation of the mobile robot R due to change in the radio environment.

First, the mobile robot R receives, by the radio communication unit 150, a task command transmitted via the radio base unit 1 from the managing computer 3, and the main controller 230 drives the legs R1, etc., via the movement controller 130 according to the task command, thereby executing a series of tasks. During the execution of the tasks, the mobile robot R detects by the position detecting section 231 of the main controller 230 its own position, stores a movement history into the storage 140, and monitors the radio environment through the radio communication unit 150 by the monitoring section 232 (step S301).

Then, the mobile robot R determines the state of the radio environment by the monitoring section 232 (step S302). If determined to be "good", it is determined whether the task operation is complete (step S303). If the task is complete (Yes at step S303), the mobile robot R ends operation, and if not complete (No at step S303), after returning to step S301, continues operation.

In contrast, if determined to be "degraded", the decelerate instructing section 234e of the main controller 230 instructs the movement controller 130 to decelerate the movement speed of the mobile robot R (step S304).

The mobile robot R determines whether the comprehensive radio environment data value calculated by the radio communication unit 150 is the same as the comprehensive radio environment data value for the current position in the radio environment map by the monitoring section 232 (step S305) and, if different (No at step S305), updates the radio environment map (step S306).

At this time, the mobile robot R may notify the managing computer 3 of having decelerated.

Thereafter, or if the comprehensive radio environment data value calculated by the radio communication unit 150 is the same as the one in the radio environment map (Yes at step S305), the mobile robot R executes step S303.

If determined to be "cut-off" at step S302, the mobile robot R speaks, e.g., "I will stop because radio is cut off," by the voice synthesis section 121 (step S307) and has the movement stop instructing section 234d instruct the movement controller 130 to stop and thereby stops moving (walking) (step S308).

The mobile robot R performs the restoring of the radio after cut off using the radio environment map (step S309). The restoring of the radio after cut off using the radio environment map will be described later with reference to FIG. 43.

Then, the mobile robot R speaks, e.g., "Radio is restored," by the voice synthesis section 121 (step S310).

At this time, the mobile robot R may notify the managing computer 3 of radio having been restored. Thereafter, the process proceeds to step S303.

By the above operation, if moving to a position where the radio environment is degraded during the execution of task operation, the mobile robot R can move to a position where radio communication is feasible as needed.

<Restoring of Radio after Cut Off Using Radio Environment Map>

Figure 43:
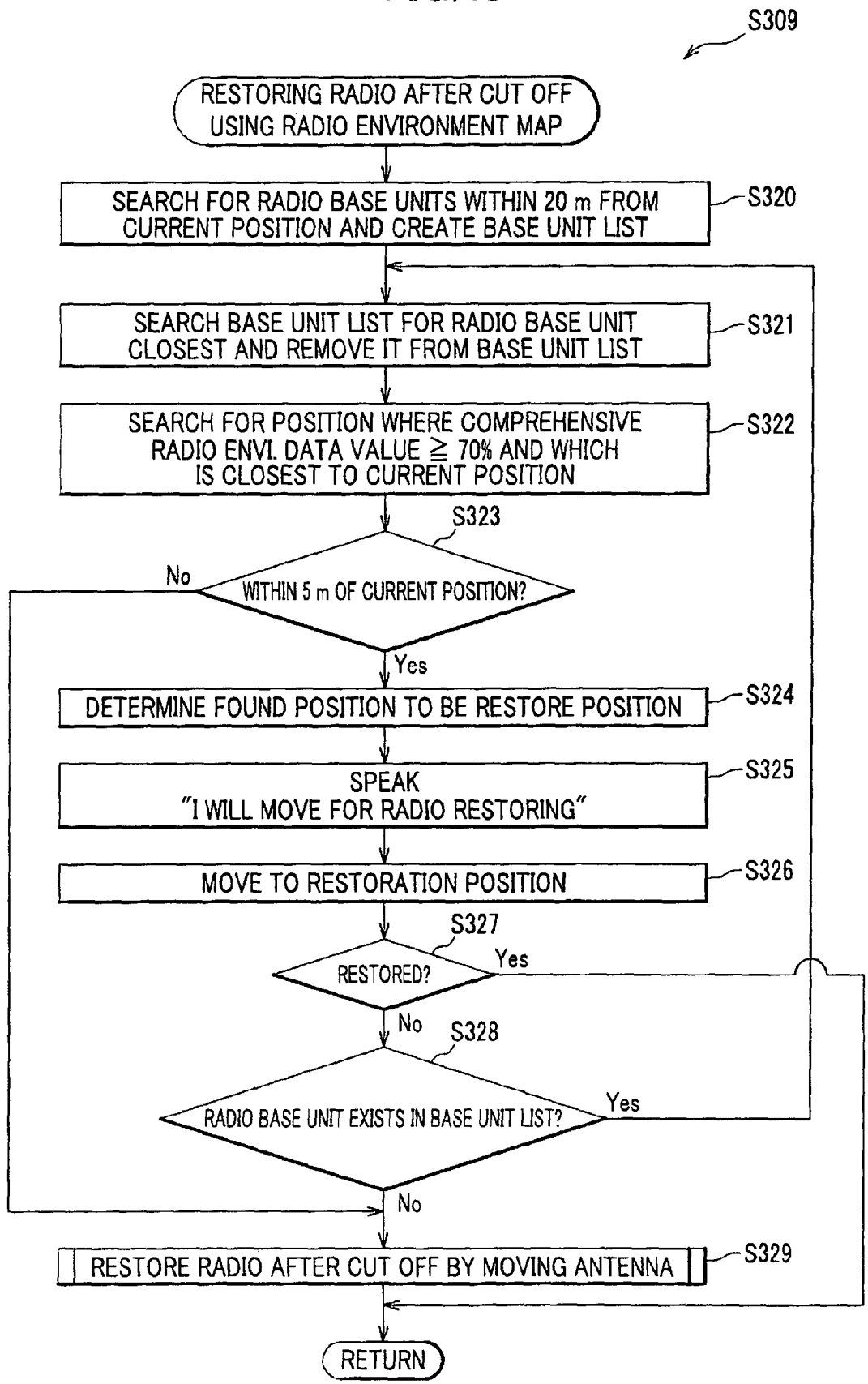
FIG. 43 is a flowchart showing the restoring of radio communication after cut off using the radio environment map by the mobile robot according to the third embodiment of the present invention.

Next, with reference to FIG. 43, the mobile robot R restoring the radio after cut off using the radio environment map will be described. FIG. 43 is a flowchart showing the restoring of radio communication after cut off using the radio environment map by the mobile robot R according to the embodiment of the present invention. This restoring corresponds to the operation in step S309 of FIG. 42.

First, the mobile robot R searches for radio base units within a predetermined distance (e.g., 20 m) from the position of the mobile robot R by the base unit searching section 233a of the searching section 233 and creates a base unit list (step S320).

Then, the mobile robot R searches for a communication restoration position for which the radio environment for a radio base unit found at step S320 satisfies a predetermined reference condition and which is closest thereto by the communication restoration position searching section 233b.

To be specific, the mobile robot R searches the base unit list for the radio base unit which is closest to the mobile robot R by the communication restoration position searching section 233b (step S321) and removes the radio base unit from the base unit list so as not to be searched for later.

Thereafter, the mobile robot R, referring to the radio environment map for the radio base unit found at step S321, searches for a position where the comprehensive radio environment data value is at or above a predetermined value (e.g., 70%) and which is closest to the current position of the mobile robot R by the communication restoration position searching section 233b (step S322).

Further, the mobile robot R determines whether the position found at step S322 is within a predetermined distance (e.g., 5 m) from the current position of the mobile robot R by the communication restoration position searching section 233b (step S323).

If the position found is farther than the predetermined distance (No at step S323), the mobile robot R determines that the restoring of radio after cut off using the radio environment map is not possible, and the process proceeds to step S329.

On the other hand, if the position found is within the predetermined distance (Yes at step S323), the mobile robot R determines the found position to be a communication restoration position for radio communication (step S324).

Thereafter, the mobile robot R speaks, e.g., "I will move for radio restoring," by the voice synthesis section 121 (step S325) and has the self-position move instructing section 234a instruct the movement controller 130 to control to move to the communication restoration position, thereby moving (walking) to the communication restoration position (step S326).

Then, the mobile robot R determines whether the radio environment is restored from being cut off (step S327). If restored from being cut off (Yes at step S327), the mobile robot R ends the restoring of radio after cut off and executes step S310 (see FIG. 42).

In contrast, if not restored from being cut off (No at step S327), the mobile robot R searches the base unit list for a radio base unit to be checked by the communication restoration position searching section 233b (step S328). If a radio base unit to be checked exists (the base unit list being not empty) (Yes at step S328), after returning to step S321, the mobile robot R continues operation.

On the other hand, if a radio base unit to be checked does not exist (the base unit list being empty) (No at step S328), the mobile robot R determines that the restoring of radio after cut off using the radio environment map is not possible and attempts to restore by changing the position or direction of the antenna (the restoring of radio after cut off by moving the antenna) (step S329). The restoring of radio after cut off by moving the antenna will be described later with reference to FIG. 44.

As described above, the mobile robot R can autonomously move to a position where radio communication is feasible using the radio environment map even when the radio environment has degraded thus not being able to receive task commands from the managing computer 3.

<Restoring of Radio after Cut Off by Moving Antenna>

Figure 44:
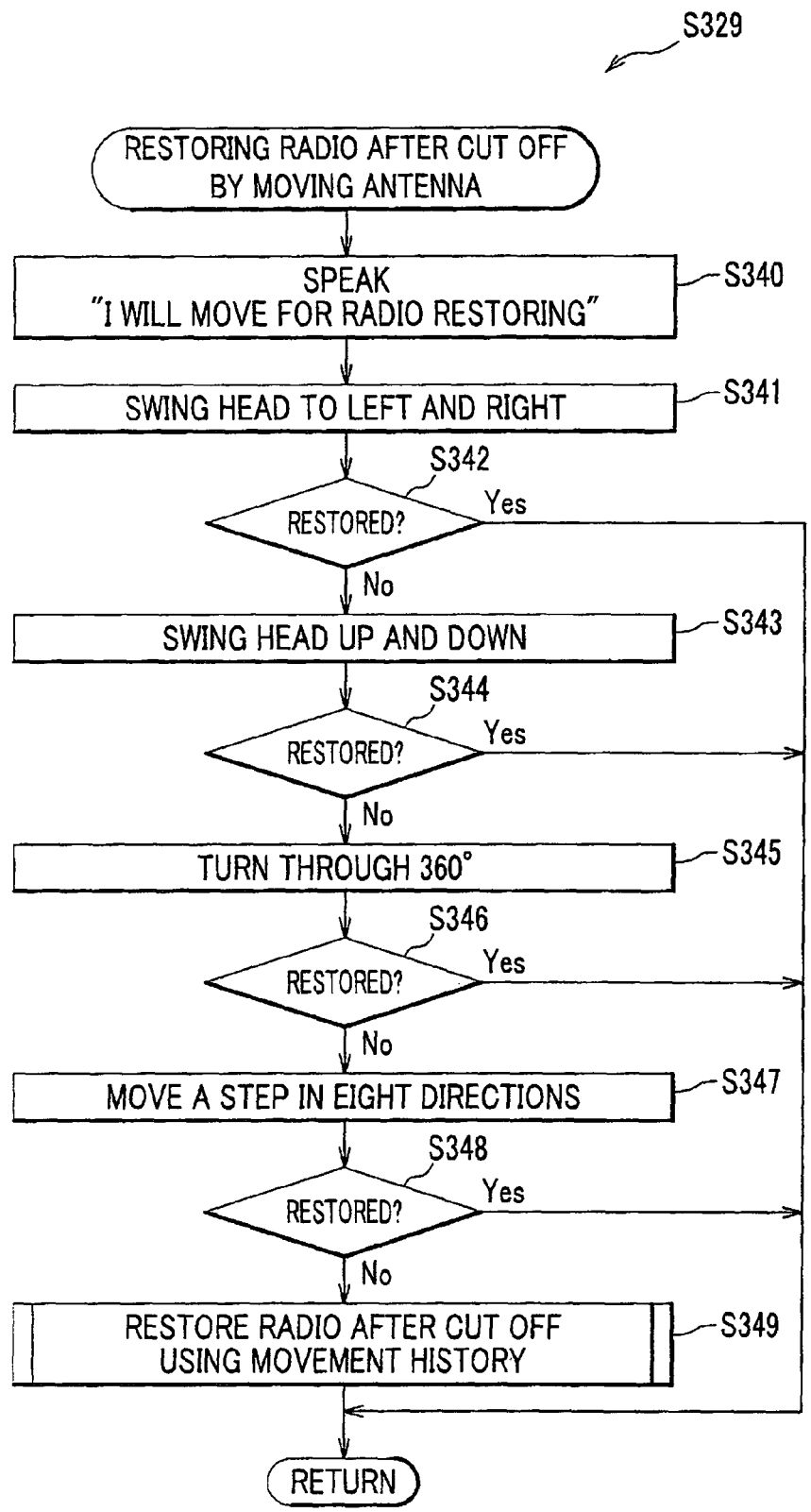
FIG. 44 is a flowchart showing the restoring of radio communication after cut off through moving the antenna by the mobile robot according to the third embodiment of the present invention.

Next, with reference to FIG. 44, the mobile robot R restoring the radio after cut off by moving the antenna 150a will be described. FIG. 44 is a flowchart showing the restoring of radio communication after cut off through moving the antenna 150a by the mobile robot R according to the embodiment of the present invention. This restoring corresponds to the operation in step S329 of FIG. 43.

First, in order to inform the surroundings of moving the antenna 150a, the mobile robot R speaks, e.g., "I will move for radio restoring," by the voice synthesis section 121 (step S340).

Then, the antenna move instructing section 234b instructs the movement controller 130 to swing the head provided with the antenna 150a to the left and right, thereby swinging the head of the mobile robot R to the left and right (step S341). The monitoring section 232 determines whether the radio environment is restored from being cut off (step S342), for each of when the head is swung to the left and when swung to the right.

At this stage, if restored from being cut off (Yes at step S342), the mobile robot R ends the restoring of radio after cut off.

In contrast, if not restored from being cut off (No at step S342), the antenna move instructing section 234b instructs the movement controller 130 to swing the head up and down, thereby swinging the head of the mobile robot R up and down (step S343). The monitoring section 232 determines whether the radio environment is restored from being cut off (step S344), for each of when the head is swung up and when swung down.

At this stage, if restored from being cut off (Yes at step S344), the mobile robot R ends the restoring of radio after cut off.

In contrast, if not restored from being cut off (No at step S344), the antenna move instructing section 234b instructs the movement controller 130 to control to turn through 360 degrees at the current position, thereby having the mobile robot R turn (step S345). The monitoring section 232 determines whether the radio environment is restored from being cut off (step S346) at predetermined time intervals while the mobile robot R is turning.

At this stage, if restored from being cut off (Yes at step S346), the mobile robot R ends the restoring of radio after cut off.

In contrast, if not restored from being cut off (No at step S346), the antenna move instructing section 234b instructs the movement controller 130 to control to move a step in each of eight directions, to the front and back, to the left and right, and obliquely to the front and back from the current position, thereby having the mobile robot R move a step in each of the eight directions (step S347). The monitoring section 232 determines whether the radio environment is restored from being cut off (step S348), for each step move.

At this stage, if restored from being cut off (Yes at step S348), the mobile robot R ends the restoring of radio after cut off.

In contrast, if not restored from being cut off (No at step S348), the mobile robot R determines that the restoring of radio after cut off by moving the antenna 150a is not possible and attempts to restore by moving back the way it has come according to the movement history (the restoring of radio after cut off using the movement history) (step S349). The restoring of radio after cut off using the movement history will be described later with reference to FIG. 45.

When restored by the above operation, the mobile robot R desirably notifies that to the managing computer 3 and waits for the next task command.

As described above, the mobile robot R can attempt to restore radio communication by moving the antenna 150a, which is complementary to the restoring of radio after cut off using the radio environment map.

<Restoring of Radio after Cut Off Using Movement History>

Figure 45:
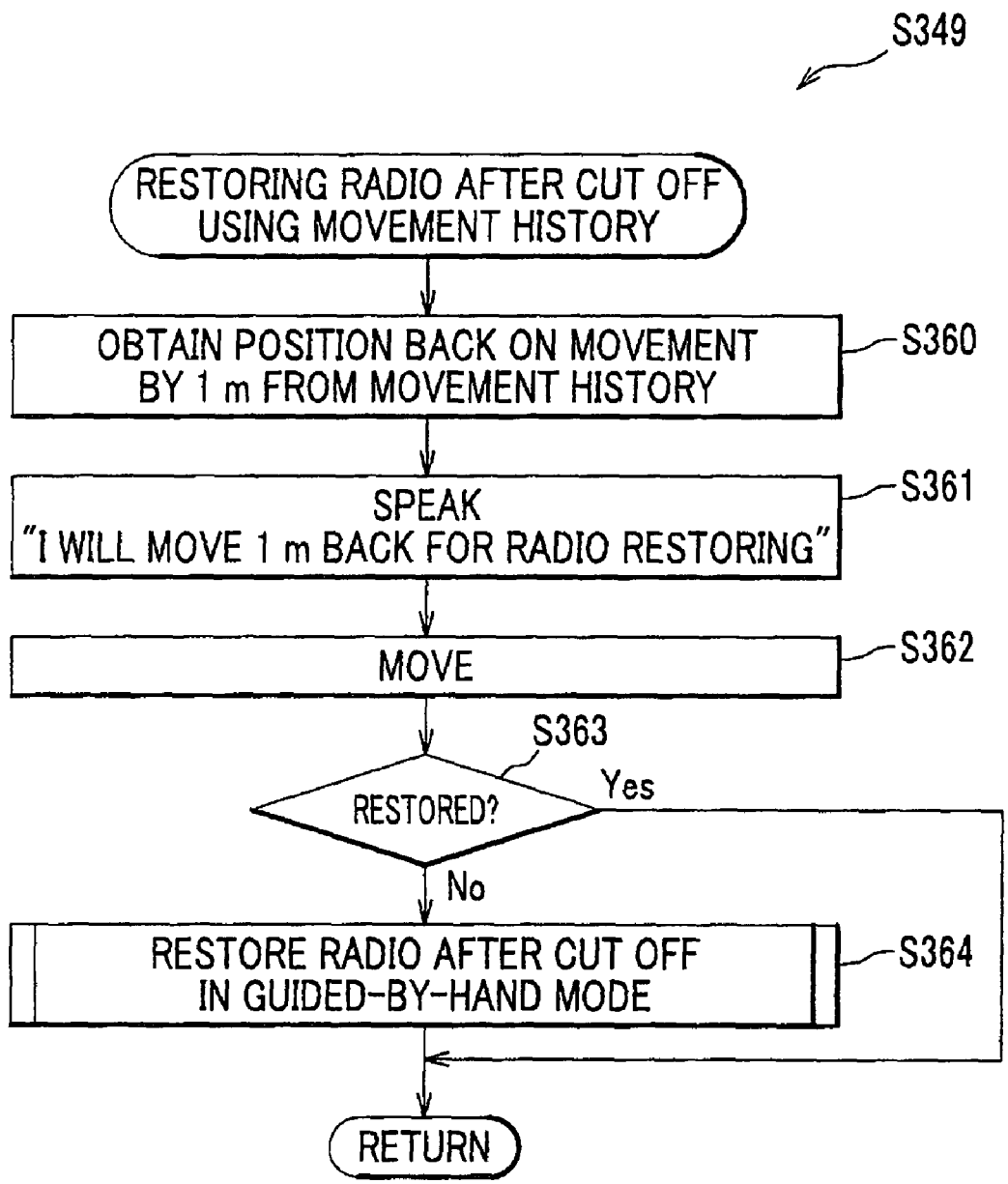
FIG. 45 is a flowchart showing the restoring of radio communication after cut off using a movement history by the mobile robot according to the third embodiment of the present invention.

Next, with reference to FIG. 45, the mobile robot R restoring the radio after cut off using the movement history will be described. FIG. 45 is a flowchart showing the restoring of radio communication after cut off using the movement history by the mobile robot R according to the embodiment of the present invention. This restoring corresponds to the operation in step S349 of FIG. 44.

First, the mobile robot R obtains, by the move-back instructing section 234c, the position back on the movement path by a predetermined amount of movement (e.g., 1 m) based on the movement history stored in the storage 140 (step S360).

Then, in order to inform the surroundings of moving back on the movement path, the mobile robot R speaks, e.g., "I will move 1 m back for radio restoring," by the voice synthesis section 121 (step S361).

The move-back instructing section 234c instructs the movement controller 130 to control to move to the position obtained at step S360, thereby having the mobile robot R move back to the position on the movement path (step S362).

Thereafter, the monitoring section 232 determines whether the radio environment is restored from being cut off (step S363).

If restored from being cut off (Yes at step S363), the mobile robot R ends the restoring of radio after cut off. On the other hand, if not restored from being cut off (No at step S363), the mobile robot R determines that the restoring of radio after cut off is not possible even by moving back on the movement path using the movement history and returns to a position to be restorable at by a person guiding it (the restoring of radio after cut off in the guided-by-hand mode) (step S364). The restoring of radio after cut off in the guided-by-hand mode will be described later with reference to FIG. 46.

When restored by the above operation, the mobile robot R desirably notifies that to the managing computer 3 and waits for the next task command.

As described above, the mobile robot R can attempt to restore radio communication by moving back on the movement path, which is complementary to the restoring of radio after cut off using the radio environment map.

<Restoring of Radio after Cut Off in Guided-by-Hand Mode>

Figure 46:
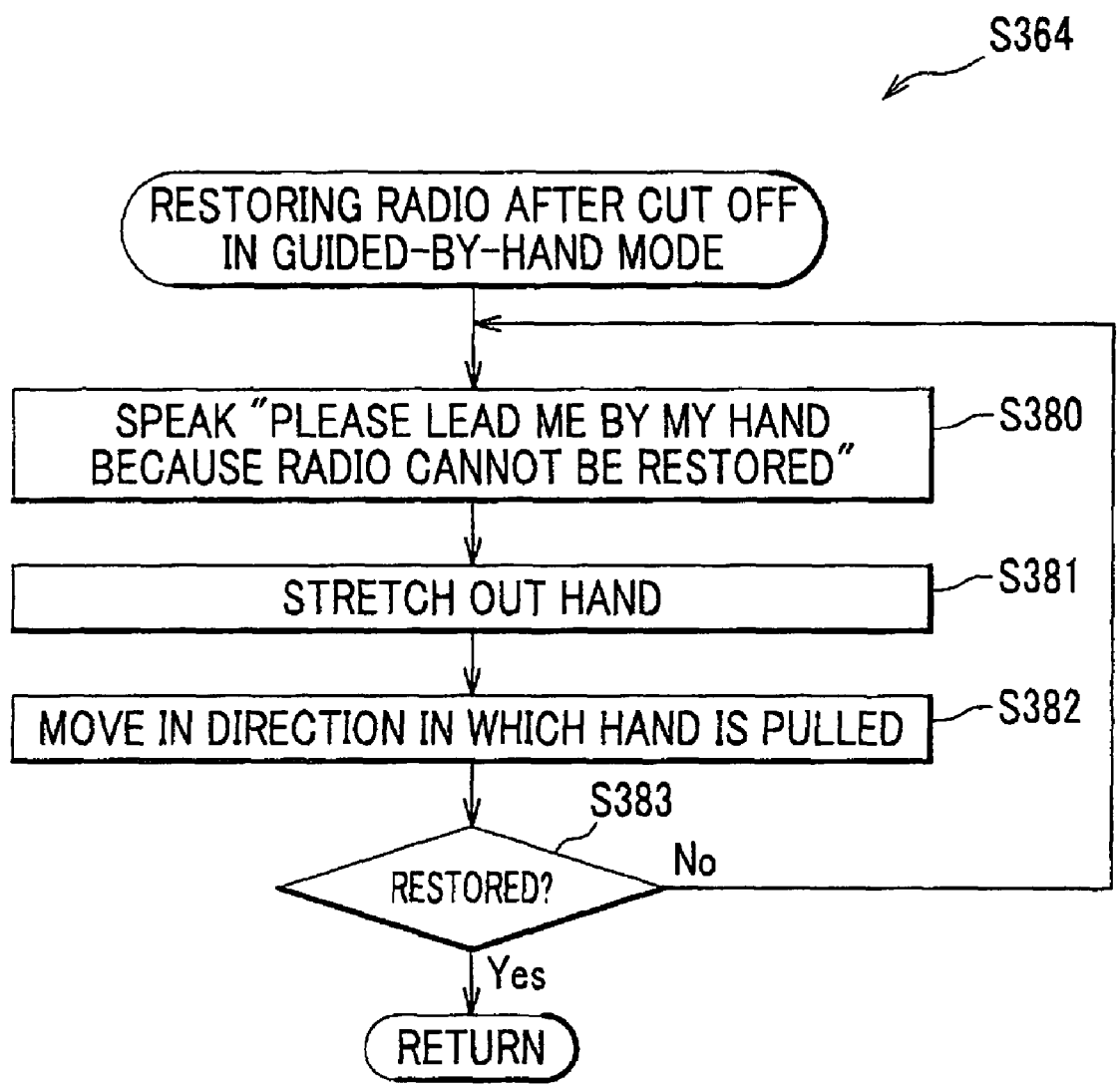
FIG. 46 is a flowchart showing the restoring of radio communication after cut off by the mobile robot being guided through its hand according to the third embodiment of the present invention.

Next, with reference to FIG. 46, the mobile robot R returning to a position to be restorable at by a person guiding it will be described. FIG. 46 is a flowchart showing the restoring of radio communication after cut off by the mobile robot R being guided by its hand according to the embodiment of the present invention. This restoring corresponds to the operation in step S364 of FIG. 45.

First, in order to inform the surroundings of being unable to restore radio, the mobile robot R speaks, e.g., "Please lead me by my hand because radio cannot be restored," by the voice synthesis section 121 (step S380).

The hand-guided move instructing section 234f instructs the movement controller 130 to control the mobile robot R to stretch out its hand (hand 71R at the end of the arm R3) forward, thereby having the mobile robot R stretch out the hand forward (step S381).

Thereafter, the mobile robot R determines the direction and speed of movement based on the direction and magnitude of the force with which a person leads the robot by its hand and moves accordingly by the movement controller 130 (step S382).

Thereafter, the monitoring section 232 determines whether the radio environment is restored from being cut off (step S383).

If restored from being cut off (Yes at step S383), the mobile robot R ends the restoring of radio after cut off. On the other hand, if not restored from being cut off (No at step S383), after returning to step S380, the mobile robot R continues operation.

As described above, the mobile robot R can restore radio communication by being assisted in movement by a person. As such, the mobile robot R can move by movement means such as the legs of itself. Hence, with only one person's assist, the mobile robot R can move to a position where radio communication is feasible.

Note that a switch (not shown) provided in the mobile robot R may switch the mobile robot R from any state to performing the restoring of radio after cut off in the guided-by-hand mode. In this case, when being switched into the guided-by-hand mode, at the step S380 the mobile robot R speaks, e.g., "Switch was pushed. Please lead me by my hand." Later operation is the same as steps S381-S383.

By this means, in an emergency, a person can take the mobile robot R to any position without waiting for its action.

As described above, the mobile robot R can move to a place where radio communication can be restored appropriately when having moved to a place where radio communication is cut off.

The present invention is not limited to this embodiment. In this embodiment, when radio communication cannot be restored even if having moved to a communication restoration position referring to the radio environment map, the mobile robot R performs sequentially the movement of the antenna, moving back based on the movement history, and moving in the guided-by-hand mode, but that order can be changed or some may be omitted.

Further, herein, a bipedal mobile robot moving on legs has been described as an example of the mobile robot R, but not being limited to the legs, its movement mechanism may be a mechanism equivalent to legs such as wheels, caterpillar tracks, or the like.

FOURTH EMBODIMENT

Next, a mobile robot of a fourth embodiment will be described with reference to the drawings. The basic structure of the mobile robot of the fourth embodiment is the same as that of the mobile robots of the first to third embodiments, and differences from the latter will be mainly described. First, the entire configuration of a guide system including the controller of a robot according to the present invention will be described with reference to FIG. 47.

[Configuration of Guide System]

FIG. 47 is a configuration diagram of a guide system including the controller of a robot according to the embodiment of the present invention. As shown in FIG. 47, the guide system A comprises a robot R; a radio base station 1 linked to the robot R by radio communication; a managing computer 3 connected to the radio base station 1 via an exclusive-to-robot network 2; and a terminal 5 connected to the managing computer 3 via a network 4.

In this embodiment, an autonomously moving bipedal walking robot will be described by way of example. The robot R comprises a head R1, arms R2, legs R3, a torso R4, and a back container R5. The head R1, arms R2, and legs R3 are each driven by an actuator and are controlled by an autonomous movement controller 50 (see FIG. 50) for bipedal walking. The details of the bipedal walking are disclosed in, for example, Japanese Patent Application Laid-Open Publication No. 2001-62760.

This robot R guides a person HB in a predetermined guide area (a movement area such as an office or a corridor). The robot R emits light (such as infrared, ultraviolet, laser light, or the like) and radio waves to all around, detects whether a person HB with a tag T exists in the surrounding area, identifies the position of the detected person HB to approach him/her, and identifies who the person HB is based on the tag T. This tag T receives infrared and radio waves emitted by the robot R to identify the position (distance and direction) of the person and creates a receipt reporting signal containing a tag identification number based on a light-receiving direction indicating signal contained in the received infrared and robot ID contained in the received radio waves and returns the signal to the robot R. When receiving this receipt reporting signal, the robot R can detect the distance and direction of the person HB with the tag T based on the receipt reporting signal and approach the person HB.

When autonomously moving in a guide area to execute a task (such as a guide task or a delivery task), the robot R irradiates laser slit light or infrared to find out the road surface state or search for a mark on the surface. That is, the robot R finds out where it is moving in the movement area and when in normal part of the movement area, irradiates laser slit light onto the surface to detect whether there are steps, undulation, or obstacles in or on the surface, and when in a mark M provided sub-area, irradiates infrared onto the surface to detect the mark M to confirm and correct its own position. The mark M is made of, e.g., reflective material that reflects back infrared. The mark M has position data, which is stored in the form of part of map data in a storage 30 (see FIG. 50). The map data includes position data of marks located at specific locations in the guide area, and data about the mark provided areas covering a predetermined range around the mark position. The mark M provided area refers to an area within a predetermined distance of the mark M that can be any area such as a circular area with the mark M as the center and a radius of 1 to 3 m or a rectangular area extending 3 m forward (on the robot side) of the mark M.

The managing computer 3 manages a plurality of robots R and controls the movement, speaking, and the like of the robots R via the radio base station 1 and the exclusive-to-robot network 2 and provides necessary information for the robots R. The necessary information includes the name of the detected person HB, a map around the robot R, etc., and is stored in a storage 3a of the managing computer 3.

The exclusive-to-robot network 2 connects the radio base station 1, the managing computer 3, and the network 4 and is embodied by a LAN (Local Area Network) or the like.

The terminal 5 connects to the managing computer 3 via the network 4 and registers information about the person HB and the like into the storage 3a of the managing computer 3 or corrects the registered information.

Figure 48A:
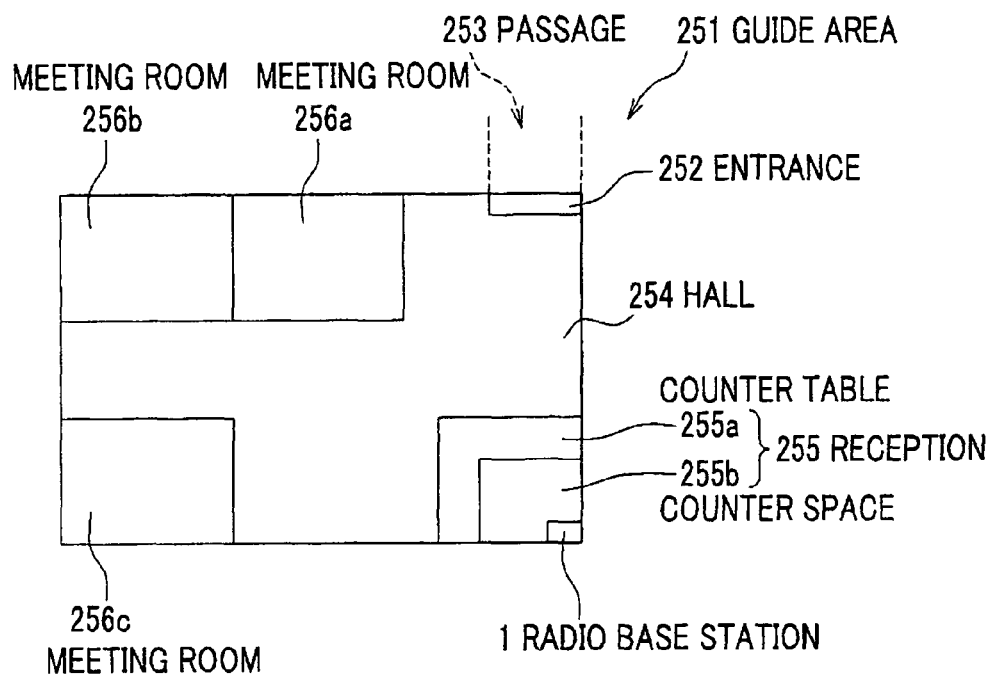
Figure 48B:
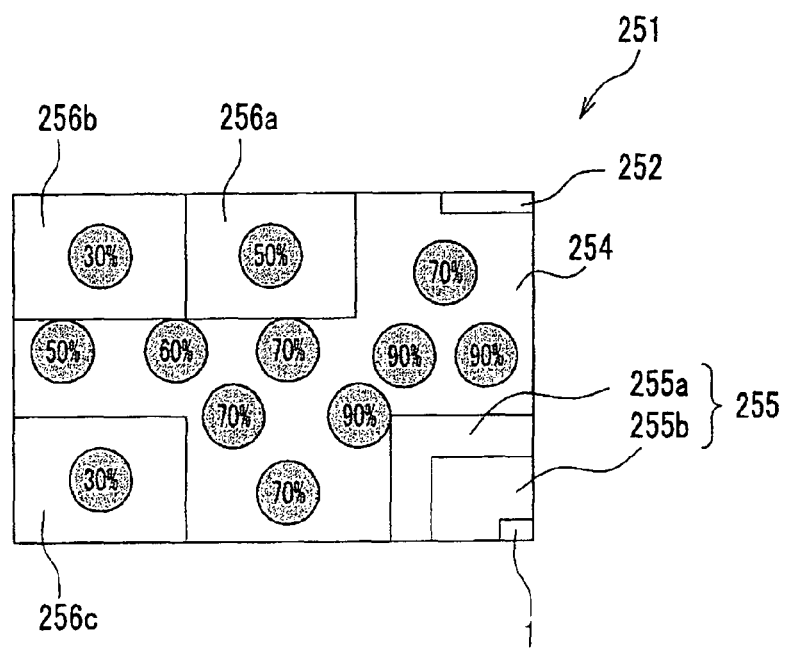

FIGS. 48A and 48B show an example of a guide area used in the guide system of FIG. 47; FIG. 48A is a plan view of the guide area; and FIG. 48B shows radio intensity in the guide area. The guide area 251 is a rectangular area of a floor of a building as shown in FIG. 48A. The robot R and a person to be guided by the robot R enter the guide area 251 through a passage 253 outside an entrance 252 of the guide area 251. A hall 254 extends from the inside of the entrance 252, and a reception 255 is provided in a back corner of the hall 254. Beside the walls of the guide area 251, there are provided a plurality of meeting rooms 256 (256a, 256b, 256c) partitioned as individual rooms. The reception 255 is made up of an L-shaped counter table 255a and a counter space 255b where a reception staff member stays. The radio base station 1 is provided in the counter space 255b. If the value of radio intensity at the radio base station 1 is normalized as 100%, the values of radio intensity are at 50 to 90% in the hall 254 of the guide area 251 as shown in FIG. 48B. In the meeting rooms 256, the values of radio intensity are at 30 to 50%. In this embodiment, the robot R stores in the storage 30 (see FIG. 50) a radio intensity map indicating information about radio intensity measured beforehand for each position of the guide area 251.

Hence, it is possible to have the robot R not enter areas having radio intensity of no higher than 50%. If entering a low radio intensity area and thus radio link with the radio base station 1 is cut off, the robot R stops walking as described later. Then, the reception staff member or the like leads the robot R by the arm R2, and thereby the robot R starts walking in the direction, detected with a pressure sensor (not shown), in which it is being led. As a result, the robot R can return to a place where the radio wave state is good.

Figure 49A:
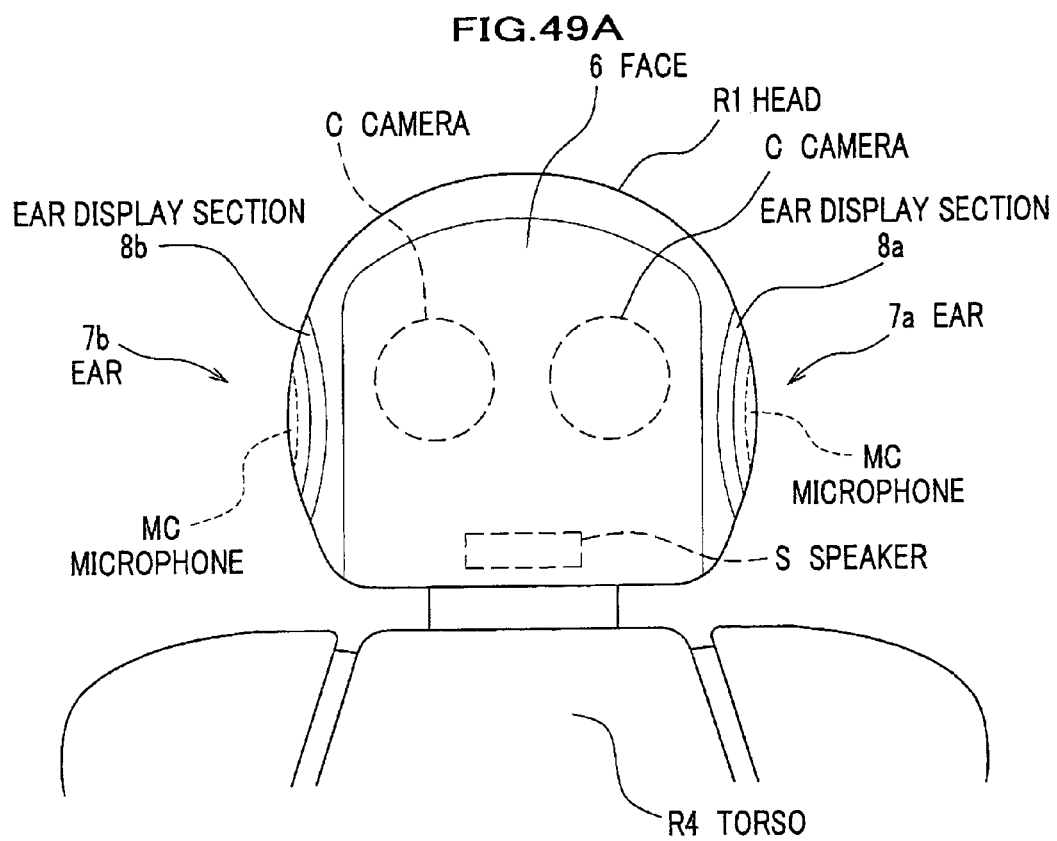
Figure 49B:
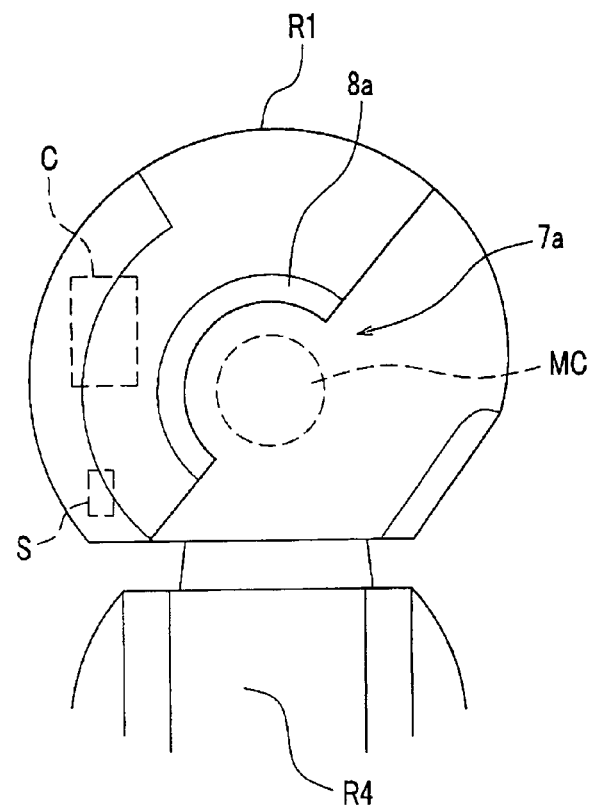

FIGS. 49A and 49B shows an example of the head of the robot shown in FIG. 47; FIG. 49A is a front view thereof; and FIG. 49B is a side view as seen from the left.

The head R1 of the robot R has two cameras C laterally arranged a predetermined distance apart in its face 6 and a speaker S provided below the cameras C in the face 6. Further, ears 7a, 7b are provided on opposite sides of the head R1. The face 6 of the head R1 is formed of material transparent to visible light.

The cameras C are for taking in images of the forward side of the robot R in the form of digital data and are embodied by, for example, color CCD (Charge Coupled Device) cameras. Image information picked up by the cameras C is output to an image processor 10 (see FIG. 50). The speaker S produces voice synthesized by a voice processor 20 (see FIG. 50).

The ears 7a, 7b are provided respectively with microphones MC as voice inputting sections and lighting ear display sections (ear display unit) 8a, 8b as half circle-shaped display unit. Voice information picked up by the microphones MC is output to the voice processor 20 (see FIG. 50). In the ear display sections 8a, 8b, for example, a white LED (Light Emitting Diode) is provided to light or blink (described later in detail).

Figure 50:
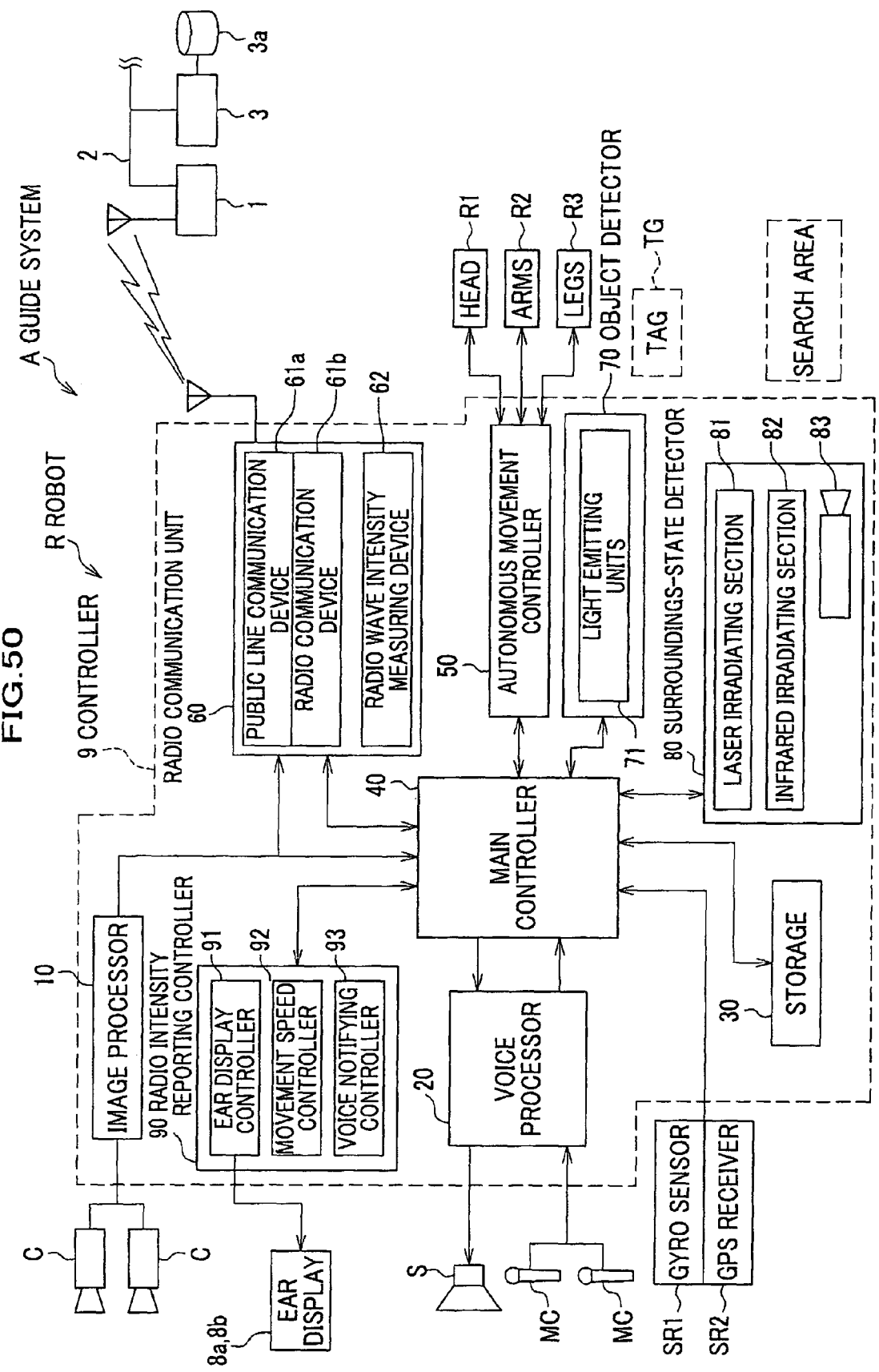
FIG. 50 is a block diagram showing an example of the configuration of the robot of FIG. 47.

The robot R will be described below in detail.
[Robot R]
FIG. 50 is a block diagram showing an example of the configuration of the robot R. As shown in FIG. 50, the robot R comprises the cameras C, the speaker S, the microphone MC, and a controller 9 that comprises the image processor 10, the voice processor 20, the storage 30, a main controller 40, an autonomous movement controller 50, a radio communication unit 60, an object detector 70, a surroundings-state detector 80, and a radio intensity reporting controller 90, as well as the head R1, arms R2, and legs R3. Further, the robot R has a gyro sensor SR1 and a GPS (Global Positioning System) receiver SR2 for detecting its current position. The components 10-90 of the controller 9 are located in a distributed manner in the torso R4, the back container R5, and the like.
[Image Processor]
The image processor 10 processes the images picked up by the cameras C and detects obstacles and persons in the surrounding area to find out the status of the surroundings of the robot R from the images. The image processor 10 has a function to detect the distance from the robot R to the image-picked-up object, a function to extract a moving object (person) from picked-up images, and a function to detect the position of the face of the extracted moving object (person). The detected position of the face is output to the main controller 40 as information for when the robot R moves and for communication with the person and also to the radio communication unit 60 and transmitted to the managing computer 3 via the radio base station 1.
[Voice Processor]
The voice processor 20 creates voice data from information in characters according to a speak instruction decided by the main controller 40 based on the beforehand-stored correspondence between voice data and information in characters and outputs voice to the speaker S. Further, the voice processor 20 creates information in characters from the voice data inputted through the microphones MC based on the beforehand-stored correspondence between voice data and information in characters and outputs to the main controller 40.
[Storage]
The storage 30 is constituted by a general hard disk device or the like and stores necessary information (persons' names, local map data, conversation data, etc.) received from the managing computer 3 and the identification numbers and position information of the persons detected by the robot R.
[Main Controller]
The main controller 40 controls overall the image processor 10, the voice processor 20, the storage 30, the autonomous movement controller 50, the radio communication unit 60, the object detector 70, the surroundings-state detector 80, and the radio intensity reporting controller 90. The main controller 40 makes various determinations and generates instructions for operating each component to control the robot R to move to a destination, to recognize a person, to communicate with the managing computer 3, and to talk with a person.
[Autonomous Movement Controller]
The autonomous movement controller 50 drives the head R1, arms R2, and legs R3 according to instructions from the main controller 40.
[Radio Communication Unit]
The radio communication unit 60 is a communication device for transmitting and receiving data to and from to the managing computer 3 and comprises a public line communication device 61a, a radio communication device 61b, and a radio wave intensity measuring device 62.

The public line communication device 61a is radio communication unit using a public line such as a mobile phone line or a PHS (Personal Handyphone System) line.

The radio communication device 61b is short-distance radio communication unit such as a wireless LAN (Local Area Network) in conformity with the IEEE 802.11b standard.

The radio wave intensity measuring device 62 measures the intensity at the current time point of radio waves transmitted from the radio base station 1. The radio wave intensity measuring device 62 measures the radio intensity at the place where the robot R exists, with the value of radio intensity at the place where the radio base station 1 is located being normalized as 100%.

The radio communication unit 60 selects the public line communication device 61a or the radio communication device 61b in response to a link request from the managing computer 3 and transmits and receives data to and from the managing computer 3.

The object detector 70 detects whether a person with a tag TG in the area around the robot R exists and comprises a plurality of light emitting units 71, which are constituted by, for example, LEDs and provided on the front and back and the left and right along the circumference of the head R1 of the robot R (not shown). The object detector 70 has each light emitting unit 71 transmit infrared containing a signal indicating the light emitting unit ID for the light emitting unit 71 and receives a receipt reporting signal from a tag TG that has received this infrared. The tag TG that has received the infrared from any unit 71 generates a receipt reporting signal based on the light emitting unit ID contained in the infrared, and hence the robot R can identifies in which direction the tag TG exists as seen from the robot R referring to the light emitting unit ID contained in the receipt reporting signal. Further, the object detector 70 has a function to identify the distance to the tag TG based on the radio wave intensity of the receipt reporting signal obtained from the tag TG. Thus, the object detector 70 can identify the position (distance and direction) of the tag TG as that of a person based on the receipt reporting signal. Yet further, the object detector 70 transmits radio waves containing a signal indicating the robot ID from an antenna (not shown) as well as the infrared from the light emitting unit 71. By this means, the tag TG that has received the radio waves can correctly identify the robot R transmitting the infrared. The details of the object detector 70 and the tag TG are disclosed in, for example, US 2006/0126918 (A1), which is herein incorporated by reference.

[Surroundings-State Detector]

The surroundings-state detector 80 detects the surroundings-state of the robot R and can obtain data about its own position detected by the gyro sensor SR1 and GPS receiver SR2. The surroundings-state detector 80 comprises a laser irradiating section 81 that irradiates slit light onto a search area, an infrared irradiating section 82 that irradiates infrared onto a search area, and a for-surface camera 83 to pick up images of the search area irradiated by the slit light or the infrared. The surroundings-state detector 80 analyzes slit light images (images when slit light is irradiated) picked up by the for-surface camera 83 to detect the surface state. Further, the surroundings-state detector 80 analyzes infrared images (images when infrared is irradiated) picked up by the for-surface camera 83 to detect the mark M and calculate a relative position relationship between the mark M and the robot R from the position (coordinates) of the detected mark M. The details of the surroundings-state detector 80 are disclosed in, for example, US 2006/0129276 (A1), which is herein incorporated by reference.

[Radio Intensity Reporting Controller]

The radio intensity reporting controller (radio intensity reporting control unit) 90 determines at which level of a plurality of predetermined levels the radio intensity is at the position where the robot R exists in the guide area and reports the determined level of radio intensity to the outside. In the present embodiment, the radio intensity reporting controller 90 determines the level of radio intensity based on the intensity at the current time point of radio waves transmitted from the radio base station 1. To be specific, the radio intensity reporting controller 90 determines the level of radio intensity based on the intensity of radio waves measured by the radio wave intensity measuring device 62. The number of levels of radio intensity is, for example, three. The first level has radio intensity values of no less than 70%, where the radio wave state is good. The second level has radio intensity values of no less than 50% but less than 70%, where the radio wave state is degraded. The third level has radio intensity values of less than 50%, where radio link may be cut off (the radio wave state being bad). The number of levels of radio intensity and the way to divide are arbitrary.

The radio intensity reporting controller 90 comprises an ear display controller 91, and a movement speed controller 92 and a voice notifying controller 93 that operate in conjunction with the ear display controller 91.

The ear display controller (ear display control unit) 91 controls the lighting states of the ear display sections 8a, 8b based on the determined level of radio intensity. To be specific, the ear display controller 91 outputs signals to have the ear display sections 8a, 8b operate as described below to the ear display sections 8a, 8b.

Figure 51A:
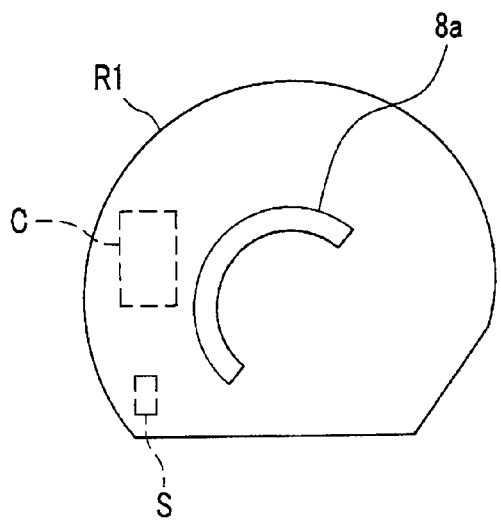
Figure 51B:
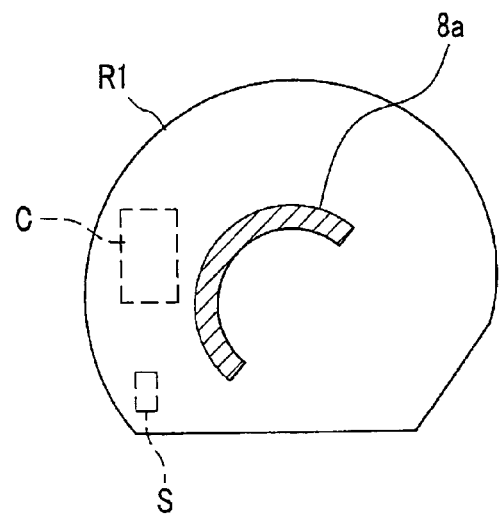
Figure 51C:
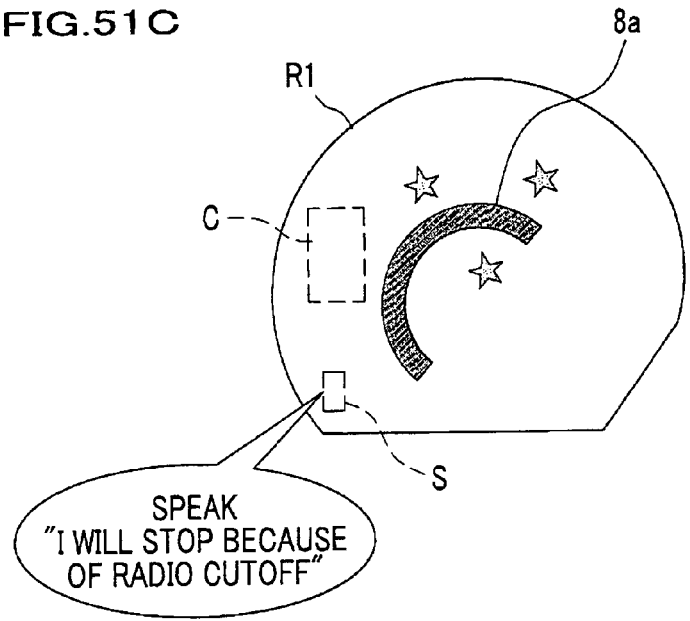
FIG. 51C shows the case where radio intensity is below 50%.

FIGS. 51A to 51C illustrate the display states of the ear display sections of FIG. 49; FIG. 51A shows the case where radio intensity is at or above 70%; FIG. 51B shows the case where radio intensity is at or above 50% but below 70%; and FIG. 51C shows the case where radio intensity is below 50%. In the present embodiment, if the radio intensity value is at or above 70%, the ear display controller 91 controls the ear display sections 8a, 8b to light at brightness of 100% (maximum brightness) as shown in FIG. 51A. If the radio intensity value is at or above 50% but below 70%, the ear display controller 91 controls the ear display sections 8a, 8b to light at brightness of 50% (half of the maximum brightness) as shown in FIG. 51B. If the radio intensity value is below 50%, the ear display controller 91 controls the ear display sections 8a, 8b to blink at brightness of 100% at a predetermined period as shown in FIG. 51C. Note that the values of brightness are arbitrary.

The movement speed controller (movement speed control unit) 92 controls the movement speed of the robot R to decelerate in connection with the lighting state of the ear display sections 8a, 8b when determining that the level of radio intensity is at a predetermined low level while the robot R is moving. To be specific, the movement speed controller 92 outputs to the autonomous movement controller 50 a signal (control command) to have the legs R3 operate as follows. That is, if the radio intensity value is at or above 70%, the movement speed controller 92 does not change the current walk speed (hereinafter called a constant speed walk). If the radio intensity value is at or above 50% but below 70%, the movement speed controller 92 reduces the walk speed to lower than the current one (hereinafter called a decelerated speed walk). In this case, it is preferable to decelerate the walk speed to no higher than half of the current one. In order to link again to the radio base station 1 after radio link is cut off during the decelerated speed walk, the movement speed is preferably at about 1 km per hour. If the radio intensity value is below 50%, the movement speed controller 92 controls the robot R to stop walking after speaking predetermined voice guidance. When the radio wave state has become good during the decelerated speed walk, the movement speed controller 92 controls the robot R to stop the decelerated speed walk and resume the constant speed walk.

When the movement speed controller 92 reduces the movement speed, the voice notifying controller (voice notifying control unit) 93 notifies that by voice. To be specific, the voice notifying controller 93 outputs to the main controller 40 a signal (control command) to have the speaker S output the following voice message. In this embodiment, the voice notifying controller 93 has the speaker S produce a voice guidance message to the effect "I will stop because of radio cutoff," as shown in FIG. 51C if the radio intensity value is below 50%. The voice output from the speaker S may be a buzzing sound or a warning beep or a combination with the voice guidance.

Figure 52:
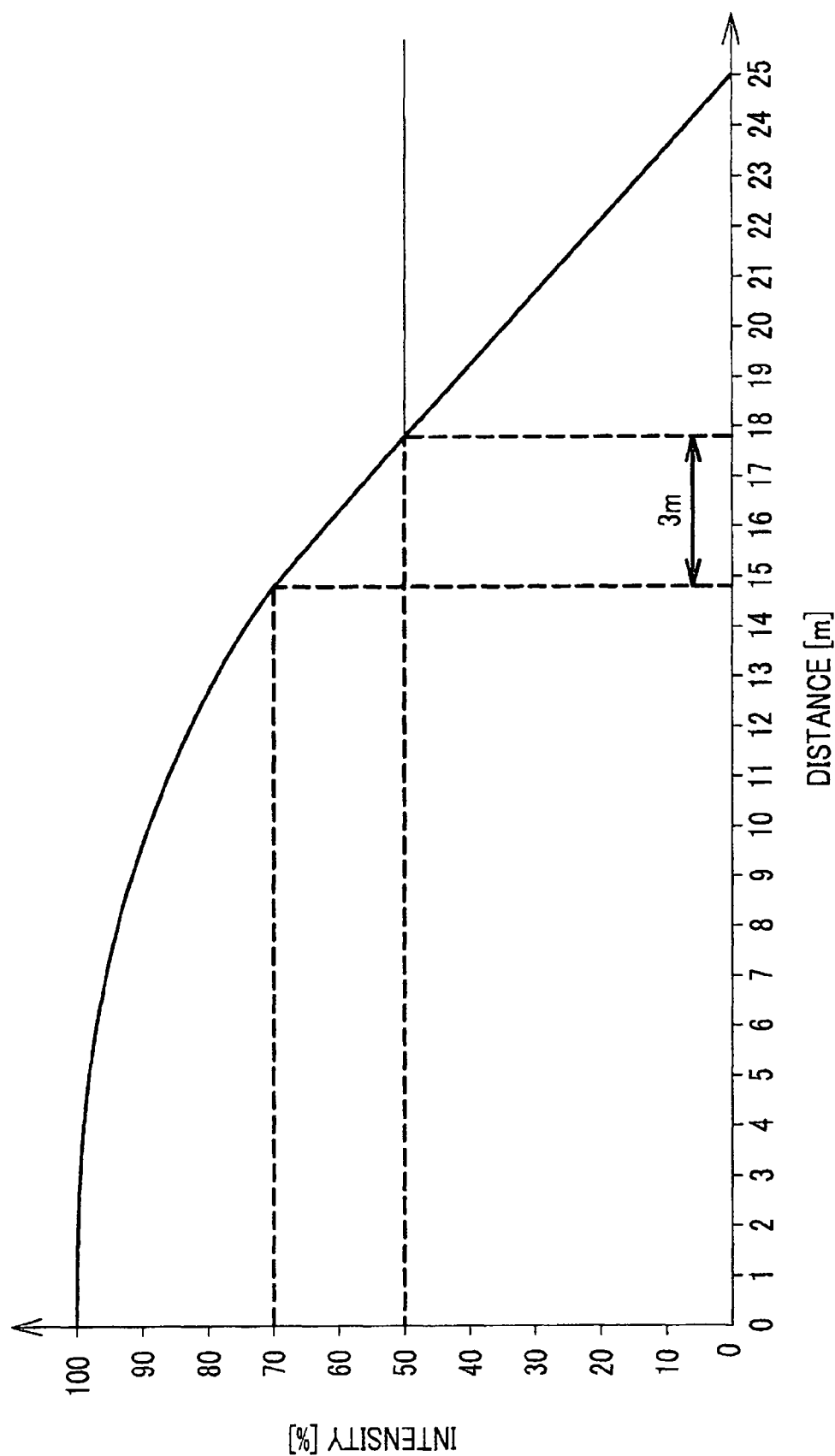
FIG. 52 is a chart showing an example of a relationship between the distance from the radio base station of FIG. 47 and the radio intensity.

FIG. 52 is a chart showing an example of a relationship between the distance from the radio base station of FIG. 47 and the radio intensity. As shown in FIG. 52, the distance at which the radio intensity value is at 70% is 14.8 m, and the distance at which the radio intensity value is at 50% is 17.8 m.

If the robot R performs the decelerated speed walk from a point where the distance from the radio base station 1 is 14.8 m to a point where the distance from the radio base station 1 is 17.8 m, the movement distance is 3 m. It takes about several seconds for the robot R to complete re-link after radio link with the radio base station 1 is cut off. Suppose that the robot R walks a movement distance of 3 m in 10 sec, the walk speed becomes 1.08 km per hour. If performing the decelerated speed walk at 1.08 km per hour during which radio cutoff occurs, the robot R can link again to the radio base station 1 without stopping the walk.

[General Operation of Guide System]

In the guide system A of FIG. 47, the general operation of the robot R and the managing computer 3 is as follows. That is, the robot R receives by the main controller 40 (see FIG. 50) a task execution command from the managing computer 3 via the radio communication unit 60 and executes a task. Each robot R performs the following actions: searching for a path (e.g., a path between nodes) from its current position (home position) to a task execution position according to its schedule, moving, executing the task, searching for a path from a task finish position to the home position, and moving in that order. In the movement, the robot R, referring to map data stored in the storage 30 (see FIG. 50), can reach a destination through the shortest distance while detecting persons by the object detector 70 (see FIG. 50). The robot R creates data (status information) concerning the state of the robot R (current position, remaining battery level, task execution status, etc.) at predetermined time intervals by the main controller 40 and outputs the created status information via the radio communication unit 60 to the managing computer 3, which registers the status information.

Next, with reference to FIG. 53 (and FIG. 50 as needed), the operation of the controller of the robot will be described.

Figure 53:
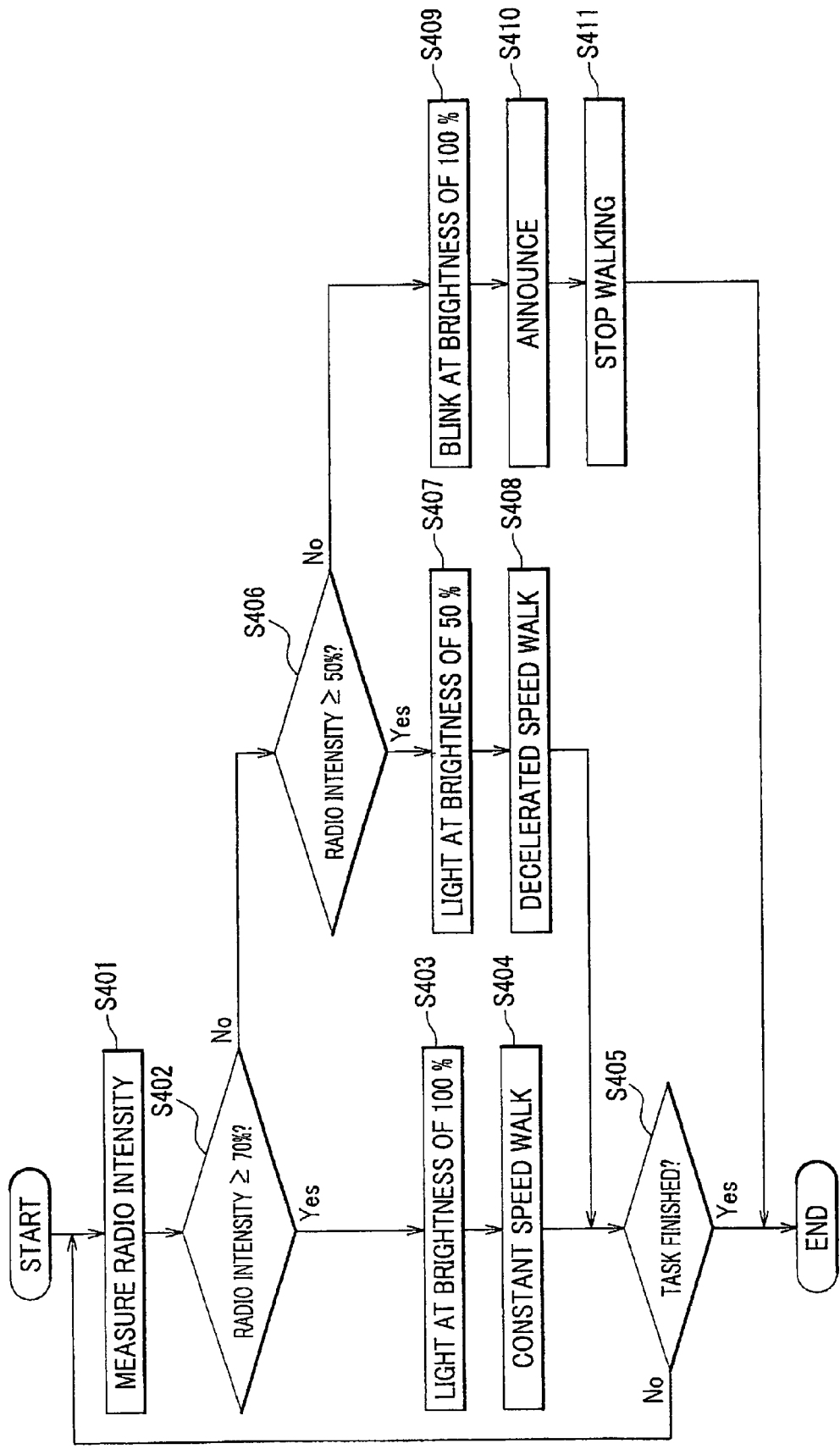
FIG. 53 is a flowchart showing an example of the operation of the robot of FIG. 47.

FIG. 53 is a flowchart showing an example of the operation of the robot R of FIG. 47.

When the robot R starts executing a task, the controller 9 of the robot measures radio intensity by the radio wave intensity measuring device 62 (step S401). Here, the task refers to a series of actions from starting to move from the home position to returning to the home position after guiding a person.

The controller 9 determines whether radio intensity is at or above 70% by the radio intensity reporting controller 90 (step S402). If radio intensity is at or above 70% (Yes at step S402), the radio intensity reporting controller 90 has the ear display controller 91 control the ear display sections 8a, 8b to light at brightness of 100% (step S403), which can show visually persons that the radio wave state is good. In this case, the radio intensity reporting controller 90 has the movement speed controller 92 control the robot R to perform the constant speed walk (step S404). Then, the radio intensity reporting controller 90 determines whether the task is finished (step S405). If the task is finished (Yes at step S405), the process is ended. On the other hand, if the task is not finished (No at step S405), the process returns to step S401.

If radio intensity is below 70% at step S402 (No at step S402), the radio intensity reporting controller 90 determines whether radio intensity is at or above 50% (step S406). If radio intensity is at or above 50% (Yes at step S406), the radio intensity reporting controller 90 has the ear display controller 91 control the ear display sections 8a, 8b to light at brightness of 50% (step S407), which can show visually persons that the radio wave state has degraded. In this case, the radio intensity reporting controller 90 has the movement speed controller 92 control the robot R to perform the decelerated speed walk (step S408), and the process returns to step S405.

If at step S406 radio intensity is below 50% (No at step S406), the radio intensity reporting controller 90 has the ear display controller 91 control the ear display sections 8a, 8b to blink at brightness of 100% (step S409), which can show visually persons that the radio wave state is bad. In this case, further, the radio intensity reporting controller 90 announces a voice guidance message by the voice notifying controller 93 (step S410), thereby notifying persons by voice that the radio wave state is bad. After the announcement, the radio intensity reporting controller 90 has the movement speed controller 92 control the robot R to stop walking (step S411), and the process is ended. An operator who has detected that radio link between the robot R and the managing computer 3 is cut off, can lead the robot R to be closer to the radio base station 1, thereby restoring the radio wave state around the robot R.

According to the present embodiment, the controller 9 of the robot can notify the level of radio intensity to the outside through the lighting state of the ear display sections 8a, 8b and can decelerate the movement speed if the level of radio intensity becomes lower during the movement of the robot R. Further, when decelerating the movement speed of the robot R, the controller 9 can notify that by voice. As a result, persons in the area around the robot R can detect the radio environment state of the robot R.

Although preferred embodiments of the present invention have been described, the present invention is not limited to the previous and above embodiments. For example, in the above embodiment, the controller 9 of the robot determines the level of radio intensity based on the intensity at the current time point of radio waves transmitted from the radio base station 1, but the level of radio intensity may be determined based on a radio intensity map created beforehand. In this case, because the radio wave intensity measuring device 62 is unnecessary, the number of components is reduced. Thus, in addition to a reduction in production costs, the battery charge amount required in movement can be reduced because of becoming lighter.

In the above embodiment, the levels of radio intensity are represented by the levels of brightness and blinking of the ear display sections 8a, 8b, but not being limited to this, for example, each of the ear display sections 8a, 8b may be divided into a plurality of (e.g., three) sub-sections, and the levels of radio intensity may be represented by different sizes of lighting. Or, the levels of radio intensity may be represented by different colors in lighting of the ear display sections 8a, 8b.

In the above embodiment, the voice notifying controller 93 controls to speak a voice guidance message immediately before stopping walking, but not being limited to this, for example, when radio intensity is not so bad as to stop walking, an announcement to the effect "Radio intensity is becoming worse. Attention is necessary," may be made.

What is claimed is:

1. A mobile robot which communicates by radio with a managing computer via one or more radio base stations coupled to the managing computer and autonomously moves in a movement area through use of map data of the movement area, comprising:

a radio communication unit for communicating by radio with each of the radio base stations;

a radio environment detecting unit for detecting plural types of radio environment data including radio intensity of a signal received by the radio communication unit in radio communication with the radio base station, wherein the radio environment data indicate degrees of goodness of a radio environment of the radio communication;

a comprehensive radio environment data calculating unit for weighting the plural types of radio environment data with predetermined weights and calculating comprehensive radio environment data from results of weighting, wherein the predetermined weights comprise intensity of radio wave and communication speed;

a self-position detecting unit for detecting a position of the robot in the movement area;

a storing unit for storing the map data of the movement area; and a comprehensive radio environment map creating unit for creating a comprehensive radio environment map for each of the radio base stations by writing the calculated comprehensive radio environment data into the map data stored in the storing unit, the calculated comprehensive radio environment data associated with the position detected by the self-position detecting unit when the radio environment data was detected by the radio environment detecting unit.

2. The mobile robot according to claim 1, wherein the plural types of radio environment data include data about at least one of communication speed, the number of communication error times, and the number of data retransmission times in addition to the data about the radio intensity.

3. The mobile robot according to claim 1, further comprising a movement control unit for autonomously moving to a predetermined position based on the map data stored in the storing unit and the position detected by the self-position detecting unit and a detecting unit for at the predetermined position, detecting the plural types of radio environment data by the radio environment detecting unit.

4. The mobile robot according to claim 1, further comprising:
a movement detecting unit for detecting a movement direction and movement speed of a person,
wherein the mobile robot moves together with the person in the movement direction and at the movement speed detected by the movement detecting unit and detects the plural types of radio environment data on a path on which the mobile robot moves together with the person by the radio environment detecting unit.

5. The mobile robot according to claim 1, wherein the radio environment detecting unit detects the plural types of radio environment data repeatedly at predetermined timings, and the comprehensive radio environment data calculating unit calculates the comprehensive radio environment data based on the radio environment data obtained in each repetition of the detection, the mobile robot further comprising:
a comprehensive radio environment map updating unit for updating the comprehensive radio environment map by comparing the calculated comprehensive radio environment data as first data and the comprehensive radio environment data which is stored in the map data as second data in association with the position detected when the corresponding radio environment data was detected and, if a difference between the first and second data being at or above a predetermined value has occurred a predetermined number of consecutive times, replacing the comprehensive radio environment data stored in the map data with the last calculated comprehensive radio environment data.

6. The mobile robot according to claim 1, further comprising:
an image pickup unit; and
a surroundings image acquiring unit for acquiring and storing images of surroundings of the robot picked up by the image pickup unit at the position where the radio environment data was detected by the radio environment detecting unit in association with the position where the radio environment data was detected into the storing unit.

7. The mobile robot according to claim 1, further comprising:
an optimum radio base station map creating unit for creating an optimum radio base station map,
wherein the optimum radio base station map creating unit is configured to create the optimum radio base station map by writing, into the map data stored in the storing unit, the comprehensive radio environment data selected for each position, based on a plurality of comprehensive radio environment maps created by the comprehensive radio environment map creating unit respectively for the plurality of radio base stations, in association with the position.

8. The mobile robot according to claim 7, further comprising:
a radio base station failure notifying unit for determining whether the radio environmental data was normally detected as a failure and, when the radio environment data of one radio base station is not normally detected, notifying the occurrence of the failure in the one radio base station to the managing computer via a radio base station other than the one radio base station by the radio communication unit.

9. The mobile robot according to claim 1, further comprising a transmitting unit for transmitting a comprehensive radio environment map created by the comprehensive radio environment map creating unit to the managing computer via the radio communication unit.

10. The mobile robot according to claim 1, further comprising:
a movement controlling unit for driving and controlling a movement mechanism for the robot to move autonomously to a goal position specified by the managing computer using the comprehensive radio environmental map;
a movement speed instructing unit for instructing the movement controlling unit about a movement speed; and
a maximum movement speed determining unit for determining a maximum movement speed for a movement path decided by the position of the robot detected by the self-position detecting unit before starting to move and by the goal position based on the radio environment data and the maximum movement speed associated with the radio environment data beforehand,
wherein the movement speed instructing unit instructs the movement controlling unit about a movement speed not higher than the maximum movement speed determined by the maximum movement speed determining unit.

11. The mobile robot according to claim 10, wherein the radio environment data includes plural types of radio environment indexes including radio intensity of a signal received by the radio communication unit in radio communication with the radio base station, which indexes indicate the degrees of goodness of the radio environment of the radio communication.

12. The mobile robot according to claim 10, further comprising:
a radio base station selecting unit for selecting a radio base station for the radio communication unit to link to from the plurality of radio base stations based on the respective comprehensive radio environment maps for the radio base stations; and a radio control switching unit for switching a link destination of the radio communication unit to the radio base station selected by the radio base station selecting unit, wherein the maximum movement speed determining unit determines a maximum movement speed based on the radio environment data stored in the comprehensive radio environment map for the radio base station selected by the radio base station selecting unit.

13. The mobile robot according to claim 12, further comprising an optimum radio base station map creating unit for creating an optimum radio base station map by writing a radio base station having best comprehensive radio environment data selected for each of positions based on a plurality of comprehensive radio environment maps created by the comprehensive radio environment map creating unit respectively for the plurality of radio base stations, in association with the position into the map data stored in the storing unit, wherein the radio base station selecting unit selects a radio base station for the radio communication unit to link to from the radio base stations based on the optimum radio base station map.

14. The mobile robot according to claim 12, wherein when the radio control switching unit switches the link of the radio communication unit between the radio base stations, the movement speed instructing unit stops the robot moving.

15. The mobile robot according to claim 12, wherein the radio base station selecting unit selects a radio base station closest to the goal position from radio base stations with which radio communication is established at a current position before starting to move and for which the radio environment data for the goal position is at or above a predetermined value.

16. The mobile robot according to claim 1, further comprising:
a movement controlling unit for driving and controlling a movement mechanism for the robot to move autonomously;
a monitoring unit for monitoring a state of the radio environment;
a searching unit for, when the radio environment state being monitored becomes a state of radio communication being cut off, searching for a communication restoration position where the radio communication is feasible to establish based on the comprehensive radio environment map; and
a self-position move instructing unit for instructing the movement controlling unit to control move from the position detected to the communication restoration position found by the searching unit.

17. The mobile robot according to claim 16, wherein the comprehensive radio environment map further has position information of each of the radio base stations associated with the comprehensive radio environment data for each of the radio base stations, and
wherein the searching unit comprises:
a base station searching unit for searching for radio base stations within a predetermined distance of the position based on the comprehensive radio environment map; and
a communication restoration position searching unit for selecting one of the radio base stations found by the base station searching unit in the order of from the closest to the position and searching for a position for which the comprehensive radio environment data for the selected radio base station satisfies a predetermined reference condition and which is closest to the position to take the found position as the communication restoration position.

18. The mobile robot according to claim 16, wherein the movement controlling unit controls a drive structure including the movement mechanism to control the operation of the robot, further comprising:
an antenna move instructing unit for instructing the movement controlling unit to perform a predetermined operation so as to change the position or direction of an antenna that transmits and receives radio waves when the searching unit determines a failure in finding the communication restoration position.

19. The mobile robot according to claim 16, further comprising:
a movement history storing unit for storing a movement history indicating the movement path on which the mobile robot has moved; and
a move-back instructing unit for instructing the movement controlling unit to control to move back on the movement path by a predetermined amount of movement based on the movement history when the searching unit determines the failure in finding the communication restoration position.

20. The mobile robot according to claim 16, further comprising:
a movement stop instructing unit for instructing the movement controlling unit to control to stop moving at the position of the robot detected when the searching unit determines the failure in finding the communication restoration position.

21. The mobile robot according to claim 16, further comprising:
a decelerate instructing unit for instructing the movement controlling unit to decelerate the movement speed when the radio environment state being monitored by the monitoring unit is degraded below a predetermined reference.

22. The mobile robot according to claim 1, further comprising:
a radio intensity reporting control unit for determining at which one of a plurality of predetermined levels radio intensity at the position of the robot is in the movement area and reporting the determined level of radio intensity to the outside.

23. The mobile robot according to claim 22, wherein the radio intensity reporting control unit comprises an ear display provided in a part of the robot at an ear position of the robot and ear display control unit for controlling the ear display to light on the basis of the determined level of radio intensity.

24. The mobile robot according to claim 23, wherein the radio intensity reporting control unit determines the level of radio intensity based on a radio intensity map indicating information about radio intensity measured beforehand at each position in the movement area.

25. The mobile robot according to claim 23, wherein the radio intensity reporting control unit determines the level of radio intensity based on a current intensity of radio waves transmitted from the radio base station.

26. The mobile robot according to claim 23, wherein the radio intensity reporting control unit further comprises movement speed control unit for controlling and reducing the movement speed of the robot in accordance with the lighting state of the ear display when the level of radio intensity is determined to be at a predetermined low level during movement of the robot.

27. The mobile robot according to claim 26, wherein the radio intensity reporting control unit further comprises voice notifying control unit for, when reducing the movement speed by the movement speed control unit, notifying reduction in the movement speed by voice.

28. A controller for a mobile robot which communicates by radio with a managing computer via one or more radio base stations connected to the managing computer and autonomously moves in a movement area through use of map data of the movement area, the controller comprising:
  a radio communication unit for communicating by radio with each of the radio base stations;
  a radio environment detecting unit for detecting plural types of radio environment data including radio intensity of a signal received by the radio communication unit in radio communication with the radio base station, wherein the radio environment data indicate degrees of goodness of the radio environment of the radio communication;
  a comprehensive radio environment data calculating unit for weighting the plural types of radio environment data with predetermined weights and calculating comprehensive radio environment data from results of weighting, wherein the predetermined weights comprise intensity of radio wave and communication speed;
  a self-position detecting unit for detecting a position of the robot in the movement area;
  a storing unit for storing the map data of the movement area; and
  a comprehensive radio environment map creating unit for creating a comprehensive radio environment map for the radio base station by writing the calculated comprehensive radio environment data into the map data stored in the storing unit, the calculated comprehensive radio environment data associated with the position detected by the self-position detecting unit when the radio environment data was detected by the radio environment detecting unit.

29. The controller for the mobile robot according to claim 28, further comprising:
  a movement controlling unit for driving and controlling a movement mechanism for the robot to move autonomously to a goal position specified by the managing computer using the comprehensive radio environment map;
  a movement speed instructing unit for instructing the movement controlling unit about a movement speed; and
  a maximum movement speed determining unit for determining a maximum movement speed for a movement path decided by the position of the robot detected by the self-position detecting unit before starting to move and by the goal position based on the radio environment data and the maximum movement speed associated with the radio environment data beforehand,
  wherein the movement speed instructing unit instructs the movement controlling unit about a movement speed not higher than the maximum movement speed determined by the maximum movement speed determining unit.

30. The controller for the mobile robot according to claim 28, further comprising:
  a radio environmental map storing unit for storing a comprehensive radio environment map for associating comprehensive radio environment data including a plurality of types of radio environmental data regarding the radio environment in the movement area with a map data in the movement area;
  a movement controlling unit for driving and controlling a movement mechanism for the robot to move autonomously on the basis of a task transmitted from a base station using the comprehensive radio environment map;
  a monitoring unit for monitoring the state of the radio environment;
  a searching unit for, when the radio environment state being monitored becomes a state of radio communication being cut off, searching for a communication restoration position where the radio communication is feasible to establish based on the comprehensive radio environment map; and
  a self-position move instructing unit for instructing the movement control unit to control to move from the position of the robot detected to the communication restoration position found by the searching unit.

31. The controller for the mobile robot according to claim 28, further comprising:
  a radio intensity reporting control unit for determining at which one of a plurality of predetermined levels radio intensity at the position of the robot is in the movement area and reporting the determined level of radio intensity to the outside.

* * * * *